(12) United States Patent
Manzari et al.

(10) Patent No.: US 10,136,048 B2
(45) Date of Patent: Nov. 20, 2018

(54) USER INTERFACE FOR CAMERA EFFECTS

(71) Applicant: Apple Inc., Cupertino, CA (US)

(72) Inventors: Behkish J. Manzari, San Francisco, CA (US); Marek Bereza, San Francisco, CA (US); Pavel Pivoňka, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/858,175

(22) Filed: Dec. 29, 2017

(65) Prior Publication Data

US 2018/0146132 A1    May 24, 2018

Related U.S. Application Data

(63) Continuation of application No. 15/273,453, filed on Sep. 22, 2016, now Pat. No. 9,912,860.

(Continued)

(51) Int. Cl.
*H04N 5/232* (2006.01)
*H04N 5/262* (2006.01)
(Continued)

(52) U.S. Cl.
CPC ....... *H04N 5/23216* (2013.01); *G06F 3/0484* (2013.01); *G06F 3/0488* (2013.01);
(Continued)

(58) Field of Classification Search
CPC ............. H04N 5/23216; H04N 5/2628; H04N 5/23293; G06F 3/04883; G06F 3/04847; G06F 3/04817
See application file for complete search history.

(56) References Cited

U.S. PATENT DOCUMENTS 5,557,358 A   9/1996 Mukai et al.
5,615,384 A   3/1997 Allard et al.
(Continued)

FOREIGN PATENT DOCUMENTS

CN    1705346 A    12/2005
CN   101427574 A    5/2009
(Continued)

OTHER PUBLICATIONS

Corrected Notice of Allowance received for U.S. Appl. No. 15/273,453, dated Dec. 21, 2017, 3 pages.
(Continued)

*Primary Examiner* — Padma Haliyur
(74) *Attorney, Agent, or Firm* — Dentons US LLP

(57) ABSTRACT

The present disclosure generally relates to user interfaces. In some examples, the electronic device transitions between user interfaces for capturing photos based on data received from a first camera and a second camera. In some examples, the electronic device provides enhanced zooming capabilities that result in visual pleasing results for a displayed digital viewfinder and for captured videos. In some examples, the electronic device provides user interfaces for transitioning a digital viewfinder between a first camera with an applied digital zoom to a second camera with no digital zoom. In some examples, the electronic device prepares to capture media at various magnification levels. In some examples, the electronic device enhanced capabilities for navigating through a plurality of values.

36 Claims, 157 Drawing Sheets

Related U.S. Application Data

(60) Provisional application No. 62/397,860, filed on Sep. 21, 2016, provisional application No. 62/384,140, filed on Sep. 6, 2016, provisional application No. 62/349,059, filed on Jun. 12, 2016.

(51) Int. Cl.

| | | |
|---|---|---|
| *G06F 3/0488* | (2013.01) | |
| *G06F 3/0484* | (2013.01) | |
| *H04N 13/271* | (2018.01) | |
| *G06T 5/00* | (2006.01) | |
| *H04N 5/247* | (2006.01) | |
| *H04N 13/239* | (2018.01) | |
| *G06F 3/0481* | (2013.01) | |
| *G06F 3/0482* | (2013.01) | |
| *H04N 5/225* | (2006.01) | |

(52) U.S. Cl.
CPC ...... *G06F 3/04847* (2013.01); *G06F 3/04883* (2013.01); *G06T 5/002* (2013.01); *H04N 5/23212* (2013.01); *H04N 5/23219* (2013.01); *H04N 5/23222* (2013.01); *H04N 5/23241* (2013.01); *H04N 5/23245* (2013.01); *H04N 5/23293* (2013.01); *H04N 5/23296* (2013.01); *H04N 5/247* (2013.01); *H04N 5/262* (2013.01); *H04N 5/2628* (2013.01); *H04N 13/239* (2018.05); *H04N 13/271* (2018.05); *G03B 2205/0092* (2013.01); *G03B 2217/002* (2013.01); *G06F 3/0482* (2013.01); *G06F 3/04817* (2013.01); *G06F 2203/04803* (2013.01); *G06F 2203/04806* (2013.01); *G06F 2203/04808* (2013.01); *G06T 2207/10028* (2013.01); *G06T 2207/30204* (2013.01); *H04N 5/2258* (2013.01)

(56) References Cited

U.S. PATENT DOCUMENTS

| | | | |
|---|---|---|---|
| 5,825,353 | A | 10/1998 | Will |
| 6,522,347 | B1 | 2/2003 | Tsuji et al. |
| 6,809,724 | B1 | 10/2004 | Shiraishi et al. |
| 6,809,759 | B1 | 10/2004 | Chiang |
| 6,819,867 | B2 | 11/2004 | Mayer et al. |
| 7,463,304 | B2 | 12/2008 | Murray |
| 7,551,899 | B1 | 6/2009 | Nicolas et al. |
| 8,405,680 | B1 | 3/2013 | Cardoso Lopes et al. |
| 8,624,836 | B1 | 1/2014 | Miller et al. |
| 8,675,084 | B2 | 3/2014 | Bolton et al. |
| 8,742,890 | B2 | 6/2014 | Gocho et al. |
| 8,817,158 | B2 | 8/2014 | Saito |
| 9,172,866 | B2 | 10/2015 | Ito et al. |
| 9,185,291 | B1 | 11/2015 | Shabtay et al. |
| 9,360,671 | B1 | 6/2016 | Zhou |
| 9,451,144 | B2 | 9/2016 | Dye et al. |
| 9,538,152 | B2 | 1/2017 | Shabtay et al. |
| 9,544,563 | B1 | 1/2017 | Chin et al. |
| 9,704,250 | B1 | 7/2017 | Shah et al. |
| 9,716,825 | B1 | 7/2017 | Manzari et al. |
| 2002/0140803 | A1 | 10/2002 | Gutta et al. |
| 2002/0171737 | A1 | 11/2002 | Tullis |
| 2003/0025802 | A1 | 2/2003 | Mayer et al. |
| 2004/0061796 | A1 | 4/2004 | Honda et al. |
| 2004/0095473 | A1 | 5/2004 | Park |
| 2004/0189861 | A1 | 9/2004 | Tom et al. |
| 2005/0134695 | A1 | 6/2005 | Deshpande |
| 2005/0189419 | A1 | 9/2005 | Igarashi et al. |
| 2005/0237383 | A1 | 10/2005 | Soga |
| 2006/0026521 | A1 | 2/2006 | Hotelling et al. |
| 2006/0187322 | A1 | 8/2006 | Janson et al. |
| 2006/0228040 | A1 | 10/2006 | Simon et al. |
| 2006/0275025 | A1 | 12/2006 | Labaziewicz et al. |
| 2007/0025711 | A1 | 2/2007 | Marcus |
| 2007/0025714 | A1 | 2/2007 | Shiraki |
| 2007/0097088 | A1 | 5/2007 | Battles |
| 2007/0109417 | A1 | 5/2007 | Hyttfors et al. |
| 2007/0113099 | A1 | 5/2007 | Takikawa et al. |
| 2007/0140675 | A1 | 6/2007 | Yanagi |
| 2007/0165103 | A1 | 7/2007 | Arima et al. |
| 2008/0129759 | A1 | 6/2008 | Jeon et al. |
| 2008/0146275 | A1 | 6/2008 | Tofflinger |
| 2008/0192020 | A1 | 8/2008 | Kang et al. |
| 2008/0218611 | A1 | 9/2008 | Parulski et al. |
| 2008/0284855 | A1 | 11/2008 | Umeyama et al. |
| 2008/0297587 | A1 | 12/2008 | Kurtz et al. |
| 2009/0021600 | A1 | 1/2009 | Watanabe |
| 2009/0102933 | A1 | 4/2009 | Harris et al. |
| 2009/0315671 | A1 | 12/2009 | Gocho |
| 2010/0020221 | A1 | 1/2010 | Tupman et al. |
| 2010/0020222 | A1 | 1/2010 | Jones et al. |
| 2010/0097322 | A1 | 4/2010 | Hu et al. |
| 2010/0232704 | A1 | 9/2010 | Thorn |
| 2010/0283743 | A1 | 11/2010 | Coddington |
| 2010/0289825 | A1 | 11/2010 | Shin et al. |
| 2010/0289910 | A1 | 11/2010 | Kamshilin |
| 2011/0008033 | A1 | 1/2011 | Ichimiya |
| 2011/0019058 | A1 | 1/2011 | Sakai et al. |
| 2011/0019655 | A1 | 1/2011 | Hakola |
| 2011/0058052 | A1 | 3/2011 | Bolton et al. |
| 2011/0074710 | A1 | 3/2011 | Weeldreyer et al. |
| 2011/0074830 | A1 | 3/2011 | Rapp et al. |
| 2011/0085016 | A1 | 4/2011 | Kristiansen et al. |
| 2011/0115932 | A1 | 5/2011 | Shin et al. |
| 2011/0234853 | A1 | 9/2011 | Hayashi et al. |
| 2012/0057064 | A1 | 3/2012 | Gardiner et al. |
| 2012/0120277 | A1 | 5/2012 | Tsai |
| 2012/0169776 | A1 | 7/2012 | Rissa et al. |
| 2012/0194559 | A1 | 8/2012 | Lim |
| 2012/0320141 | A1 | 12/2012 | Bowen et al. |
| 2013/0009858 | A1 | 1/2013 | Lacey |
| 2013/0038546 | A1 | 2/2013 | Mineo |
| 2013/0038771 | A1 | 2/2013 | Brunner et al. |
| 2013/0055119 | A1 | 2/2013 | Luong |
| 2013/0057472 | A1 | 3/2013 | Dizac et al. |
| 2013/0076908 | A1 | 3/2013 | Bratton et al. |
| 2013/0141362 | A1 | 6/2013 | Asanuma |
| 2013/0208136 | A1 | 8/2013 | Takatsuka et al. |
| 2013/0222663 | A1 | 8/2013 | Rydenhag et al. |
| 2013/0265311 | A1 | 10/2013 | Na et al. |
| 2013/0265467 | A1 | 10/2013 | Matsuzawa et al. |
| 2013/0278576 | A1 | 10/2013 | Lee et al. |
| 2013/0286251 | A1 | 10/2013 | Wood et al. |
| 2013/0329074 | A1 | 12/2013 | Zhang et al. |
| 2014/0007021 | A1 | 1/2014 | Akiyama |
| 2014/0022399 | A1 | 1/2014 | Rashid |
| 2014/0033100 | A1 | 1/2014 | Noda et al. |
| 2014/0063313 | A1 | 3/2014 | Choi et al. |
| 2014/0078371 | A1 | 3/2014 | Kinoshita |
| 2014/0095122 | A1 | 4/2014 | Appleman et al. |
| 2014/0099994 | A1 | 4/2014 | Bishop et al. |
| 2014/0104449 | A1 | 4/2014 | Masarik et al. |
| 2014/0118563 | A1 | 5/2014 | Mehta et al. |
| 2014/0132735 | A1 | 5/2014 | Lee et al. |
| 2014/0160231 | A1 | 6/2014 | Middleton et al. |
| 2014/0160304 | A1 | 6/2014 | Galor et al. |
| 2014/0184524 | A1 | 7/2014 | Schiefer et al. |
| 2014/0192233 | A1 | 7/2014 | Kakkori et al. |
| 2014/0204229 | A1 | 7/2014 | Leung |
| 2014/0218599 | A1 | 8/2014 | Nakamura |
| 2014/0267126 | A1 | 9/2014 | Berg et al. |
| 2014/0267867 | A1 | 9/2014 | Lee et al. |
| 2014/0310598 | A1 | 10/2014 | Sprague et al. |
| 2014/0327639 | A1 | 11/2014 | Papakipos et al. |
| 2014/0351753 | A1 | 11/2014 | Shin et al. |
| 2014/0368719 | A1 | 12/2014 | Kaneko et al. |
| 2015/0022674 | A1 | 1/2015 | Blair et al. |
| 2015/0043806 | A1 | 2/2015 | Karsch et al. |
| 2015/0049233 | A1 | 2/2015 | Choi |
| 2015/0067513 | A1 | 3/2015 | Zambetti et al. |
| 2015/0109417 | A1 | 4/2015 | Zirnheld |
| 2015/0146079 | A1 | 5/2015 | Kim |

(56) References Cited

U.S. PATENT DOCUMENTS

| | | | |
|---|---|---|---|
| 2015/0150141 A1 | 5/2015 | szymanski et al. |
| 2015/0181135 A1 | 6/2015 | Shimosato |
| 2015/0189162 A1 | 7/2015 | Kuo et al. |
| 2015/0208001 A1 | 7/2015 | Kaneko et al. |
| 2015/0248583 A1 | 9/2015 | Sugita et al. |
| 2015/0264202 A1 | 9/2015 | Pawlowski |
| 2015/0297185 A1 | 10/2015 | Mander et al. |
| 2015/0350533 A1 | 12/2015 | Harris et al. |
| 2015/0362998 A1 | 12/2015 | Park et al. |
| 2015/0370458 A1 | 12/2015 | Chen |
| 2016/0012567 A1 | 1/2016 | Siddiqui et al. |
| 2016/0044236 A1 | 2/2016 | Matsuzawa et al. |
| 2016/0065861 A1 | 3/2016 | Steinberg et al. |
| 2016/0080657 A1 | 3/2016 | Chou et al. |
| 2016/0142649 A1 | 5/2016 | Yim |
| 2016/0173869 A1 | 6/2016 | Wang et al. |
| 2016/0241793 A1 | 8/2016 | Ravirala et al. |
| 2016/0283097 A1 | 9/2016 | Voss |
| 2016/0307324 A1 | 10/2016 | Nakada et al. |
| 2016/0316147 A1 | 10/2016 | Bernstein et al. |
| 2016/0353030 A1 | 12/2016 | Gao et al. |
| 2016/0357387 A1 | 12/2016 | Penha et al. |
| 2016/0366323 A1 | 12/2016 | Chan et al. |
| 2016/0373631 A1 | 12/2016 | Kocienda et al. |
| 2017/0006210 A1 | 1/2017 | Dye et al. |
| 2017/0061635 A1 | 3/2017 | Oberheu et al. |
| 2017/0111567 A1 | 4/2017 | Pila |
| 2017/0359504 A1 | 12/2017 | Manzari et al. |
| 2017/0359505 A1 | 12/2017 | Manzari et al. |
| 2017/0359506 A1 | 12/2017 | Manzari et al. |
| 2018/0131876 A1 | 5/2018 | Bernstein et al. |

FOREIGN PATENT DOCUMENTS

| | | |
|---|---|---|
| EP | 1981262 A1 | 10/2008 |
| EP | 2487613 A1 | 8/2012 |
| EP | 2640060 A1 | 9/2013 |
| EP | 2950198 A1 | 12/2015 |
| EP | 3209012 A1 | 8/2017 |
| JP | 2010-160581 A | 7/2010 |
| JP | 2012-124608 A | 6/2012 |
| JP | 2015-146619 A | 8/2015 |
| WO | 2010/102678 A1 | 9/2010 |
| WO | 2014/105276 A1 | 7/2014 |
| WO | 2015/112868 A1 | 7/2015 |
| WO | 2015/190666 A1 | 12/2015 |

OTHER PUBLICATIONS

Corrected Notice of Allowance received for U.S. Appl. No. 15/273,453, dated Feb. 8, 2018, 2 pages.
Corrected Notice of Allowance received for U.S. Appl. No. 15/273,453, dated Nov. 27, 2017, 2 pages.
Dialandroid, "Google Camera Lens Blur Vs Galaxy S5 Selective Focus", Available online at: https://www.youtube.com/watch?v=4RJf9V85hHc, Apr. 16, 2014, 1 page.
Hernández, Carlos, "Lens Blur in the New Google Camera App", Available online at: https://research.googleblog.com/2014/04/lens-blur-in-new-google-camera-app.html, Apr. 16, 2014, 6 pages.
International Search Report & Written Opinion received for PCT Patent Application No. PCT/US2016/029030, dated Aug. 5, 2016, 37 pages.
International Search Report and Written Opinion received for PCT Patent Application No. PCT/US2017/035321, dated Oct. 6, 2017, 15 pages.
Non-Final Office Action received for U.S. Appl. No. 15/136,323, dated Apr. 6, 2017, 27 pages.
Non-Final Office Action received for U.S. Appl. No. 15/273,522, dated Nov. 30, 2016, 15 pages.
Non-Final Office Action received for U.S. Appl. No. 15/273,544, dated May 25, 2017, 18 pages.
Notice of Allowance received for U.S. Appl. No. 15/273,453, dated Oct. 12, 2017, 11 pages.
Notice of Allowance received for U.S. Appl. No. 15/273,522, dated Mar. 28, 2017, 9 pages.
Notice of Allowance received for U.S. Appl. No. 15/273,522, dated May 19, 2017, 2 pages.
Notice of Allowance received for U.S. Appl. No. 15/273,522, dated May 23, 2017, 2 pages.
Office Action received for Australian Patent Application No. 2017100683, dated Sep. 20, 2017, 3 pages.
Office Action received for Australian Patent Application No. 2017100684, dated Oct. 5, 2017, 4 pages.
Office action received for Danish Patent Application No. PA201670627, dated Apr. 5, 2017, 3 pages.
Office Action received for Danish Patent Application No. PA201670627, dated Nov. 6, 2017, 2 pages.
Office Action reveived for Danish Patent Application No. PA201670627, dated Oct. 11, 2016, 8 pages.
Office Action received for Danish Patent Application No. PA201670753, dated Dec. 20, 2016, 7 pages.
Office Action received for Danish Patent Application No. PA201670753, dated Jul. 5, 2017, 4 pages.
Office Action received for Danish Patent Application No. PA201670755, dated Apr. 6, 2017, 5 pages.
Office Action received for Danish Patent Application No. PA201670755, dated Dec. 22, 2016, 6 pages.
Office Action received for Danish Patent Application No. PA201670755, dated Oct. 20, 2017, 4 pages.
Seberini, Laurence, "Tutorial on the Lens Blur Feature for Google Camera App (android)", Available online at: https://www.youtube.com/watch?v=GmpmhvVlklc, Jan. 25, 2015, 1 page.
Extended European Search Report received for European Patent Application No. 16784025.5, dated Apr. 16, 2018, 11 pages.
Office Action received for Chinese Patent Application No. 201580046237.6, dated Feb. 6, 2018, 10 pages (5 pages of English Translation and 5 pages of Official Copy).
Corrected Notice of Allowance received for U.S. Appl. No. 15/268,115, dated Apr. 13, 2018, 11 pages.
Office Action received for Danish Patent Application No. PA201670755, dated Apr. 20, 2018, 2 pages.
Peters, Jeremy W., "Long-Awaited iPhone Goes on Sale", The New York Times, Jun. 29, 2007, 3 pages.
Helpvideostv, "How to Use Snap Filters on Snapchat", Retrieved from <https://www.youtube.com/watch?v=oR-7clWPszU&feature=youtu.be>, Mar. 22, 2017, pp. 1-2.
Lenses, Snapchat, "How to Get All Snapchat Lenses Face Effect Filter on Android", Retrieved from: <https://www.youtube.com/watch?v=0PfnF1RInfw&feature=youtu.be>, Sep. 21, 2015, pp. 1-2.
Non-Final Office Action received for U.S. Appl. No. 15/863,369, dated Apr. 4, 2018, 15 pages.
Office Action received for Danish Patent Application No. PA201670753, dated Mar. 23, 2018, 5 pages.
Paine, Steve, "Samsung Galaxy Camera Detailed Overview—User Interface", Retrieved from: <https://www.youtube.com/watch?v=td8UYSySulo&feature=youtu.be>, Sep. 18, 2012, pp. 1-2.
Phonearena, "Sony Xperia Z5 camera app and UI overview", Retrieved from <https://www.youtube.com/watch?v=UtDzdTsmkfU&feature=youtu.be>, Sep. 8, 2015, pp. 1-3.
Corrected Notice of Allowance received for U.S. Appl. No. 15/268,115, dated Mar. 21, 2018, 9 pages.
Notice of Allowance received for U.S. Appl. No. 15/136,323, dated Feb. 28, 2018, 9 pages.
Notice of Allowance received for U.S. Appl. No. 15/268,115, dated Mar. 7, 2018, 15 pages.
Notice of Allowance received for U.S. Appl. No. 15/273,544, dated Mar. 13, 2018, 8 pages.
"Dslrdashboard", Available online at: https://www.youtube.com/watch?v=DD4dCVinreU, 2013, 1 page.
"Iphone User Guide for Ios 4.2 and 4.3 Software", Available at https://manuals.info.apple.com/MANUALS/1000/MA1539/en_US/iPhone_iOS4_User_Guide.pdf, 2011, 274 pages.

(56) References Cited

OTHER PUBLICATIONS

"Playmemories Camera Apps Help Guide", available at https://www.playmemoriescameraapps.com/portal/manual/IS9104-NPIA09014_00-F00002/en/index.html, 2012, 3 pages.
"Remote Shot for Smartwatch 2", Android Apps on Google Play, Nov. 21, 2017, 3 pages.
Apple, "Iphone User's Guide", Available at http://mesnotices.20minutes.fr/manuel-notice-mode-emploi/APPLE/IPHONE%2D%5FE#, Jun. 2007, 137 pages.
Certificate of Examination received for Australian Patent Application No. 2017100683, dated Jan. 16, 2018, 2 pages.
Corrected Notice of Allowance received for U.S. Appl. No. 15/273,503, dated Nov. 2, 2017, 2 pages.
Corrected Notice of Allowance received for U.S. Appl. No. 15/273,503, dated Nov. 24, 2017, 2 pages.
Decision to Grant received for Danish Patent Application No. PA201570788, dated Jul. 10, 2017, 2 pages.
Decision to Grant received for Danish Patent Application No. PA201570791, dated Jun. 7, 2017, 2 pages.
Extended European Search Report (includes Supplementary European Search Report and Search Opinion) received for European Patent Application No. 17184710.6, dated Nov. 28, 2017, 10 pages.
Final Office Action received for U.S. Appl. No. 15/268,115, dated Oct. 11, 2017, 48 pages.
Fuji Film, "Taking Pictures Remotely: Free Iphone/Android App Fujifilm Camera Remote", Available at http://app.fujifilm-dsc.com/en/camera_remote/guide05.html, Apr. 22, 2014, 3 pages.
Intention to Grant received for Danish Patent Application No. PA201570788, dated Mar. 27, 2017, 2 pages.
Intention to Grant received for Danish Patent Application No. PA201570791, dated Mar. 7, 2017, 2 pages.
Intention to Grant received for European Patent Application No. 15712218.5, dated Jan. 24, 2018, 7 pages.
International Preliminary Report on Patentability and Written Opinion received for PCT Application No. PCT/US2016/029030, dated Nov. 2, 2017, 35 pages.
International Preliminary Report on Patentability received for PCT Patent Application No. PCT/US2015/019298, dated Mar. 16, 2017, 12 pages.
International Search Report and Written Opinion received for PCT Patent Application No. PCT/US2015/019298, dated Jul. 13, 2015, 17 pages.
Invitation to Pay Addition Fees received for PCT Patent Application No. PCT/US2017/035321, dated Aug. 17, 2017, 3 pages.
Non-Final Office Action received for U.S. Appl. No. 12/508,534, dated Dec. 30, 2011, 11 pages.
Non-Final Office Action received for U.S. Appl. No. 14/869,807, dated Dec. 2, 2016, 23 pages.
Non-Final Office Action received for U.S. Appl. No. 15/268,115, dated Apr. 13, 2017, 44 pages.
Notice of Acceptance received for Australian Patent Application No. 2016252993, dated Dec. 19, 2017, 3 pages.
Notice of Allowance received for Taiwanese Patent Application No. 104107328, dated Jun. 12, 2017, 3 pages (Official copy only) (See Communication under 37 CFR § 1.98(a) (3).
Notice of Allowance received for U.S. Appl. No. 14/641,251, dated Jun. 17, 2016, 2 pages.
Notice of Allowance received for U.S. Appl. No. 14/641,251, dated May 18, 2016, 13 pages.
Notice of Allowance received for U.S. Appl. No. 14/869,807, dated Jun. 21, 2017, 9 pages.
Notice of Allowance received for U.S. Appl. No. 14/869,807, dated Oct. 10, 2017, 9 pages.
Notice of Allowance received for U.S. Appl. No. 15/136,323, dated Oct. 12, 2017, 8 pages.
Notice of Allowance received for U.S. Appl. No. 15/273,503, dated Aug. 14, 2017, 9 pages.
Notice of Allowance received for U.S. Appl. No. 15/273,544, dated Oct. 27, 2017, 8 pages.
Office Action received for Australian Patent Application No. 2017100684, dated Jan. 24, 2018, 4 pages.
Office Action received for Danish Patent Application No. PA201570788, dated Apr. 8, 2016, 11 pages.
Office Action received for Danish Patent Application No. PA201570788, dated Sep. 13, 2016, 3 pages.
Office Action received for Danish Patent Application No. PA201570791, dated Apr. 6, 2016, 12 pages.
Office Action received for Danish Patent Application No. PA201570791, dated Sep. 6, 2016, 4 pages.
Office Action received for European Patent Application No. 15712218.5, dated Aug. 3, 2017, 4 pages.
Office Action received for Taiwanese Patent Application No. 104107328, dated Dec. 28, 2016, 4 pages (1 page of English Translation and 3 pages of Official copy).
Supplemental Notice of Allowance received for U.S. Appl. No. 15/136,323, dated Jan. 31, 2018, 6 pages.
Tech, Smith, "Snagit 11 Snagit 11.4 Help", Available at: http://assets.techsmith.com/Downloads/ua-tutorials-snagit-11/Snagit_11.pdf, Jan. 2014, 2 pages.
Techsmith, "Snagit® 11 Snagit 11.4 Help", available at http://assets.techsmith.com/Downloads/ua-tutorials-snagit-11/Snagit_11.pdf, Jan. 2014, 146 pages.
Xiao et al., "Expanding the Input Expressivity of Smartwatches with Mechanical Pan, Twist, Tilt and Click", 14th Proceedings of the SIGCHI Conference on Human Factors in Computing Systems, Apr. 26, 2014, pp. 193-196.
Xperia Blog, "Action Camera Extension Gives Smartwatch/Smartband Owners Ability to Control Sony Wireless Cameras", Available at http://www.xperiablog.net/2014/06/13/action-camera-extension-gives-smartwatchsmartband-owners-ability-to-control-sony-wireless-cameras/, Jun. 13, 2014, 10 pages.
Decision to Grant received for European Patent Application No. 15712218.5, dated Jun. 7, 2018, 2 pages.
Extended Search Report received for European Patent Application 17809168.2, dated Jun. 28, 2018, 9 pages.
Intention to Grant received for Danish Patent Application No. PA201670627, dated Jun. 11, 2018, 2 pages.
International Search Report and Written Opinion received for PCT Patent Application No. PCT/US2018/015591, dated Jun. 14, 2018, 14 pages.
Non-Final Office Action received for U.S. Appl. No. 15/728,147, dated Feb. 22, 2018, 20 pages.
Notice of Allowance received for U.S. Appl. No. 15/863,369, dated Jun. 28, 2018, 8 pages.
Office Action received for Danish Patent Application No. PA201770563, dated Oct. 10, 2017, 9 pages.
Search Report received for Danish Patent Application No. PA201770719, dated Oct. 17, 2017, 9 pages.
Supplemental Notice of Allowance received for U.S. Appl. No. 15/863,369, dated Aug. 8, 2018, 4 pages.
At&T, "Pantech C3b User Guide", Feb. 10, 2007, 14 pages.

2100

2102
While the device is prepared to capture media with the one or more cameras at a first magnification level:

2104
Display, on the display, a digital viewfinder based on data received from the one or more cameras.

2106
The digital viewfinder includes a representation of one or more objects within a field of view of the one or more cameras.

2108
Display the representations of the one or more objects at the first magnification level.

2110
While displaying the digital viewfinder, detect, via the one or more input devices, a first gesture.

2302
Display, on the display, an adjustable control for selecting a value of a plurality of values from a minimum value to a maximum value.

↓

2304
While displaying the adjustable control, receive an input, at the one or more input devices, that includes movement detected via the one or more input devices, wherein the movement is constrained by a first input boundary and a second input boundary and the input is at a location closer to the first input boundary than the second input boundary.

> 2306
> The one or more input devices include a touch-sensitive surface.

> 2308
> The first input boundary is a first edge of a touch-sensitive surface and the second input boundary is a second edge of the touch-sensitive surface.

USER INTERFACE FOR CAMERA EFFECTS

CROSS-REFERENCE TO RELATED APPLICATIONS

This application is a continuation of U.S. patent application Ser. No. 15/273,453, entitled "USER INTERFACE FOR CAMERA EFFECTS", filed Sep. 22, 2016, which claims priority to the following provisional applications: U.S. Patent Application Ser. No. 62/349,059, entitled "USER INTERFACE FOR CAMERA EFFECTS", filed Jun. 12, 2016; U.S. Patent Application Ser. No. 62/384,140, entitled "USER INTERFACE FOR CAMERA EFFECTS", filed Sep. 6, 2016; and U.S. Patent Application Ser. No. 62/397,860, entitled "USER INTERFACE FOR CAMERA EFFECTS", filed Sep. 21, 2016. The content of these applications is hereby incorporated by reference in their entirety.

FIELD

The present disclosure relates generally to computer user interfaces of electronic devices, particularly devices having built-in cameras.

BACKGROUND

The use of electronic devices for recording videos and taking pictures has increased significantly in recent years. Exemplary electronic devices for recording videos and taking pictures include smart phones and hand-held cameras. Such devices frequently include a viewfinder, which the user can use for previewing before taking a picture or recording a video.

BRIEF SUMMARY

Some techniques for managing camera effects using electronic devices, however, are generally cumbersome and inefficient. For example, modifying the visual effects in viewfinders such that captured images and recorded videos exhibit the visual effects often requires extensive user input and is imprecise. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for managing camera effects. Such methods and interfaces optionally complement or replace other methods for managing camera effects. Such methods and interfaces reduce the cognitive burden on a user and produce a more efficient human-machine interface. For battery-operated computing devices, such methods and interfaces conserve power and increase the time between battery charges. In some examples, the techniques provide simulated optical effects in camera viewfinders and captured images without requiring additional hardware components. In some examples, the techniques provide the ability to quickly transition between user interfaces for capturing photos based on data received from a first camera and a second camera with limited user input. In some examples, the techniques efficiently provide enhanced zooming capabilities that result in visual pleasing results for a displayed digital viewfinder and for captured videos. In some examples, the techniques efficiently provide user interfaces for transitioning a digital viewfinder between a first camera with an applied digital zoom to a second camera with no digital zoom. Such techniques reduce the number of required user inputs and conserve battery power.

In accordance with some embodiments, a method is performed at an electronic device with a first camera, a second camera, and a display. The method, comprises: displaying, on the display, a digital viewfinder including a preview based on data received from the first camera; and while displaying the digital viewfinder: in accordance with a determination that a set of one or more conditions is met, wherein a first condition of the set of one or more conditions is met when a subject is detected within a predetermined distance from the device, applying a simulated optical effect to the preview displayed in the digital viewfinder, wherein the simulated optical effect is based on data received from the first camera and the second camera; and in accordance with a determination that the set of one or more conditions is not met, displaying the preview in the digital viewfinder without applying the simulated optical effect.

In accordance with some embodiments, a non-transitory computer-readable storage medium is described. The non-transitory computer-readable storage medium stores one or more programs configured to be executed by one or more processors of an electronic device with a first camera, a second camera, and a display, the one or more programs including instructions for: displaying, on the display, a digital viewfinder including a preview based on data received from the first camera; and while displaying the digital viewfinder: in accordance with a determination that a set of one or more conditions is met, wherein a first condition of the set of one or more conditions is met when a subject is detected within a predetermined distance from the device, applying a simulated optical effect to the preview displayed in the digital viewfinder, wherein the simulated optical effect is based on data received from the first camera and the second camera; and in accordance with a determination that the set of one or more conditions is not met, displaying the preview in the digital viewfinder without applying the simulated optical effect.

In accordance with some embodiments, an electronic device is described. The electronic device comprises: a first camera; a second camera; a display; one or more processors; and a memory storing one or more programs configured to be executed by the one or more processors, the one or more programs including instructions for: displaying, on the display, a digital viewfinder including a preview based on data received from the first camera; and while displaying the digital viewfinder: in accordance with a determination that a set of one or more conditions is met, wherein a first condition of the set of one or more conditions is met when a subject is detected within a predetermined distance from the device, applying a simulated optical effect to the preview displayed in the digital viewfinder, wherein the simulated optical effect is based on data received from the first camera and the second camera; and in accordance with a determination that the set of one or more conditions is not met, displaying the preview in the digital viewfinder without applying the simulated optical effect.

In accordance with some embodiments, an electronic device is described. The electronic device comprises: a first camera; a second camera; and a display; means for displaying, on the display, a digital viewfinder including a preview based on data received from the first camera; and while displaying the digital viewfinder: in accordance with a determination that a set of one or more conditions is met, wherein a first condition of the set of one or more conditions is met when a subject is detected within a predetermined distance from the device, means for applying a simulated optical effect to the preview displayed in the digital viewfinder, wherein the simulated optical effect is based on data received from the first camera and the second camera; and in accordance with a determination that the set of one or more conditions is not met, means for displaying the preview in the digital viewfinder without applying the simulated optical effect.

In accordance with some embodiments, a transitory computer-readable storage medium is described. The transitory computer-readable storage medium stores one or more programs configured to be executed by one or more processors of an electronic device with a first camera, a second camera, and a display, the one or more programs including instructions for: displaying, on the display, a digital viewfinder including a preview based on data received from the first camera; and while displaying the digital viewfinder: in accordance with a determination that a set of one or more conditions is met, wherein a first condition of the set of one or more conditions is met when a subject is detected within a predetermined distance from the device, applying a simulated optical effect to the preview displayed in the digital viewfinder, wherein the simulated optical effect is based on data received from the first camera and the second camera; and in accordance with a determination that the set of one or more conditions is not met, displaying the preview in the digital viewfinder without applying the simulated optical effect.

In accordance with some embodiments, a method is performed at an electronic device with a first camera, a second camera, and a display. The method, comprises: concurrently displaying, on the display: a user interface for capturing photos based on data received from the first camera that includes displaying a digital viewfinder with a first magnification; and an affordance for modifying the magnification of photos captured by the device using one or more of the first and second cameras; detecting activation of the affordance; in response to detecting activation of the affordance: ceasing to display, on the display, the user interface for capturing photos based on data received from the first camera; and displaying, on the display, a user interface for capturing photos based on data received from the second camera that includes displaying a digital viewfinder with a second magnification that is greater than the first magnification.

In accordance with some embodiments, a non-transitory computer-readable storage medium is described. The non-transitory computer-readable storage medium stores one or more programs configured to be executed by one or more processors of an electronic device with a first camera, a second camera, and a display, the one or more programs including instructions for: concurrently displaying, on the display: a user interface for capturing photos based on data received from the first camera that includes displaying a digital viewfinder with a first magnification; and an affordance for modifying the magnification of photos captured by the device using one or more of the first and second cameras; detecting activation of the affordance; in response to detecting activation of the affordance: ceasing to display, on the display, the user interface for capturing photos based on data received from the first camera; and displaying, on the display, a user interface for capturing photos based on data received from the second camera that includes displaying a digital viewfinder with a second magnification that is greater than the first magnification.

In accordance with some embodiments, an electronic device is described. The electronic device comprises: a first camera; a second camera; a display; one or more processors; and a memory storing one or more programs configured to be executed by the one or more processors, the one or more programs including instructions for: concurrently displaying, on the display: a user interface for capturing photos based on data received from the first camera that includes displaying a digital viewfinder with a first magnification; and an affordance for modifying the magnification of photos captured by the device using one or more of the first and second cameras; detecting activation of the affordance; in response to detecting activation of the affordance: ceasing to display, on the display, the user interface for capturing photos based on data received from the first camera; and displaying, on the display, a user interface for capturing photos based on data received from the second camera that includes displaying a digital viewfinder with a second magnification that is greater than the first magnification.

In accordance with some embodiments, an electronic device is described. The electronic device comprises: a first camera; a second camera; and a display; means for concurrently displaying, on the display: a user interface for capturing photos based on data received from the first camera that includes displaying a digital viewfinder with a first magnification; and an affordance for modifying the magnification of photos captured by the device using one or more of the first and second cameras; means for detecting activation of the affordance; in response to detecting activation of the affordance: means for ceasing to display, on the display, the user interface for capturing photos based on data received from the first camera; and means for displaying, on the display, a user interface for capturing photos based on data received from the second camera that includes displaying a digital viewfinder with a second magnification that is greater than the first magnification.

In accordance with some embodiments, a transitory computer-readable storage medium is described. The transitory computer-readable storage medium stores one or more programs configured to be executed by one or more processors of an electronic device with a first camera, a second camera, and a display, the one or more programs including instructions for: concurrently displaying, on the display: a user interface for capturing photos based on data received from the first camera that includes displaying a digital viewfinder with a first magnification; and an affordance for modifying the magnification of photos captured by the device using one or more of the first and second cameras; detecting activation of the affordance; in response to detecting activation of the affordance: ceasing to display, on the display, the user interface for capturing photos based on data received from the first camera; and displaying, on the display, a user interface for capturing photos based on data received from the second camera that includes displaying a digital viewfinder with a second magnification that is greater than the first magnification.

In accordance with some embodiments, a method is performed at an electronic device with a one or more cameras and a display. The method, comprises: displaying, on the display: a digital viewfinder based on data received from the one or more cameras; while displaying the digital viewfinder, detecting a gesture that progresses at a gesture rate, the gesture corresponding to an instruction to zoom the digital viewfinder from a first magnification level to a third magnification level; in response to detecting the gesture, zooming the digital viewfinder from the first magnification level to a second magnification level and from the second magnification level to a third magnification level, including: during a first portion of the gesture, zooming the digital viewfinder at a first rate that is slower than the gesture rate at which the gesture is progressing; and during a second portion of the gesture that occurs after the first portion of the gesture, zooming the digital viewfinder at a second rate that is faster than the gesture rate at which the gesture is progressing.

In accordance with some embodiments, a non-transitory computer-readable storage medium is described. The non-transitory computer-readable storage medium stores one or more programs configured to be executed by one or more processors of an electronic device with one or more cameras and a display, the one or more programs including instructions for: displaying, on the display: a digital viewfinder based on data received from the one or more cameras; while displaying the digital viewfinder, detecting a gesture that progresses at a gesture rate, the gesture corresponding to an instruction to zoom the digital viewfinder from a first magnification level to a third magnification level; in response to detecting the gesture, zooming the digital viewfinder from the first magnification level to a second magnification level and from the second magnification level to a third magnification level, including: during a first portion of the gesture, zooming the digital viewfinder at a first rate that is slower than the gesture rate at which the gesture is progressing; and during a second portion of the gesture that occurs after the first portion of the gesture, zooming the digital viewfinder at a second rate that is faster than the gesture rate at which the gesture is progressing.

In accordance with some embodiments, an electronic device is described. The electronic device comprises: one or more cameras; a display; one or more processors; and a memory storing one or more programs configured to be executed by the one or more processors, the one or more programs including instructions for: displaying, on the display: a digital viewfinder based on data received from the one or more cameras; while displaying the digital viewfinder, detecting a gesture that progresses at a gesture rate, the gesture corresponding to an instruction to zoom the digital viewfinder from a first magnification level to a third magnification level; in response to detecting the gesture, zooming the digital viewfinder from the first magnification level to a second magnification level and from the second magnification level to a third magnification level, including: during a first portion of the gesture, zooming the digital viewfinder at a first rate that is slower than the gesture rate at which the gesture is progressing; and during a second portion of the gesture that occurs after the first portion of the gesture, zooming the digital viewfinder at a second rate that is faster than the gesture rate at which the gesture is progressing.

In accordance with some embodiments, an electronic device is described. The electronic device comprises: one or more cameras; and a display; means for displaying, on the display: a digital viewfinder based on data received from the one or more cameras; while displaying the digital viewfinder, detecting a gesture that progresses at a gesture rate, the gesture corresponding to an instruction to zoom the digital viewfinder from a first magnification level to a third magnification level; in response to detecting the gesture, zooming the digital viewfinder from the first magnification level to a second magnification level and from the second magnification level to a third magnification level, including: during a first portion of the gesture, zooming the digital viewfinder at a first rate that is slower than the gesture rate at which the gesture is progressing; and during a second portion of the gesture that occurs after the first portion of the gesture, zooming the digital viewfinder at a second rate that is faster than the gesture rate at which the gesture is progressing.

In accordance with some embodiments, a transitory computer-readable storage medium is described. The transitory computer-readable storage medium stores one or more programs configured to be executed by one or more processors of an electronic device with one or more cameras and a display, the one or more programs including instructions for: displaying, on the display: a digital viewfinder based on data received from the one or more cameras; while displaying the digital viewfinder, detecting a gesture that progresses at a gesture rate, the gesture corresponding to an instruction to zoom the digital viewfinder from a first magnification level to a third magnification level; in response to detecting the gesture, zooming the digital viewfinder from the first magnification level to a second magnification level and from the second magnification level to a third magnification level, including: during a first portion of the gesture, zooming the digital viewfinder at a first rate that is slower than the gesture rate at which the gesture is progressing; and during a second portion of the gesture that occurs after the first portion of the gesture, zooming the digital viewfinder at a second rate that is faster than the gesture rate at which the gesture is progressing.

In accordance with some embodiments, a method is performed at an electronic device with a display. The method, comprises: displaying, on the display: displaying, on the display, a digital viewfinder; detecting a gesture corresponding to an instruction to zoom the digital viewfinder from a first magnification level to a second magnification level different from the first magnification level; determining whether a set of one or more conditions has been met, wherein a first condition of the set of one or more conditions is met when the difference between the second magnification level and a third magnification level is less than a predetermined threshold; and in accordance with a determination that the set of one or more conditions has been met, zooming the digital viewfinder from the first magnification level to the third magnification level.

In accordance with some embodiments, a non-transitory computer-readable storage medium is described. The non-transitory computer-readable storage medium stores one or more programs configured to be executed by one or more processors of an electronic device with a display, the one or more programs including instructions for: displaying, on the display, a digital viewfinder; detecting a gesture corresponding to an instruction to zoom the digital viewfinder from a first magnification level to a second magnification level different from the first magnification level; determining whether a set of one or more conditions has been met, wherein a first condition of the set of one or more conditions is met when the difference between the second magnification level and a third magnification level is less than a predetermined threshold; and in accordance with a determination that the set of one or more conditions has been met, zooming the digital viewfinder from the first magnification level to the third magnification level.

In accordance with some embodiments, an electronic device is described. The electronic device comprises: a display; one or more processors; and memory storing one or more programs configured to be executed by the one or more processors, the one or more programs including instructions for: displaying, on the display, a digital viewfinder; detecting a gesture corresponding to an instruction to zoom the digital viewfinder from a first magnification level to a second magnification level different from the first magnification level; determining whether a set of one or more conditions has been met, wherein a first condition of the set of one or more conditions is met when the difference between the second magnification level and a third magnification level is less than a predetermined threshold; and in accordance with a determination that the set of one or more conditions has been met, zooming the digital viewfinder from the first magnification level to the third magnification level.

In accordance with some embodiments, an electronic device is described. The electronic device comprises: a display; and means for displaying, on the display, a digital viewfinder; means for detecting a gesture corresponding to an instruction to zoom the digital viewfinder from a first magnification level to a second magnification level different from the first magnification level; means for determining whether a set of one or more conditions has been met, wherein a first condition of the set of one or more conditions is met when the difference between the second magnification level and a third magnification level is less than a predetermined threshold; and in accordance with a determination that the set of one or more conditions has been met, means for zooming the digital viewfinder from the first magnification level to the third magnification level.

In accordance with some embodiments, a transitory computer-readable storage medium is described. The transitory computer-readable storage medium stores one or more programs configured to be executed by one or more processors of an electronic device with a display, the one or more programs including instructions for: displaying, on the display, a digital viewfinder; detecting a gesture corresponding to an instruction to zoom the digital viewfinder from a first magnification level to a second magnification level different from the first magnification level; determining whether a set of one or more conditions has been met, wherein a first condition of the set of one or more conditions is met when the difference between the second magnification level and a third magnification level is less than a predetermined threshold; and in accordance with a determination that the set of one or more conditions has been met, zooming the digital viewfinder from the first magnification level to the third magnification level.

In accordance with some embodiments, a method is performed at an electronic device with one or more input devices and a display. The method, comprises: concurrently displaying, on the display: a digital viewfinder for capturing media with the one or more cameras at a first magnification level; and a magnification adjustment affordance; while concurrently displaying the digital viewfinder and the magnification adjustment affordance, detecting, via the one or more input devices, a first gesture at a location corresponding to the magnification adjustment affordance; in accordance with a determination that the first gesture is of a first type preparing to capture media with the one or more cameras at a second magnification level different from the first magnification level; and in accordance with a determination that the first gesture is of a second type different from the first type: preparing to capture media with the one or more cameras at a dynamically-selected magnification level different from the first magnification level, wherein the dynamically-selected magnification level is selected based on a magnitude of the first gesture.

In accordance with some embodiments, a non-transitory computer-readable storage medium is described. The non-transitory computer-readable storage medium stores one or more programs configured to be executed by one or more processors of an electronic device with one or more cameras, one or more input devices, and a display, the one or more programs including instructions for: concurrently displaying, on the display: a digital viewfinder for capturing media with the one or more cameras at a first magnification level; and a magnification adjustment affordance; while concurrently displaying the digital viewfinder and the magnification adjustment affordance, detecting, via the one or more input devices, a first gesture at a location corresponding to the magnification adjustment affordance; in accordance with a determination that the first gesture is of a first type preparing to capture media with the one or more cameras at a second magnification level different from the first magnification level; and in accordance with a determination that the first gesture is of a second type different from the first type: preparing to capture media with the one or more cameras at a dynamically-selected magnification level different from the first magnification level, wherein the dynamically-selected magnification level is selected based on a magnitude of the first gesture.

In accordance with some embodiments, an electronic device is described. The electronic device comprises: one or more cameras; one or more input devices; a display; one or more processors; and; and memory storing one or more programs configured to be executed by the one or more processors, the one or more programs including instructions for: concurrently displaying, on the display: a digital viewfinder for capturing media with the one or more cameras at a first magnification level; and a magnification adjustment affordance; while concurrently displaying the digital viewfinder and the magnification adjustment affordance, detecting, via the one or more input devices, a first gesture at a location corresponding to the magnification adjustment affordance; in accordance with a determination that the first gesture is of a first type preparing to capture media with the one or more cameras at a second magnification level different from the first magnification level; and in accordance with a determination that the first gesture is of a second type different from the first type: preparing to capture media with the one or more cameras at a dynamically-selected magnification level different from the first magnification level, wherein the dynamically-selected magnification level is selected based on a magnitude of the first gesture.

In accordance with some embodiments, an electronic device is described. The electronic device comprises: one or more cameras; one or more input devices; a display; and means for concurrently displaying, on the display: a digital viewfinder for capturing media with the one or more cameras at a first magnification level; and a magnification adjustment affordance; means, while concurrently displaying the digital viewfinder and the magnification adjustment affordance, for detecting, via the one or more input devices, a first gesture at a location corresponding to the magnification adjustment affordance; means, in accordance with a determination that the first gesture is of a first type, for preparing to capture media with the one or more cameras at a second magnification level different from the first magnification level; and means, in accordance with a determination that the first gesture is of a second type different from the first type, for: preparing to capture media with the one or more cameras at a dynamically-selected magnification level different from the first magnification level, wherein the dynamically-selected magnification level is selected based on a magnitude of the first gesture.

In accordance with some embodiments, a transitory computer-readable storage medium is described. The non-transitory computer-readable storage medium stores one or more programs configured to be executed by one or more processors of an electronic device with one or more cameras, one or more input devices, and a display, the one or more programs including instructions for: concurrently displaying, on the display: a digital viewfinder for capturing media with the one or more cameras at a first magnification level; and a magnification adjustment affordance; while concurrently displaying the digital viewfinder and the magnification adjustment affordance, detecting, via the one or more input devices, a first gesture at a location corresponding to the magnification adjustment affordance; in accordance with a determination that the first gesture is of a first type preparing to capture media with the one or more cameras at a second magnification level different from the first magnification level; and in accordance with a determination that the first gesture is of a second type different from the first type: preparing to capture media with the one or more cameras at a dynamically-selected magnification level different from the first magnification level, wherein the dynamically-selected magnification level is selected based on a magnitude of the first gesture.

In accordance with some embodiments, a method is performed at an electronic device with one or more cameras, one or more input devices, and a display. The method, comprises: displaying a digital viewfinder based on data received from the one or more cameras, wherein the digital viewfinder includes a representation of one or more objects within a field of view of the one or more cameras; while displaying the digital viewfinder, detecting, via the one or more input devices, a first gesture; in accordance with a determination that a first set of one or more conditions is met, wherein a first condition of the first set of one or more conditions is met when the first gesture is at a first location, updating display of the digital viewfinder to focus on a representation of a respective object of the one or more objects in the field of view of the one or more cameras that corresponds to a location of the first gesture on the one or more input devices without preparing to capture media with the one or more cameras at a second magnification level different from the first magnification level; and in accordance with a determination that a second set of one or more conditions is met, wherein a first condition of the second set of one or more conditions is met when the first gesture is at a second location different from the first location, preparing to capture media with the one or more cameras at the second magnification level different from the first magnification level.

In accordance with some embodiments, a non-transitory computer-readable storage medium is described. The non-transitory computer-readable storage medium stores one or more programs configured to be executed by one or more processors of an electronic device with one or more cameras, one or more input devices, and a display, the one or more programs including instructions for: displaying a digital viewfinder based on data received from the one or more cameras, wherein the digital viewfinder includes a representation of one or more objects within a field of view of the one or more cameras; while displaying the digital viewfinder, detecting, via the one or more input devices, a first gesture; in accordance with a determination that a first set of one or more conditions is met, wherein a first condition of the first set of one or more conditions is met when the first gesture is at a first location, updating display of the digital viewfinder to focus on a representation of a respective object of the one or more objects in the field of view of the one or more cameras that corresponds to a location of the first gesture on the one or more input devices without preparing to capture media with the one or more cameras at a second magnification level different from the first magnification level; and in accordance with a determination that a second set of one or more conditions is met, wherein a first condition of the second set of one or more conditions is met when the first gesture is at a second location different from the first location, preparing to capture media with the one or more cameras at the second magnification level different from the first magnification level.

In accordance with some embodiments, an electronic device is described. The electronic device comprises: one or more cameras; one or more input devices; a display; one or more processors; and; and memory storing one or more programs configured to be executed by the one or more processors, the one or more programs including instructions for: displaying a digital viewfinder based on data received from the one or more cameras, wherein the digital viewfinder includes a representation of one or more objects within a field of view of the one or more cameras; while displaying the digital viewfinder, detecting, via the one or more input devices, a first gesture; in accordance with a determination that a first set of one or more conditions is met, wherein a first condition of the first set of one or more conditions is met when the first gesture is at a first location, updating display of the digital viewfinder to focus on a representation of a respective object of the one or more objects in the field of view of the one or more cameras that corresponds to a location of the first gesture on the one or more input devices without preparing to capture media with the one or more cameras at a second magnification level different from the first magnification level; and in accordance with a determination that a second set of one or more conditions is met, wherein a first condition of the second set of one or more conditions is met when the first gesture is at a second location different from the first location, preparing to capture media with the one or more cameras at the second magnification level different from the first magnification level.

In accordance with some embodiments, an electronic device is described. The electronic device comprises: one or more cameras; one or more input devices; a display; and means, while the device is prepared to capture media with the one or more cameras at a first magnification level, for displaying, on the display: a digital viewfinder based on data received from the one or more cameras, wherein the digital viewfinder includes a representation of one or more objects within a field of view of the one or more cameras; means, while displaying the digital viewfinder, for detecting, via the one or more input devices, a first gesture; means, in accordance with a determination that a first set of one or more conditions is met, wherein a first condition of the first set of one or more conditions is met when the first gesture is at a first location, for updating display of the digital viewfinder to focus on a representation of a respective object of the one or more objects in the field of view of the one or more cameras that corresponds to a location of the first gesture on the one or more input devices without preparing to capture media with the one or more cameras at a second magnification level different from the first magnification level; and means, in accordance with a determination that a second set of one or more conditions is met, wherein a first condition of the second set of one or more conditions is met when the first gesture is at a second location different from the first location, for preparing to capture media with the one or more cameras at the second magnification level different from the first magnification level.

In accordance with some embodiments, a transitory computer-readable storage medium is described. The non-tran sitory computer-readable storage medium stores one or more programs configured to be executed by one or more processors of an electronic device with one or more cameras, one or more input devices, and a display, the one or more programs including instructions for: displaying a digital viewfinder based on data received from the one or more cameras, wherein the digital viewfinder includes a representation of one or more objects within a field of view of the one or more cameras; while displaying the digital viewfinder, detecting, via the one or more input devices, a first gesture; in accordance with a determination that a first set of one or more conditions is met, wherein a first condition of the first set of one or more conditions is met when the first gesture is at a first location, updating display of the digital viewfinder to focus on a representation of a respective object of the one or more objects in the field of view of the one or more cameras that corresponds to a location of the first gesture on the one or more input devices without preparing to capture media with the one or more cameras at a second magnification level different from the first magnification level; and in accordance with a determination that a second set of one or more conditions is met, wherein a first condition of the second set of one or more conditions is met when the first gesture is at a second location different from the first location, preparing to capture media with the one or more cameras at the second magnification level different from the first magnification level.

In accordance with some embodiments, a method is performed at an electronic device with a display and one or more input devices. The method, comprises: displaying, on the display, an adjustable control for selecting a value of a plurality of values from a minimum value to a maximum value; while displaying the adjustable control, receiving an input, at the one or more input devices, that includes movement detected via the one or more input devices, wherein the movement is constrained by a first input boundary and a second input boundary and the input is at a location closer to the first input boundary than the second input boundary; in response to receiving the input: in accordance with a determination that a rate of movement of the input meets a first movement-rate criteria, wherein the first movement-rate criteria include a first requirement that the rate of movement of the input is above a first movement-rate threshold in order for the first movement-rate criteria to be met, and in accordance with the movement of the input including movement toward the first input boundary, navigating through the plurality of values based on a magnitude of the movement and a first acceleration factor; and in accordance with a determination that the rate of movement of the input meets the first set of movement-rate criteria and a determination that the movement of the input includes movement toward the second input boundary, navigating through the plurality of values based on the magnitude of the movement and a second acceleration factor that is different from the first acceleration factor.

In accordance with some embodiments, a non-transitory computer-readable storage medium is described. The non-transitory computer-readable storage medium stores one or more programs configured to be executed by one or more processors of an electronic device with one or more input devices, and a display, the one or more programs including instructions for: displaying, on the display, an adjustable control for selecting a value of a plurality of values from a minimum value to a maximum value; while displaying the adjustable control, receiving an input, at the one or more input devices, that includes movement detected via the one or more input devices, wherein the movement is constrained by a first input boundary and a second input boundary and the input is at a location closer to the first input boundary than the second input boundary; in response to receiving the input: in accordance with a determination that a rate of movement of the input meets a first movement-rate criteria, wherein the first movement-rate criteria include a first requirement that the rate of movement of the input is above a first movement-rate threshold in order for the first movement-rate criteria to be met, and in accordance with the movement of the input including movement toward the first input boundary, navigating through the plurality of values based on a magnitude of the movement and a first acceleration factor; and in accordance with a determination that the rate of movement of the input meets the first set of movement-rate criteria and a determination that the movement of the input includes movement toward the second input boundary, navigating through the plurality of values based on the magnitude of the movement and a second acceleration factor that is different from the first acceleration factor.

In accordance with some embodiments, an electronic device is described. The electronic device comprises: one or more input devices; a display; one or more processors; and; and memory storing one or more programs configured to be executed by the one or more processors, the one or more programs including instructions for: means for displaying, on the display, an adjustable control for selecting a value of a plurality of values from a minimum value to a maximum value; means, while displaying the adjustable control, for receiving an input, at the one or more input devices, that includes movement detected via the one or more input devices, wherein the movement is constrained by a first input boundary and a second input boundary and the input is at a location closer to the first input boundary than the second input boundary; means, responsive to receiving the input, for: in accordance with a determination that a rate of movement of the input meets a first movement-rate criteria, wherein the first movement-rate criteria include a first requirement that the rate of movement of the input is above a first movement-rate threshold in order for the first movement-rate criteria to be met, and in accordance with the movement of the input including movement toward the first input boundary, navigating through the plurality of values based on a magnitude of the movement and a first acceleration factor; and in accordance with a determination that the rate of movement of the input meets the first set of movement-rate criteria and a determination that the movement of the input includes movement toward the second input boundary, navigating through the plurality of values based on the magnitude of the movement and a second acceleration factor that is different from the first acceleration factor.

In accordance with some embodiments, a transitory computer-readable storage medium is described. The non-transitory computer-readable storage medium stores one or more programs configured to be executed by one or more processors of an electronic device with one or more input devices, and a display, the one or more programs including instructions for: displaying, on the display, an adjustable control for selecting a value of a plurality of values from a minimum value to a maximum value; while displaying the adjustable control, receiving an input, at the one or more input devices, that includes movement detected via the one or more input devices, wherein the movement is constrained by a first input boundary and a second input boundary and the input is at a location closer to the first input boundary than the second input boundary; in response to receiving the input: in accordance with a determination that a rate of movement of the input meets a first movement-rate criteria, wherein the first movement-rate criteria include a first requirement that the rate of movement of the input is above a first movement-rate threshold in order for the first movement-rate criteria to be met, and in accordance with the movement of the input including movement toward the first input boundary, navigating through the plurality of values based on a magnitude of the movement and a first acceleration factor; and in accordance with a determination that the rate of movement of the input meets the first set of movement-rate criteria and a determination that the movement of the input includes movement toward the second input boundary, navigating through the plurality of values based on the magnitude of the movement and a second acceleration factor that is different from the first acceleration factor.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing camera effects, thereby increasing the effectiveness, efficiency, and user satisfaction with such devices. Such methods and interfaces may complement or replace other methods for managing camera effects.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIGS. 21A-21B is a flow diagram illustrating a method for managing camera user interfaces, in accordance with some embodiments.

FIGS. 23A-23B is a flow diagram illustrating a method for navigating through a plurality of values, in accordance with some embodiments.

DESCRIPTION OF EMBODIMENTS

Figure 1A:
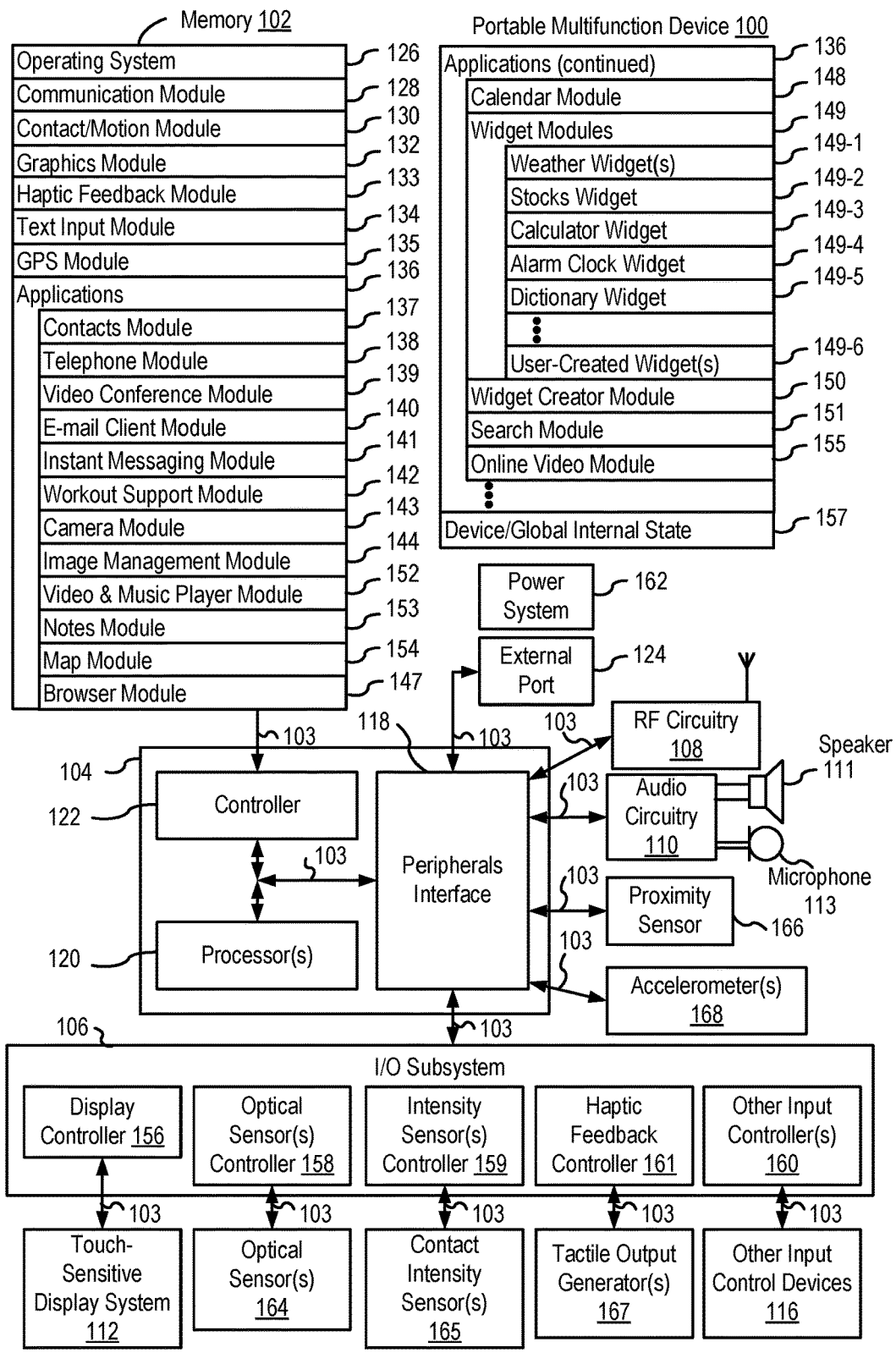
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

Efficient device packaging allows desirable, highly-portable electronic devices to be designed and manufactured. But, some electronic device components complicate the design of smaller devices, particularly thinner ones. Camera sensors and related components constitute an example: they involve physical components organized along optical trains that lend to thicker designs. Consider, for instance, the ability of a camera (e.g., CCD sensor and related lenses) to perform variable optical zooming depends on the arrangement of moveable (e.g., motorized) lens(es) among an optical train. When incorporated into cellular phones, the usual orientation of camera components is at odds with the form-factor of the overall phone: the camera's optical train typically runs along the thickness of the device. The use of cameras of thinner design—such as fixed focal length cameras—introduces other issues. Namely, fixed focal length cameras do not have variable, optical zoom capabilities. While it is still possible to perform digital zooming, digital zooming impacts image quality. Another issue with traditional cellular phone cameras is that the size of the entrance pupil on the camera is relatively small as compared to traditional camera system, such as an SLR. As a result of the small entrance pupil of the camera lens, some of the artistic photographic effects that are achievable using a traditional SLR camera, such as the bokeh effect, are simply not achievable using a traditional mobile phone camera.

The embodiments described herein include electronic devices that utilize multiple cameras to provide improved camera capabilities. In some embodiments, multiple cameras of fixed focal length are used with variable digital magnification to mimic optical zooming capabilities. In some embodiments, multiple cameras of fixed focal length are used to mimic, or simulate, a bokeh effect. The described embodiments also include complementary user interfaces that enable these improved camera capabilities.

Together, the described embodiments permit efficient packaging and production of thin and light devices, while improving the performance of the device's camera optical capabilities. The use of fixed focal length cameras is beneficial as they are thinner and smaller than their variable focal length counterparts. The use of multiple cameras provides the user the ability to optically zoom as well as provides the user an ability to capture more pleasing photos by simulating the bokeh effect. Intuitive user interfaces allow users to leverage the benefits of multiple on-board cameras without placing undue cognitive burdens on the user, thereby producing a more efficient human-machine interface. In battery-operated embodiments, the described embodiments also conserve power and increase run-time between battery charges, as the use of fixed focal length cameras to simulate optical zooming avoids battery consumption by motorized lenses used in conventional variable, optical zooming cameras.

Figure 6A:
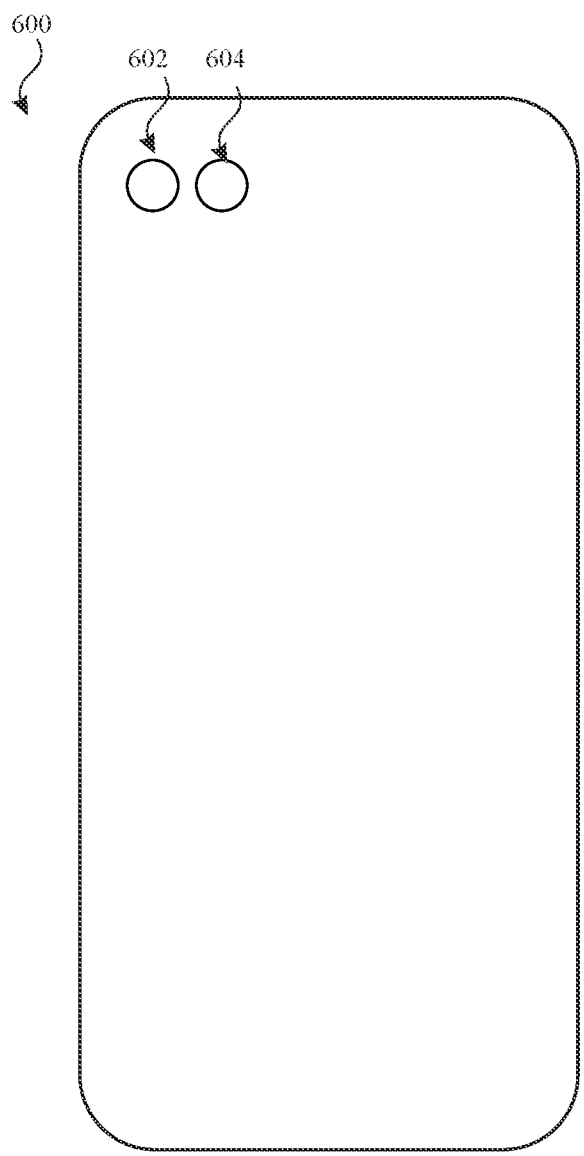
FIGS. 6A-6Q illustrate exemplary devices and user interfaces for managing camera effects, in accordance with some embodiments.
Figure 6Q:
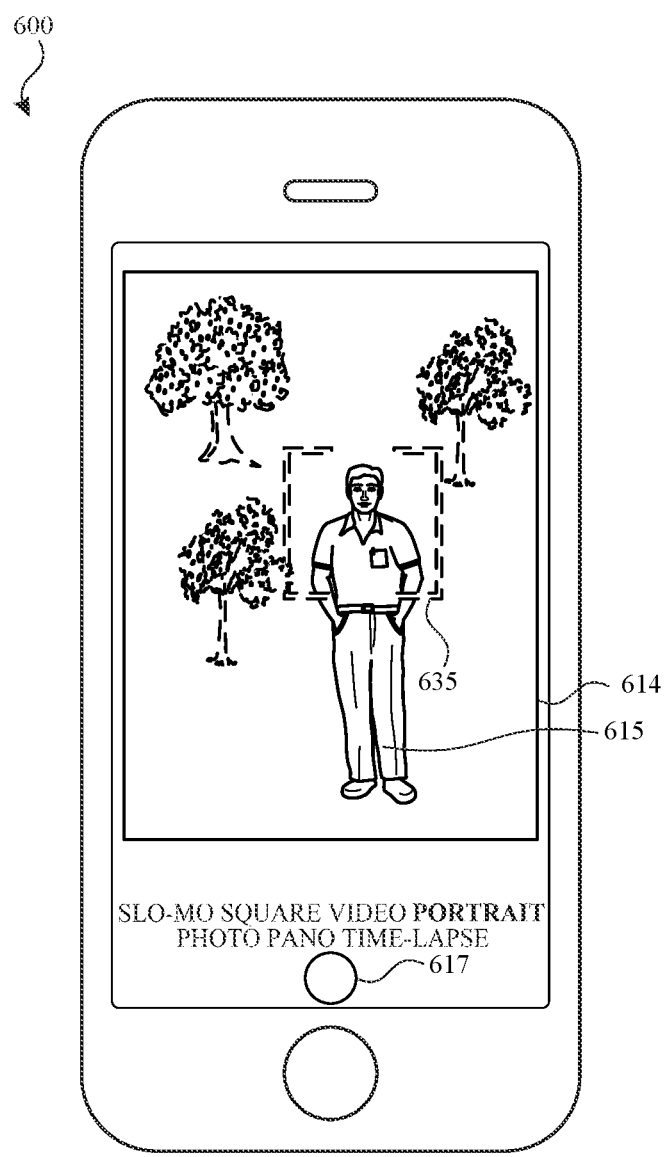
Figure 7A:
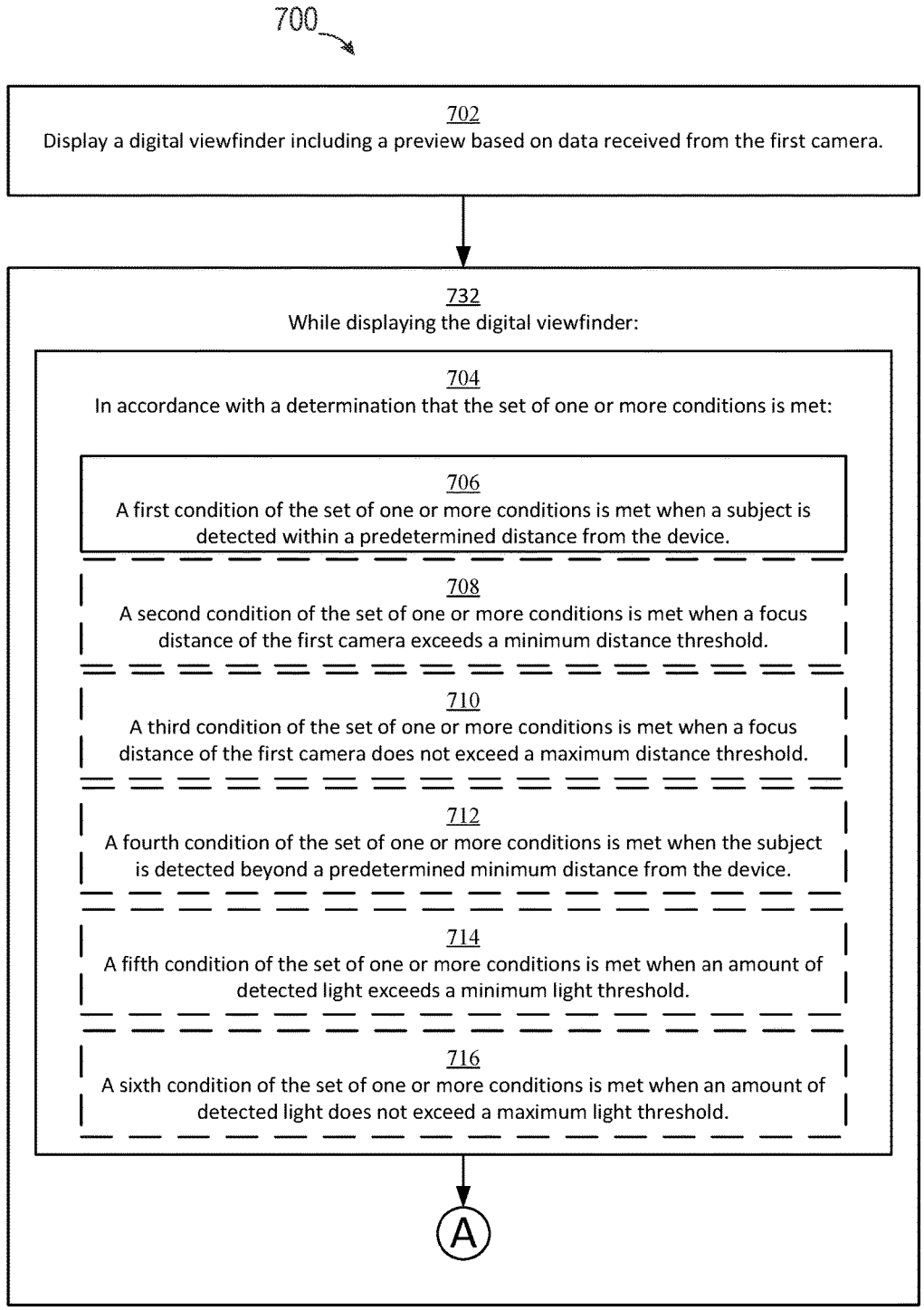
FIGS. 7A-7B is a flow diagram illustrating a method for managing camera effects, in accordance with some embodiments.
Figure 7B:
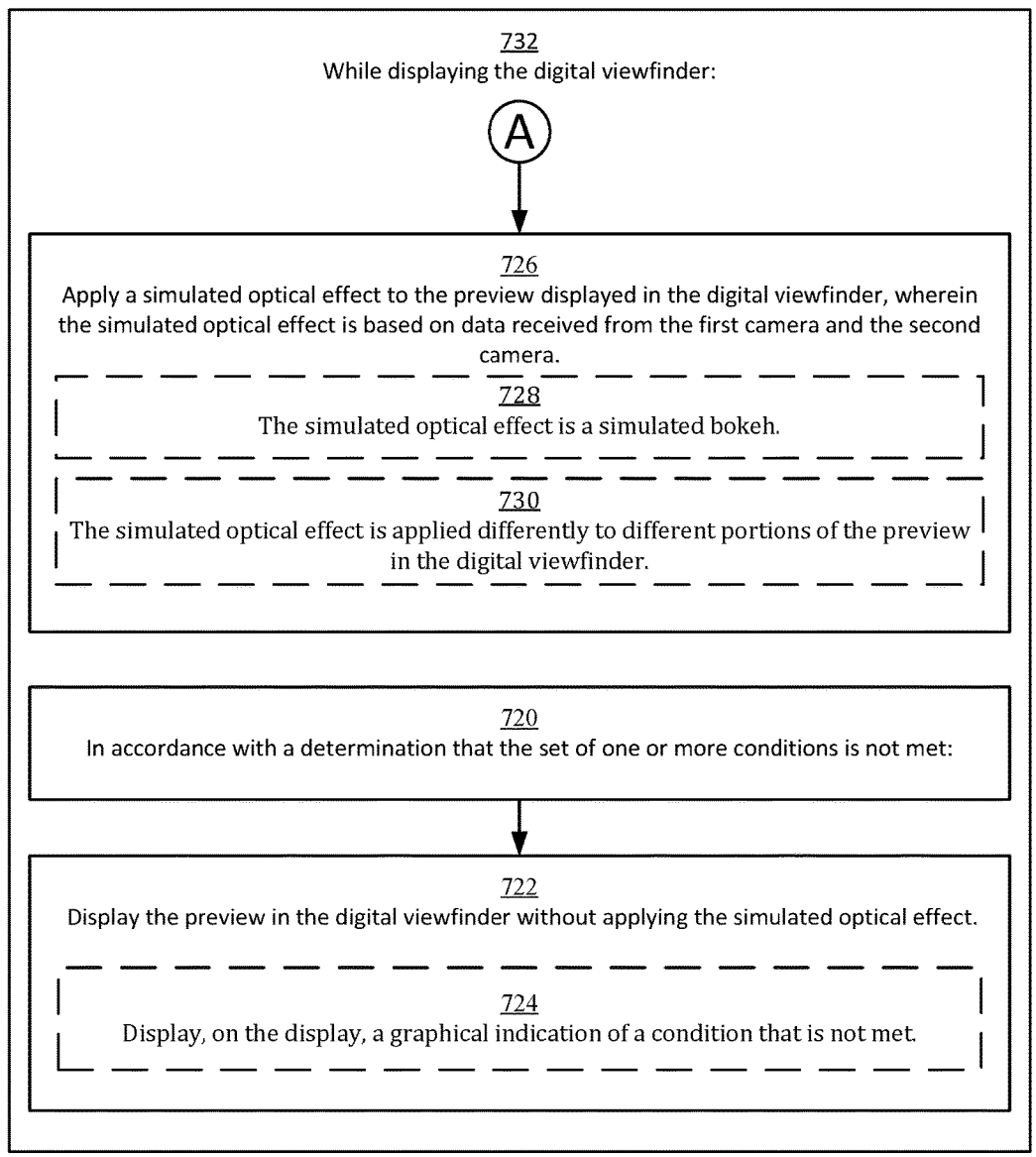
Figure 9:
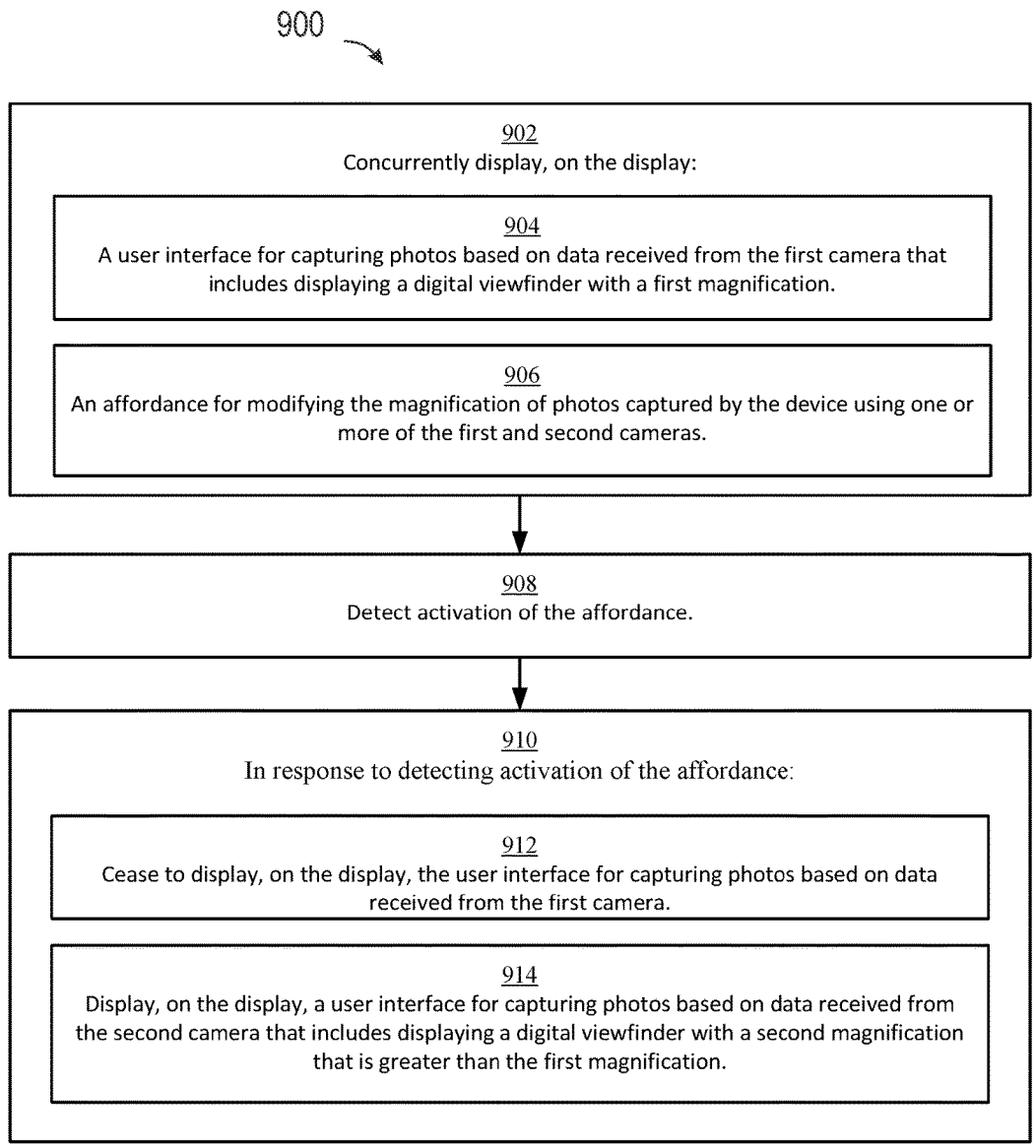
FIG. 9 is a flow diagram illustrating a method for managing camera effects, in accordance with some embodiments.
Figure 10A:
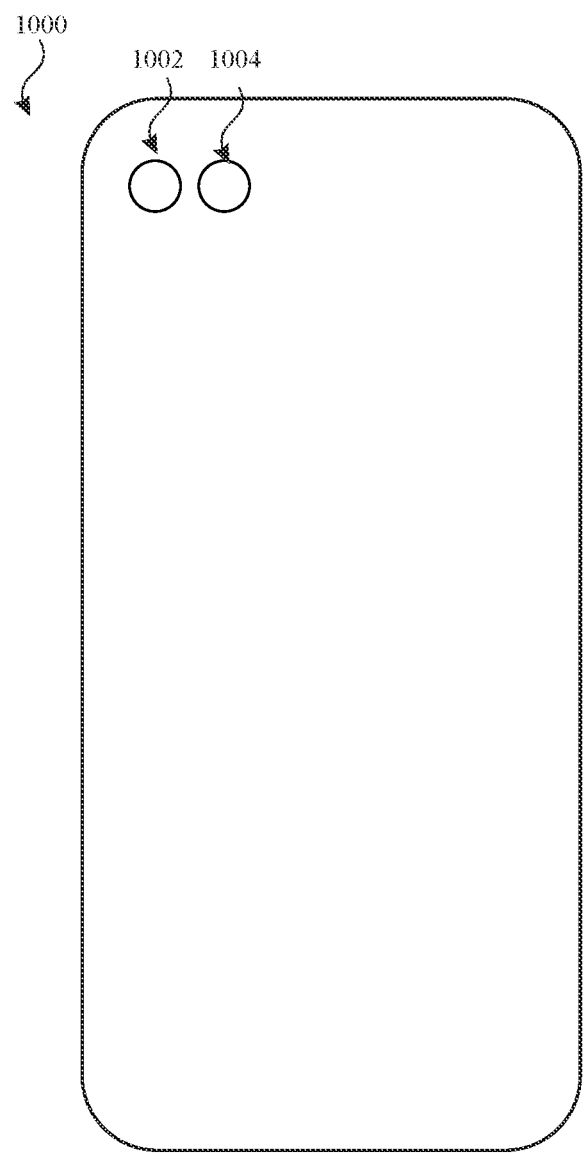
FIGS. 10A-10T illustrate exemplary devices and user interfaces for managing camera effects, in accordance with some embodiments.
Figure 10T:
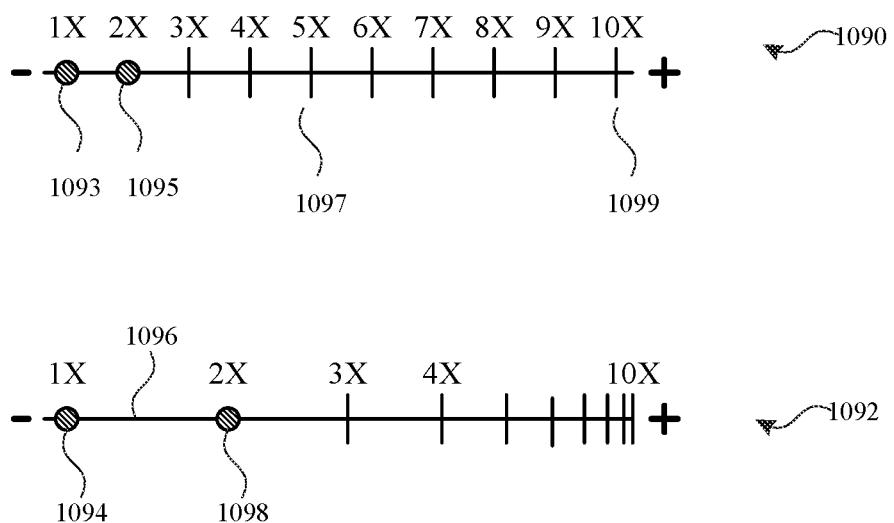
Figure 11:
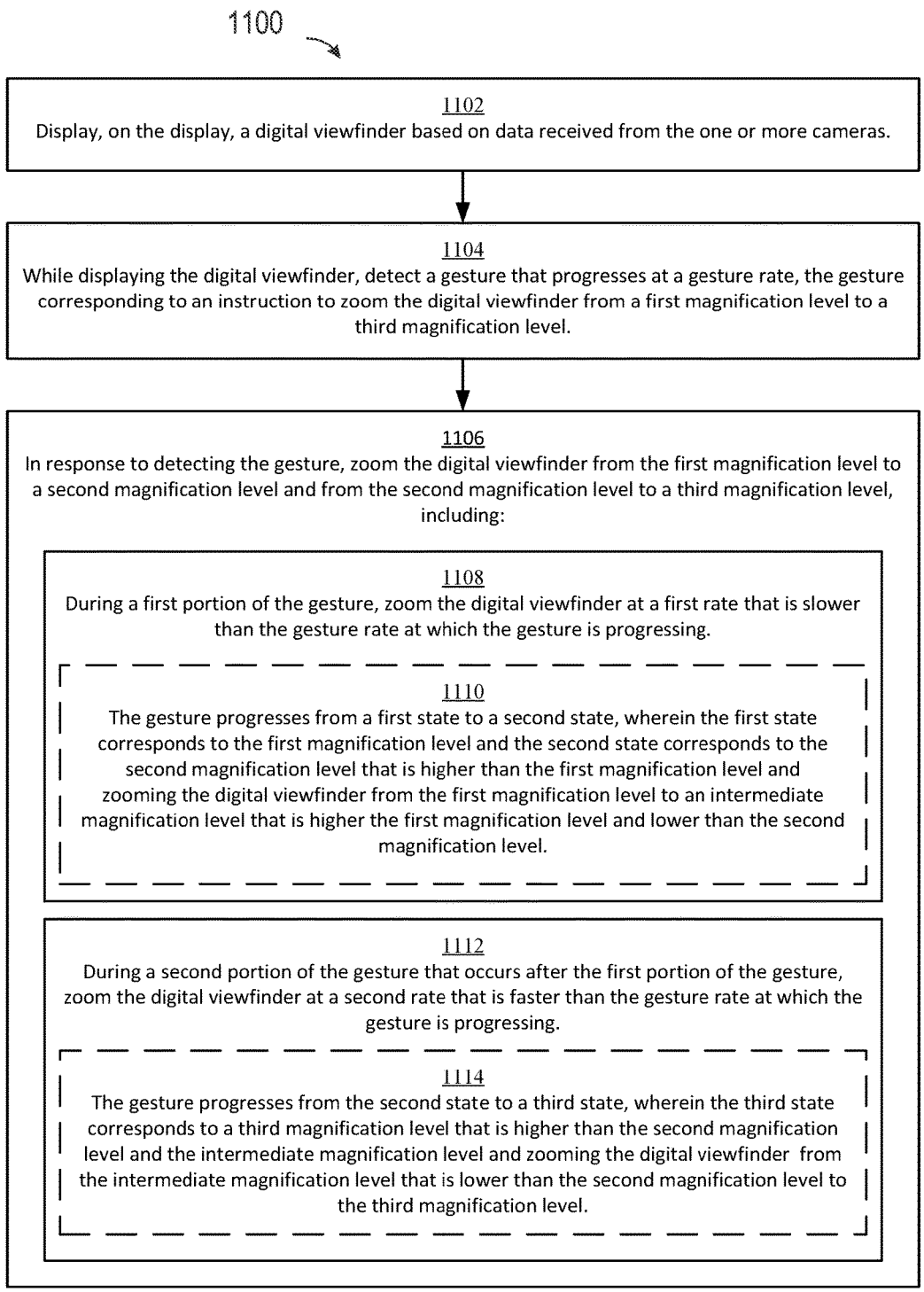
FIG. 11 is a flow diagram illustrating a method for managing camera effects, in accordance with some embodiments.
Figure 18A:
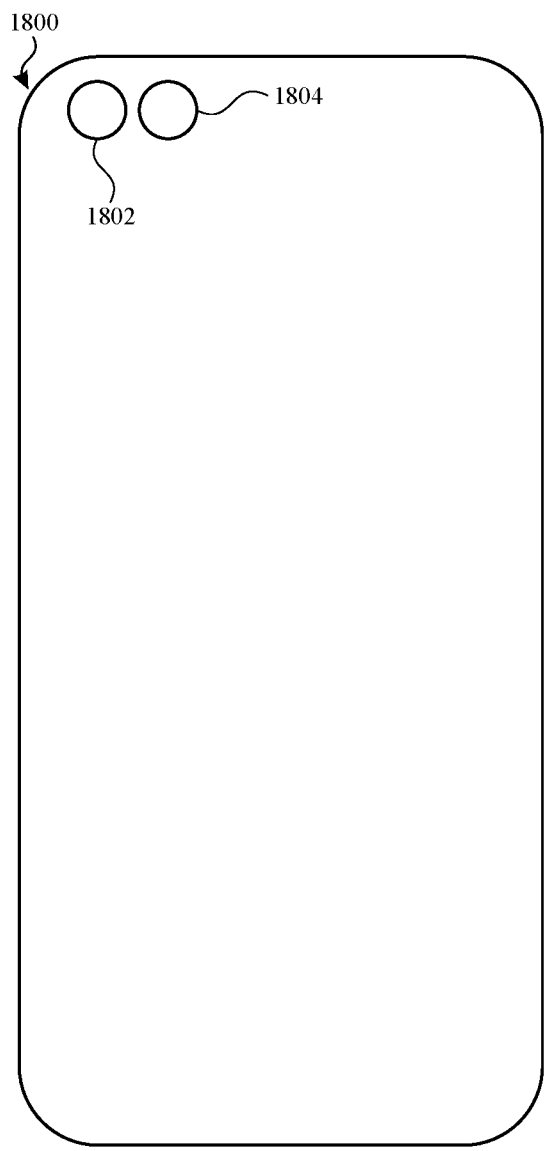
FIGS. 18A-18AN illustrate exemplary devices and user interfaces for managing camera user interfaces, in accordance with some embodiments.
Figure 19A:
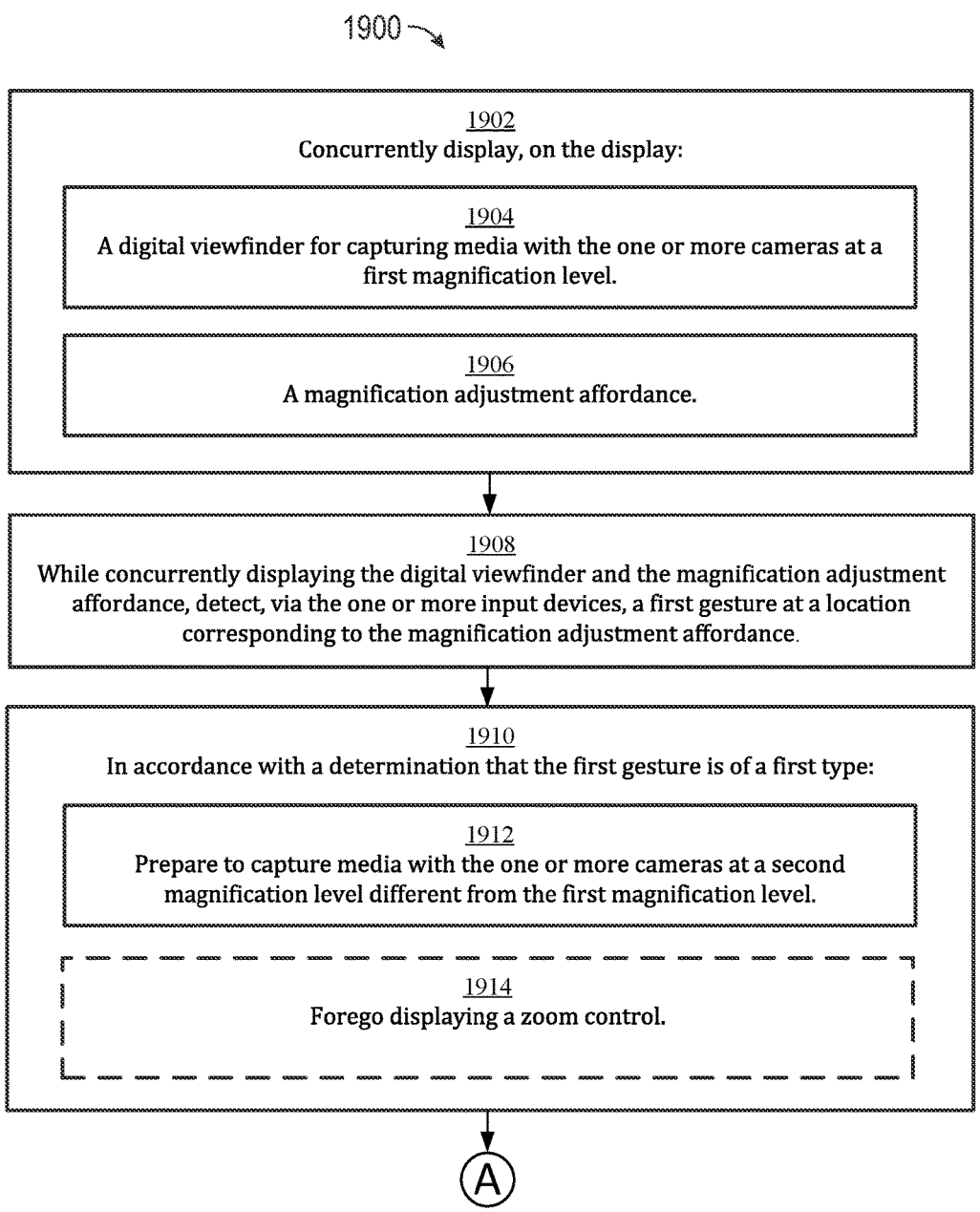
FIGS. 19A-19B is a flow diagram illustrating a method for managing camera user interfaces, in accordance with some embodiments.
Figure 19B:
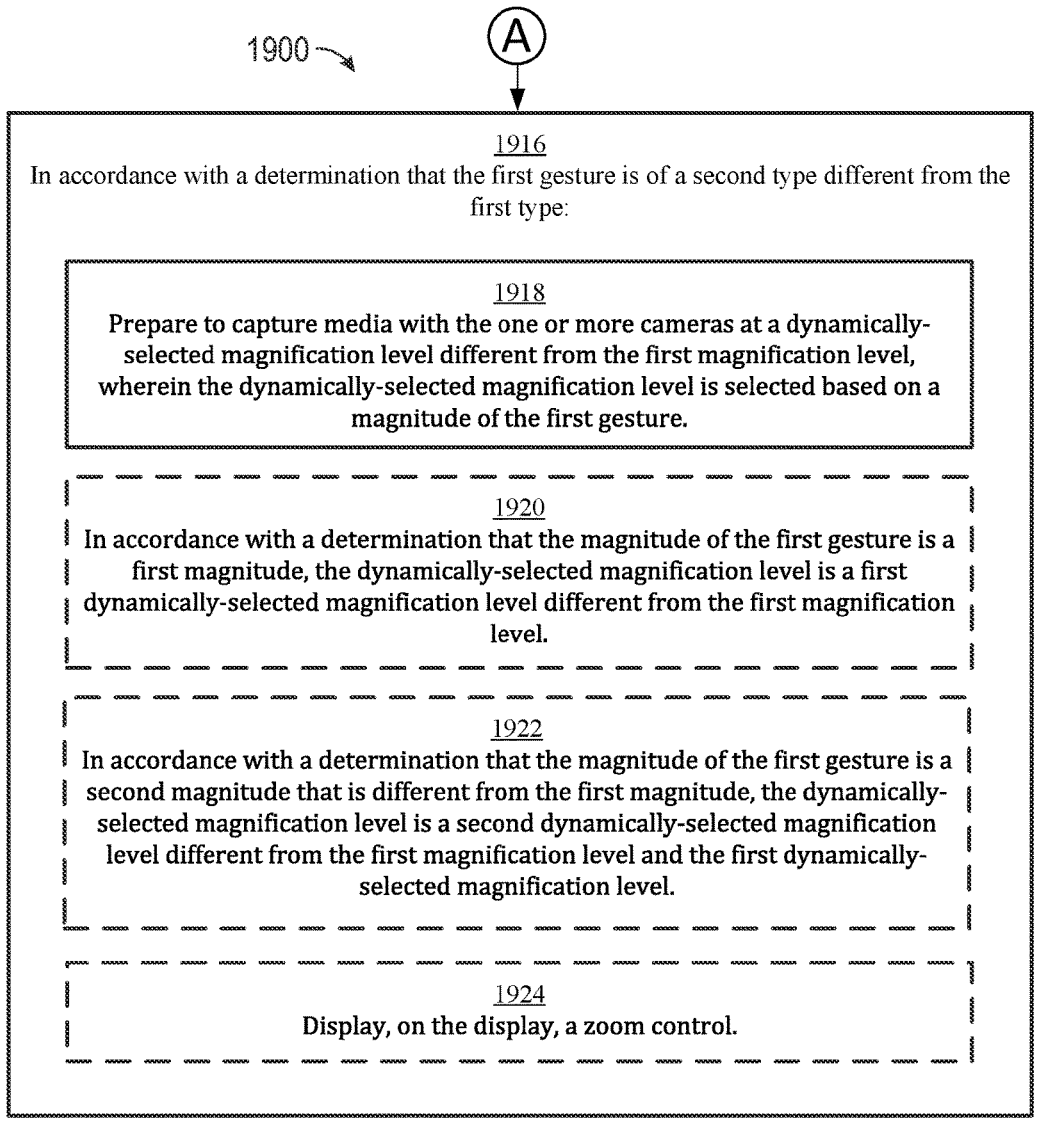
Figure 20A:
FIGS. 20A-20R illustrate exemplary devices and user interfaces for managing camera user interfaces, in accordance with some embodiments.

Below, FIGS. 1A-1B, 2, 3, 4A-4B, and 5A-5H provide a description of exemplary devices for performing the techniques for managing camera effects. FIGS. 6A-6Q illustrate exemplary devices and user interfaces for managing camera effects. FIGS. 7A-7B is a flow diagram illustrating methods of managing camera effects in accordance with some embodiments. The devices and user interfaces in FIGS. 6A-6Q are used to illustrate the processes described below, including the processes in FIGS. 7A-7B. FIGS. 8A-8H illustrate exemplary user interfaces for managing camera effects. FIG. 9 is a flow diagram illustrating methods of managing camera effects in accordance with some embodiments. The user interfaces in FIGS. 8A-8H are used to illustrate the processes described below, including the processes in FIG. 9. FIGS. 10A-10T illustrate exemplary devices and user interfaces for managing camera effects. FIG. 11 is a flow diagram illustrating methods of managing camera effects in accordance with some embodiments. The devices and user interfaces in FIGS. 10A-10T are used to illustrate the processes described below, including the processes in FIG. 11. FIGS. 12A-12I illustrate exemplary devices and user interfaces for managing camera effects. FIG. 13 is a flow diagram illustrating methods of managing camera effects in accordance with some embodiments. The user interfaces in FIGS. 12A-12I are used to illustrate the processes described below, including the processes in FIG. 13. FIGS. 18A-18AN illustrate exemplary devices and user interfaces for managing camera user interfaces. FIGS. 19A-19B is a flow diagram illustrating methods of managing camera user interfaces in accordance with some embodiments. The devices and user interfaces in FIGS. 18A-18AN are used to illustrate the processes described below, including the processes in FIGS. 19A-19B. FIGS. 20A-20R illustrate exemplary devices and user interfaces for managing camera user interfaces. FIGS. 21A-21B is a flow diagram illustrating methods of managing camera user interfaces in accordance with some embodiments. The devices and user interfaces in FIGS. 20A-20R are used to illustrate the processes described below, including the processes in FIGS. 21A-21B. FIGS. 22A-22J illustrate exemplary devices and user interfaces for navigating through a plurality of values. FIGS. 23A-23B is a flow diagram illustrating methods of navigating through a plurality of values in accordance with some embodiments. The devices and user interfaces in FIGS. 22A-22J are used to illustrate the processes described below, including the processes in FIGS. 23A-23B.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described.

It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety.

In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
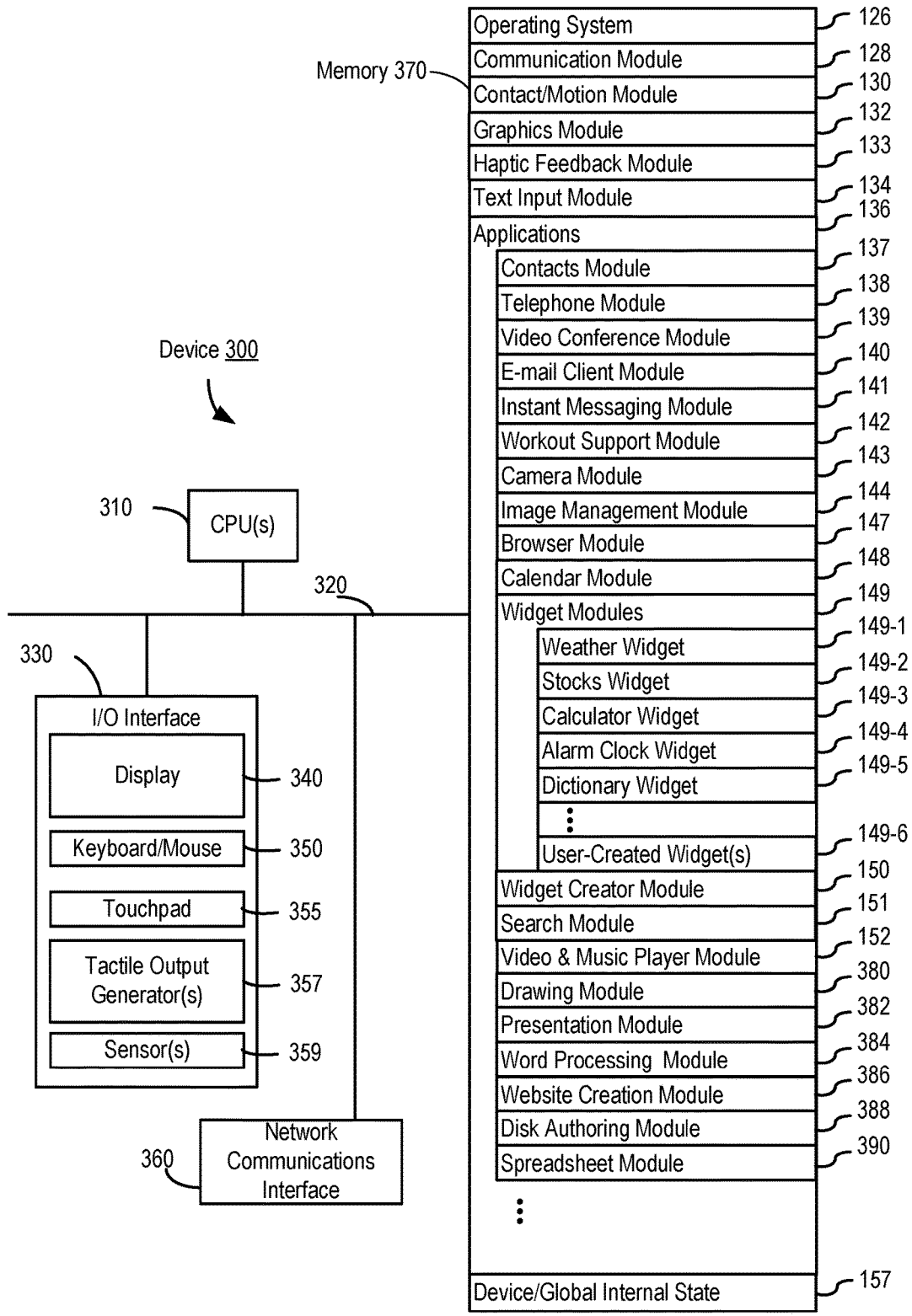
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
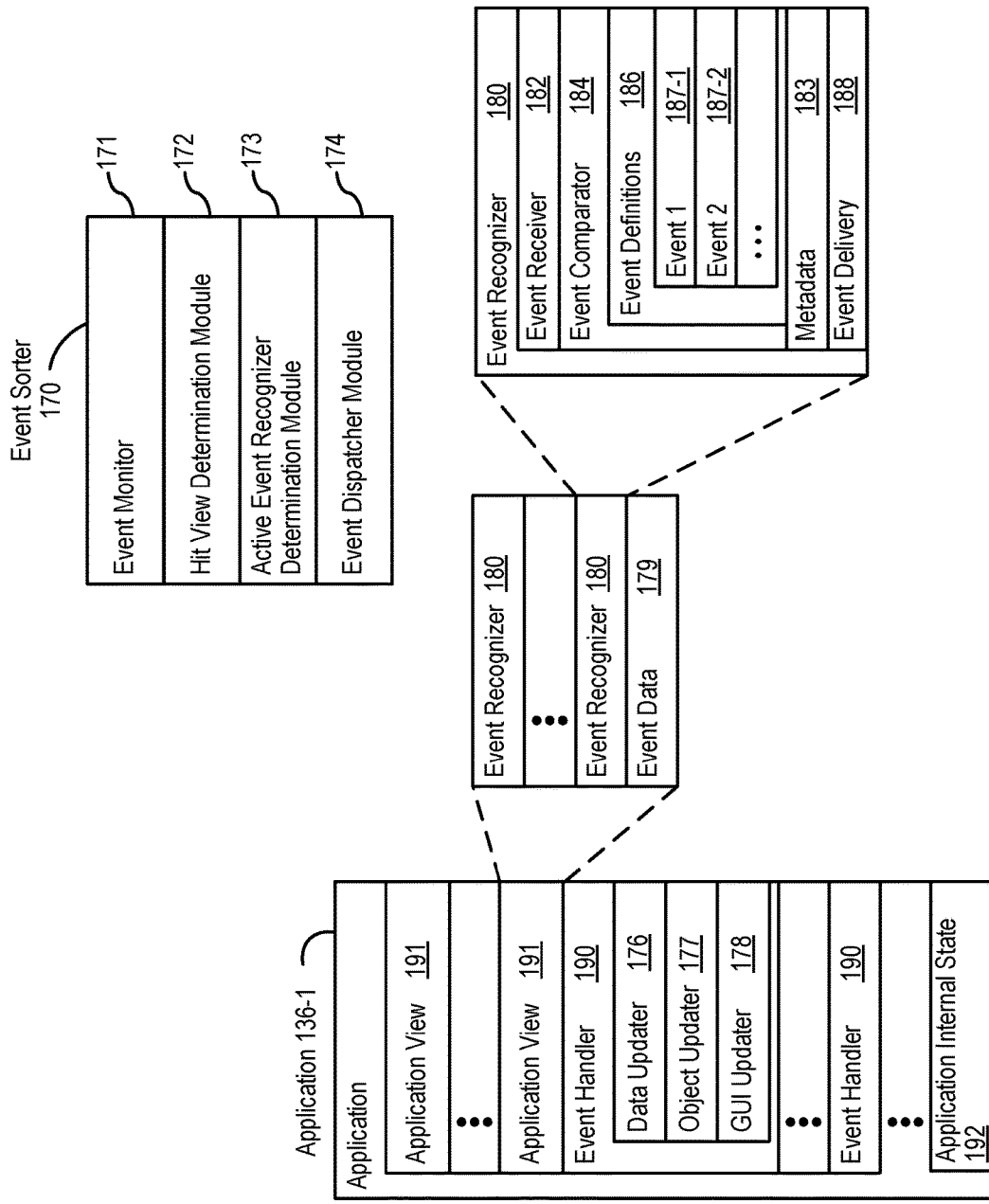
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
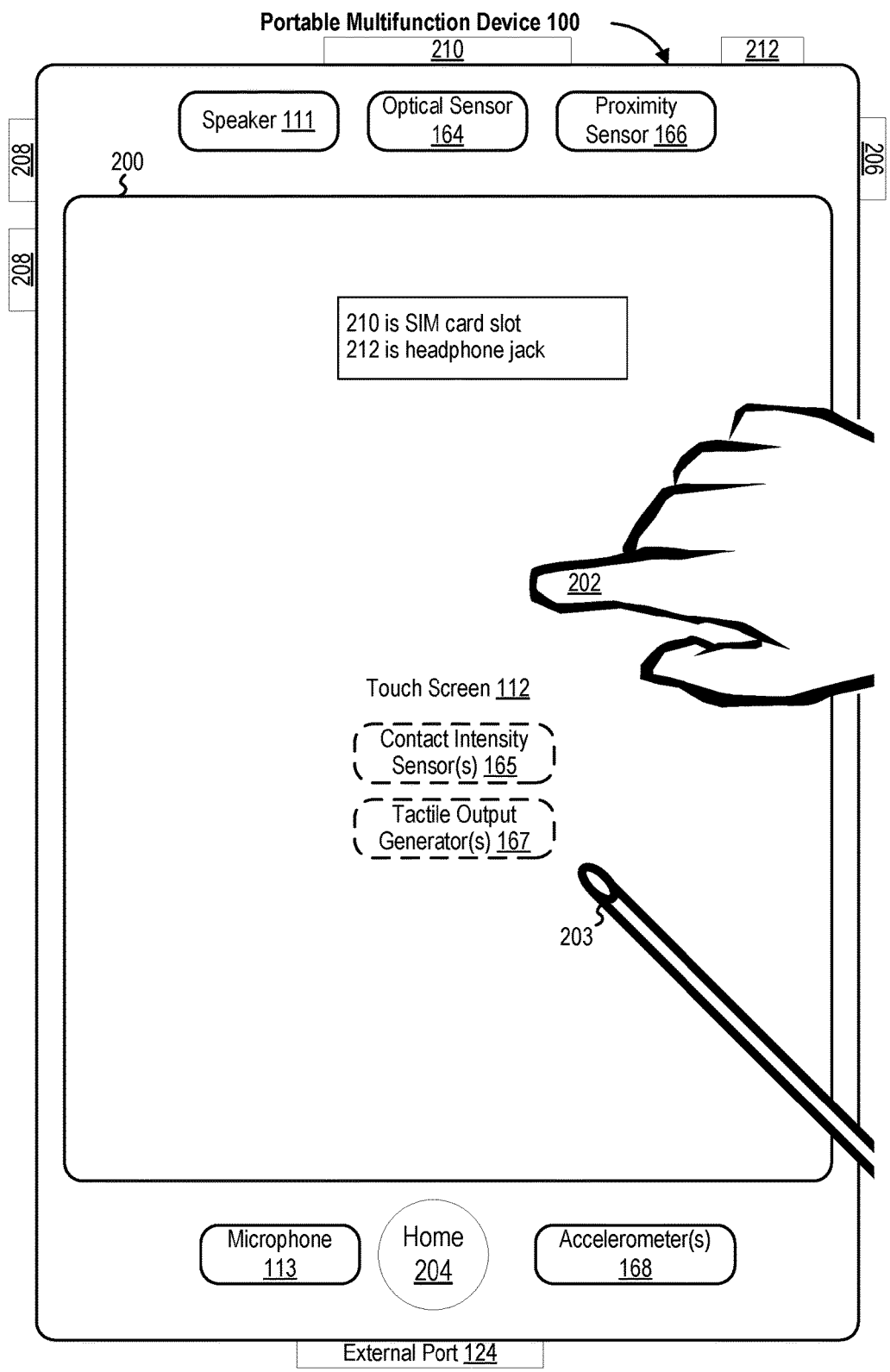
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multi-media player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
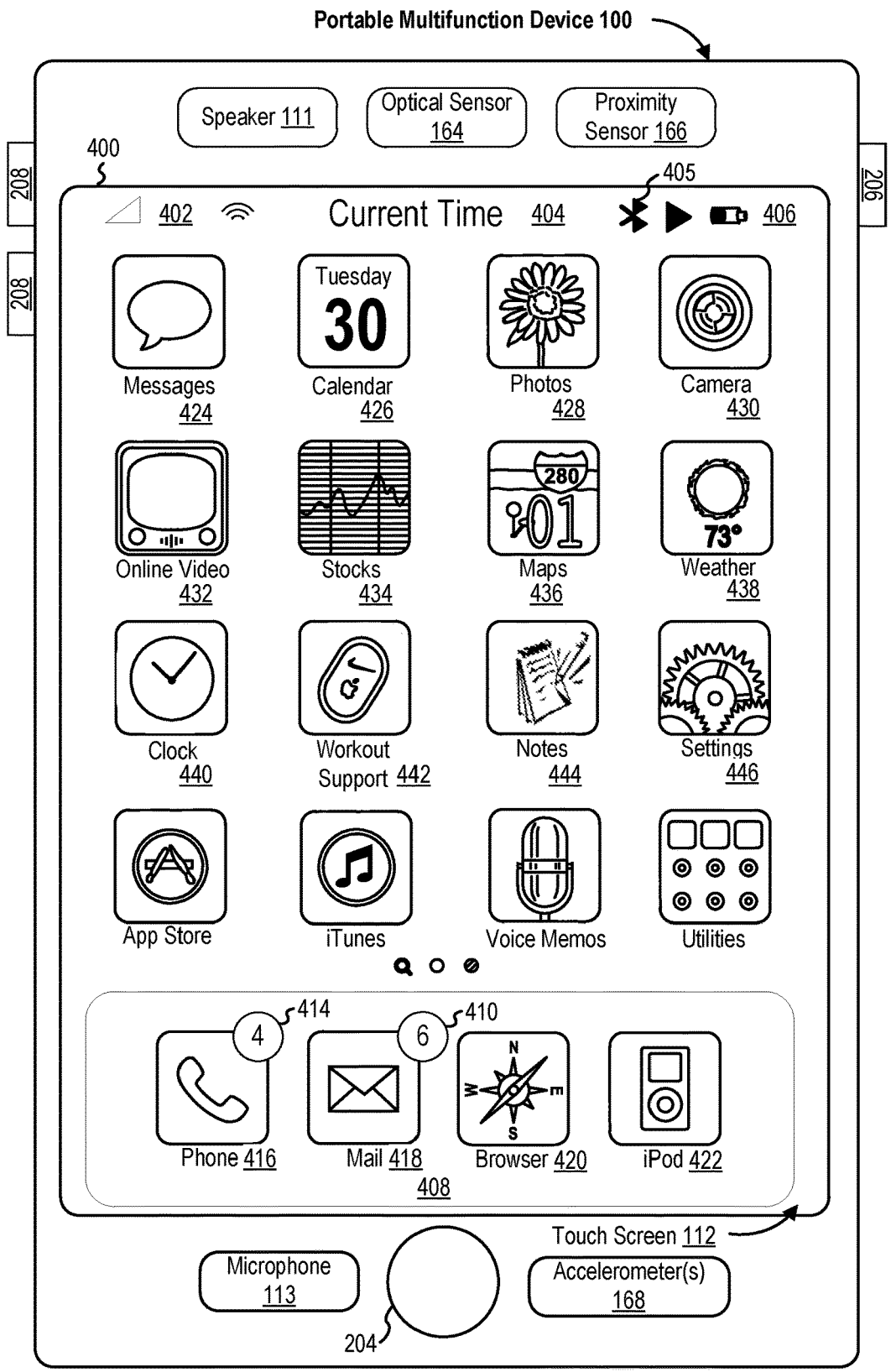
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;

Tray 408 with icons for frequently used applications, such as:
- Icon 416 for telephone module 138, labeled "Phone," which optionally includes an indicator 414 of the number of missed calls or voicemail messages;
- Icon 418 for e-mail client module 140, labeled "Mail," which optionally includes an indicator 410 of the number of unread e-mails;
- Icon 420 for browser module 147, labeled "Browser;" and
- Icon 422 for video and music player module 152, also referred to as iPod (trademark of Apple Inc.) module 152, labeled "iPod;" and Icons for other applications, such as:
- Icon 424 for IM module 141, labeled "Messages;"
- Icon 426 for calendar module 148, labeled "Calendar;"
- Icon 428 for image management module 144, labeled "Photos;"
- Icon 430 for camera module 143, labeled "Camera;"
- Icon 432 for online video module 155, labeled "Online Video;"
- Icon 434 for stocks widget 149-2, labeled "Stocks;"
- Icon 436 for map module 154, labeled "Maps;"
- Icon 438 for weather widget 149-1, labeled "Weather;"
- Icon 440 for alarm clock widget 149-4, labeled "Clock;"
- Icon 442 for workout support module 142, labeled "Workout Support;"
- Icon 444 for notes module 153, labeled "Notes;" and
- Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
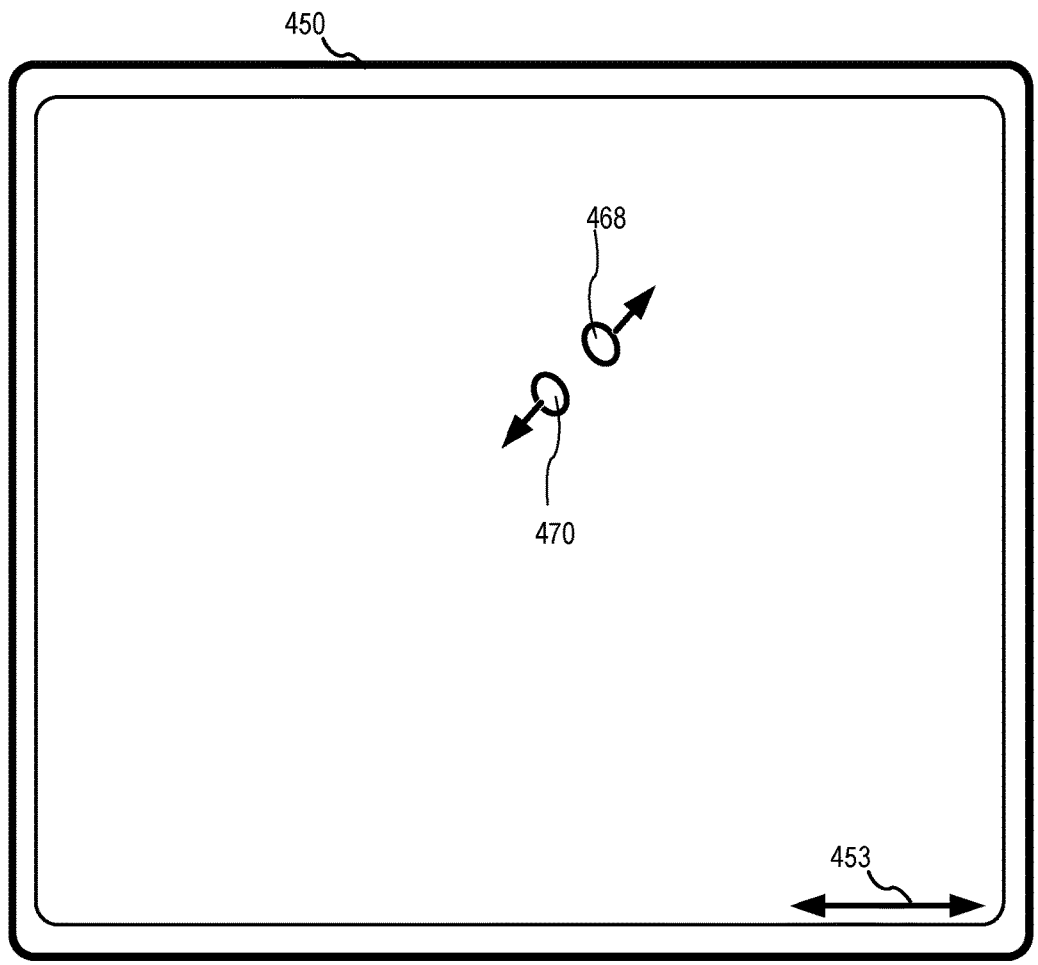
FIG. 4B illustrates an exemplary user interface for a multifunction device with a touch-sensitive surface that is separate from the display in accordance with some embodiments.
Figure 4B:
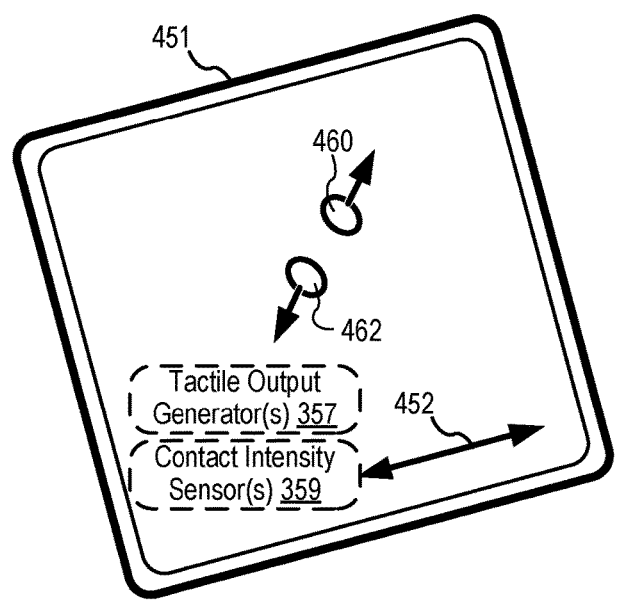

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
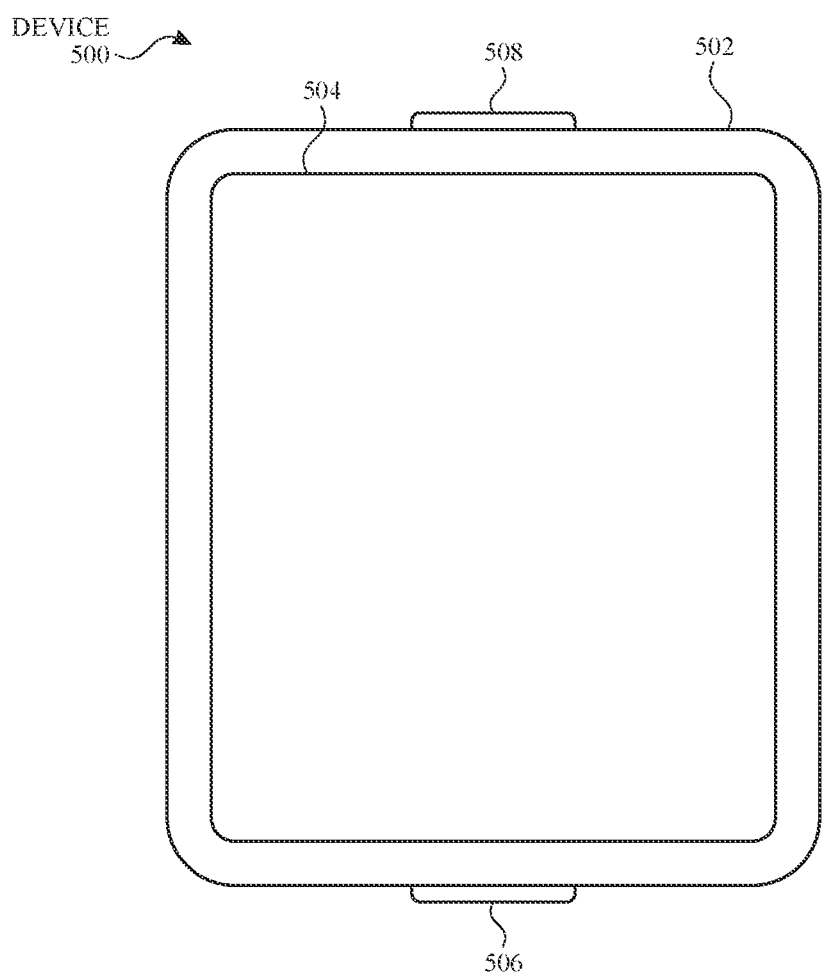
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
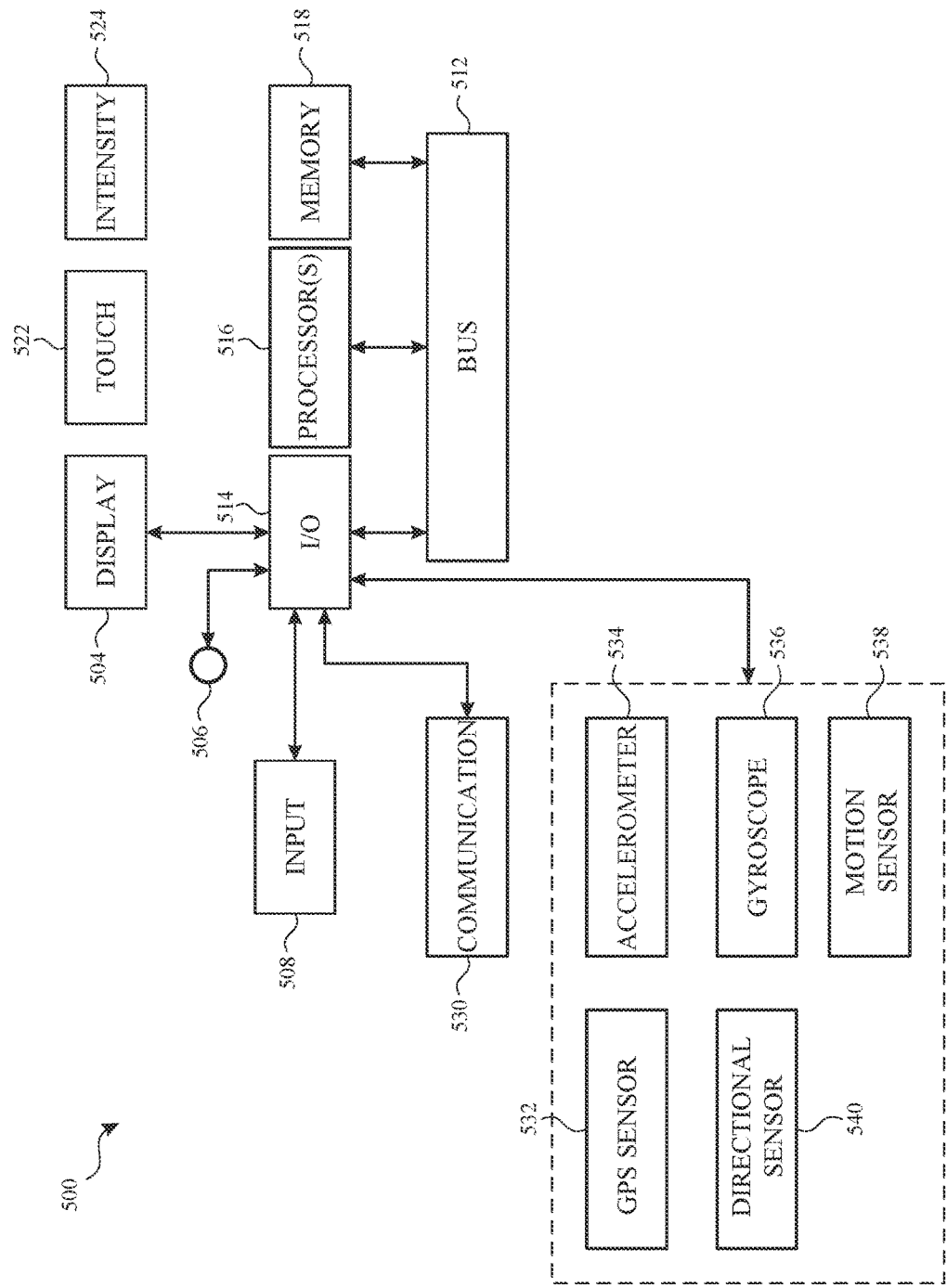
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700 (FIGS. 7A-7B), 900 (FIG. 9), 1100 (FIG. 11), 1300 (FIG. 13), 1900 (FIGS. 19A-19B), 2100 (FIGS. 21A-21B), and 2300 (FIGS. 23A-23B). Personal electronic device 500 is not limited to the components and configuration of FIG. 5B, but can include other or additional components in multiple configurations.

Figures 1, 20B:
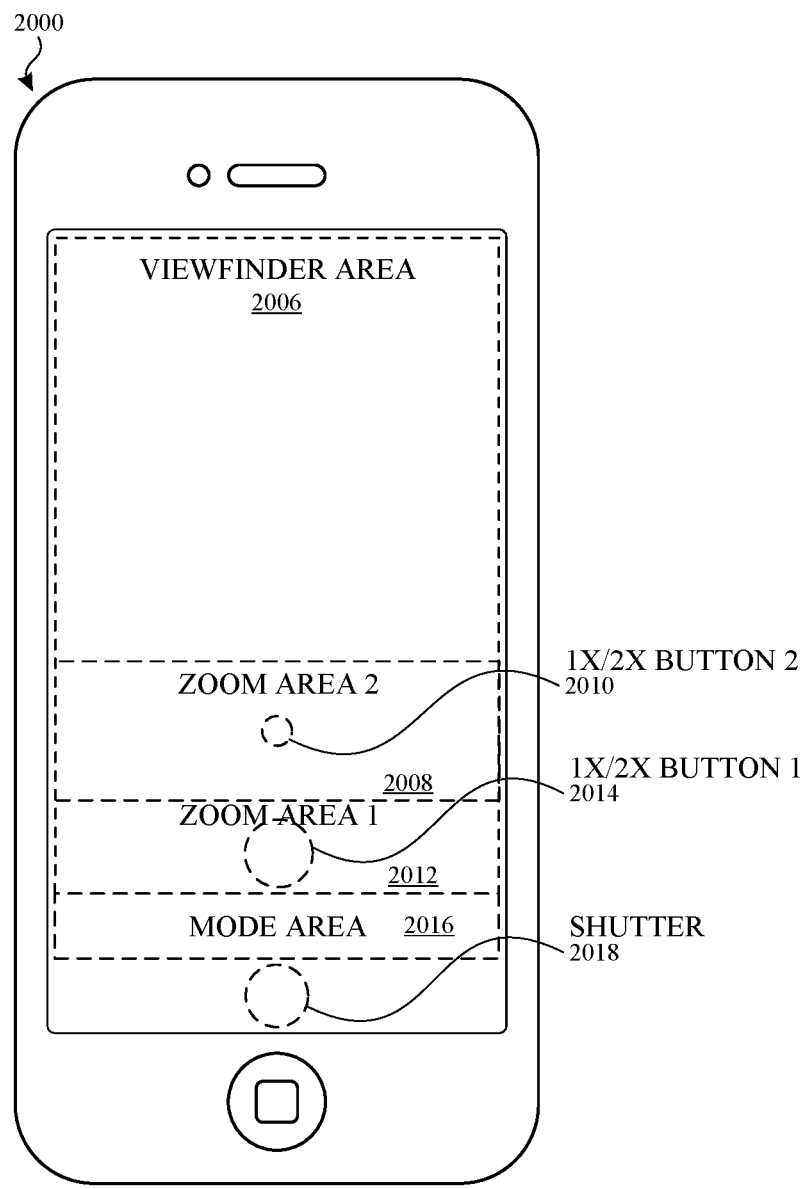
Figures 2, 20B:
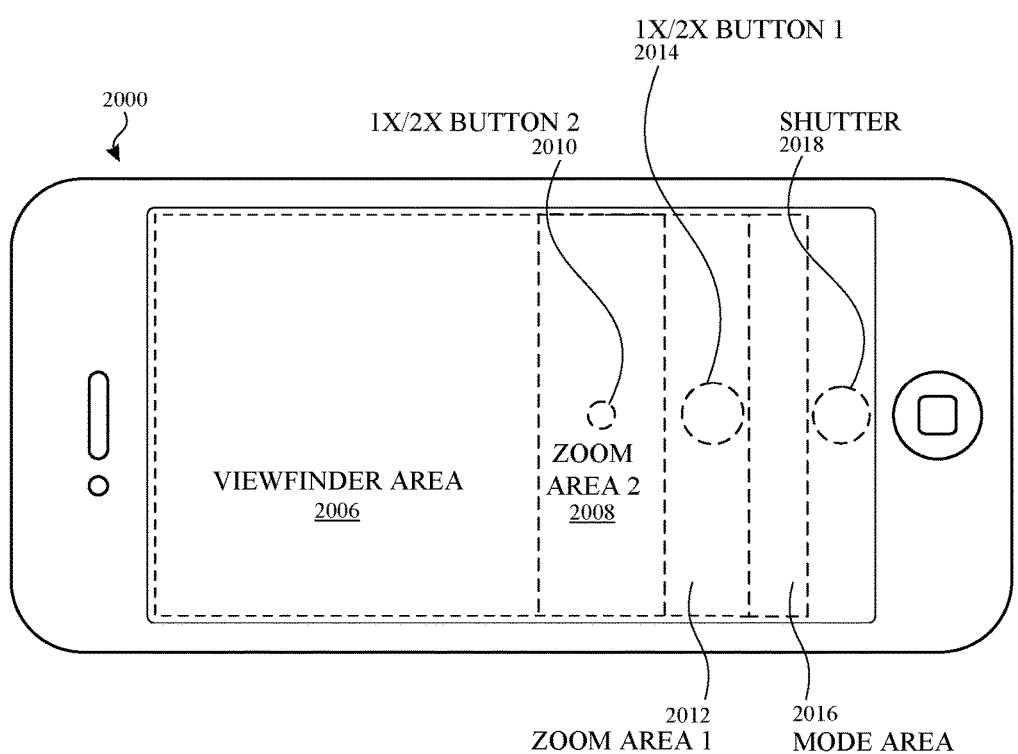

As used here, the term "affordance" refers to a user-interactive graphical user interface object that is, optionally, displayed on the display screen of devices 100, 300, and/or 500 (FIGS. 1, 3, and 5). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
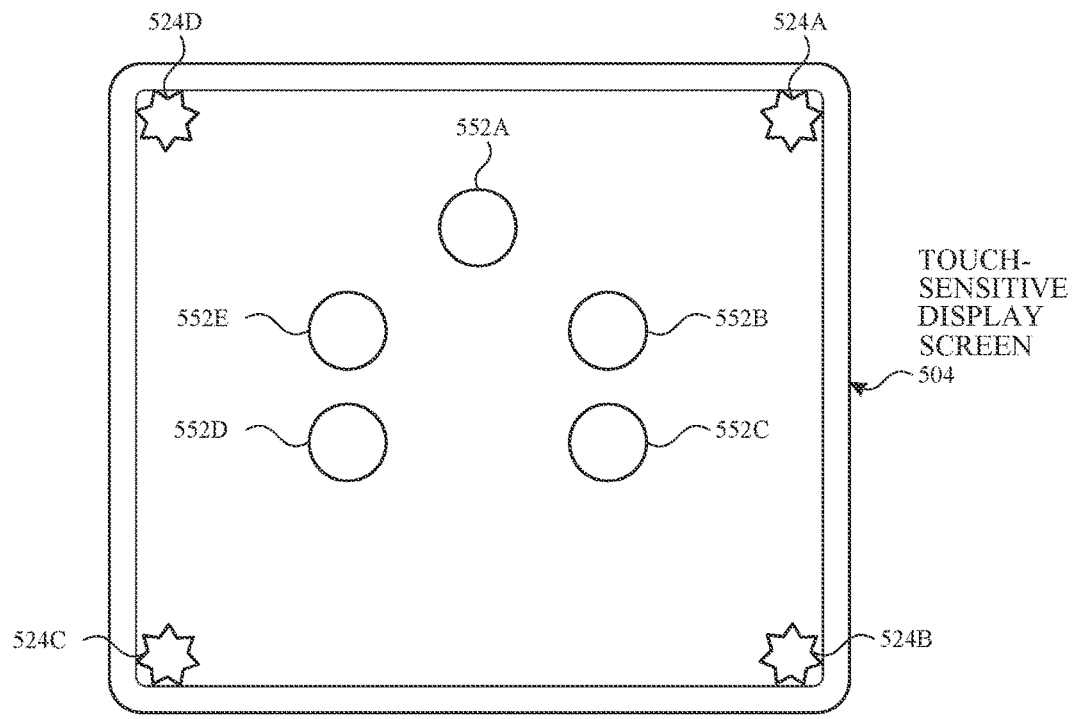
FIGS. 5C-5D illustrate exemplary components of a personal electronic device having a touch-sensitive display and intensity sensors in accordance with some embodiments.
Figure 5C:
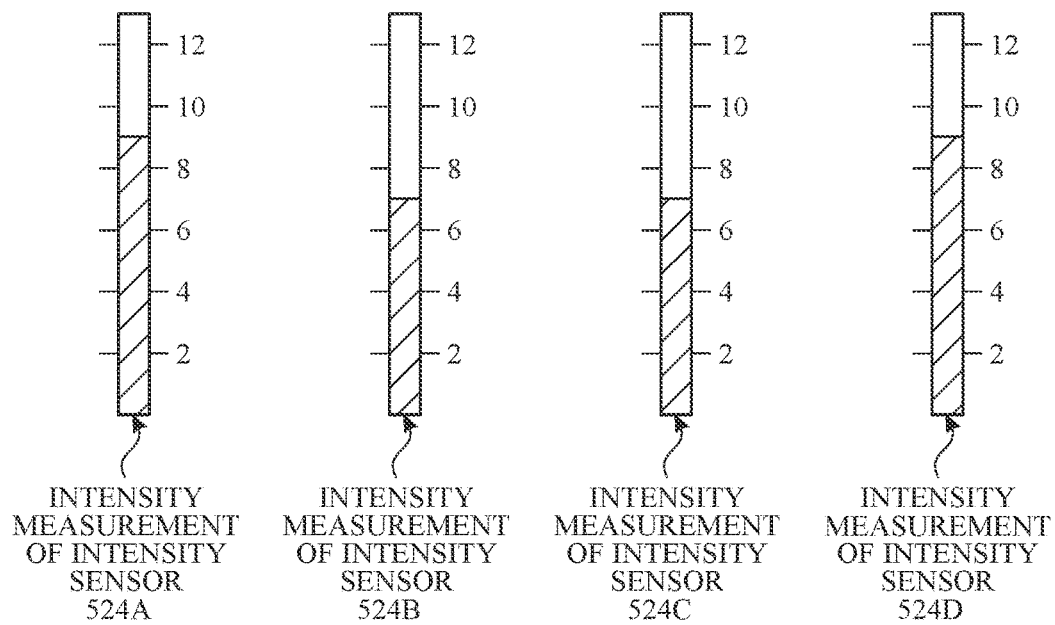
Figure 5D:
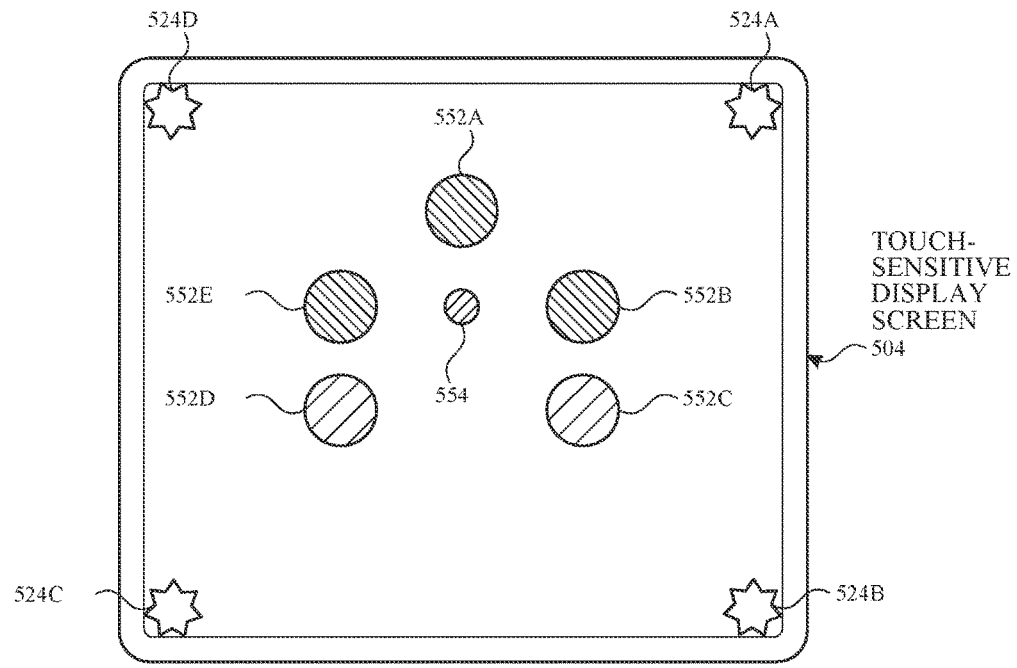
Figure 5D:
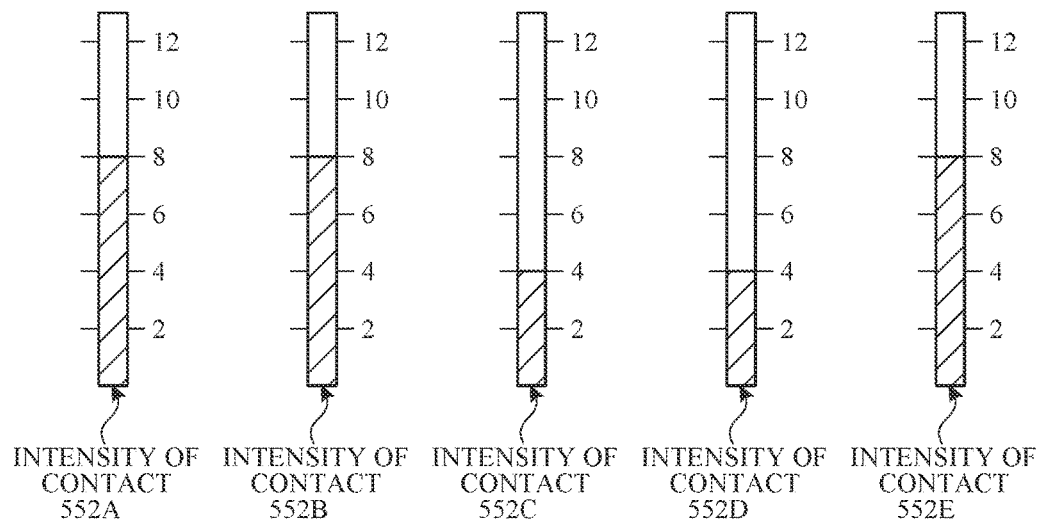

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A \cdot (Dj/\Sigma Di)$, where Dj is the distance of the respective contact j to the center of force, and $\Sigma Di$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
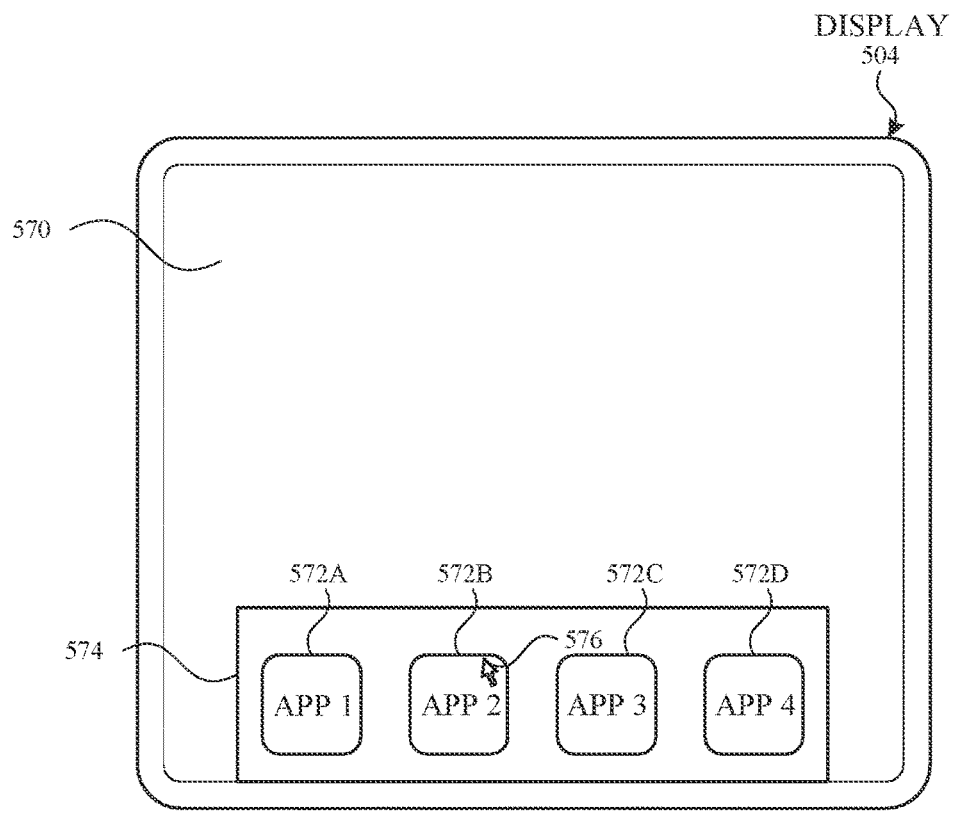
FIGS. 5E-5H illustrate exemplary components and user interfaces of a personal electronic device in accordance with some embodiments.
Figure 5E:
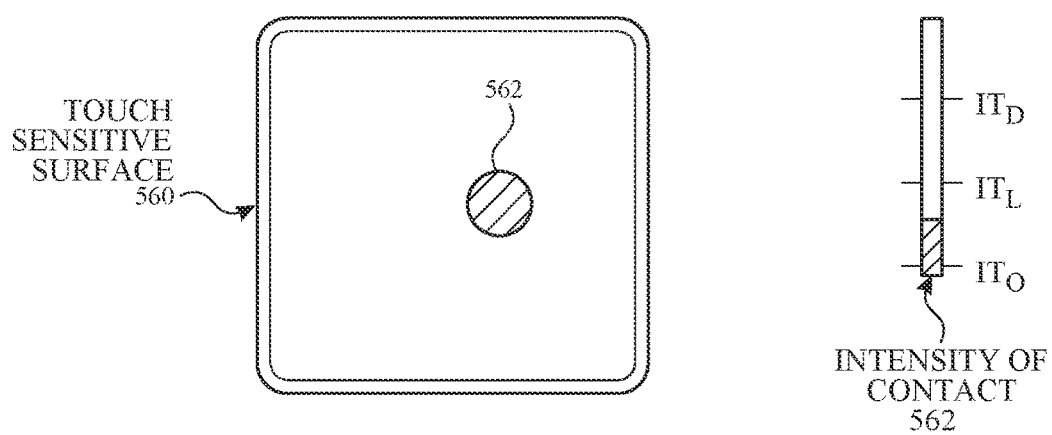
Figure 5F:
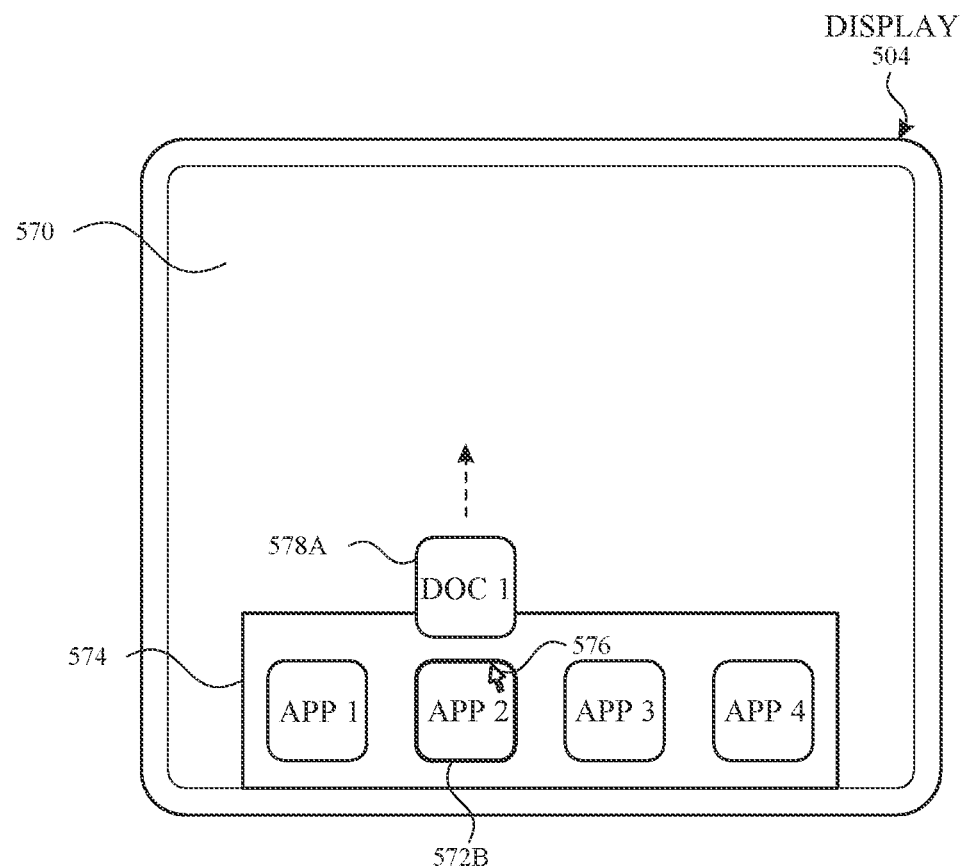
Figure 5F:
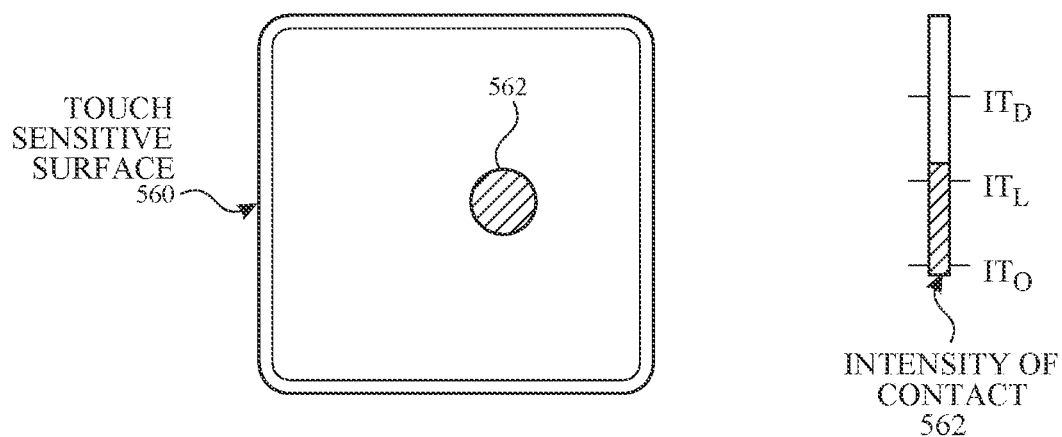
Figure 5G:
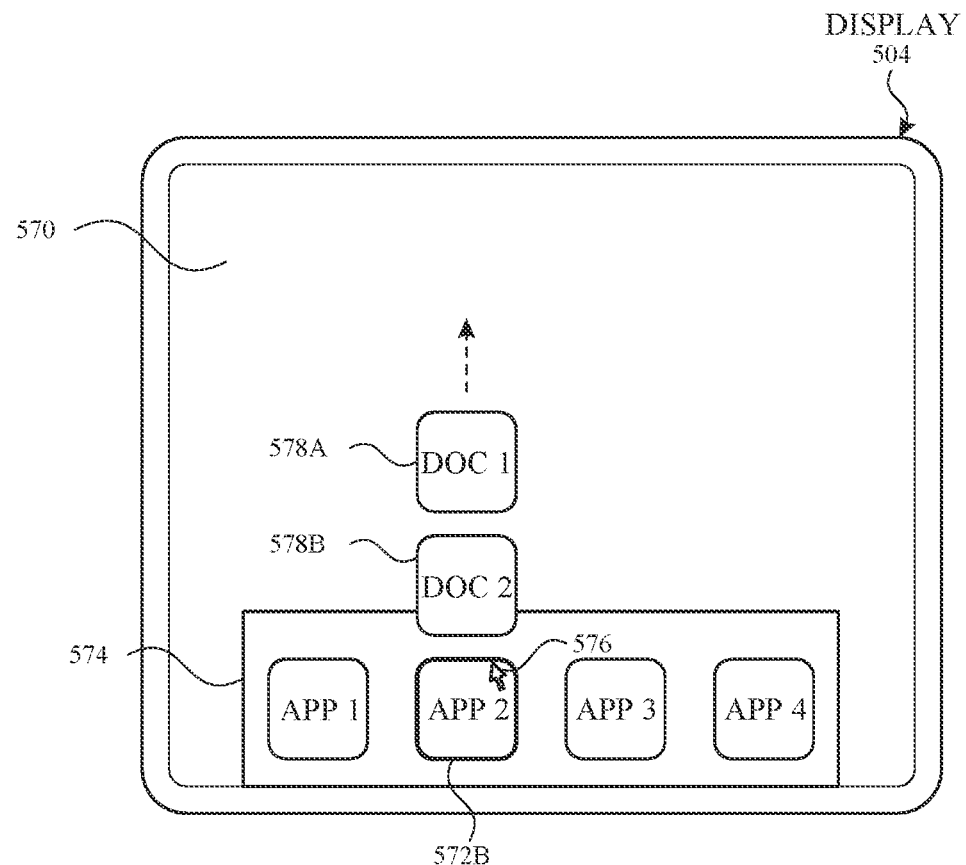
Figure 5G:
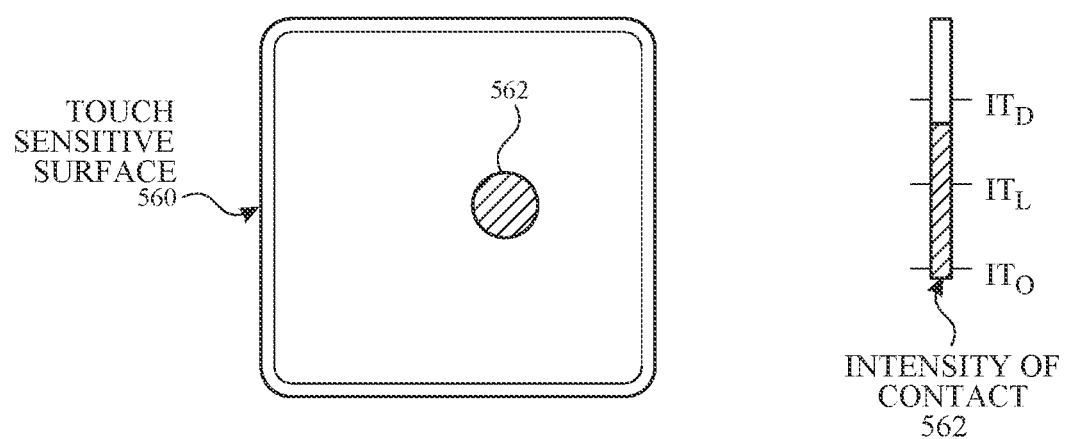
Figure 5H:
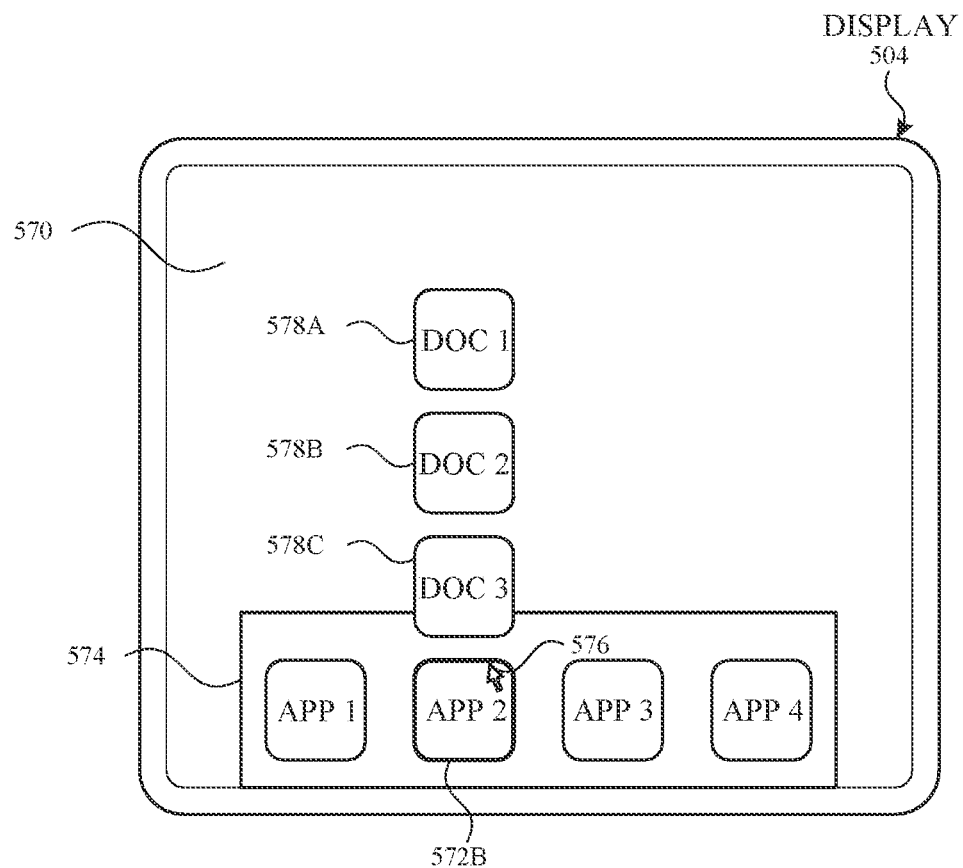
Figure 5H:
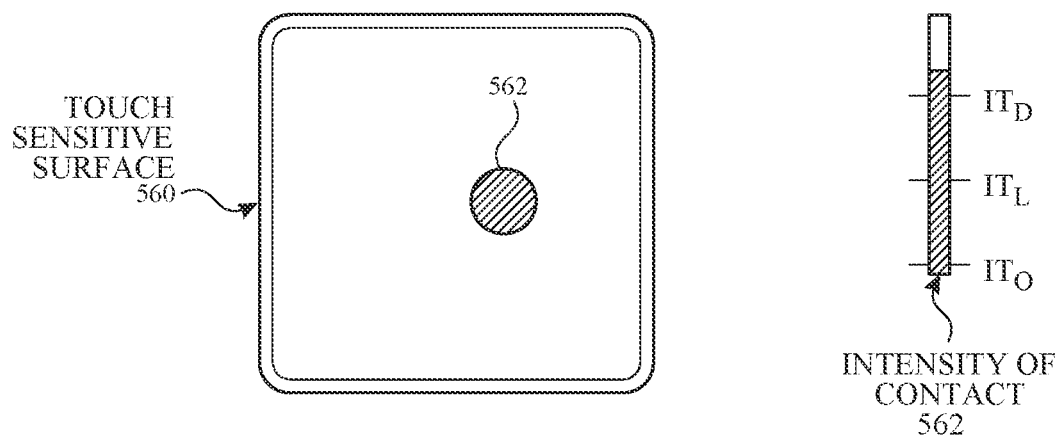

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Attention is now directed towards embodiments of user interfaces ("UI") and associated processes that are implemented on an electronic device, such as portable multifunction device 100, device 300, or device 500.

FIGS. 6A-6Q illustrate exemplary devices and user interfaces for simulating an optical effect, in accordance with some embodiments. The user interfaces in these figures are used to illustrate the simulated optical effect processes described below, including the processes in FIGS. 7A-7B.

FIG. 6A illustrates an exemplary electronic device 600 with a first camera 602 and a second camera 604 that are located, for example, on the rear of the electronic device. In some examples, the first camera 602 and the second camera 604 have fixed, but different, focal lengths. In some examples, the focal length, field of view, and/or optical magnification properties of the optical system is fixed for each of the cameras (e.g., 602, 604). In some embodiments, in addition to having different fixed focal lengths, the cameras (e.g., 602, 604) have different fixed fields of view and different fixed optical magnification properties.

In some embodiments, the first camera 602 has a first field of view and the second camera 604 has a second field of view, wherein the first field of view and the second field of view overlap. In some examples, the first camera 602 and the second camera 604 are spaced apart so that a parallax between images detected (e.g., captured) by the cameras is used to determine distances to objects represented by different portions of a digital viewfinder displaying image data from one or more of camera 602 and camera 604. In some embodiments, the first camera 602 and the second camera 604 are located on a surface of the electronic device 600 and the optical axes of the cameras 602 and 604 are arranged such that they are parallel or substantially parallel. In some examples, the first camera 602 and the second camera 604 capture overlapping fields of view, for example, at least 50% overlapping, at least 90% overlapping, or more. In some examples, the first camera 602 has a wider field of view than the second camera 604. In some examples, the second camera has a wider field of view than the first camera. When a wide-angle camera (e.g., a camera with a wide-angle lens) has a wider field of view than a telephoto camera (e.g., a camera with a telephoto lens), at a 1× magnification of the wide-angle camera objects appear further away than at a 1× magnification of the telephoto camera. If the wide-angle camera and the telephoto camera have overlapping fields of view such that the field of view of the telephoto camera is approximately centered on the field of view of the wide angle camera, an image captured with the telephoto camera at a 1× magnification level will, in some circumstances (e.g., where the subject of the image is at least 1 meter away), appear to be an optical zoom of a corresponding image captured with the wide-angle camera at a 1× magnification level.

Figure 6B:
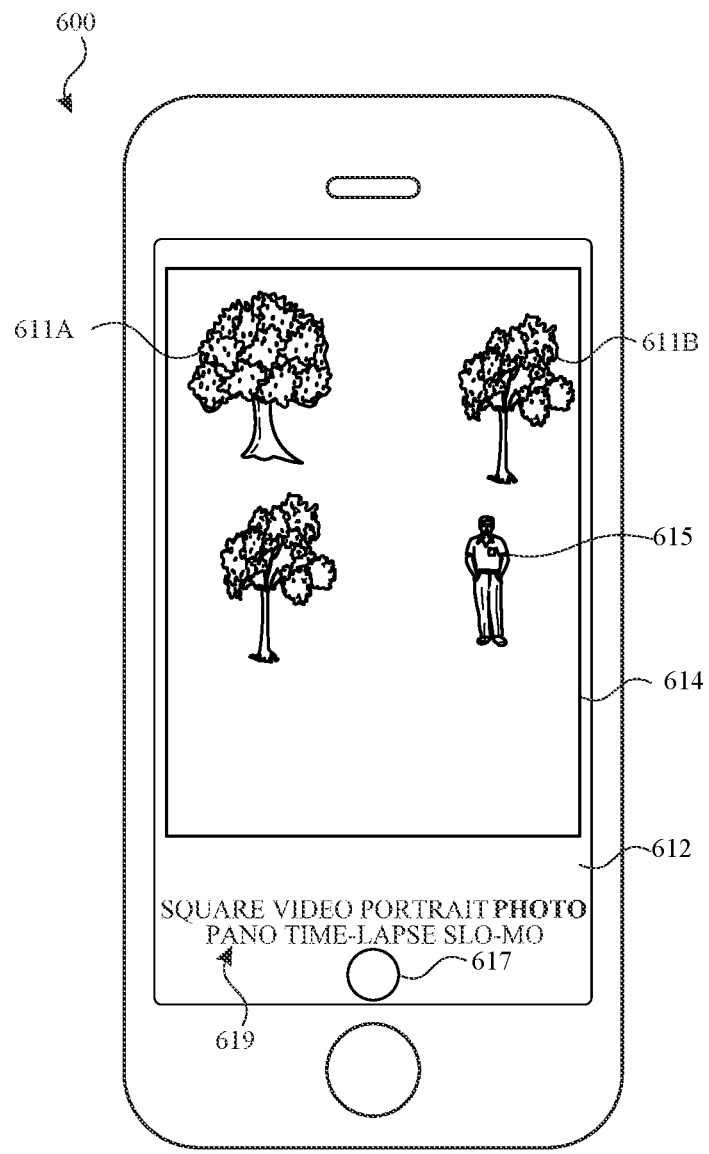

FIG. 6B illustrates the front of exemplary electronic device 600 including display 612. The electronic device 600 displays, on the display 612, a digital viewfinder 614 including a preview based on data received from the first camera 602. In some embodiments, objects (e.g., 611A, 611B, 615) displayed in the digital viewfinder are located at varying distances from the camera (and/or the electronic device 600). In some embodiments, as illustrated in FIGS. 6B-6H, data is displayed in the viewfinder without applying a simulated optical effect, such as a bokeh simulated optical effect. In some embodiments, the electronic device displays, on the display 612, the digital viewfinder 614 in response to the electronic device 600 receiving a user input—for example detecting a tap gesture at a location on a touch-sensitive surface corresponding to a camera application affordance (e.g., 430 of FIG. 4A).

In some embodiments, the electronic device 600 displays, on the display 612, a camera mode selection menu 619, which includes affordances corresponding to various selectable camera modes. In response to the electronic device 600 receiving a signal corresponding to a selection of a camera mode, the electronic device 600 configures the camera application for the selected camera mode. For example, FIG. 6B illustrates a "PHOTO" camera mode, or photo mode, that is active. In some examples, the electronic displays, on the display 612, a camera shutter affordance 617 (e.g., concurrently with the digital viewfinder 614) which, when activated, causes the electronic device 600 to capture an image, such as by storing, in memory, data from the first camera and/or the second camera. In some examples, the captured image corresponds to the preview displayed in the digital viewfinder 614 (e.g., at the time the electronic device 600 detects activation of the camera shutter affordance 617).

Figure 6C:
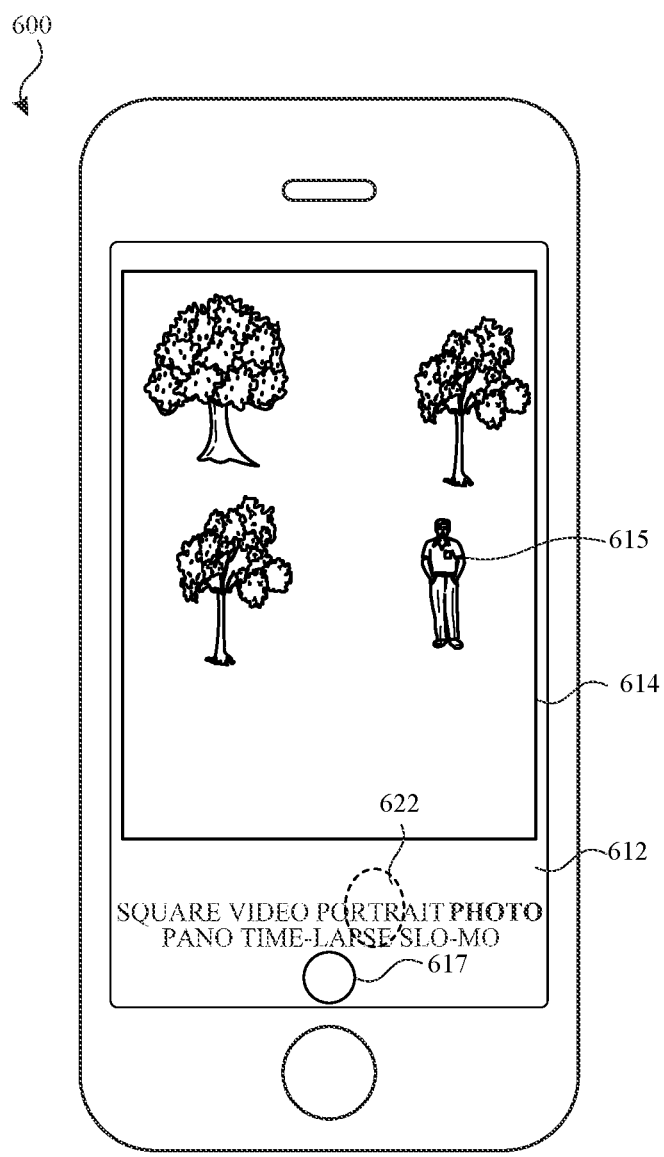

FIG. 6C illustrates electronic device 600 receiving a user input 622 corresponding to an instruction to initiate a camera mode change. In FIG. 6C, the electronic device 600 receives the user input on the "PORTRAIT" mode menu item displayed on display 612. As a result, the electronic device 600 changes the camera capture mode to the "PORTRAIT" mode. In some examples, the "PORTRAIT" mode, or the portrait mode, corresponds to a simulated optical effect mode. In some embodiments, the simulated optical effect mode is a mode in which a simulated optical effect is applied to the digital viewfinder when a set of one or more conditions is met, as described below. In some embodiments, the menu name, label, or affordance for the camera mode corresponding to the simulated optical effect is varied.

Figure 6D:
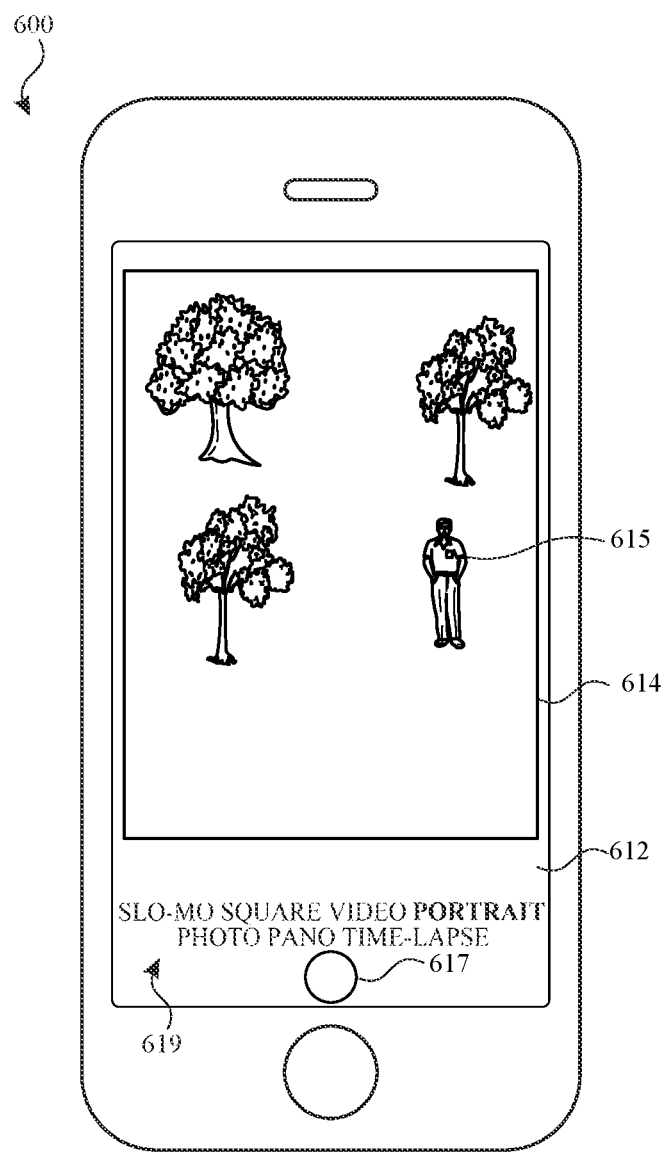

FIG. 6D illustrates the result of receiving user input 622 in FIG. 6C when the electronic device 600 transitions from the photo mode as shown in FIG. 6B to the portrait mode. Once the electronic device 600 is in the portrait mode, the portrait menu label is differentiated from the remaining menu items so that a user can easily identify when the mode changed has occurred and what mode is selected. In some embodiment, the differentiating can be via, for example, highlighting, bolding, different size font, varying font type, or any other mechanism to distinguish the selected mode from the non-selected modes.

Figure 6E:
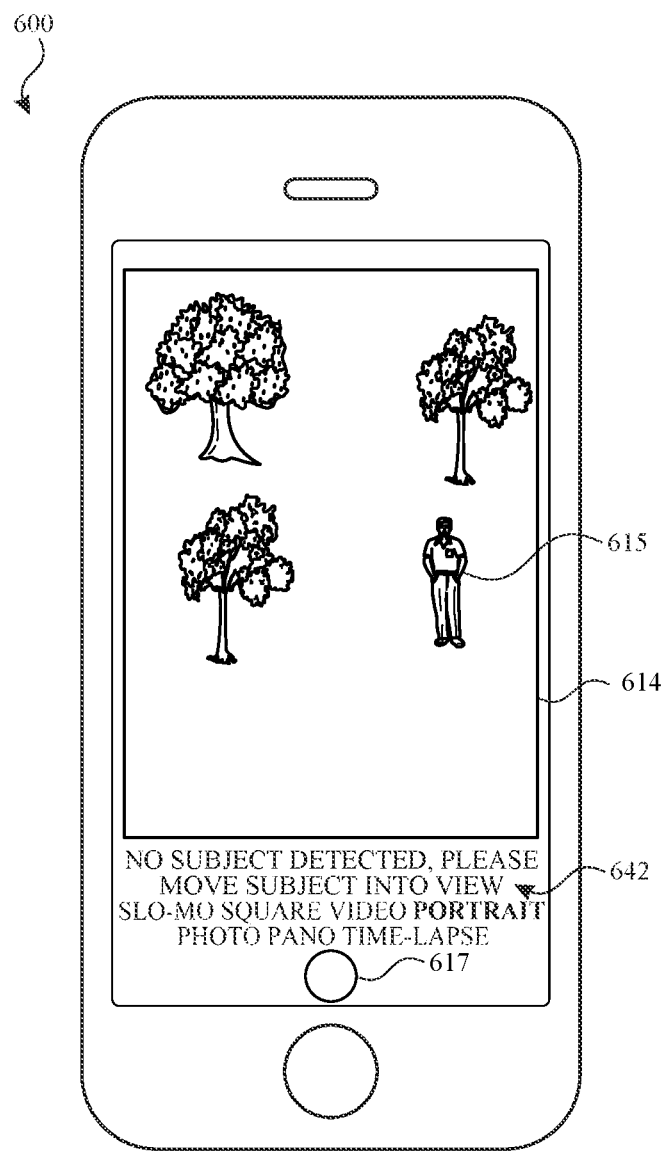

In FIG. 6E, while displaying the digital viewfinder, the electronic device 600 determines whether the set of one or more conditions is met. In some examples, a condition of the set of one or more conditions is met when a subject is detected. In the example illustrated in FIG. 6E, a subject is not detected because, for example, the subject is too far and the electronic device 600 cannot differentiate the subject from the remaining objects in the scene. In some examples, as illustrated in FIG. 6E, in accordance with a determination that the set of one or more conditions is not met, the electronic device displays, on the display, a graphical indication 642 of a condition that is not met. In some examples, as illustrated in FIG. 6E, the electronic device does not detect a subject (e.g., the camera focus is 10 m or more) and instructs the user (e.g., using the graphical indication) to place a subject within an acceptable distance (e.g., within 8 feet and 2.5 m). In some examples, an affordance is displayed in the viewfinder to allow a user to disable or enable such instructions. In some examples, in accordance with the determination that the set of one or more conditions are met, the electronic device forgoes displaying, on the display, the graphical indication 642 instructing the user. Thus, in some examples, the electronic device does not instruct the user when user action is not helpful (or required) for applying the simulated optical effect.

In some examples, the electronic device detects a subject, but the subject is too far away (e.g., focus is between 2.5 m and 10 m), and the electronic device instructs the user (e.g., using the graphical indication) to move closer to camera (e.g., to within 8 feet). In some examples, the electronic device determines an amount of light is too low (e.g., 400 lux or less), and instructs the user (e.g., using the graphical indication) to provide more light. In some examples, an affordance is displayed in the viewfinder to allow a user to disable or enable such instructions. In some examples, in accordance with the determination that the set of one or more conditions are met: electronic device 600 forgoes displaying, on the display, the graphical indication instructing the user. Thus, in some examples, the electronic device does not instruct the user when user action is not helpful for applying the simulated optical effect.

Figure 6F:
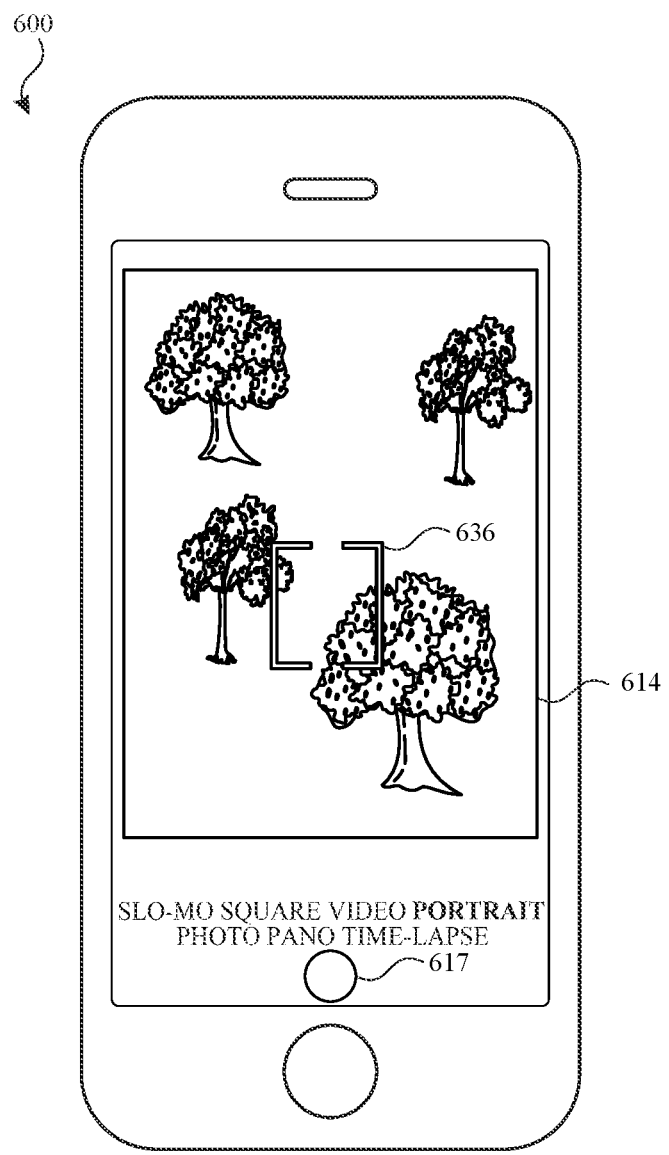

As illustrated in FIGS. 6E and 6F, in some examples, the electronic device 600 fails to detect the subject. In some examples, in accordance with failing to detect the subject, the electronic device 600, displays, in the digital viewfinder 614 on the display, one or more visual markers 636 (e.g., a visual boundary) that are centered in the digital viewfinder, as shown in FIG. 6F. In some examples, in accordance with detecting no subjects, the electronic device 600 displays in the digital viewfinder 614 on the display, one or more visual markers (e.g., a visual boundary) that is centered in the digital viewfinder. In some examples, the one or more visual markers 636 indicate to the user the area within the scene that will be placed into focus or otherwise acted on by the electronic device.

Figure 6G:
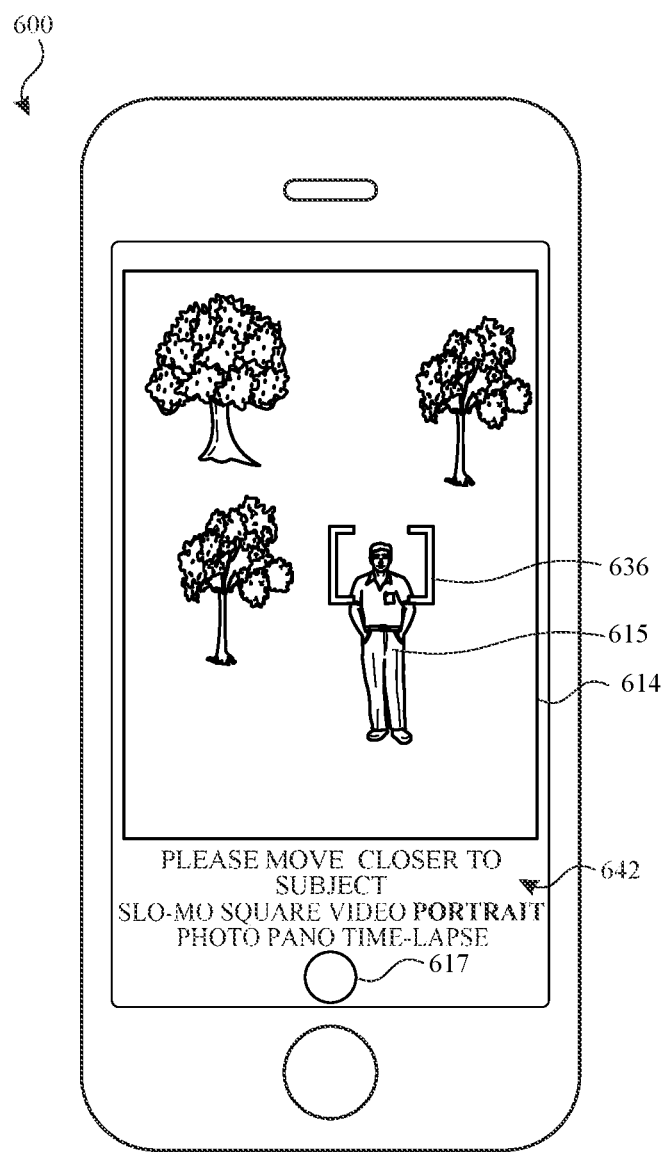

As illustrated in FIG. 6G, a condition of the set of one or more conditions is met when the electronic device detects a subject within a predetermined distance from the electronic device 600 (e.g., a distance from subject to the first camera or to the second camera). In the example of FIG. 6G, the set of one or more conditions is not met, and thus the electronic device does not apply the simulated optical effect to the preview displayed in the digital viewfinder 614. In some embodiments, the electronic device 600 automatically (e.g., without user intervention, without user input), determines a distance to the subject. For example, the electronic device 600 repeatedly (or continuously) tracks the subject and determines the distance to the subject. In some examples, the determination of the distance to the subject is based on a depth map generated based on a parallax effect (e.g., using the first camera and the second camera). In some examples, the determination of the distance to the subject is based on a focus distance of either (or both) the first camera or the second camera. In some examples, the first condition of the set of one or more conditions includes determining whether: a focus distance is 8 feet or more, a focus distance is within 8 feet and 2.5 m, or the amount of light is 400 lux or more. In some embodiments, the determination of whether the first condition is met is based on data from one camera sensor (e.g., focal length). In some embodiments, the determination of whether the first condition is met is based on data from both the first camera and the second camera. In some embodiments, the electronic device 600 displays a visual marker 636 (e.g., around the subject, around a portion of the subject, or around the head and shoulder portion of a person that is the subject) to indicate that the electronic device 600 detected a subject in the digital viewfinder 614. In some embodiments, the electronic device does not display the one or more visual markers (e.g., 636) even when the subject is detected.

Figure 6H:
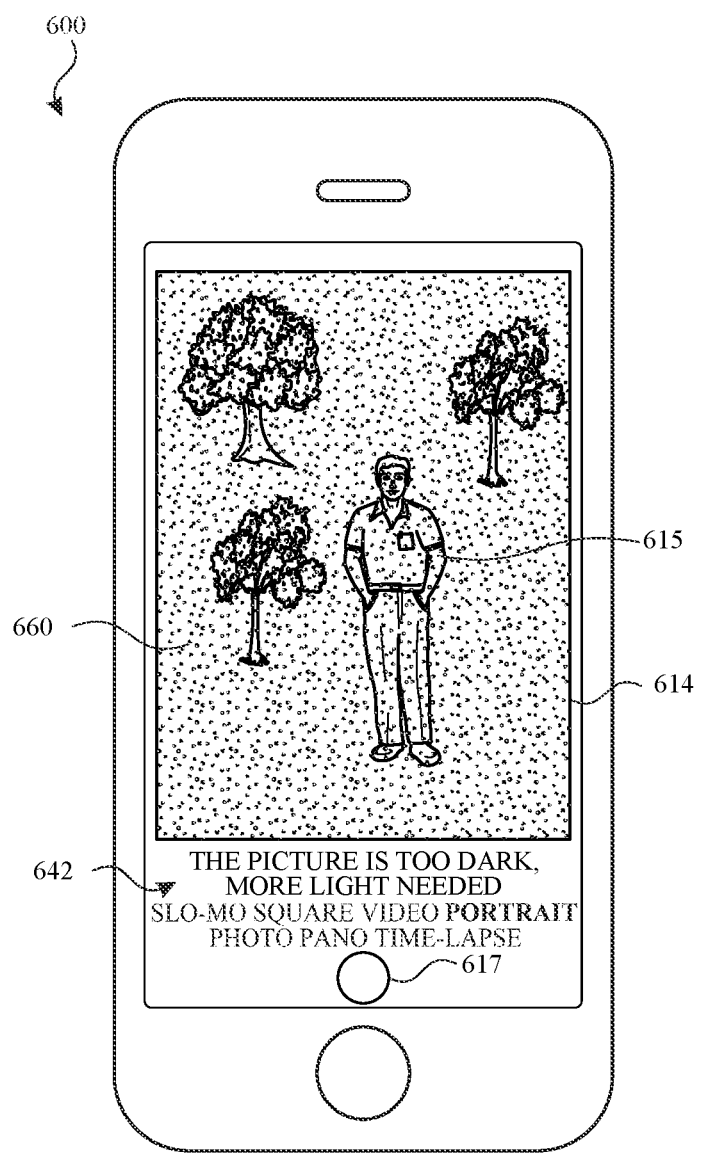

As illustrated in FIG. 6H, in some examples, a condition of the set of one or more conditions is met when the electronic device detects that an amount of detected light (e.g., at the first camera, at the second camera) that exceeds a minimum light threshold. In this example, the detected light (corresponding to the darkness 660) does not exceed the minimum light threshold and is too low for the portrait mode. In some examples, if the amount of light is insufficient for the portrait mode (e.g., does not exceed the minimum light threshold), the electronic device 600 displays, on the display, an indication to the user that not enough light is present 642. In some embodiments, the minimum light threshold is 100 lux, 200 lux, 300 lux, 400 lux, 500 lux, 600 lux, 700 lux, or some other threshold value determined based on the capabilities of the camera(s) to function in low light environments. Thus, in some examples, the simulated optical effect is applied based on the amount of light detected. In some examples, the electronic device 600 instructs the user to improve light conditions by not applying the simulated optical effect when light conditions are not optimal.

As illustrated in FIGS. 6E, 6G, and 6H, in accordance with a determination that the set of one or more conditions are not met, the electronic device 600 displays, on the display, a graphical indication 642 of a condition that is not met. In some examples, the electronic device 600 does not detect a subject (e.g., focus is 10 m or more) and instructs the user (e.g., using the graphical indication) to place a subject within an acceptable distance (e.g., within 8 feet and 2.5 m), as illustrated in FIG. 6E. In some examples, the electronic device 600 detects a subject, but the subject is too far away (e.g., focus is between 10 m and 2.5 m), and the electronic device 600 instructs the user (e.g., using the graphical indication) to move closer to camera (e.g., to within 8 feet), as illustrated in FIG. 6G. In some examples, the electronic device 600 determines an amount of light is too low (e.g., 400 lux or less), and instructs the user (e.g., using the graphical indication) to provide more light, as illustrated in FIG. 6H. In some examples, an affordance is displayed in the viewfinder to allow a user to disable or enable such instructions. In some examples, in accordance with the determination that the set of one or more conditions is met, the electronic device forgoes displaying, on the display, the graphical indication 642 instructing the user.

Thus, in some examples, the electronic device 600 does not instruct the user when user action is not helpful for applying the simulated optical effect.

Table A below illustrates exemplary results when the electronic device 600 is operating in the portrait mode. Entries in the first column specify whether the optical effect (e.g., depth effect, bokeh) is applied to the preview displayed in the digital viewfinder (e.g., 614) while the electronic device is operating in the portrait mode. Entries in the second column represent the status of the graphical indication (e.g., 675 of FIG. 6J) which, in some embodiments, visually changes (e.g., color, translucency, hue, contrast) based on whether the optical effect is applied. In some embodiments, the graphical indication (e.g., 675 of FIG. 6J) is displayed regardless of whether the optical effect is applied or not applied. In some embodiments, the graphical indication (e.g., 675 of FIG. 6J) is displayed when the optical effect is applied and is not displayed when the optical effect is not applied. In some examples, the graphical indication (e.g., 675 of FIG. 6J) is highlight when the optical effect is applied and is not highlighted when the optical effect is not applied.

Furthermore, entries in the third column of Table A represent conditions that may be met while the electronic device is operating in the portrait mode. Entries in the fourth column represent the graphical indication (e.g., 642, instructing the user) displayed, on the display, in the digital viewfinder as a result of the detected condition in the third column. In some embodiments, entries in the fourth column are suggestive of the steps that the user must perform in order for the device 600 to meet one or more conditions (e.g., the optical effect conditions) such that the electronic device applies the optical effect. In some examples, the electronic device determines an amount of light is too low (e.g., less than 400 lux), and instructs the user (e.g., using the graphical indication 642) to provide more light, and thus causes the electronic device to meet the optical effects conditions. Entries in the fifth column specify whether (and types of) one or more visual markers (e.g., 636 of FIG. 6J) that will be displayed in the digital viewfinder if the condition in the corresponding row in the third column is satisfied. In some examples, for the optical effect conditions to be met, one or more (e.g., all) of the following conditions must be met (1) the focus must not be under a minimum (e.g., 50 cm) (2) the focus must not be farther than a maximum (e.g., 2.5 m), (3) and light detected must not be under a value (e.g., 400 lux).

TABLE A

| | | PORTRAIT MODE | | |
|---|---|---|---|---|
| Optical effect applied | Graphical indication of optical effect (e.g., "Depth Effect", "Portrait Mode") | Detected condition | Graphical indication warning | Visual marker for subject |
| No | Not highlighted | Focus at 2.5 m or farther (no subject detected) | Place subject within 2.5 m | None |
| No | Not highlighted | Focus at 2.5 m or farther (subject detected) | Move closer | Yes (depends on type of subject) |
| No | Not highlighted | Focus under 50 cm | Move farther away | None |

TABLE A-continued

PORTRAIT MODE

| Optical effect applied | Graphical indication of optical effect (e.g., "Depth Effect", "Portrait Mode") | Detected condition | Graphical indication warning | Visual marker for subject |
|---|---|---|---|---|
| No | Not highlighted | Light below 400lux | More light required | None |
| Yes | Highlighted | Optical Effect Conditions Met + Single person detected | None | Single visual marker encompassing subject's face |
| Yes | Highlighted | Optical Effect Conditions Met + Multiple people detected | None | Multiple visual markers each encompassing a respective subject's face |
| Yes | Highlighted | Optical Effect Conditions Met + No people detected (no user-selected focal point) | None | None |
| Yes | Highlighted | Optical Effect Conditions Met + No people detected (user-selected focal point) | None | Single subject indicator at user-selected focal point |

Figure 6I:
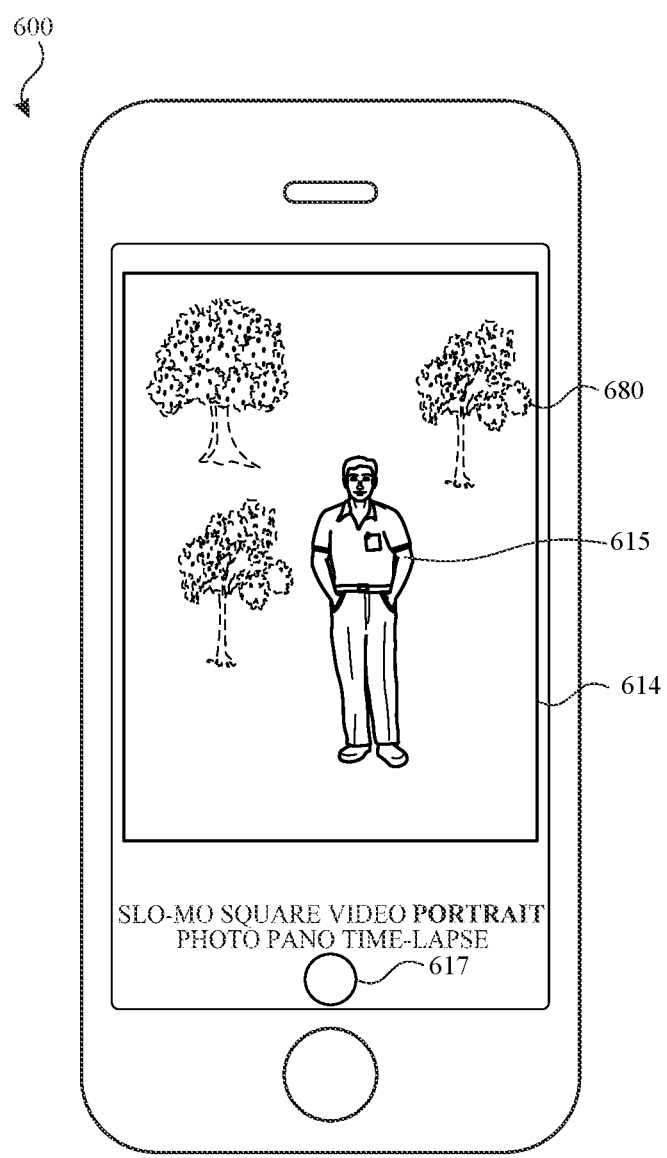

As illustrated in FIG. 6I, in accordance with a determination that the set of one or more conditions is met, the electronic device 600 applies a simulated optical effect 680 (e.g., a bokeh simulated optical effect) to the preview displayed in the digital viewfinder, wherein the simulated optical effect is based on data received from the first camera and the second camera. In this example, a simulated optical effect 680 is applied to the objects in the background of the scene (e.g., the trees) and is not applied to the object in the foreground of the scene (e.g., the subject).

Figure 6J:
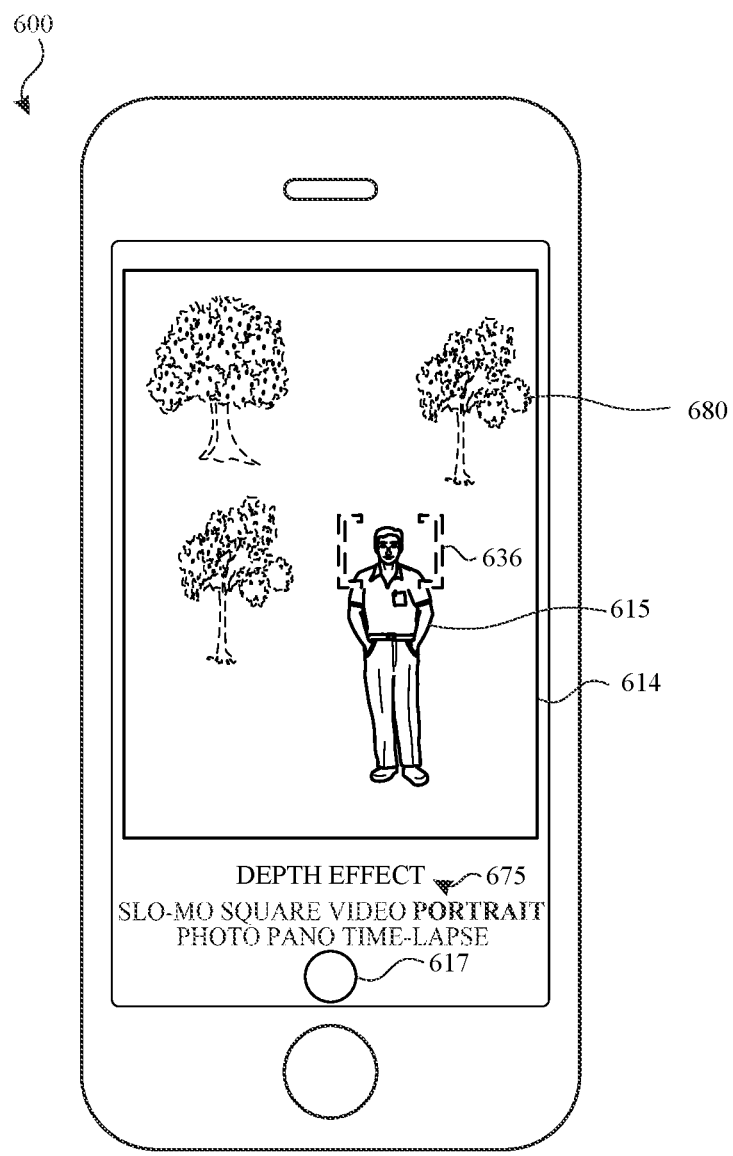

As illustrated in FIG. 6J, in some examples, in accordance with a determination that the set of one or more conditions is met, the electronic device 600 displays, on the display, one or more visual markers 636 around the subject (or a portion of the subject). In some examples, a visual characteristic of the one or more visual markers 636 is updated in response to the determination that the set of one or more conditions is met. For example, the one or more visual markers 636 illustrated in FIG. 6G indicate that the electronic device 600 has detected a subject in the digital viewfinder, and in response to the determination that the set of one or more conditions is met, the electronic device updates a characteristics (e.g., size, location, color) of the one or more visual markers to provide the user with an indication that the set of one or more conditions is met and, optionally, that the simulated optical effect was (or will be) applied. In some embodiments, the one or more visual markers 636 are not displayed even when the set of one or more conditions is met and the simulated optical effect is applied.

As illustrated in FIGS. 6B-6H, in some examples, in accordance with a determination that the set of one or more conditions is not met, the electronic device 600 displays, on the display, the preview in the digital viewfinder without applying the simulated optical effect. As illustrated in FIGS. 6I and 6J, in some examples, the simulated optical effect is a simulated bokeh 680. In some embodiments, a non-exhaustive list of the possible simulated optical effects includes a bokeh simulated optical effect, a simulated color filter, and a simulated gamma adjustment. In some embodiments, the electronic device applies the simulated optical effect such that a first part (e.g., 680) of the preview in the digital viewfinder has a simulated bokeh effect and a second part (e.g., 615) (different from the first part) of the digital viewfinder does not have a simulated bokeh effect. Thus, in some examples, the digital viewfinder mimics an optical bokeh effect commonly seen in viewfinders of (and images captured with) SLR cameras.

As illustrated in FIGS. 6I and 6J, in some examples, in accordance with a determination that the set of one or more conditions is met, the electronic device 600 applies a simulated optical effect 680 (e.g., a bokeh simulated optical effect) to the preview displayed in the digital viewfinder 614, wherein the simulated optical effect is based on data received from the first camera 602 and the second camera 604. In some examples, as illustrated in FIG. 6I, the electronic device 600 applies the simulated optical effect to the preview displayed in the digital viewfinder 614 without displaying an indication that the simulated optical effect has been applied and without displaying any visual marker. In some examples, as illustrated in FIG. 6J, the electronic device 600 applies the simulated optical effect to the preview displayed in the digital viewfinder 614 and displays an indication 675 that the simulated optical effect has been applied and one or more visual markers 636.

In some embodiments, prior to the electronic device 600 applying the simulated optical effect to the preview in the digital viewfinder 614, the preview in the digital viewfinder 614 is not based on the second camera. In some examples, the displayed viewfinder 614 is based on only the first camera 602 before the set of one or more conditions is met. In some examples, the displayed viewfinder 614 is based on both the first camera 602 and the second camera 604 after the set of one or more conditions is met. Thus, in some examples, the electronic device conserves power by only using one camera when both cameras are not needed, but uses two (or more) cameras when the additional cameras provide an advantage (e.g., a visual advantage).

Figure 6K:
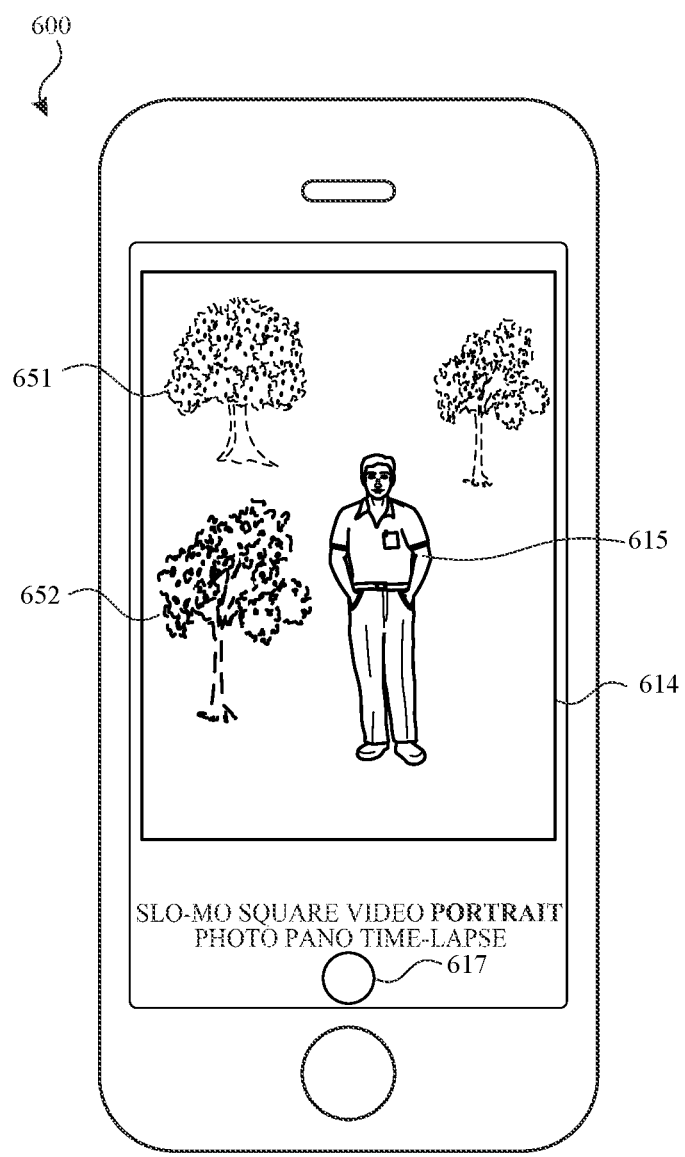

In some embodiments, as illustrated in FIG. 6K, the electronic device 600 applies the simulated optical effect differently to different portions 651 and 652 of the preview in the digital viewfinder. In some embodiments, the simulated optical effect (e.g., a bokeh effect) is applied differently to different portions of the preview based on (or as a function of) the distance from the electronic device 600 to objects in the different portions of the preview. For example, a first portion of the preview (e.g., 652) will appear to have a first degree of blurring and a second portion of the preview (e.g., 651, that represents an object that is further from the electronic device 600 than represented by the first portion) will appear to have a second degree of blurring that is more intense than the first degree of blurring. Thus, a preview of a scene with varying depths will have varying blur intensities (e.g., degrees of blurring) throughout the preview. In some embodiments, as illustrated in FIG. 6K, device 600 does not display a graphical indication (e.g., 675, text including "Depth Effect") that a simulated optical effect (e.g., a simulated bokeh effect) is being applied.

In some embodiments, as illustrated in FIG. 6K, a first portion of the preview 651 depicts a first object, wherein the first object is at a first distance from the electronic device 600, a second portion of the preview 652 depicts a second object, and wherein the second object is a second distance (different from the first distance) from the electronic device 600. In some examples, applying the simulated optical effect to the preview 614 includes applying the simulated optical effect to the first portion (e.g., 652) with a first magnitude and applying the simulated optical effect to the second portion (e.g., 651) with a second magnitude that is different from (e.g., greater than) the first magnitude. Thus, in some examples, varying intensities of the simulated optical effect are applied to different portions of the preview in the digital viewfinder, which indicates the distance to the objects to a viewer of the preview.

In some embodiments, as illustrated in FIG. 6K, applying the simulated optical effect causes a first portion (e.g., 651, 652) of the digital viewfinder 614 to exhibit an effect, such as a bokeh effect, and a second portion (e.g., 615, different from the first portion) of the digital viewfinder to not exhibit the effect. In some examples, the simulated optical effect is repeatedly updated based on data from the first camera and the second camera and repeatedly applied to the digital viewfinder. In some embodiments the simulated optical effect is based on which portion of the field of view of the camera has been selected as the point of focus, so when the distance of an object at the point of focus changes or the user selects a new point of focus, the simulated optical effect changes as well. For example, the simulated optical effect initially causes a first portion of a first preview image displayed in the digital viewfinder 614 to exhibit an effect (and not a second portion) and an updated simulated optical effect causes a third portion (different from the first portion) of a second preview image displayed in the digital viewfinder 614 to exhibit the effect (and not a fourth portion of the second preview image). In some examples, the simulated optical effect is applied to the first portion of preview images displayed in the viewfinder and is not applied to a second portion (different from the first portion) of the preview images displayed in the viewfinder. In some examples, the simulated optical effect is applied to a first portion of a first preview image displayed in the viewfinder (and not a second portion) and to a third portion (different from the first portion) of a second preview image displayed in the viewfinder (and not a fourth portion). As a result, the viewfinder exhibits a simulated optical effect. This simulated optical effect is also retained for images captured while the simulated optical effect is applied to the viewfinder.

In some embodiments, the electronic device 600 generates a depth map based on data received from the first camera 602 and the second camera 604, and the simulated optical effect is based on the depth map. In some examples, the electronic device 600 uses images captured by the first camera 602 and the second camera 604 to generate the depth map by using a parallax effect where the observed difference in position of an object from two different points of view (e.g., the two cameras) is greater for objects that are closer to the points of view and less for objects that are further from the points of view. In some examples, the depth map includes information indicating distances from the electronic device 600 to various elements (e.g., pixels, objects) depicted in the digital viewfinder (e.g., based on the overlapping fields of view of the first camera and the second camera).

In some embodiments, a condition of the set of one or more conditions is met when a focus distance of the first camera 602 (or the second camera 604) exceeds a minimum distance threshold (e.g., 8 feet). Thus, in some examples, the simulated optical effect is applied based on the first camera focusing on a subject that is not too close to the electronic device 600.

In some embodiments, a condition of the set of one or more conditions is met when a focus distance of the first camera 602 (or the second camera 604) does not exceed a maximum distance threshold (e.g., 2.5 meters). Thus, in some examples, the simulated optical effect is applied based on the first camera 602 focusing on a subject that is not too far from the electronic device 600.

In some embodiments, the set of one or more conditions is based on lighting conditions. In some embodiments, a sixth condition of the set of one or more conditions is met when an amount of detected light (e.g., at the first camera 602, at the second camera 604) does not exceed a maximum light threshold (e.g., 1000 lux, 2000 lux, 3000 lux, or some other threshold value determined based on the capabilities of the camera(s) to function in high light environments). Thus, in some examples, the electronic device 600 encourages the user to improve light conditions by not applying the simulated optical effect when light conditions are not optimal.

In some embodiments, the determination by the electronic device 600 of whether the set of one of more conditions is met is based on data from the first camera. In some examples, data from the second camera is not used to determine whether the set of one or more conditions have been met. In some examples, data from both the first camera and the second camera are used to determine whether the set of one or more conditions have been met.

In some embodiments, the determination by the electronic device 600 of whether the set of one of more conditions is met is based on data from the second camera. In some examples, data from the first camera is not used to determine whether the set of one or more conditions have been met. In some examples, data from both the first camera and the second camera are used to determine whether the set of one or more conditions have been met.

Figure 6L:
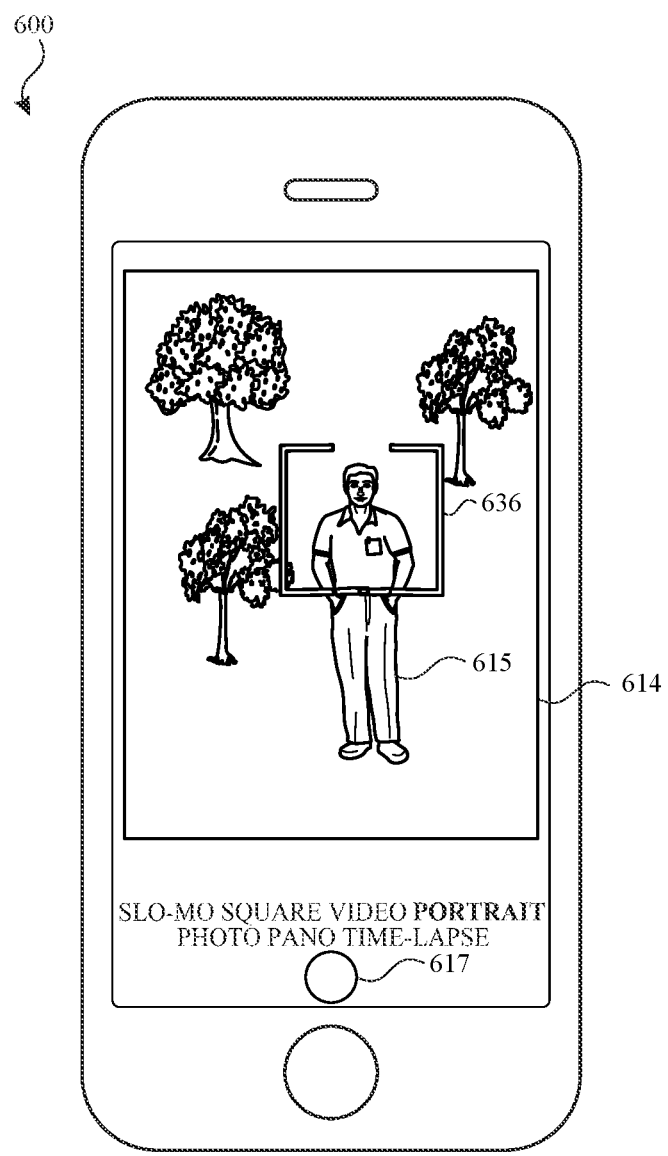
Figure 6M:
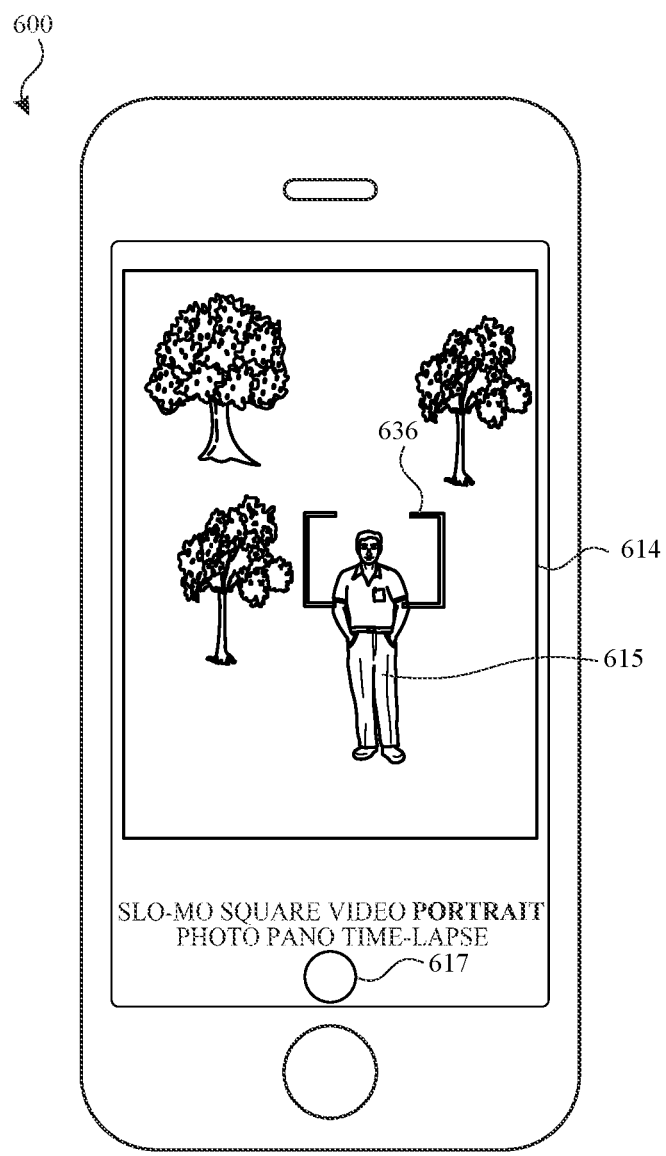

In some embodiments, as illustrated in FIGS. 6L and 6M, in response to detecting the subject 615 (e.g., within or outside the appropriate distance), the electronic device 600 displays, on the digital viewfinder 614 on the display, one or more visual markers 636 (e.g., a visual boundary) that identify the subject. In some examples, the visual characteristic (e.g., color of visual markers, size of visual markers, location of visual markers, and distance between visual markers) of the one or more visual markers is based on whether the set of one or more conditions is met. In some examples, the one or more visual markers is a bounding box. In some examples, in accordance with (or in response to) the determination that the set of one or more conditions is met, the electronic device 600 changes the visual characteristic of the one or more visual markers to indicate to the user that the set of one or more conditions is met. In some examples, changing the visual indication includes animating the one or more visual markers (e.g., a bounding box) such that the one or more visual markers bounce. Thus, in some examples, the electronic device 600 notifies the user as to whether the set of one or more conditions is met based on the visual characteristic of the one or more visual markers. In some examples, the electronic device 600 notifies the user as to whether the set of one or more conditions is met via a visual characteristic of the visual marker.

Figure 6N:
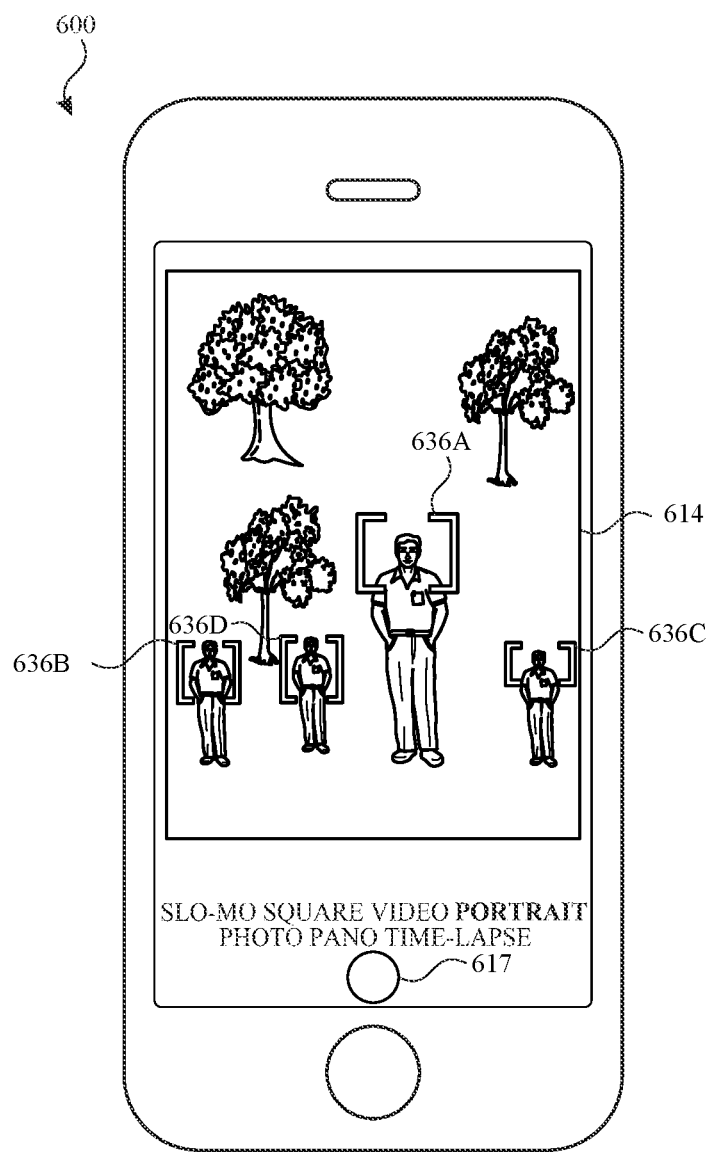
Figure 6O:
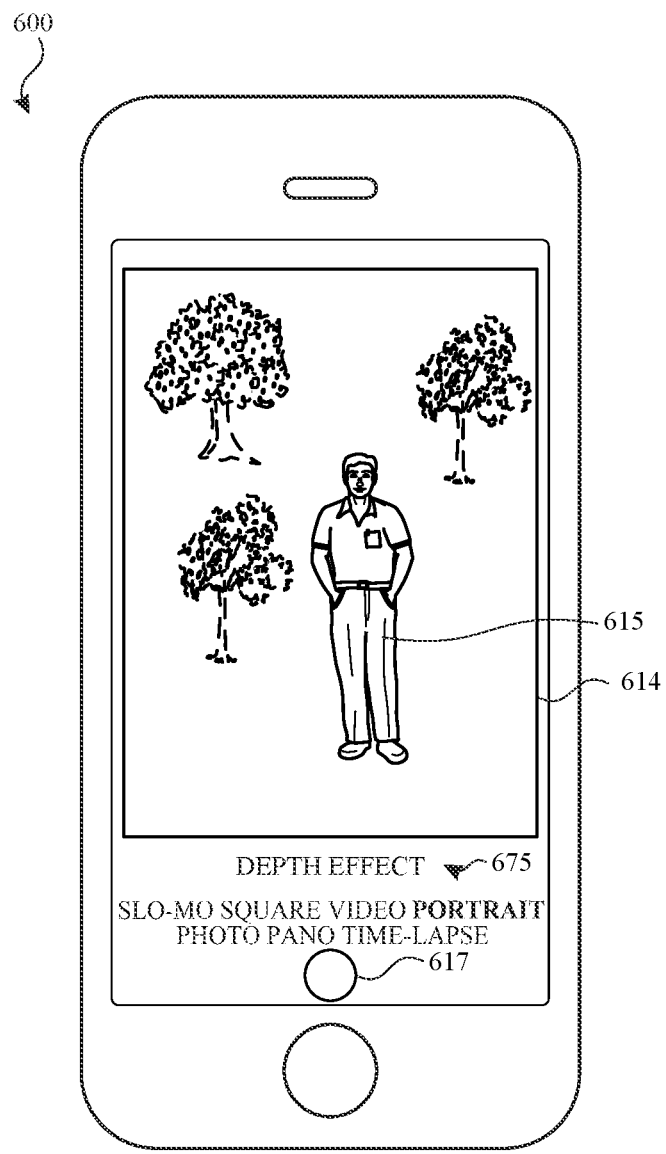

In some embodiments, as illustrated in FIG. 6N, in accordance with detecting (e.g., using the first camera 602, the second camera 604) a plurality of subjects, the electronic device 600 displays a plurality of one or more visual markers 636A-636D (e.g., visual boundaries) corresponding to the plurality of subjects. Thus, in some examples, the electronic device 600 notifies the user which subjects are being tracked (and/or considered when determining whether the set of one or more conditions have been met). In some embodiments, as shown in FIG. 6O, device 600 applies a simulated optical effect (e.g., a simulated bokeh effect) and a graphical indication (e.g., 675, text including "Depth Effect"), without displaying a visual marker (e.g., visual marker 636).

Figure 6P:
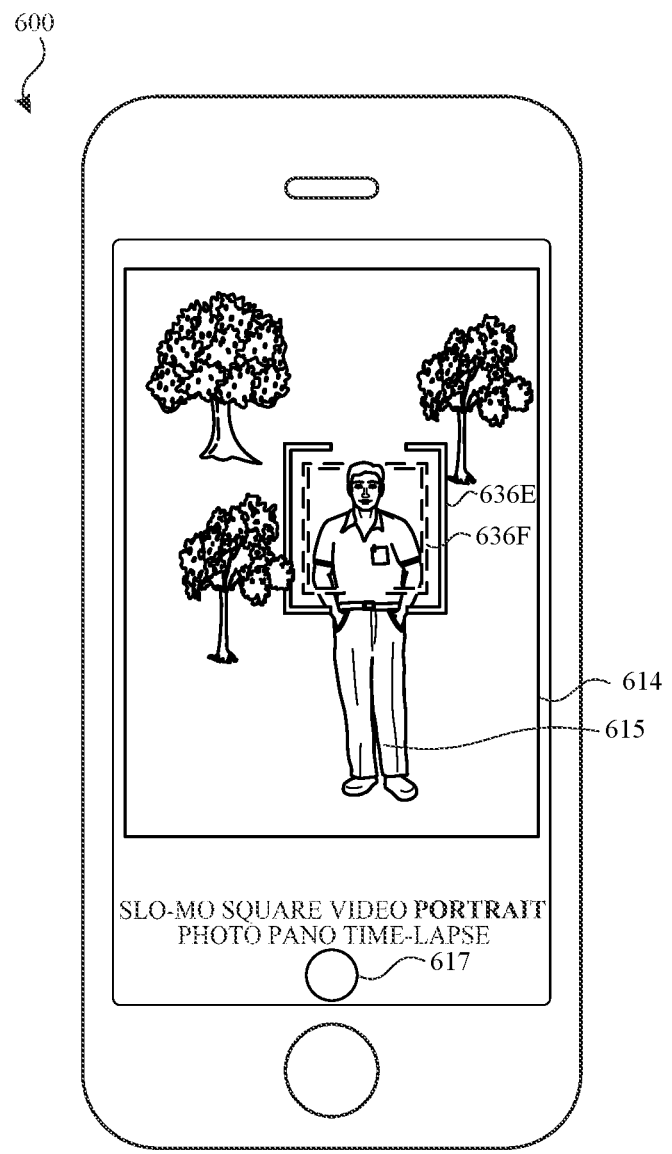

In some embodiments, as illustrated in FIG. 6P, in accordance with the determination that the set of one or more conditions is met, the electronic device 600 changes the a visual characteristic (e.g., color of visual markers, size of visual markers, location of visual markers, distance between visual markers) of the one or more visual markers (e.g., visual boundary) before applying the simulated optical effect. For example, in FIG. 6P, the electronic device displays the one or more virtual markers (e.g., 636E) with a particular visual characteristic (e.g., a first color, a first location, a first size) and transitions the one or more visual markers (e.g., 636F) to a different visual characteristic (e.g., a second color, a second location, a second size) before applying the simulated optical effect. In some embodiments, as illustrated in FIG. 6Q, in accordance with a determination that a set of one or more conditions is met (e.g., focus distance is 8 feet or more, focus distance is within 8 feet and 2.5 m, light is 400 lux or more; in some embodiments, the condition is based on data from one camera sensor (e.g., focal distance data); in some embodiments, the condition is based on data from both camera sensors), the electronic device applies the simulated optical effect (e.g., a bokeh simulated optical effect) to the preview displayed in the digital viewfinder 614. As illustrated in FIG. 6Q, as a result, the trees are blurred and the person is not blurred.

In some embodiments, as illustrated in the transition between FIGS. 6G to 6J, in accordance with the determination that the set of one or more conditions is met (or not met), the electronic device changes a visual characteristic of the one or more visual markers (e.g., from 636 in FIG. 6G with, for example, a first color, a first location, a first size to 636 in FIG. 6J with second color, different from the first color). In some examples, in accordance with the determination that the set of one or more conditions is met, the electronic device changes the color or visual texture of the one or more visual markers 636. Thus, in some examples, the change in the visual characteristic indicates to the user that the set of one or more conditions is met. In some examples, in accordance with a subsequent determination that the set of one or more conditions is no longer met (after the set of one or more conditions was previously met), the electronic device changes back the first visual characteristic of the one or more visual markers (e.g., 636 changing the second color back to the first color). Thus, in some examples, the electronic device 600 notifies the user whether the set of one or more conditions is met.

In some embodiments, in accordance with detecting the subject (e.g., within or outside the appropriate distance), the electronic device 600 displays, in the digital viewfinder on the display, one or more visual markers (e.g., a visual boundary) identifying the subject. In some examples, a second characteristic (e.g., different from the first characteristic) of the one or more visual markers is based on a characteristic (e.g., physical characteristic, size of the subject, distance to the subject, location of the subject) of the subject. Thus, in some examples, the electronic device 600 indicates to the user which subject is being considered for satisfying the set of one or more conditions. As illustrated in FIG. 6L, the one or more visual markers 636 surrounds a portion of the subject (e.g., from the hips to the head, from the shoulders to the head). When the subject moves further away from the electronic device 600, as illustrated in FIG. 6M, the one or more visual markers 636 are displayed proportionally smaller to compensate for the change in the size of the subject in the digital viewfinder 614.

In some embodiments, as illustrated in FIG. 6J, in accordance with applying the simulated optical effect (e.g., a bokeh simulated optical effect) to the preview displayed in the digital viewfinder 614, the electronic device 600 displays, (e.g., in the digital viewfinder 614, outside the digital viewfinder 614) on the display, a graphical indication (e.g., 675, text including "Depth Effect") that the simulated optical effect is being applied to the preview displayed in the digital viewfinder 614. Thus, a user is quickly able to understand that the simulated optical effect has been applied. In some embodiments, in accordance with not applying the simulated optical effect, the electronic device 600 does not display (e.g., forgoes displaying), on the display, the graphical indication (e.g., text including "Depth Effect") that the simulated optical effect is being applied to the preview displayed in the digital viewfinder. Thus, in some examples, the electronic device 600 notifies the user that the set of one or more conditions have been met and, in some examples, the electronic device 600 notifies the user that the set of one or more conditions have not been met.

In some embodiments, the electronic device 600 detects a user input requesting to capture an image (e.g., using the camera application). In response to detecting the user input requesting to capture the image. In accordance with the determination that the set of one or more conditions is not met, the electronic device 600 captures the image (e.g., based on data from the first camera 602 and not based on data from the second camera 604, based on data from the second camera 604 and not based on data from the first camera 602) without the simulated optical effect. In some examples, the user activates a shutter affordance 617 that is displayed on the display while the set of one or more conditions is not met, and the electronic device 600 captures (e.g., stores in memory) an image using data from the first camera (or the second camera) without applying the simulated optical effect to the data from the first camera. In some embodiments, in response to detecting the user input requesting to capture the image, in accordance with the determination that the set of one or more conditions is met, the electronic device 600 captures the image (e.g., based on data from the first camera 602 and the second camera 604) with the simulated optical effect (e.g., with the simulated optical effect applied to the image). In some examples, the user activates the shutter affordance 617 that is displayed on the display while the set of one or more conditions is met, and the electronic device 600 captures (e.g., stores in memory) an image using data from the first camera (and/or the second camera), wherein the simulated optical effect is applied to the data.

In some embodiments, while the electronic device 600 displays the preview in the digital viewfinder 614 without applying the simulated optical effect, the electronic device 600 detects a change in the scene in front of one or more of the cameras (e.g., in the field of view of the first camera, due to movement of the first camera, movement of objects/people in the scene, and/or a change in lighting in the scene). In response to the electronic device 600 detecting the change in the scene, in accordance with a determination that the change in the scene has caused the set of one or more conditions to be met (e.g., focus distance is 8 feet or more, focus distance is within 8 feet and 2.5 m, light is 400 lux or more), the electronic device 600 applies the simulated optical effect (e.g., a bokeh simulated optical effect, simulated color filter, simulated gamma adjustment) to the preview displayed in the digital viewfinder 614. In accordance with a determination that the change in the scene has not caused the set of one or more conditions (e.g., focus distance is 8 feet or more, focus distance is within 8 feet and 2.5 m, light is 400 lux or more) to be met, the electronic device 600 maintains display of the preview in the digital viewfinder without applying the simulated optical effect (e.g., a bokeh simulated optical effect, simulated color filter, simulated gamma adjustment).

FIGS. 7A-7B is a flow diagram illustrating a method for managing simulated optical effects using an electronic device in accordance with some embodiments. Method 700 is performed at an electronic device (e.g., 100, 300, 500, 600) with a first camera, a second camera, and a display. Some operations in method 700 are, optionally, combined, the order of some operations is, optionally, changed, and some operations are, optionally, omitted.

At block 702, the electronic device displays, on the display (e.g., 612), a digital viewfinder (e.g., 614) including a preview based on data received from the first camera (e.g., 602). In some examples, data is displayed in the viewfinder (e.g., 614) without applying a simulated optical effect, such as a bokeh simulated optical effect.

At blocks 704-706, while displaying the digital viewfinder (e.g., 614): in accordance with a determination that the set of one or more conditions is met (e.g., focus distance is 8 feet or more, focus distance is within 8 feet and 2.5 m, light is 400 lux or more), the electronic device (e.g., 600) applies, at block 726, a simulated optical effect (e.g., a bokeh simulated optical effect) to the preview displayed in the digital viewfinder (e.g., 614 at FIG. 6I), wherein the simulated optical effect is based on data received from the first camera (e.g., 602) and the second camera (e.g., 604). Thus, the electronic device, by applying a simulated optical effect to the preview, informs the user that the set of one or more conditions have been met and informs the user as to what captured images will look like, thereby prompting the user to capture an image (with the applied simulated optical effect), as appropriate. In some embodiments, the one or more conditions are based on data from one camera (e.g., focal distance data). In some embodiments, the one or more conditions are based on data from both sensors. In some examples, a first condition of the set of one or more conditions is met when a subject (e.g., 615) is detected within a predetermined distance from the device (e.g., distance from subject (e.g., 615) to the first or second cameras 602, 604).

At block 732 in FIG. 7B, while displaying the digital viewfinder, in accordance with a determination, at block 720, that the set of one or more conditions (e.g., focus distance is 8 feet or more, focus distance is within 8 feet and 2.5 m, light is 400 lux or more) is not met, the electronic device displays, at block 722, the preview in the digital viewfinder (e.g., 614 at FIG. 6B) without applying the simulated optical effect (e.g., a bokeh simulated optical effect, simulated color filter, simulated gamma adjustment). Thus, the electronic device, by displaying the preview without applying the simulated optical effect, informs the user that the set of one or more conditions has not been met and informs the user as to what captured images will look like (without the simulated optical effect), thereby prompting the user to take actions such that the one or more conditions will be met (so that the simulated optical effect will be applied). In some embodiments, the set of one or more conditions is based on data from one sensor (e.g., focal distance data). In some embodiments, the set of one or more conditions is based on data from both sensors.

In some embodiments, the simulated optical effect causes a first portion (e.g., 651, 652 of FIG. 6K) of the digital viewfinder to exhibit an effect, such as a bokeh effect, and a second portion (e.g., 615 of FIG. 6K, different from the first portion) of the digital viewfinder (e.g., 614) to not exhibit the effect. In some examples, the simulated optical effect is repeatedly updated based on data from the first camera (e.g., 602) and the second camera (e.g., 604) and repeatedly applied to the digital viewfinder (e.g., 614). Thus, the electronic device, by repeatedly updating and applying the simulated optical effect to the digital viewfinder, informs the user as to what a captured image will look like at any given time (e.g., live or near-live), thereby prompting the user to capture an image (with the applied simulated optical effect), as appropriate. For example, the simulated optical effect initially causes a first portion (e.g., 651, 652) of a first preview image displayed in the viewfinder to exhibit an effect (and not a second portion) and an updated simulated optical effect causes the third portion (different from the first portion) of a second preview image displayed in the viewfinder to exhibit the effect (and not a fourth portion of the second preview image).

In some embodiments, the simulated optical effect (e.g., as shown in 680) is applied to the first portion (e.g., 651) of preview images displayed in the viewfinder and is not applied to a second portion (e.g., 652) (different from the first portion) of the preview images displayed in the viewfinder. In some examples, the simulated optical effect is applied to a first portion of a first preview image displayed in the viewfinder (and not a second portion) and to a third portion (different from the first portion) of a second preview image displayed in the viewfinder (and not a fourth portion). As a result, the viewfinder exhibits a simulated bokeh effect. This simulated bokeh effect is also retained for images captured while the simulated optical effect is applied to the viewfinder.

In some embodiments, the first camera (e.g., 602) and the second camera (e.g., 604) have fixed, but different, focal lengths. In some examples, the focal length, field of view, and optical magnification properties of the optical system is fixed for each of the cameras, but the fixed focal length is different between the first camera (e.g., 602) and the second camera (e.g., 604).

In accordance with some embodiments, prior to applying the simulated optical effect to the preview in the digital viewfinder (e.g., 614), the preview in the digital viewfinder (e.g., 614 at FIG. 6B) is not based on the second camera (e.g., 604) (e.g., not based on both cameras). In some examples, the displayed viewfinder (e.g., 614 at FIG. 6B) is based on only the first camera (e.g., 602) before the set of one or more conditions is met. Thus, in some examples, the electronic device, by not basing the preview on the second camera prior to applying the simulated optical effect, conserves battery power of the electronic device. In some examples, the displayed viewfinder (e.g., 614 at FIGS. 6I-6K) is based on both the first camera (e.g., 602) and the second camera (e.g., 604) after the set of one or more conditions is met.

In accordance with some embodiments, at block 728, the simulated optical effect is a simulated bokeh. In some embodiments, the electronic device (e.g., 600) applies the simulated optical effect such that a first part (e.g., 651, 652, 680) of the preview in the digital viewfinder (e.g., 614) has a simulated bokeh effect and a second part (e.g., 615) (different from the first part) of the digital viewfinder (e.g., 614) does not have a simulated bokeh effect. Thus, in some examples, the digital viewfinder (e.g., 614) mimics an optical bokeh effect commonly seen in viewfinders of (and images captured with) SLR cameras.

In accordance with some embodiments, at block 730, the simulated optical effect is applied differently to different portions of the preview in the digital viewfinder (e.g., 614 of FIG. 6K). In some embodiments, the bokeh effect is applied differently to different portions of the preview based on (or as a function of) the distance from the electronic device (e.g., 600) to objects in the different portions of the preview. For example, a first portion (e.g., 651 of FIG. 6K) of the preview will appear to have (or has) a first degree of blurring and a second portion (e.g., 652 of FIG. 6K) of the preview (that represents an object that is further from the electronic device (e.g., 600) than represented by the first portion) will appear to have (or has) a second degree of blurring that is more intense than the first degree of blurring. Thus, in some examples, a preview of a scene with varying depths will have varying blur intensities (e.g., degrees of blurring) throughout the preview. In some examples, while the electronic viewfinder exhibits portions with varying blur intensities, a picture captured by the electronic device in response to detecting activation of camera shutter affordance 617 will also exhibit corresponding varying blur intensities.

In accordance with some embodiments, a first portion (e.g., 651 of FIG. 6K) of the preview depicts a first object (e.g., object represented by 651), wherein the first object is at a first distance from the electronic device (e.g., 600). Additionally, a second portion (e.g., 652 of FIG. 6K) of the preview depicts a second object (e.g., object represented by 652), wherein the second object is a second distance from the electronic device (e.g., 600). In some embodiments, the electronic device (e.g., 600) applying the simulated optical effect to the preview includes applying the simulated optical effect to the first portion (e.g., 651) with a first magnitude and applying the simulated optical effect to the second portion (e.g., 652) with a second magnitude that is different from (e.g., greater than) the first magnitude. Thus, in some examples, varying intensities of the simulated optical effect are applied to different portions of the preview in the digital viewfinder (e.g., 614), which indicates the distance to the objects to a viewer of the preview.

In accordance with some embodiments, the first camera (e.g., 602) has a first field of view and the second camera (e.g., 604) has a second field of view, wherein the first field of view and the second field of view overlap. In some examples, the first camera (e.g., 602) and the second camera (e.g., 604) are spaced apart so that a parallax between images captured by the camera is used (e.g., but the electronic device) to determine depths for objects (e.g., 611A and 611B of FIG. 6B) represented by different portions of the digital viewfinder (e.g., 614). In some embodiments, the first camera (e.g., 602) and the second camera (e.g., 604) are located on a surface of the electronic device (e.g., 600) and the optical axes of the cameras are arranged such that they are parallel. In some examples, the first camera (e.g., 602) and the second camera (e.g., 604) capture overlapping fields of view, for example, at least 50% overlapping, at least 90% overlapping, or more. In some examples, the first camera (e.g., 602) has a wider field of view than the second camera (e.g., 604). In some examples, the second camera (e.g., 604) has a wider field of view than the first camera (e.g., 602). When a wide-angle camera (e.g., a camera with a wide-angle lens) has a wider field of view than a telephoto camera (e.g., a camera with a telephoto lens), at a 1× magnification of the wide-angle camera objects appear further away than at a 1× magnification of the telephoto camera. If the wide-angle camera and the telephoto camera have overlapping fields of view such that the field of view of the telephoto camera is approximately centered on the field of view of the wide angle camera, an image captured with the telephoto camera at a 1× magnification level will, in some circumstances (e.g., where the subject of the image is at least 1 meter away), appear to be an optical zoom of a corresponding image captured with the wide-angle camera at a 1× magnification level.

In accordance with some embodiments, the electronic device (e.g., 600) generates a depth map based on data received from the first camera (e.g., 602) and the second camera (e.g., 604) and the simulated optical effect is based on the depth map. In some examples, the electronic device (e.g., 600) uses images captured by the first camera (e.g., 602) and the second camera (e.g., 604) to generate the depth map by using a parallax effect where the observed difference in position of an object from two different points of view (e.g., the two cameras) is greater for objects that are closer to the points of view and less for objects that are further from the points of view. In some examples, the depth map includes information indicating distances from the electronic device (e.g., 600) to various elements (e.g., pixels, objects, portions) depicted in the digital viewfinder (e.g., 614) (e.g., based on the overlapping fields of view of the first camera (e.g., 602) and the second camera (e.g., 604)).

In accordance with some embodiments, the electronic device (e.g., 600) automatically (e.g., without user intervention, without user input) determines a distance to the subject (e.g., 615). For example, the electronic device (e.g., 600) repeatedly (or continuously) tracks the subject (e.g., 615) and determines the distance to the subject (e.g., 615). In some examples, the determination of the distance to the subject is based on a depth map generated based on a parallax effect. In some examples, the determination of the distance to the subject is based on a focus distance of either (or both) the first camera (e.g., 602) or the second camera (e.g., 604). In some examples, applying the simulated optical effect includes applying a blur or bokeh effect to background objects depicted in the electronic viewfinder and not applying the blur or bokeh effect to the subject depicted in the electronic viewfinder.

In accordance with some embodiments, at block 708, a second condition of the set of one or more conditions is met when a focus distance of the first camera (e.g., 602) (or the second camera (e.g., 604)) exceeds a minimum distance threshold (e.g., 8 feet). Thus, in some examples, the electronic device applies the simulated optical effect based on the first camera (e.g., 602) focusing on a subject (e.g., 615) that is not too close to the electronic device (e.g., 600).

In accordance with some embodiments, at block 710, a third condition of the set of one or more conditions is met when a focus distance of the first camera (or the second camera (e.g., 604)) does not exceed a maximum distance threshold (e.g., 2.5 meters). Thus, in some examples, the simulated optical effect is applied based on the first camera (e.g., 602) focusing on a subject (e.g., 615) that is not too far from the electronic device (e.g., 600).

In accordance with some embodiments, at block 712, a fourth condition of the set of one or more conditions is met when the subject (e.g., 615) is detected beyond a predetermined minimum distance from the device. Thus, in some examples, the simulated optical effect is applied based on the subject (e.g., 615) that not being too close to the electronic device (e.g., 600).

In accordance with some embodiments, at block 714, a fifth condition of the set of one or more conditions is met when an amount of detected light (e.g., corresponding to the darkness 660) (e.g., at the first camera 602, at the second camera 604) exceeds a minimum light threshold (e.g., 100 lux, 200 lux, 300 lux, 400 lux, 500 lux, 600 lux, 700 lux, or some other reasonable threshold value determined based on the capabilities of the camera(s) to function in low light environments). Thus, in some examples, the simulated optical effect is applied based on the amount of light detected. In some examples, the electronic device (e.g., 600) encourages the user to improve light conditions by not applying the simulated optical effect when light conditions are not optimal.

In accordance with some embodiments, at block 716, a sixth condition of the set of one or more conditions is met when an amount of detected light (e.g., at the first camera 602, at the second camera 604) does not exceed a maximum light threshold (e.g., 1000 lux, 2000 lux, 3000 lux, or some other reasonable threshold value determined based on the capabilities of the camera(s) to function in high light environments). In some examples, the electronic device (e.g., 600) encourages the user to improve light conditions by not applying the simulated optical effect when light conditions are not optimal.

In accordance with some embodiments, the determination of whether the set of one of more conditions is met is based on data from the first camera (e.g., 602). In some examples, data from the second camera (e.g., 604) is not used to determine whether the set of one or more conditions have been met, which conserves battery power. In some examples, data from both the first camera (e.g., 602) and the second camera (e.g., 604) are used to determine whether the set of one or more conditions have been met, which provides more precise metrics.

In accordance with some embodiments, the determination of whether the set of one of more conditions is met is based on data from the second camera (e.g., 604). In some examples, data from the first camera (e.g., 602) is not used to determine whether the set of one or more conditions have been met. In some examples, data from both the first camera (e.g., 602) and the second camera (e.g., 604) are used to determine whether the set of one or more conditions have been met.

In accordance with some embodiments, at block 724, in accordance with the determination that the set of one or more conditions are not met: displaying, on the display (e.g., 612), a graphical indication (e.g., 642) of a condition that is not met. In some examples, the electronic device (e.g., 600) does not detect a subject (e.g., 615) (e.g., focus is 10 m or more) and instructs the user (e.g., using the graphical indication (e.g., 642)) to place a subject (e.g., 615) within an acceptable distance (e.g., within 8 feet and 2.5 m).

In accordance with some embodiments, the electronic device (e.g., 600) detects a subject (e.g., 615), but the subject (e.g., 615) is too far away (e.g., focus is between 10 m and 2.5 m), and the electronic device (e.g., 600) instructs the user (e.g., using the graphical indication 642 of FIG. 6G) to move closer to camera (e.g., to within 8 feet). In some examples, the electronic device (e.g., 600) determines an amount of light is too low (e.g., 400 lux or less), and instructs the user (e.g., using the graphical indication 642 of FIG. 6H) to provide more light. In some examples, an affordance is displayed in the viewfinder to allow a user to disable or enable such instructions (e.g., based on detecting activation of the affordance). In some examples, in accordance with the determination that the set of one or more conditions are met, the electronic device (e.g., 600) forgoes displaying, on the display (e.g., 612), the graphical indication (e.g., 641) instructing the user. Thus, in some examples, the electronic device (e.g., 600) does not instruct the user when user action is not helpful for applying the simulated optical effect (e.g., 680). Thus, the electronic device, by providing the user with a visual indication (e.g., using graphical indication 642) that a condition has automatically been determined to not have been met, prompts the user to take actions such that the condition is met.

In accordance with some embodiments, in response to detecting the subject (e.g., 615) (e.g., within or outside the appropriate distance), the electronic device (e.g., 600) displays, on the digital viewfinder on the display (e.g., 612), one or more visual markers (e.g., 636) (e.g., a visual boundary) that identify the subject (e.g., 615). A first visual characteristic (e.g., color of visual markers, size of visual markers, location of visual markers, distance between visual markers) of the one or more visual markers (e.g., 636) is based on whether the set of one or more conditions is met. In some examples, the one or more visual markers (e.g., 636) is a bounding box. In some examples, in accordance with (or in response to) the determination that the set of one or more conditions is met, the electronic device (e.g., 600) changes the visual characteristic of the one or more visual markers (e.g., 636) to indicate to the user that the set of one or more conditions is met. Thus, the electronic device, by changing the visual characteristic of the one or more visual markers 636, informs the user that the electronic device has automatically detected that the set of one or more conditions has been met and prompts the user to capture an image (with the applied simulated optical effect), as appropriate.

In accordance with some embodiments, changing the visual indication includes animating the one or more visual markers (e.g., 636) (e.g., a bounding box) such that a visual characteristic of the one or more visual markers (e.g., 636, 636E, and 636F) changes (e.g., repeatedly, a plurality of times), such as repeatedly changing location, size, and/or color. Thus, in some examples, the electronic device (e.g., 600) notifies the user whether the set of one or more conditions is met.

In accordance with some embodiments, in accordance with the determination that the set of one or more conditions is met, the electronic device (e.g., 600) changes the first visual characteristic (e.g., color of visual markers, size of visual markers, location of visual markers, distance between visual markers) of the one or more visual markers (e.g., 636) (e.g., visual boundary). Thus, in some examples, the change in the visual characteristic indicates to the user that the set of one or more conditions is met. In some examples, in accordance with a subsequent determination that the set of one or more conditions is no longer met (after the set of one or more conditions was previously met), the electronic device (e.g., 600) changes back the first visual characteristic of the one or more visual markers (e.g., 636). Thus, in some examples, the electronic device (e.g., 600) notifies the user whether the set of one or more conditions is met.

In accordance with some embodiments, in accordance with detecting the subject (e.g., 615) (e.g., within or outside the appropriate distance), the electronic device (e.g., 600) displays, in the digital viewfinder (e.g., 614) on the display (e.g., 612), one or more visual markers (e.g., 636) (e.g., a visual boundary) identifying the subject (e.g., 615). A second characteristic (e.g., different from the first characteristic) of the one or more visual markers (e.g., 636) is based on a characteristic (e.g., physical characteristic, size of the subject 615, distance to the subject 615, location of the subject 615). Thus, in some examples, the electronic device (e.g., 600) indicates to the user which subject (e.g., 615) is being considered for satisfying the set of one or more conditions.

In accordance with some embodiments, in accordance with failing to detect the subject (e.g., 615), the electronic device (e.g., 600) displays, in the digital viewfinder (e.g., 614) on the display (e.g., 612), one or more visual markers (e.g., 636 at FIG. 6F) (e.g., a visual boundary) that are centered in the digital viewfinder (e.g., 614). In some examples, in accordance with detecting no subjects, the electronic device (e.g., 600) displays in the digital viewfinder (e.g., 614) on the display (e.g., 612), one or more visual markers (e.g., 636 at FIG. 6F) (e.g., a visual boundary) that is centered in the digital viewfinder (e.g., 614).

In accordance with some embodiments, in accordance with detecting (e.g., using the first camera 602, the second camera 604) a plurality of subjects, the electronic device (e.g., 600) displays, in the digital viewfinder (e.g., 614) on the display (e.g., 612), a plurality of one or more visual markers (e.g., 636A-636D at FIG. 6N) (e.g., visual boundaries) corresponding to the plurality of subjects. Thus, in some examples, the electronic device (e.g., 600) notifies the user which subjects are being tracked (and/or considered when determining whether the set of one or more conditions have been met).

In accordance with some embodiments, in accordance with applying the simulated optical effect (e.g., a bokeh simulated optical effect) to the preview displayed in the digital viewfinder (e.g., 614), the electronic device (e.g., 600) displays, (e.g., in the digital viewfinder 614) on the display (e.g., 612), a graphical indication (e.g., 675) (e.g., text including "Depth Effect") that the simulated optical effect is being applied to the preview displayed in the digital viewfinder (e.g., 614). Thus, the electronic device, by providing the user with a visual indication (e.g., indication 675) that the set of one or more conditions has automatically been determined to have been met, prompts the user to capture an image (with the applied simulated optical effect), as appropriate. In accordance with displaying the preview in the digital viewfinder (e.g., 614) without applying the simulated optical effect (e.g., 680), the electronic device (e.g., 600) forgoes displaying, (e.g., in the digital viewfinder 614) on the display (e.g., 612), the graphical indication (e.g., 675) (e.g., text including "Depth Effect") that the simulated optical effect is being applied to the preview displayed in the digital viewfinder (e.g., 614). Thus, in some examples, the electronic device (e.g., 600) notifies the user whether the set of one or more conditions have been met or have not been met. Thus, the electronic device, by providing the user with a visual indication that the set of one or more conditions has automatically been determined to not have been met (e.g., not displaying indication 675), prompts the user to take actions such that the set of one or more conditions is met before taking a picture or recording a video.

In accordance with some embodiments, in accordance with the determination that the set of one or more conditions is not met (and in response to a user request), the electronic device (e.g., 600) captures the image (e.g., based on dated from the first camera 602 and not based on the second camera 604, based on data from the second camera 604 and not based on the first camera 602) without the simulated optical effect. In some examples, the user activates a shutter affordance (e.g., 617) that is displayed on the display (e.g., 612) while the set of one or more conditions is not met, and, in response, the electronic device (e.g., 600) captures (e.g., stores in memory) an image using data from the first camera (e.g., 602) (or the second camera (e.g., 604)) without applying the simulated optical effect to the data. Thus the electronic device, by not applying the simulated optical effect to images captured when the set of one or more conditions is not met, informs the user as to the nature of the image data that will be captured and stored, in response to further user input (e.g., an image capture request).

In accordance with some embodiments, in accordance with the determination that the set of one or more conditions is met (and in response to a user request), the electronic device (e.g., 600) captures the image (e.g., based on dated from the first camera 602 and the second camera 604) with the simulated optical effect (e.g., 680). In some examples, the user activates a shutter affordance that is displayed on the display (e.g., 612) while the set of one or more conditions is met, and, in response, the electronic device (e.g., 600) captures (e.g., stores in memory) an image using data from the first camera (e.g., 602) (and/or the second camera (e.g., 604)), wherein the simulated optical effect is applied to the data.

In accordance with some embodiments, while the preview is displayed in the digital viewfinder (e.g., 614) without applying the simulated optical effect, the electronic device (e.g., 600) detects a change in the scene in front of the cameras (e.g., due to movement of the camera, movement of objects/people in the scene, and/or a change in lighting in the scene). In response to detecting the change in the scene: in accordance with a determination that the change in the scene has caused the set of one or more conditions to be met (e.g., focus distance is 8 feet or more, focus distance is within 8 feet and 2.5 m, light is 400 lux or more), the electronic device (e.g., 600) applies the simulated optical effect (e.g., a bokeh simulated optical effect) to the preview displayed in the digital viewfinder (e.g., 614). Thus, the electronic device, by updating the digital viewfinder to apply the simulated optical effect, informs the user that the set of one or more conditions has been met and informs the user as to what a captured image will look (e.g., live or near-live), thereby prompting the user to capture an image (with the applied simulated optical effect), as appropriate. In accordance with a determination that the change in the scene has not caused the set of one or more conditions (e.g., focus distance is 8 feet or more, focus distance is within 8 feet and 2.5 m, light is 400 lux or more) to be met, the electronic device (e.g., 600) maintains display of the preview in the digital viewfinder (e.g., 614) without applying the simulated optical effect (e.g., a bokeh simulated optical effect, simulated color filter, simulated gamma adjustment).

Note that details of the processes described above with respect to method 700 (e.g., FIGS. 7A-7B) are also applicable in an analogous manner to the methods described below. For example, methods 900, 1100, 1300, 1900, 2100, and 2300 optionally include one or more of the characteristics of the various methods described above with reference to method 700. For example, the electronic viewfinder 614 in method 700 is analogous to the electronic viewfinder in methods 900, 1100, 1300, 1900, 2100, and 2300. For brevity, these details are not repeated below.

FIGS. 8A-8H illustrate exemplary devices and user interfaces for managing camera effects. The user interfaces in these figures are used to illustrate processes described below, including the processes in FIG. 9.

Figure 8A:
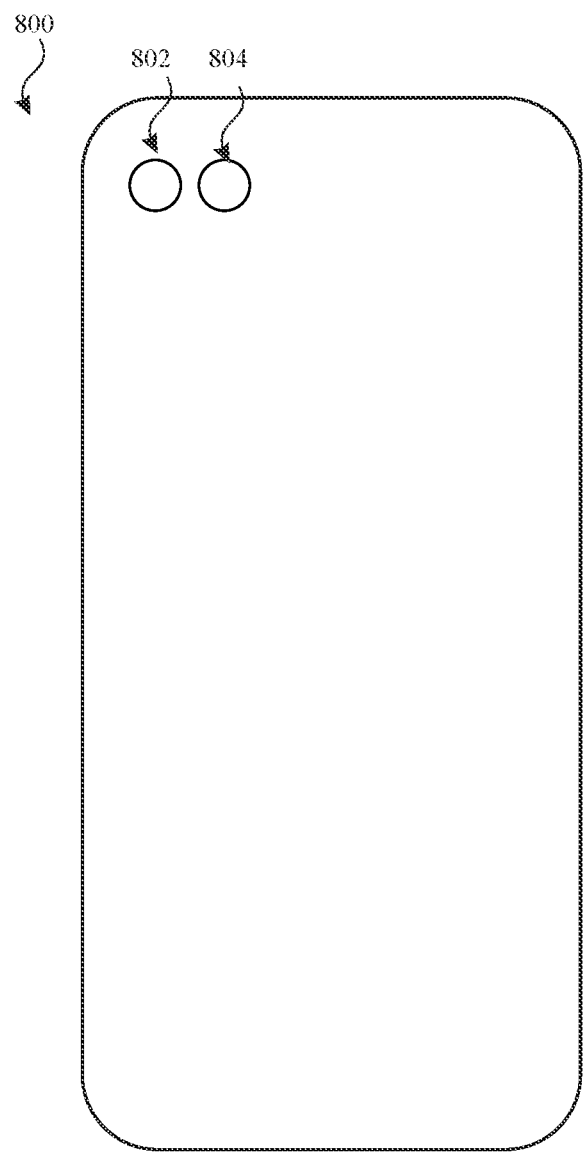
FIGS. 8A-8H illustrate exemplary devices and user interfaces for managing camera effects, in accordance with some embodiments.

FIG. 8A illustrates an electronic device 800 with a first camera 802 and a second camera 804 (e.g., on the rear of the electronic device 800). In some examples, the first camera 802 and the second camera 804 have fixed, but different, focal lengths. In some examples, the focal length, field of view, and/or optical magnification properties of the optical system is fixed for each of the cameras. In some embodiments, in addition to having different fixed focal lengths, the cameras (e.g., 802, 804) have different fixed fields of view and different fixed optical magnification properties.

In some embodiments, the first camera 802 has a first field of view and the second camera 804 has a second field of view, wherein the first field of view and the second field of view overlap. In some examples, the first camera 802 and the second camera 804 are spaced apart so that a parallax between images captured by the camera (e.g., 802 and 804) is used to determine depths for objects represented by different portions of the digital viewfinder. In some embodiments, the first camera 802 and the second camera 804 are located on a surface of the electronic device 800 and the optical axes of the cameras (e.g., 802 and 804) are arranged such that they are parallel. In some examples, the first camera 802 and the second camera 804 capture overlapping fields of view, for example, at least 50% overlapping, at least 90% overlapping, or more. In some examples, the first camera 802 has a wider field of view than the second camera 804. In some examples, the second camera 804 has a wider field of view than the first camera 802. When a wide-angle camera (e.g., a camera with a wide-angle lens) has a wider field of view than a telephoto camera (e.g., a camera with a telephoto lens), at a 1× magnification of the wide-angle camera objects appear further away than at a 1× magnification of the telephoto camera. If the wide-angle camera and the telephoto camera have overlapping fields of view such that the field of view of the telephoto camera is approximately centered on the field of view of the wide angle camera, an image captured with the telephoto camera at a 1× magnification level will, in some circumstances (e.g., where the subject of the image is at least 1 meter away), appear to be an optical zoom of a corresponding image captured with the wide-angle camera at a 1× magnification level.

Figure 8B:
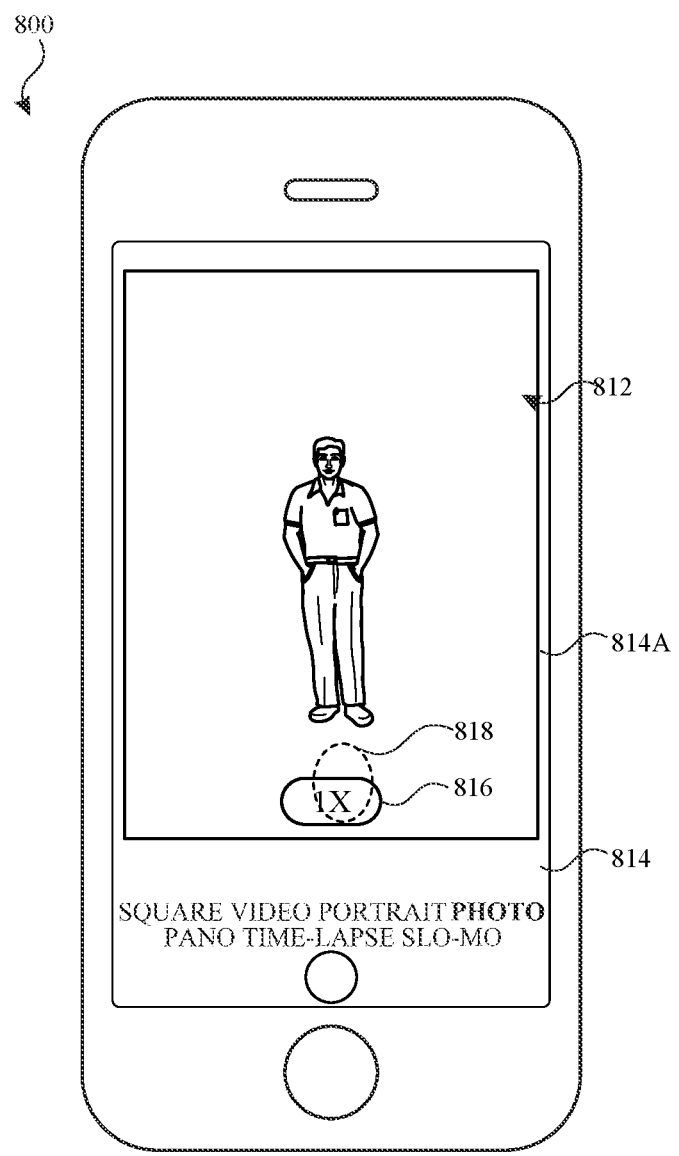

As illustrated in FIG. 8B, the electronic device concurrently displays, on the display 812, a user interface 814 for capturing photos based on data received from the first camera 802 that includes displaying a digital viewfinder 814A with a first magnification (e.g., 1×) (e.g., a live or near-live preview image, not based on the second camera), and an affordance (e.g., icon, textual representation indicating the magnification level) (e.g., 816) for modifying the magnification of photos captured by the device using one or more of the first 802 and second cameras 804. In some examples, the magnification is 1×, and the digital viewfinder 814A displays images corresponding to a respective camera without applying a digital zoom. In some examples, the user interface for capturing photos based on data received from the first camera does not use data received from the second camera for capturing photos.

The electronic device detects activation (e.g., based on detecting tap gesture 818) of the affordance (e.g., 816). In some examples, detecting activation of the affordance includes detecting a tap gesture 818 at a location on a touch sensitive surface of the electronic device 800 corresponding to a location of the affordance.

Figure 8C:
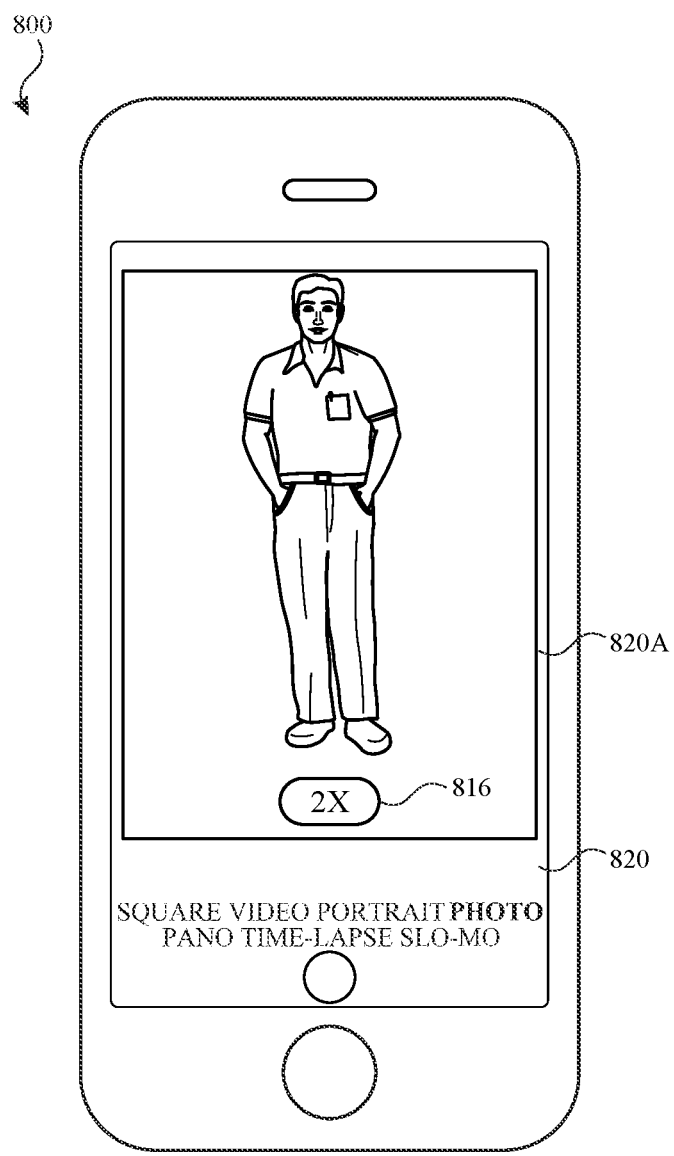

As illustrated in FIG. 8C, in response to detecting activation of the affordance (e.g., 818), the electronic device 800 ceases to display, on the display 812, the user interface 814 for capturing photos based on data received from the first camera 802, and the electronic device 800 displays, on the display 812, a user interface 820 for capturing photos based on data received from the second camera 804 that includes displaying a digital viewfinder 820A with a second magnification (e.g., 2×) that is greater than the first magnification. In some examples, the user interface for capturing photos based on data received from the second camera 804 does not use data received from the first camera 802 for capturing photos. Thus, in some examples, activation of the affordance 818 results in the electronic device replacing the digital viewfinder 814A (based on the first camera) with the digital viewfinder 820A (based on the second camera).

In some embodiments, the digital viewfinder 820A of the user interface for capturing photos based on the second camera 804 fully replaces the digital viewfinder 814A of the user interface for capturing photos based on the first camera 802.

Figure 8D:
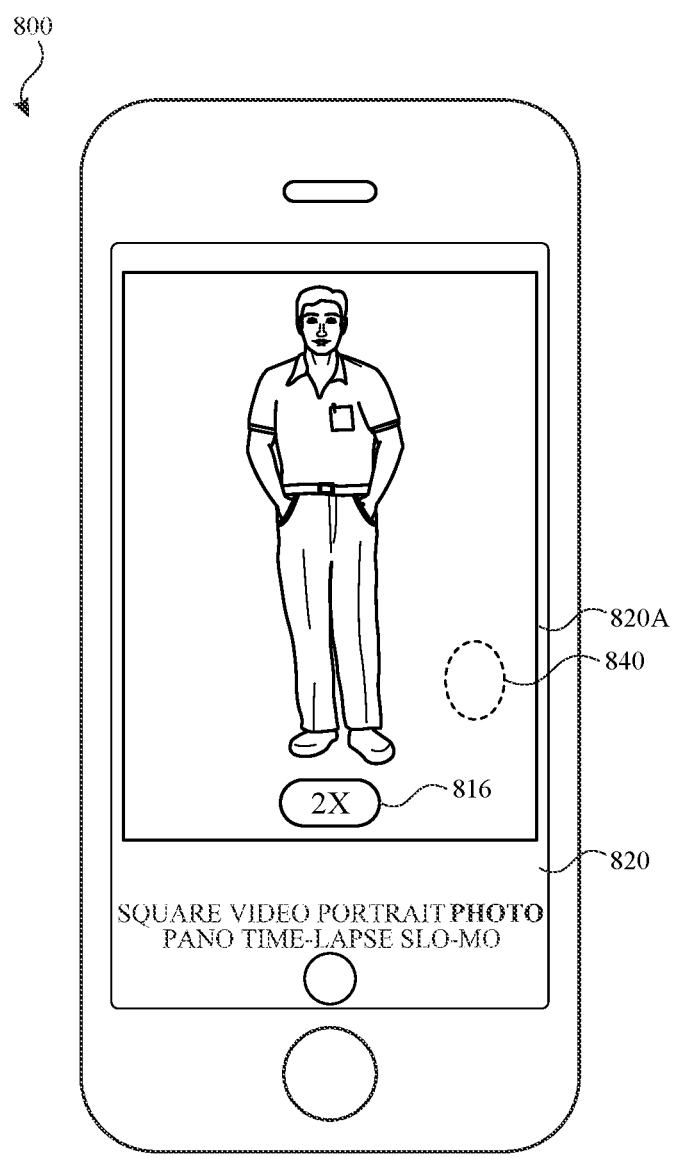
Figure 8E:
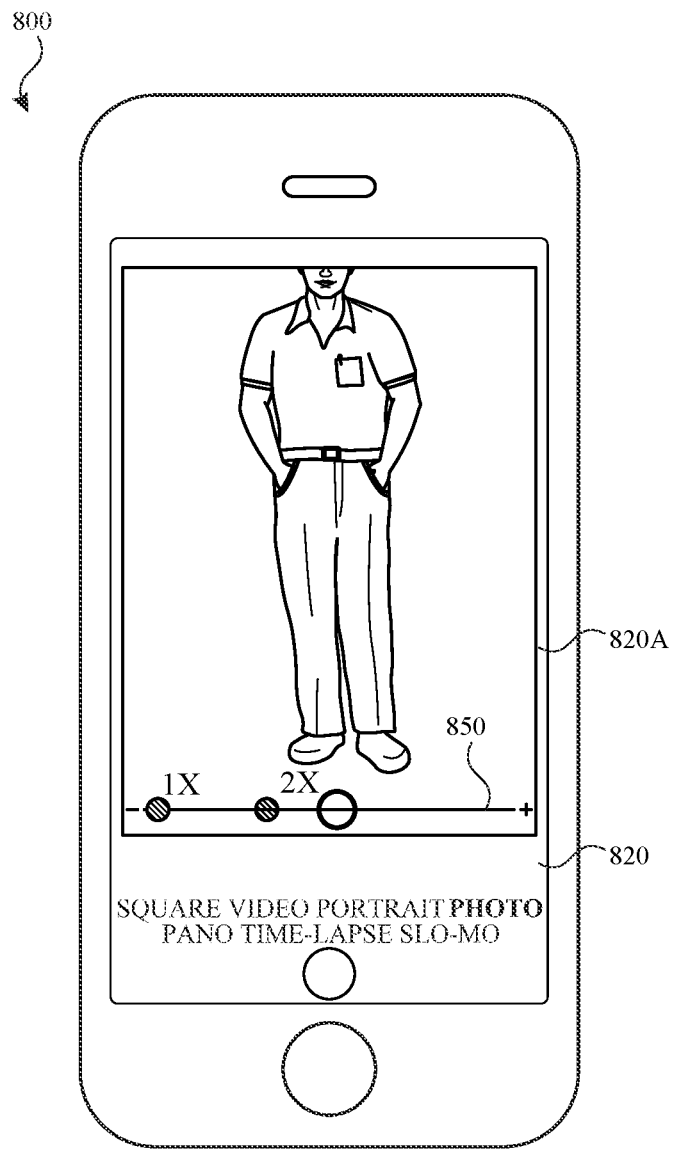

In some embodiments, the electronic device provides a zoom control mechanism to allow a user to zoom in and out. As illustrated in FIG. 8D, in some embodiments, the electronic device detects a user input 840 (e.g., a pinch gesture, a drag gesture on an affordance (e.g., affordance 816), or a swipe input in a region surrounding the affordance) in the digital viewfinder (e.g., 814A, 820A). In some examples, the electronic device 800 includes a touch-sensitive surface and the user input is received at a location on the touch-sensitive surface corresponding to the digital viewfinder (e.g., 814A, 820A). Thus, the electronic device is said to detect the user input 840 in the digital viewfinder (e.g., 814A, 820A). As illustrated in FIG. 8E, the electronic device, in response to detecting the user input 840, displays (e.g., concurrently with the digital viewfinder), on the display 812, a zoom control 850 (e.g., slider) (e.g., concurrently with the affordance 816) and, in some embodiments, performs a zoom of the digital viewfinder (e.g., 814A, 820A) in accordance with the user input 840. In some embodiments, as illustrated in FIG. 8D, the continuous zoom control 850 is not displayed, on the display 812, prior to detecting the user input 840. Thus, in some embodiments, the electronic device provides the user with an additional mechanism (e.g., a continuous zoom control) for zooming the digital viewfinder in response to detecting a gesture for zooming.

Figure 8F:
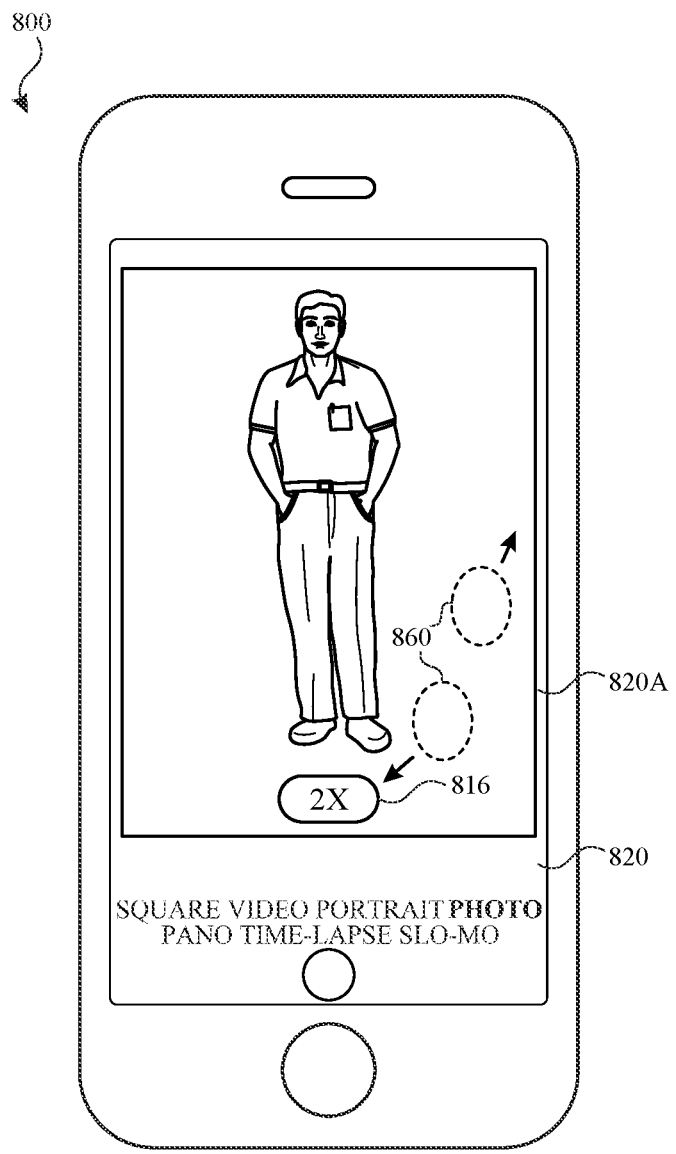
Figure 8G:
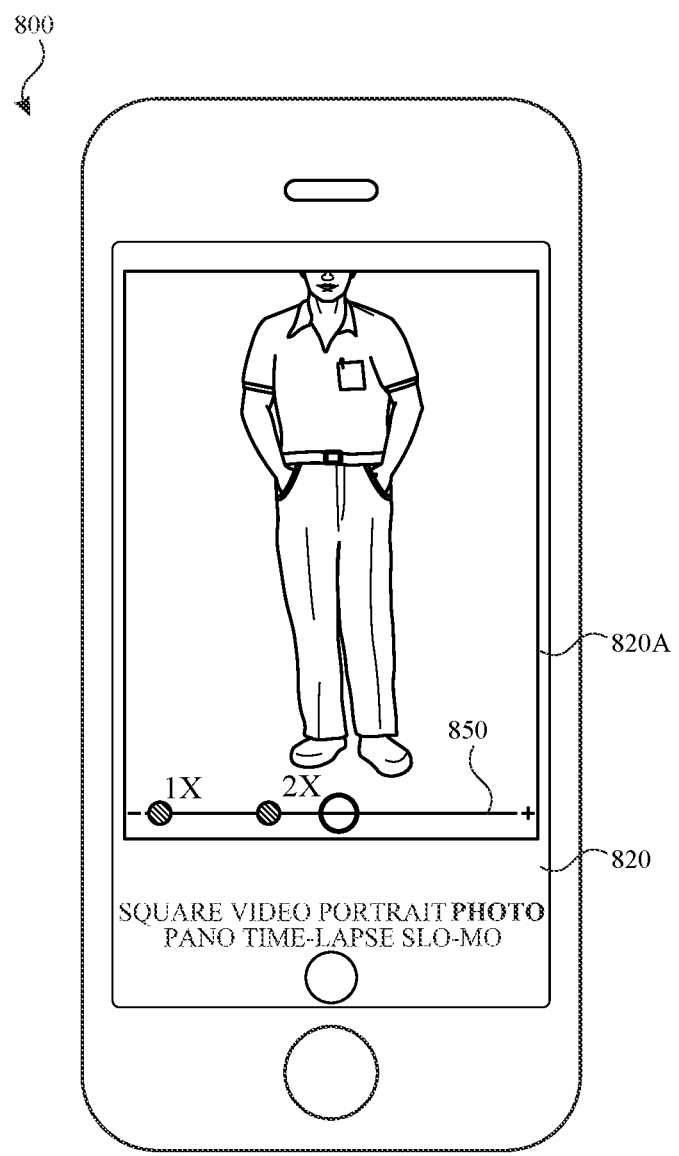

In some embodiments, the electronic device displays the zoom control in response to detecting a pinch gesture. In some examples, as illustrated in FIG. 8F, the user input corresponds to a pinch (or de-pinch) gesture (e.g., 860) in the digital viewfinder (e.g., 814A, 820A). In some examples, also as illustrated in FIG. 8G, electronic device 800, in response to the pinch gesture (e.g., 860), performs a zoom of the digital viewfinder (e.g., 814A, 820A) and also displays continuous zoom control 850.

In some embodiments, the electronic device 800 displays the zoom control 850 in response to detecting a drag gesture. In some examples, the user input corresponds to a drag gesture in the digital viewfinder (e.g., 814A, 820A). In some examples, the electronic device 800 includes a touch-sensitive surface, and wherein the user input is a drag gesture at a location on the touch-sensitive surface corresponding to the affordance. Thus, in some examples, the electronic device 800 detects user input corresponding to dragging the affordance (e.g., 816, the 1x/2x indicator), and in response, displays the zoom control (e.g., concurrently with the affordance 816).

In some embodiments, the electronic device 800 displays the zoom control in response to detecting a swipe gesture. In some embodiments, the user input corresponds to a swipe gesture in the digital viewfinder (e.g., 814A, 820A). In some examples, the electronic device includes a touch-sensitive surface, and wherein the user input is a swipe gesture at a location on the touch-sensitive surface corresponding to the digital viewfinder. In some examples, the electronic device detects user input corresponding to a swipe gesture on the digital viewfinder, and in response, displays the zoom control (e.g., concurrently with the affordance 816).

Figure 8H:
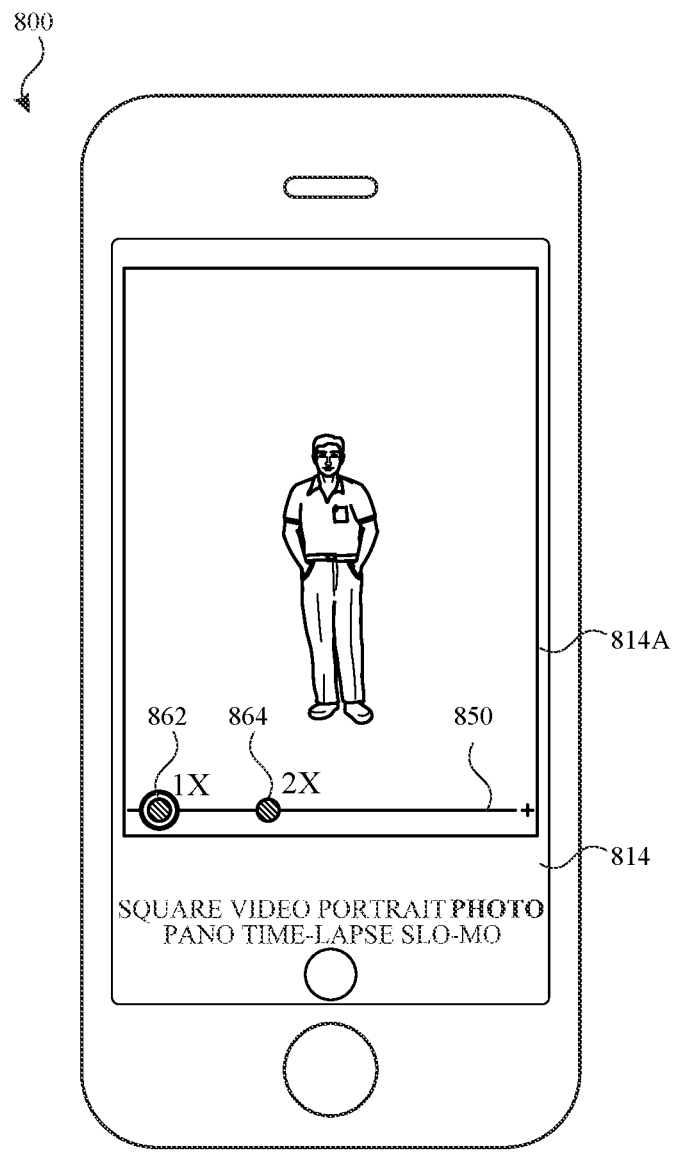

In some embodiments, as illustrated in FIG. 8H, the zoom control 850 is a slider. In some embodiments, the zoom control 850 includes a plurality of positions corresponding to a plurality of magnification levels (e.g., 862 and 864).

In some embodiments, as illustrated in FIG. 8H, the zoom control 850 includes a plurality of locations corresponding to a plurality of magnification levels (e.g., 862 and 864), and wherein a first location 862 of the plurality of locations corresponds to a first optical magnification level (e.g., based on a first camera without any digital zoom) and a second location 864 of the plurality of locations corresponds to a second optical magnification level that is different from the first optical magnification level (e.g., based on a second camera without any digital zoom).

In some embodiments, the zoom control acts as a joystick-like control. In some examples, affordance 816 acts as a joystick-like control. In some examples, the electronic device 800 detects a gesture corresponding to the zoom control (e.g., at a location on a touch-sensitive surface corresponding to the zoom control) or the affordance 816 (e.g., at a location on a touch-sensitive surface corresponding to the affordance 816), the gesture having a direction and a length. The electronic device 800 in response to detecting the gesture and in accordance with the direction being a first direction, performs a zoom-out of the digital viewfinder (e.g., 814A, 820A) (e.g., with increasing speed) at a speed based on the magnitude of the gesture (e.g., a distance moved from particular location on the touch-sensitive surface, or a distance moved from an initial point of contact on the touch-sensitive surface). The electronic device 800, in response to detecting the gesture and in accordance with the direction being a second direction different from the first direction, performs a zoom-in of the digital viewfinder (e.g., with increasing speed) at a speed based on the magnitude of the gesture. In some embodiments, the zoom control acts as a joystick-like control wherein detecting a drag gesture in one direction zooms out the viewfinder with increasing speed based on a magnitude of the gesture and wherein dragging in another direction (e.g., opposite to the first direction) zooms in the viewfinder with increasing speed based on a magnitude of the gesture.

In some embodiments, the affordance 816 for modifying the magnification is displayed in accordance with a determination that the electronic device includes a plurality of cameras (e.g., 802 and 804) with overlapping fields of view. In some examples, the cameras (e.g., 802 and 804) are arranged such that the cameras have parallel optical axes or substantially parallel optical axes. In some examples, in accordance with a determination that the electronic device does not include a plurality of cameras with overlapping fields of view, the electronic device forgoes displaying the affordance 816 for modifying the magnification.

In some embodiments, the electronic device 800 detects a second activation of the affordance 816 for modifying the magnification. In some examples, detecting activation of the affordance includes detecting a tap gesture at a location on a touch sensitive surface corresponding to a location of the affordance. The electronic device, in response to detecting the second activation of the affordance 816 for modifying the magnification ceases to display, on the display 812, the user interface 820 for capturing photos based on data received from the second camera 802, and the electronic device displays, on the display 812, the user interface 814 for capturing photos based on data received from the first camera 802 that includes displaying the digital viewfinder 814A with the first magnification.

In some embodiments, the zoom control 850 fades out (e.g., visually, on the display) in response to device 800 detecting an input lift-off signal associated with the user input in the digital viewfinder (e.g., 814A, 820A). In some embodiments, the displayed affordance 816 for modifying the magnification does not fade out in response detecting the input lift-off signal associated with the user input in the digital viewfinder (e.g., 814A, 820A). In some examples, the electronic device determines that the user input has ended, such as by detecting a lift-off of a touch performed on a touch-sensitive surface, and in response fades out the display of the zoom control 850.

In some embodiments, displaying (e.g., concurrently with the digital viewfinder), on the display, the zoom control 850 includes replacing display of the affordance 816 for modifying the magnification with display of the zoom control.

FIG. 9 is a flow diagram illustrating a method for managing camera effects, in accordance with some embodiments. Method 900 is performed at an electronic device (e.g., 100, 300, 500, 600, 800) with a first camera, a second camera, and a display. Some operations in method 900 are, optionally, combined, the order of some operations is, optionally, changed, and some operations are, optionally, omitted.

At blocks 902-906, the electronic device (e.g., 800) concurrently displays, on the display (e.g., 812): a user interface (e.g., 814) for capturing photos based on data received from the first camera (e.g., 802) that includes displaying a digital viewfinder (e.g., 814A) with a first magnification (e.g., a live or near-live preview image, not based on the second camera (e.g., 804)). The electronic device (e.g., 800) further displays an affordance (e.g., 816) for modifying the magnification of photos captured by the device using one or more of the first and second cameras (e.g., 802 and 804) (e.g., icon, textual representation indicating the magnification level). In some examples, the magnification is 1x, and the digital viewfinder (e.g., 814A) displays images corresponding to a respective camera without digital zoom.

At block 908, the electronic device (e.g., 800) detects activation of the affordance (e.g., 816). In some examples, detecting activation of the affordance (e.g., 816) includes detecting a tap gesture (e.g., 818) at a location on a touch sensitive surface corresponding to a location of the affordance (e.g., 816).

At block 910, in response to detecting activation of the affordance (e.g., 816): the electronic device (e.g., 800) ceases, at block 912, to display, on the display (e.g., 812), the user interface (e.g., 814) for capturing photos based on data received from the first camera (e.g., 802), and, at block 914, the electronic device (e.g., 800) displays, on the display (e.g., 812), a user interface (e.g., 820) for capturing photos based on data received from the second camera (e.g., 804) that includes displaying a digital viewfinder (e.g., 820A) with a second magnification that is greater than the first magnification. Thus, in some examples, by transitioning user interfaces (of the first camera to the second camera) in response to detecting activation of the affordance (e.g., 816), the electronic device informs the user of the internal state of the electronic device (e.g., which camera will be used when a picture is taken) and also informs a user of what a captured image will look like (e.g., magnification, quality, field of view) before the image is captured. In some examples, the user interface (e.g., 814) for capturing photos based on data received from the first camera (e.g., 802) does not use data received from the second camera (e.g., 804) for capturing photos.

In accordance with some embodiments, the user interface (e.g., 820) for capturing photos based on data received from the second camera (e.g., 804) does not use data received from the first camera (e.g., 802) for capturing photos. In some examples, the digital viewfinder (e.g., 820A) of the user interface (e.g., 820) for capturing photos based on the second camera (e.g., 804) fully replaces the digital viewfinder (e.g., 814A) of the user interface (e.g., 814) for capturing photos based on the first camera (e.g., 802). In some examples, the first camera (e.g., 802) and the second camera (e.g., 804) have fixed, but different, focal lengths. In some examples, the focal length, field of view, and optical zoom properties of the optical system is fixed for each of the cameras, but the fixed focal length is different between the first camera (e.g., 802) and the second camera (e.g., 804).

In accordance with some embodiments, the electronic device (e.g., 800) detects a user input (e.g., 818, 840, 860) in the digital viewfinder (e.g., 814A, 820A) (e.g., a tap gesture, a pinch gesture, a drag gesture of an affordance 816, or a swipe input in a region surrounding the affordance). In response to detecting the user input: the electronic device (e.g., 800) displays (e.g., concurrently with the digital viewfinder), on the display (e.g., 812), a zoom control (e.g., 850) (e.g., a slider). Thus, by displaying a zoom control (e.g., 850) in response to the user input, the electronic device provides the user with an additional (e.g., more precise) mechanism (e.g., a continuous zoom control) for zooming the digital viewfinder. In some embodiments, the zoom control (e.g., 850) is not displayed, on the display (e.g., 812 at FIG. 8B-8D), prior to detecting the user input. In some embodiments, the electronic device (e.g., 800) performs a zoom of the digital viewfinder (e.g., 814A, 820A) in accordance with the user input (e.g., 818, 840, 860). Thus, in some examples, the electronic device (e.g., 800) provides the user with an additional mechanism (e.g., the zoom control 850) for zooming the digital viewfinder (e.g., 814A, 820A). In some examples, the electronic device (e.g., 800) includes a touch-sensitive surface and the user input (e.g., 818, 840, 860) is received at a location on the touch-sensitive surface corresponding to the digital viewfinder (e.g., 814A, 820A). Thus, the electronic device (e.g., 800) is said to detect the user input in the digital viewfinder (e.g., 814A, 820A).

In accordance with some embodiments, the user input corresponds to a pinch gesture (e.g., 860) in the digital viewfinder (e.g., 814A, 820A). In some examples, electronic device (e.g., 800) includes a touch-sensitive surface, and the user input is a pinch gesture (e.g., 860) at a location on the touch-sensitive surface corresponding to the digital viewfinder (e.g., 814A, 820A).

In accordance with some embodiments, the user input corresponds to a drag gesture in the digital viewfinder (e.g., 814A, 820A). In some examples, the electronic device (e.g., 800) includes a touch-sensitive surface, and the user input is a drag gesture at a location on the touch-sensitive surface corresponding to the affordance (e.g., 816). In some examples, the electronic device (e.g., 800) detects user input corresponding to dragging the affordance (e.g., 816) (e.g., the 1×/2× indicator), and in response, the electronic device (e.g., 800) displays the zoom control (e.g., 850). Thus, by displaying a zoom control (e.g., 850) in response to the user input, the electronic device provides the user with an additional (e.g., more precise) mechanism (e.g., a continuous zoom control) for zooming the digital viewfinder.

In accordance with some embodiments, the user input corresponds to a swipe gesture in the digital viewfinder (e.g., 814A, 820A). In some examples, the electronic device (e.g., 800) includes a touch-sensitive surface, and wherein the user input is a swipe gesture at a location on the touch-sensitive surface corresponding to the digital viewfinder (e.g., 814A, 820A). In some examples, the electronic device (e.g., 800) detects user input corresponding to a swipe gesture on the digital viewfinder (e.g., 814A, 820A), and in response, displays the zoom control (e.g., 850).

In accordance with some embodiments, the zoom control (e.g., 850) includes a zoom indicator affordance (e.g., as described with reference to 1040 of FIGS. 10A-10T). In some examples, the zoom control (e.g., 850) includes a plurality of positions corresponding to a plurality of magnification levels.

In accordance with some embodiments, the zoom control (e.g., 850) includes a plurality of locations (e.g., 862 and 864) corresponding to a plurality of magnification levels, and wherein a first location (e.g., 862) of the plurality of locations corresponds to a first optical magnification level (e.g., based on a first camera (e.g., 802) without any digital zoom) and a second location (e.g., 864) of the plurality of locations (e.g., 862 and 864) corresponds to a second optical magnification level that is different from the first optical magnification level (e.g., based on a second camera (e.g., 804) without any digital zoom. Thus, by providing a zoom control that includes positions corresponding to two optical levels (e.g., of the two respective cameras), the electronic device provides an efficient user-machine interface for transitioning between the two cameras.

In accordance with some embodiments, the electronic device (e.g., 800) detects a gesture (e.g., 818, 840, 860) corresponding to the zoom control (e.g., 850) (e.g., at a location on a touch-sensitive surface corresponding to the zoom control (e.g., 850)), the gesture having a direction and a length. In response to detecting the gesture corresponding to the zoom control (e.g., 850) and in accordance with the direction being a first direction, the electronic device (e.g., 800) performs a zoom-out of the digital viewfinder (e.g., 814A, 820A) (e.g., with increasing speed) at a speed based on the magnitude of the gesture (e.g., a distance moved from particular location on the touch-sensitive surface, or a distance moved from an initial point of contact on the touch-sensitive surface). In response to detecting the gesture corresponding to the zoom control (e.g., 850) and in accordance with the direction being a second direction different from the first direction, the electronic device (e.g., 800) performs a zoom-in of the digital viewfinder (e.g., 814A, 820A) (e.g., with increasing speed) at a speed based on the magnitude of the gesture. In some embodiments, the zoom control (e.g., 850) acts as a joystick-like control wherein detecting a drag gesture in one direction zooms out the viewfinder with increasing speed based on a magnitude of the gesture and wherein dragging in another direction (e.g., opposite to the first direction) zooms in the viewfinder (e.g., 814A, 820A) with increasing speed based on a magnitude of the gesture. Thus, by performing zoom operations with varying speeds based on the magnitudes of the gestures, the electronic device optimizes the user-machine interface by reducing the number of user inputs (e.g., to a single gesture) that the user is required to provide in order to instruct the electronic device to both perform a zoom operation as well as the speed with which the zoom operation should be performed.

In accordance with some embodiments, the affordance (e.g., 816) for modifying the magnification is displayed in accordance with a determination that the electronic device (e.g., 800) includes a plurality of cameras with overlapping fields of view. In some examples, the cameras are arranged such that the cameras have parallel optical axes. In some examples, in accordance with a determination that the electronic device (e.g., 800) does not include a plurality of cameras with overlapping fields of view, the electronic device forgoes displaying the affordance (e.g., 816).

In accordance with some embodiments, the electronic device (e.g., 800) detects a second activation of the affordance (e.g., 816) for modifying the magnification. In some examples, detecting activation of the affordance (e.g., 816) includes detecting a tap gesture (e.g., 818) at a location on a touch sensitive surface corresponding to a location of the affordance (e.g., 816). In response to detecting the second activation of the affordance (e.g., 816) for modifying the magnification: the electronic device (e.g., 800) ceases to display, on the display (e.g., 812), the user interface (e.g., 820) for capturing photos based on data received from the second camera (e.g., 804), and the electronic device (e.g., 800) displays, on the display (e.g., 812), the user interface (e.g., 814) for capturing photos based on data received from the first camera (e.g., 802) that includes displaying the digital viewfinder (e.g., 814A) with the first magnification. Thus, in some examples, by transitioning user interfaces (of the second camera to the first camera) in response to detecting the second activation of the affordance (e.g., 816), the electronic device informs the user of the internal state of the electronic device (e.g., which camera will be used when a picture is taken) and also informs the user of what a captured image will look like (e.g., magnification, quality, field of view) before the image is captured.

In accordance with some embodiments, the displayed zoom control (e.g., 850) fades out in response to detecting an input lift-off signal associated with the user input in the digital viewfinder (e.g., 814A, 820A) and wherein the displayed affordance (e.g., 816) for modifying the magnification does not fade out in response detecting the input lift-off signal associated with the user input in the digital viewfinder (e.g., 814A, 820A). In some examples, the electronic device (e.g., 800) determines that the user input has ended, such as by detecting a lift-off of a touch performed on a touch-sensitive surface, and in response, the electronic device (e.g., 800) fades out the display of the zoom control (e.g., 850).

In accordance with some embodiments, displaying (e.g., concurrently with the digital viewfinder 814A, 820A), on the display (e.g., 812) the zoom control (e.g., 850) includes replacing display of the affordance (e.g., 816) for modifying the magnification with display of the zoom control (e.g., 850).

Note that details of the processes described above with respect to method 900 (e.g., FIG. 9) are also applicable in an analogous manner to the methods described below. For example, methods 700, 1100, 1300, 1900, 2100, and 2300 optionally include one or more of the characteristics of the various methods described above with reference to method 900. For example, the electronic viewfinder in method 900 is analogous to the electronic viewfinder in methods 700, 1100, 1300, 1900, 2100, and 2300. For brevity, these details are not repeated below.

FIGS. 10A-10T illustrate exemplary devices and user interfaces for zooming a digital viewfinder, in accordance with some embodiments. The user interfaces in these figures are used to illustrate processes described below, including the processes in FIG. 11.

FIG. 10A illustrates an exemplary electronic device 1000. In some embodiments, the electronic device 1000 includes a first camera 1002 and a second camera 1004 (e.g., on the rear of the electronic device 1000). In some examples, the first camera 1002 and the second camera 1004 have fixed, but different, focal lengths. In some examples, the focal length, field of view, and/or optical magnification properties of the optical system is fixed for each of the cameras, In some embodiments, in addition to having different fixed focal lengths, the cameras (e.g., 1002, 1004) have different fixed fields of view and different fixed optical magnification properties.

Figure 10B:
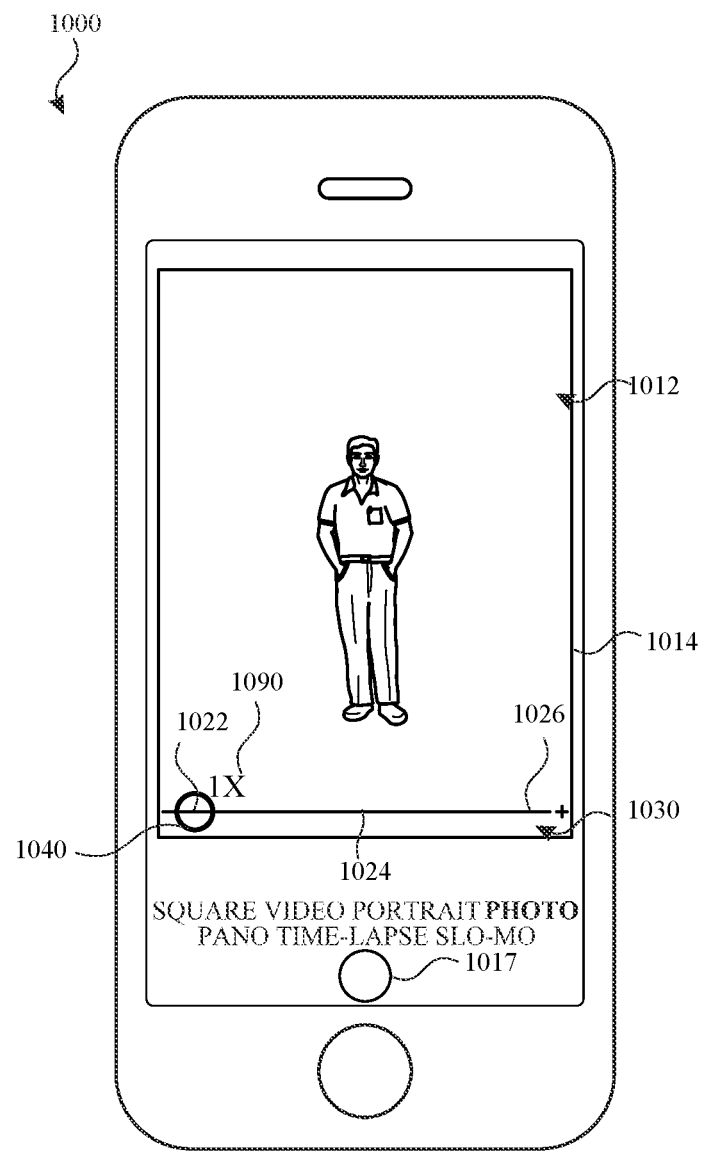

As illustrated in FIG. 10B, the electronic device 1000 displays, on the display, a digital viewfinder 1014 based on data received from the one or more cameras (e.g., a live or near-live preview image from either camera). In some examples, the digital viewfinder 1014 displays data based only one of the first and second cameras (e.g., 1002 and 1004).

Figure 10C:
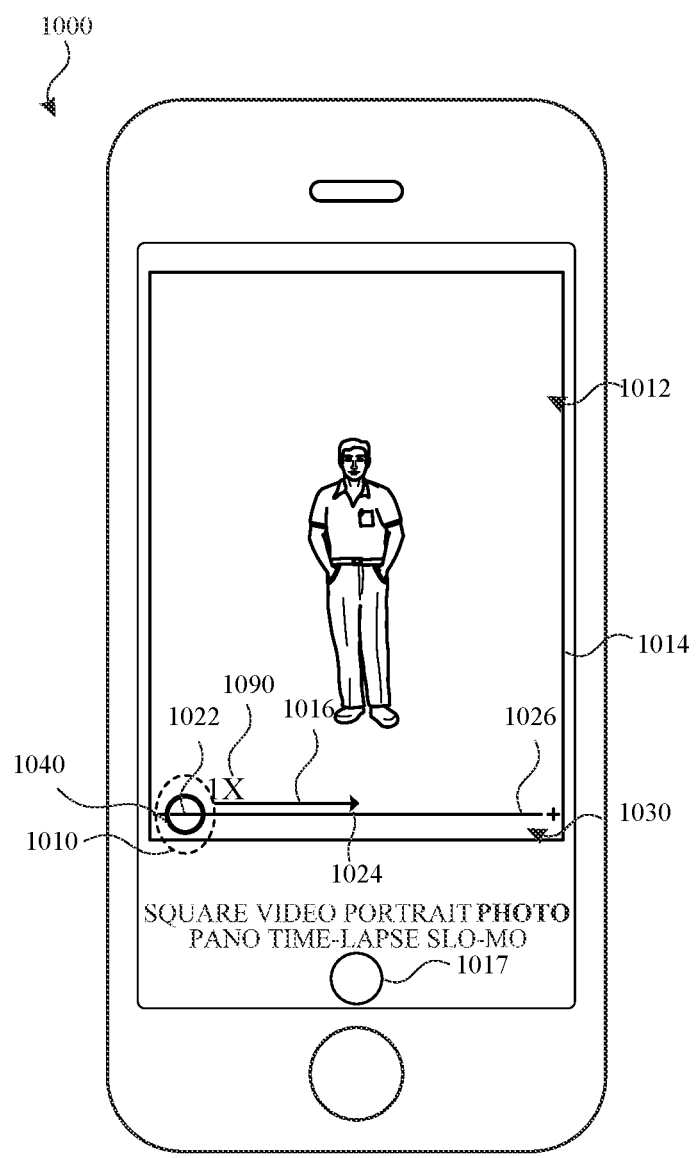
Figure 10D:
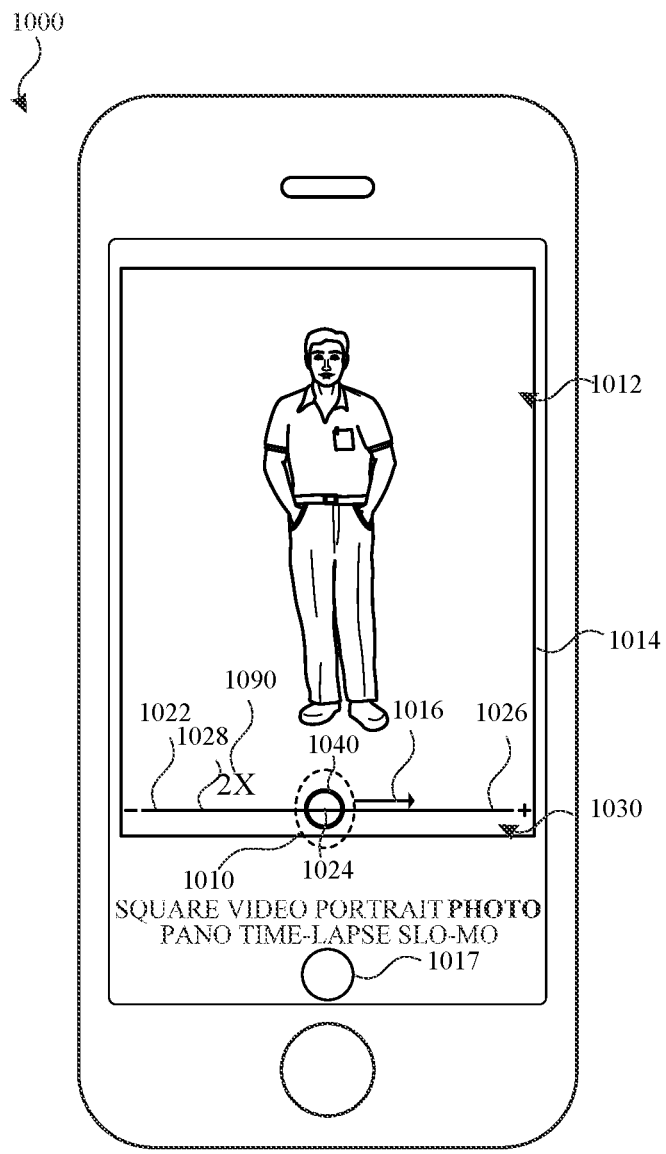
Figure 10E:
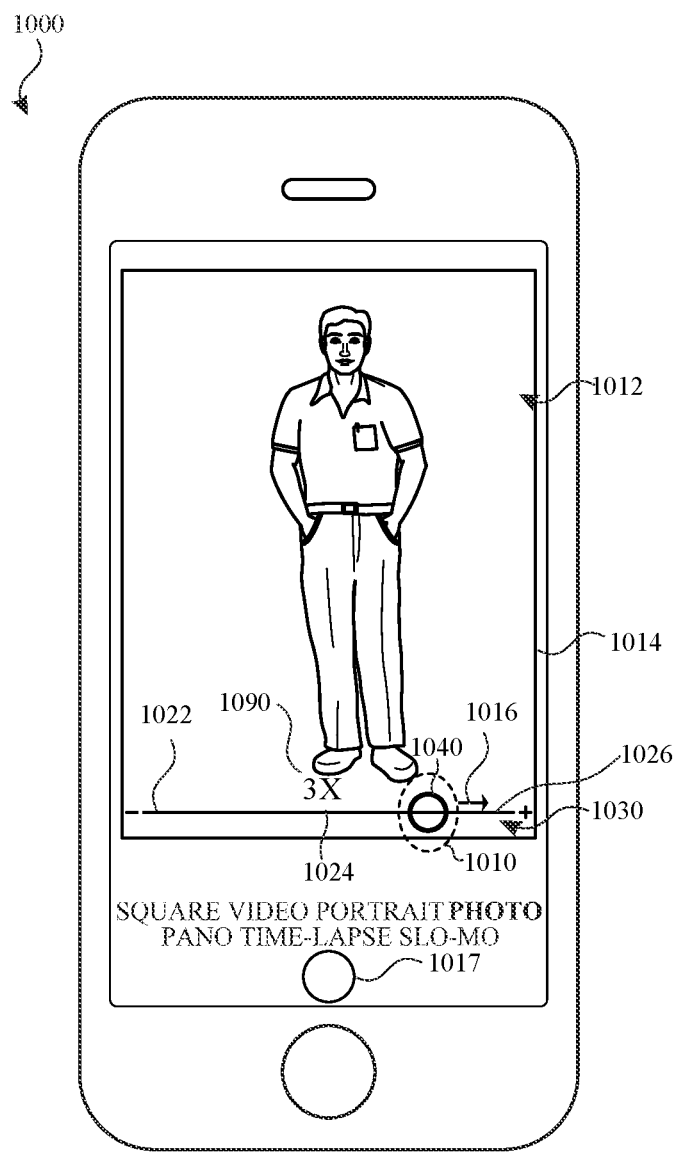
Figure 10F:
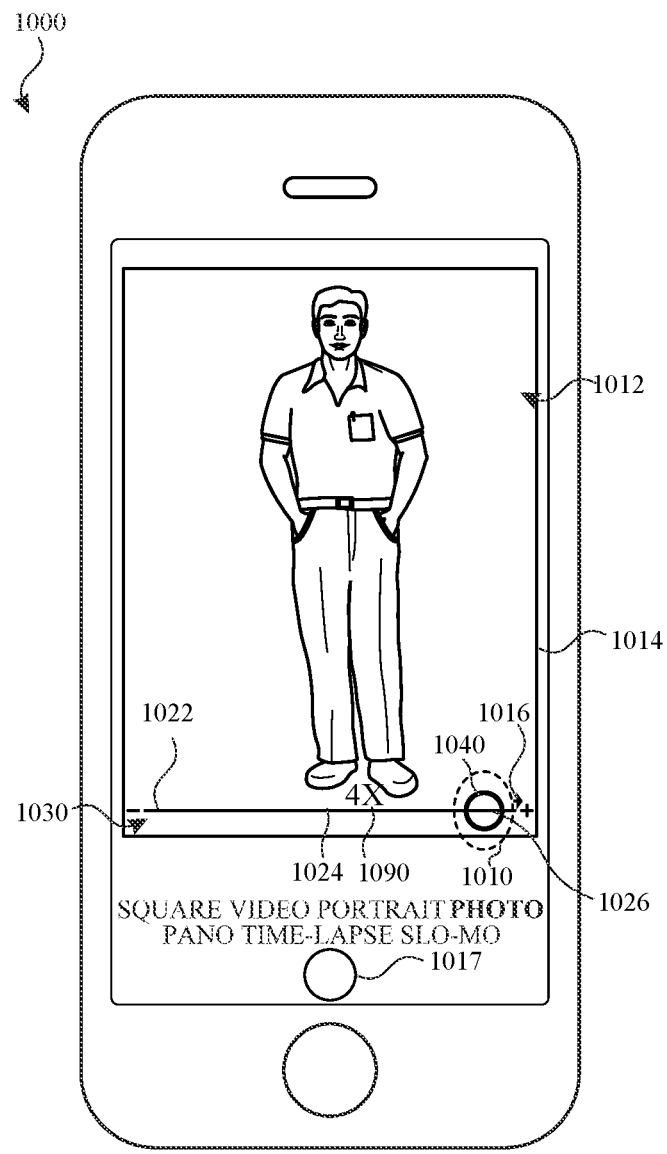
Figure 10G:
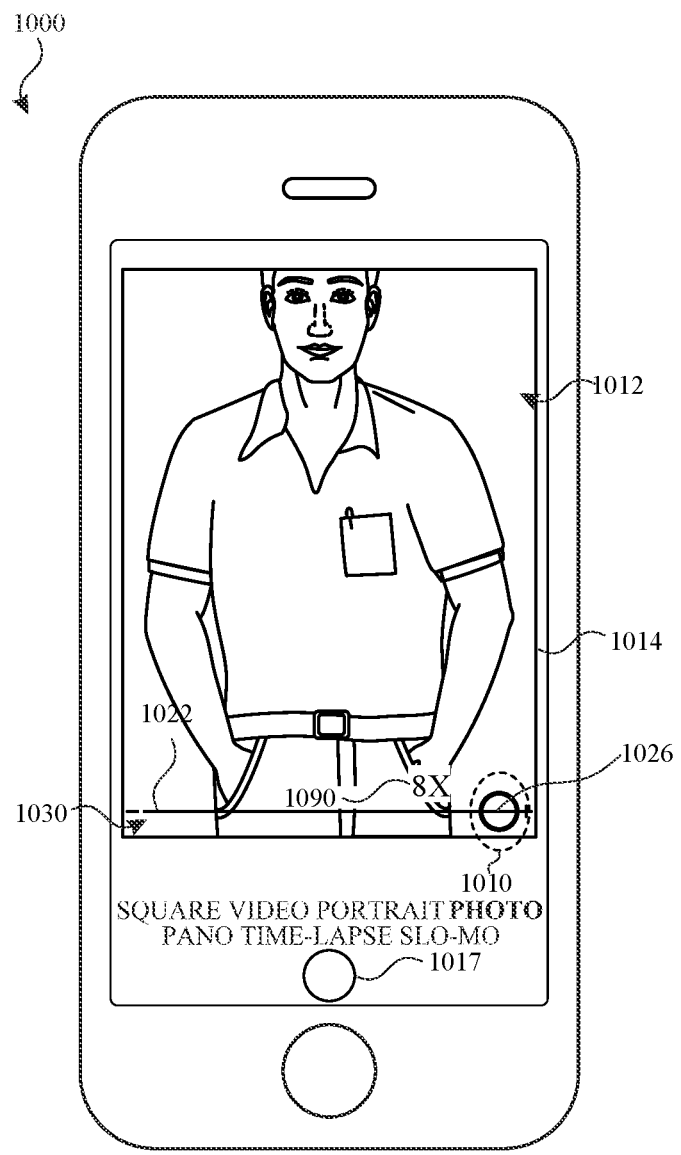
Figure 10H:
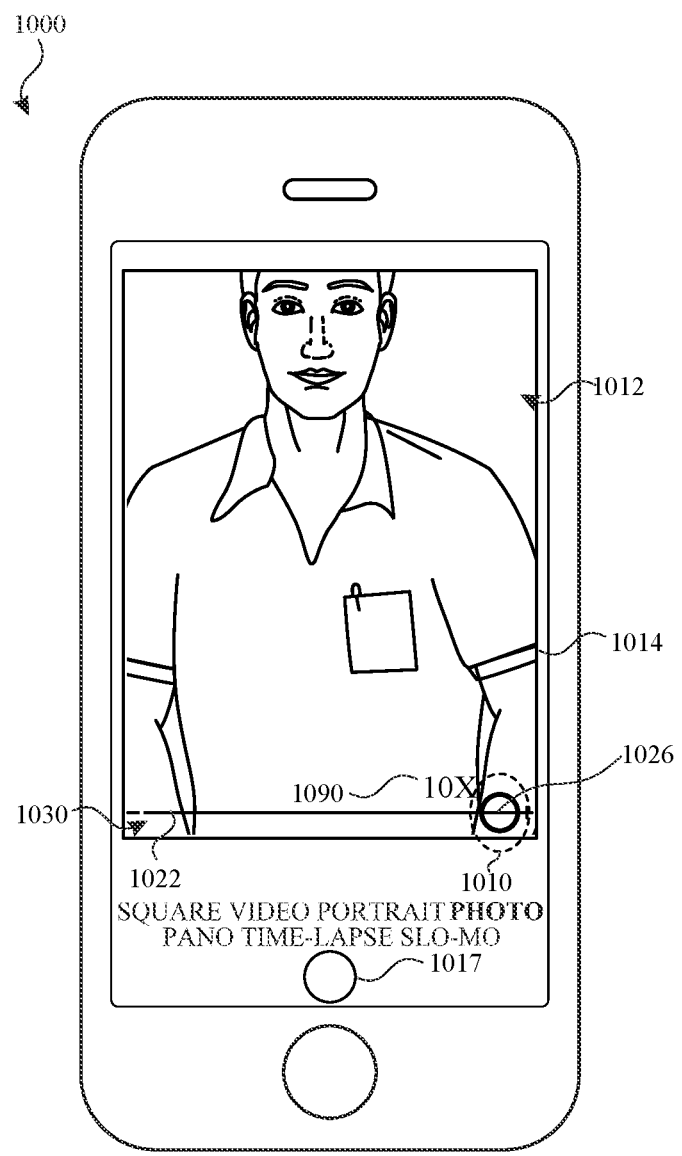
Figure 10I:
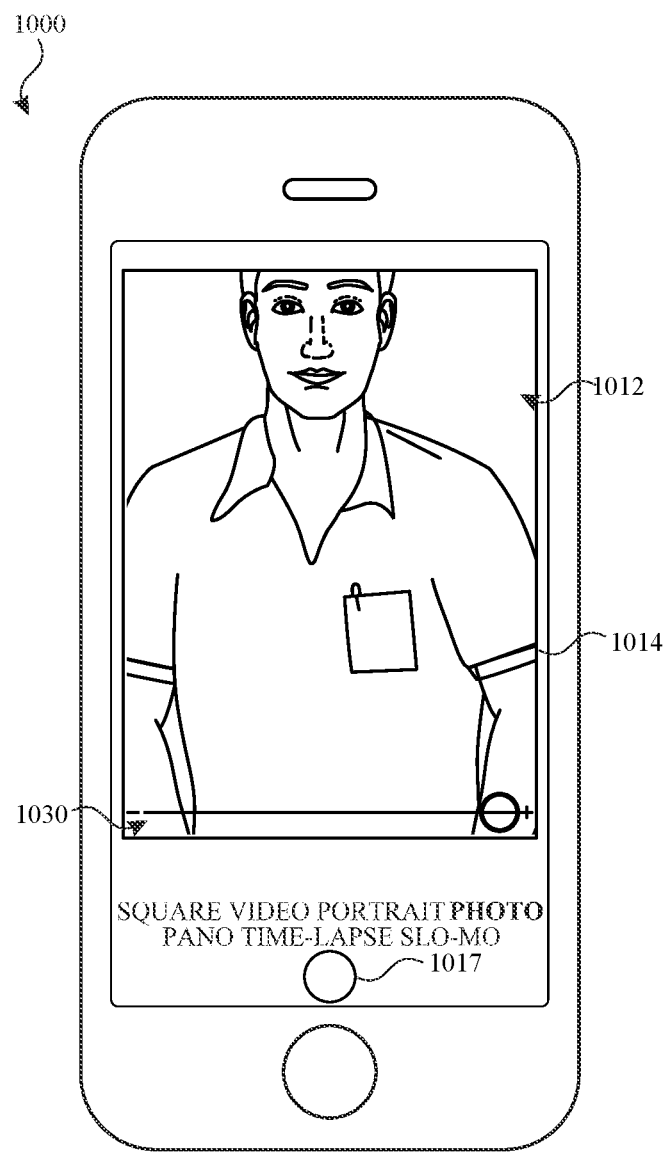
Figure 10J:
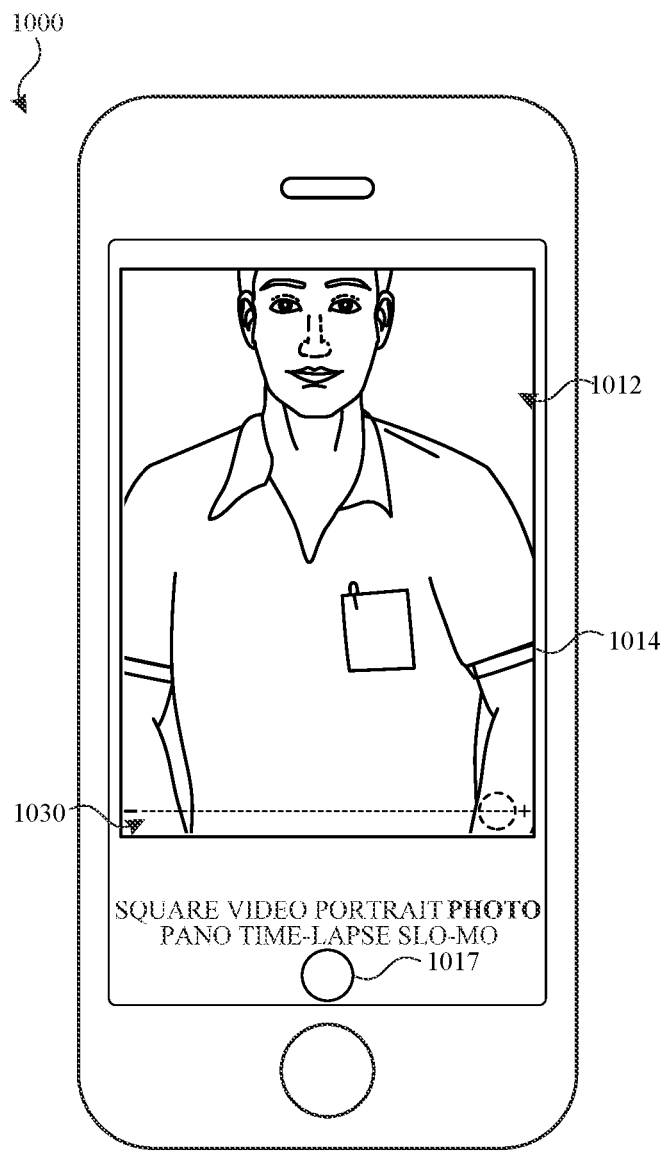
Figure 10K:
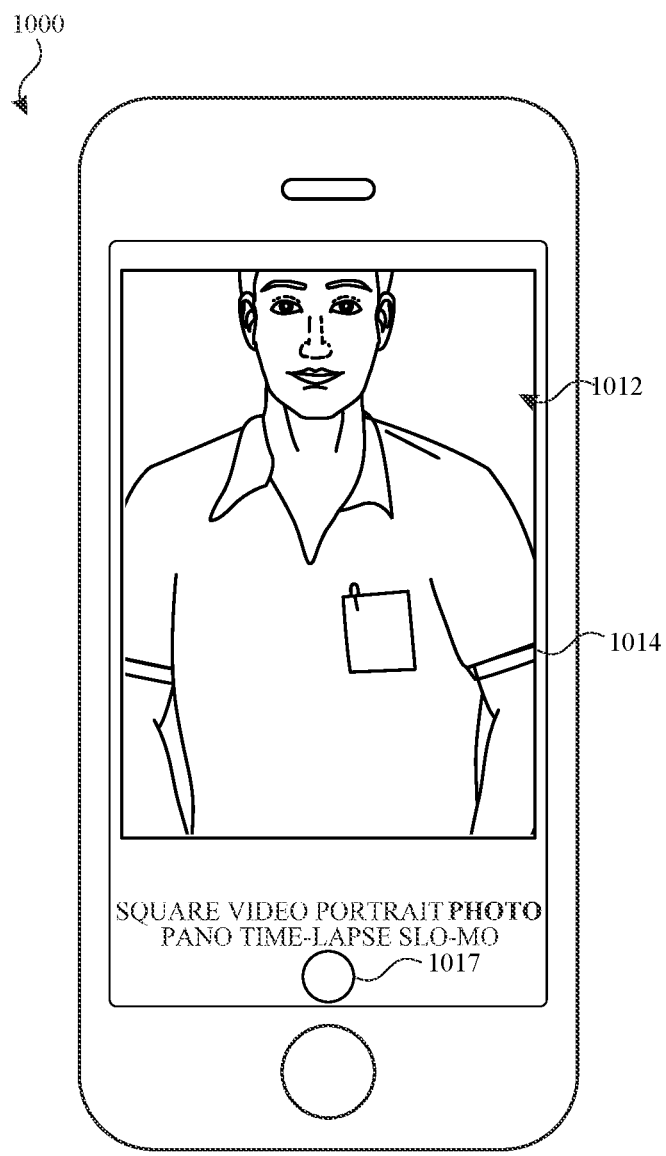

As illustrated in FIGS. 10C-10H, as user performs a drag gesture on a zoom indicator affordance 1040 to change the magnification of the digital viewfinder 1014. The zoom indicator affordance 1040 progresses with the gesture. In contrast, the magnification of the digital viewfinder 1014 progresses at a different rate, initially lagging behind the gesture and later catching up to the gesture. As illustrated in FIGS. 10C-10H, while displaying the digital viewfinder 1014, the electronic device 1000 detects a gesture 1010 (e.g., a drag gesture on a touch-sensitive surface, a drag gesture at a location corresponding to a zoom control 1030) that progresses at a gesture rate 1016, the gesture corresponding to an instruction to zoom the digital viewfinder 1014 from a first magnification level (e.g., 1×, as illustrated in FIG. 10C, corresponding to location 1022 on the zoom control 1030) to a third magnification level (e.g., 10×, as illustrated in FIG. 10H, corresponding to location 1026 on the zoom control 1030). In response to detecting the gesture, the electronic device 1000 zooms the digital viewfinder 1014 from the first magnification level (e.g., 1×, as illustrated in FIG. 10C) to a second magnification level (e.g., 3×, as illustrated in FIG. 10E, corresponding to location 1024 on the zoom control 1030) and from the second magnification level (e.g., 3×, as illustrated in FIG. 10E, corresponding to location 1024 on the zoom control 1030) to a third magnification level (e.g., 10×, as illustrated in FIG. 10H, corresponding to location 1026 on the zoom control 1030), wherein during a first portion of the gesture (e.g., the portion of the gesture as it progress in FIGS. 10C to 10D), the electronic device zooms the digital viewfinder at a first rate (e.g., an average rate) that is slower than the gesture rate at which the gesture is progressing, and during a second portion of the gesture (e.g., the portion of the gesture as it progresses in FIGS. 10D through 10H) that occurs after the first portion of the gesture, the electronic device zooms the digital viewfinder at a second rate (e.g., an average rate) that is faster than the gesture rate at which the gesture is progressing.

In some examples, the electronic device receives a request to record a video (e.g., detecting a tap gesture at a location corresponding to the camera shutter affordance 1017) prior to detecting the gesture and, in response, the to the request to record the video electronic device records a video to memory, the video recording beginning before the gesture is detected and ending after the gesture ends. In some examples, the recorded video includes zooming that corresponds to the zooming performed in the digital viewfinder in response to the gesture. In some examples, representations of the images displayed in the viewfinder are stored in memory as part of the video, including the zooming performed. In some examples, the size of the digital viewfinder on the display is maintained while the digital viewfinder is zoomed (e.g., the content within the digital viewfinder is zoomed).

In some embodiments, as described in detail below and as illustrated in FIGS. 10C-10H: (1) during a first portion of the gesture: (a) the gesture progresses from a location 1022 corresponding to 1× magnification to a location 1024 corresponding 3× magnification and (b) the magnification level of the digital viewfinder changes from 1× magnification to 2× magnification; (2) during a second portion of the gesture: (a) the gesture progresses from the location 1024 corresponding to 3× magnification to a location 1026 corresponding 10× magnification and (b) the magnification level of the digital viewfinder changes from 2× magnification to 10× magnification. Thus, (1) during the first portion of the gesture the magnification level lags behind the gesture and (2) during the second portion of the gesture the magnification level catches up to the gesture. In some embodiments, the gradual zooming is performed even when an input that corresponds to a request to switch between discrete zoom levels is received (e.g., a tap on a 1×/2× button as described above with respect to method 800).

In some embodiments, during the first portion of the gesture the magnification level lags behind the gesture. In some embodiments, as illustrated in FIGS. 10C-10D, during the first portion of the gesture, the gesture progresses from a first state (e.g., location 1022 on the zoom control 1030) to a second state (e.g., location 1024 on the zoom control 1030), wherein the first state corresponds to the first magnification level (e.g., 1×, as illustrated in FIG. 10C, corresponding to location 1022 on the zoom control 1030) (optionally, the first state of the gesture is a state at which the contact is detected at a location that corresponds to a portion of a zoom control 1030 that corresponds to the first magnification level) and the second state corresponds to the second magnification level (e.g., 3×, as illustrated in FIG. 10E, corresponding to location 1024 on the zoom control 1030) that is higher than the first magnification level (e.g., if the gesture is maintained at the second state for at least a predetermined period of time the magnification level will come to rest at the second magnification level, optionally, the second state of the gesture is a state at which the contact is detected at a location that corresponds to a portion of the zoom control (e.g., 1030) that corresponds to the second magnification level), and the electronic device zooms the digital viewfinder from the first magnification level (e.g., 1×, as illustrated in FIG. 10C, corresponding to location 1022 on the zoom control 1030) to an intermediate magnification level (e.g., 2×, as illustrated in FIG. 10D, corresponding to location 1028 on the zoom control 1030) that is higher the first magnification level (e.g., 1×, as illustrated in FIG. 10C, corresponding to location 1022 on the zoom control 1030) and lower than the second magnification level (e.g., 3×, as illustrated in FIG. 10E, corresponding to location 1024 on the zoom control 1030) (e.g., the magnification level lags behind the gesture).

In some embodiments, during the second portion of the gesture the magnification level catches up to the gesture. In some embodiments, as illustrated in FIGS. 10D-10H, during the second portion of the gesture, the gesture progresses from the second state (e.g., location 1024 on the zoom control 1030) to a third state (e.g., location 1026 on the zoom control 1030), wherein the third state corresponds to a third magnification level (e.g., 10×, as illustrated in FIG. 10H, corresponding to location 1026 on the zoom control 1030) that is higher than the second magnification level (e.g., 3×, as illustrated in FIG. 10E, corresponding to location 1024 on the zoom control 1030) and the intermediate magnification level (e.g., 2×, as illustrated in FIG. 10D, corresponding to location 1028 on the zoom control 1030) (e.g., if the gesture is maintained at the second state for at least a predetermined period of time the magnification level will come to rest at the second magnification level optionally, the third state of the gesture is a state at which the contact is detected at a location that corresponds to a portion of the zoom control (e.g., 1030) that corresponds to the third magnification level) and the electronic device zooms the digital viewfinder from the intermediate magnification level (e.g., 2×, as illustrated in FIG. 10D, corresponding to location 1028 on the zoom control 1030) that is lower than the second magnification level (e.g., 3×, as illustrated in FIG. 10E, corresponding to location 1024 on the zoom control 1030) to the third magnification level (e.g., 10×, as illustrated in FIG. 10H, corresponding to location 1026 on the zoom control 1030). Thus, in some embodiments, during the second portion of the gesture, the magnification level catches up to the gesture, changing from the intermediate magnification level to the third magnification level, wherein the intermediate magnification level is lower than the second magnification level.

In some embodiments, as illustrated in FIGS. 10C-10F, the first portion of the gesture (e.g., as illustrated in FIGS. 10C-10D) includes movement of one or more contacts (e.g., 1010) on a touch-sensitive surface (e.g., a drag input or de-pinch input on a touch-sensitive display) and the rate at which the first portion of the gesture is progressing is based on a rate of movement (e.g., 1016) of the one or more contacts (e.g., 1010). The second portion of the gesture includes continued movement of the one or more contacts on the touch-sensitive surface (e.g., a continuation of the drag input, as illustrated in FIGS. 10D-10F, or the de-pinch input the touch-sensitive display) and the rate at which the second portion of the gesture is progressing is based on a rate of movement (e.g., 1016) of the one or more contacts (e.g., 1010). During the second portion of the gesture, the movement of the one or more contacts ceases (e.g., as illustrated in FIGS. 10G-10H) while the one or more contacts (e.g., 1010) continue to be detected on the touch-sensitive surface and, the electronic device 1000 continues to zoom the digital viewfinder 1014 after the movement of the one or more contacts (e.g., 1010) has ceased. In some embodiments, the zooming lags behind the movement of the contacts for at least a portion of the gesture and then catches up when the movement of the contacts stops.

In some embodiments, continuing to zoom the digital viewfinder after the movement of the one or more contacts (e.g., 1010) has ceased includes gradually decreasing the rate at which the magnification level is increasing. In some embodiments, the electronic device decreases the rate at which the zoom is increasing as the current magnification level approaches the third magnification level (e.g., 10×, as illustrated in FIG. 10H) that corresponds to the position (e.g., corresponding to location 1026 on the zoom control 1030) at which the one or more contacts stopped moving.

In some embodiments, zooming the digital viewfinder at a rate that is slower than the gesture rate at which the gesture is progressing includes gradually increasing the rate at which the magnification level increases when the contact (e.g., 1010) moves away from a starting position (e.g., corresponding to location 1022 on the zoom control 1030) on the touch-sensitive surface. In some embodiments, the magnification level eases into a respective rate of changing the magnification level then eases out of the rate of changing the magnification level to provide a smoother zooming effect.

In some embodiments, as illustrated in FIG. 10B-10I the electronic device 1000 concurrently displays, on the display 1012, with the digital viewfinder 1014, a zoom control 1030 (e.g., an adjustable zoom control such as a zoom slider), wherein a plurality of positions along the zoom control 1030 correspond to a plurality of magnification levels (e.g., 1×, 1.1×, 1.2×, 1.3×, etc.), and a zoom indicator affordance 1040 (e.g., a draggable circle or square on the zoom slider). In response to detecting the gesture (e.g., contact 1010), the electronic device 100 updates display of the zoom indicator affordance 1040 to transition, at the gesture rate 1016, from a first position (e.g., location 1022 on the zoom control 1030) of the plurality of positions to a second position (e.g., location 1026 on the zoom control 1030) of the plurality of positions, wherein the first position corresponds to the first magnification level (e.g., 1×, as illustrated in FIG. 10C, corresponding to location 1022 on the zoom control 1030) of the plurality of magnification levels and the second position corresponds to the third magnification level (e.g., 10×, as illustrated in FIG. 10H, corresponding to location 1026 on the zoom control 1030) of the plurality of magnification levels. Thus, in some embodiments, the electronic device enables the user to perform the zoom operation by dragging the zoom indicator affordance 1040 along the zoom control 1030.

In some embodiments, zooming the digital viewfinder from the first magnification level (e.g., 1×, as illustrated in FIG. 10C, corresponding to location 1022 on the zoom control 1030) to the third magnification level (e.g., 10×, as illustrated in FIG. 10H, corresponding to location 1026 on the zoom control 1030) includes zooming the digital viewfinder while smoothing the rate at which the zooming occurs relative to the rate at which the gesture progresses, by limiting the rate of the zoom or the rate of change of the rate of the zoom. Thus, the electronic device provides a more visually pleasing (e.g., less disorienting) zoom experience in the viewfinder and for videos recorded to memory (e.g., where the electronic device is performing a video recording operation while the gesture is detected). In some examples, the electronic device zooms the digital viewfinder while smoothing the rate at which the zoom occurs by limiting the rate of the zoom (e.g., a max rate of zoom). In some examples, the electronic device zooms the digital viewfinder while smoothing the rate at which the zoom occurs by limiting the rate of change of the rate of the zoom. In some examples, the electronic device zooms the digital viewfinder while smoothing the rate at which the zoom occurs by limiting both the rate of the zoom and the rate of change of the rate of the zoom.

Figure 10L:
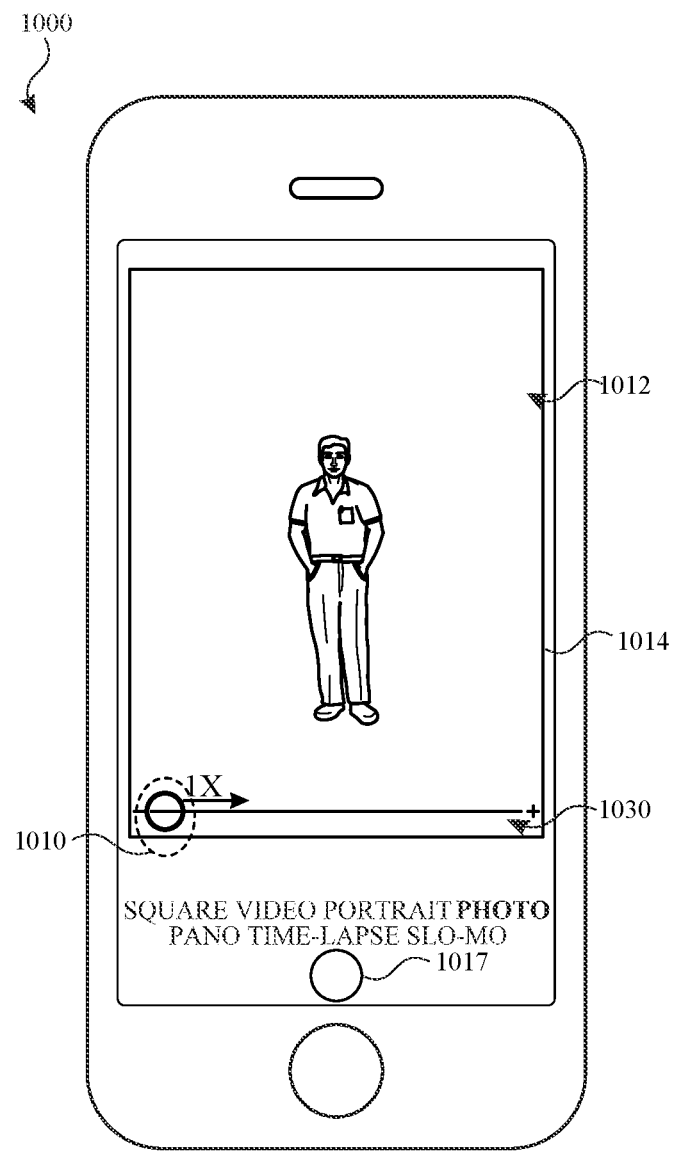
Figure 10M:
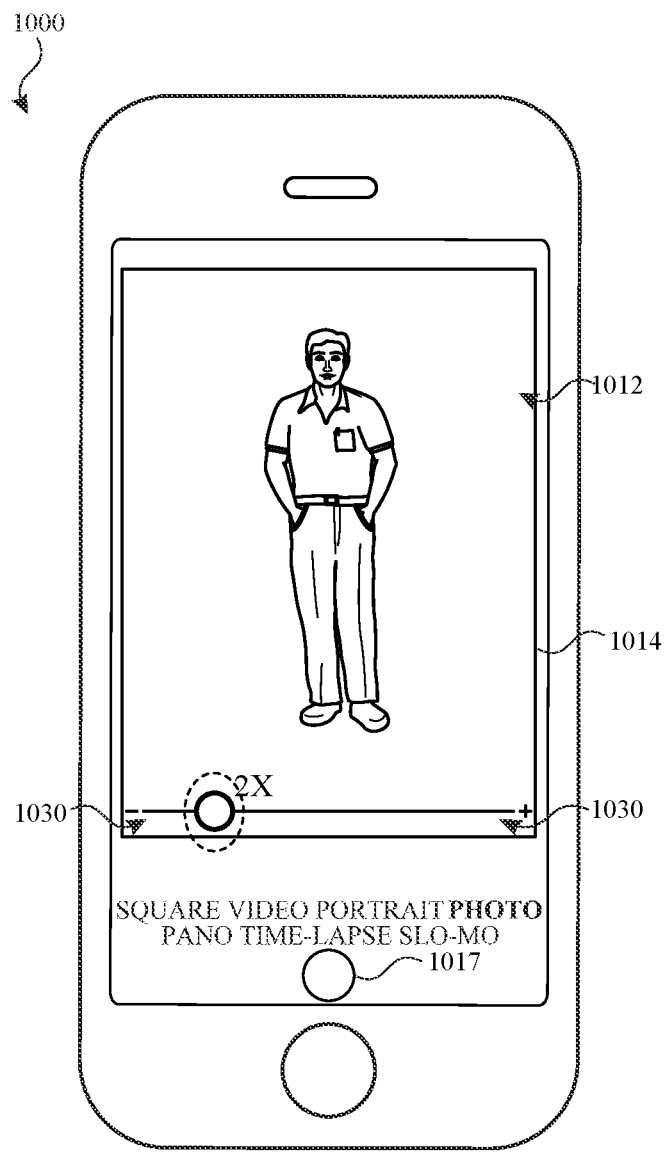
Figure 10N:
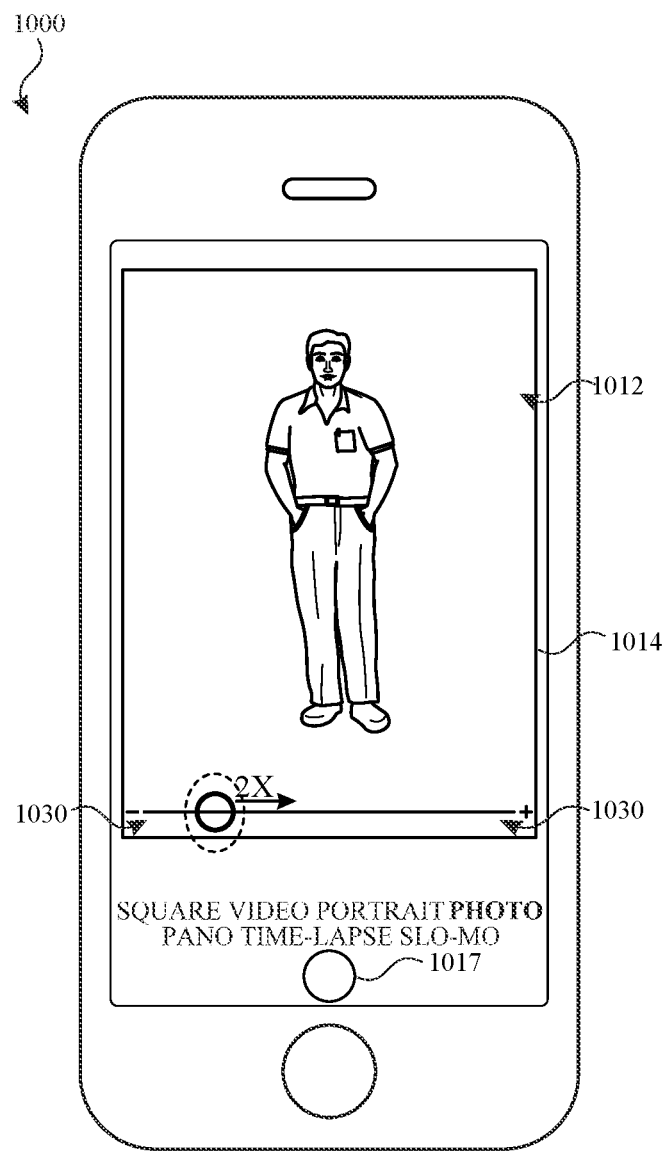
Figure 10O:
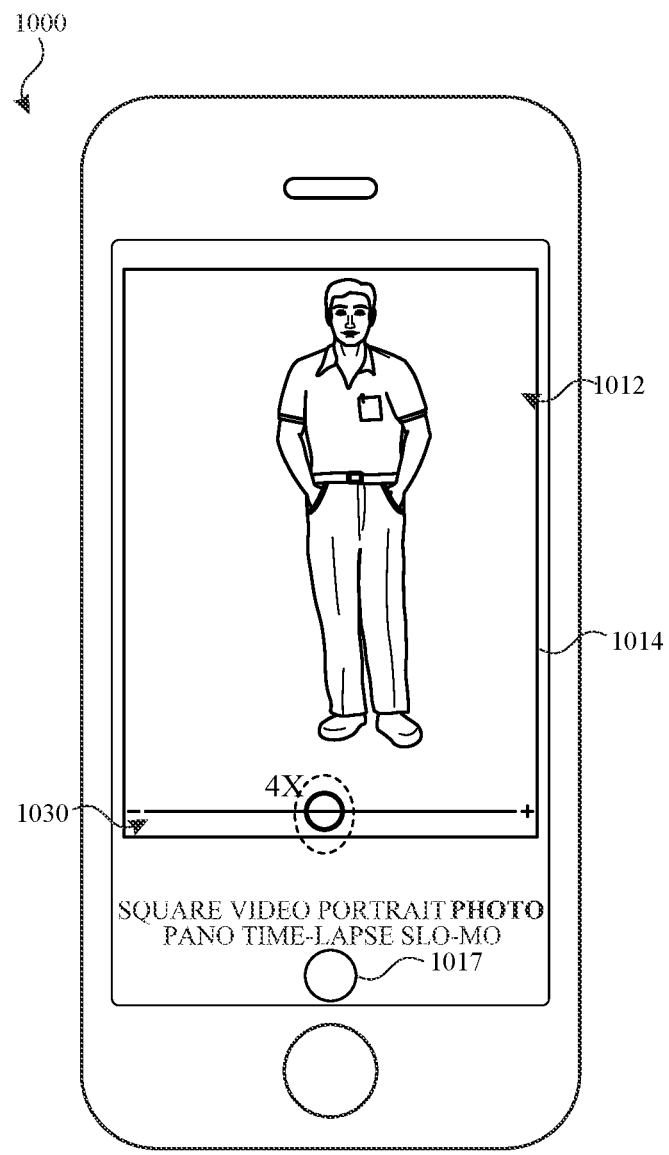

In some embodiments, as illustrated in FIG. 10L-100 during a third portion of the gesture that occurs before the first portion of the gesture, zooming the digital viewfinder (e.g., 1014) at a third rate that corresponds to the gesture rate at which the gesture is progressing (during the third portion of the gesture). Thus, when the gesture is below a threshold gesture rate, the zoom rate matches the rate gesture, allowing the user to directly control the zoom speed for videos recorded to memory.

In some embodiments, at a first time during the first portion of the gesture, the electronic device 1000 zooms the digital viewfinder 1014 at the first rate while a first gesture rate of the gesture exceeds a threshold gesture rate. In some examples, this occurs during the first portion of the gesture, where the gesture is fast and pulling away from the zoom, assuming the first rate is a maximum zoom speed and that the threshold gesture is the gesture speed that corresponds to the first rate. In some embodiments, at a second time during the second portion of the gesture, the electronic device 1000 zooms the digital viewfinder 1014 at the first rate while a second gesture rate of the gesture does not exceed the threshold gesture rate. For example, towards end of the second portion of the gesture, the gesture has slowed or stopped and the zoom is catching up at the maximum zoom speed. Thus, in some examples, the digital viewfinder 1014 reaches (and tops out at) a maximum zoom rate, which helps to smooth out zooms (e.g., that occur while a video is being recorded). Thus, the electronic device provides a more visually pleasing zoom experience in the viewfinder and for videos recorded to memory.

Figure 10P:
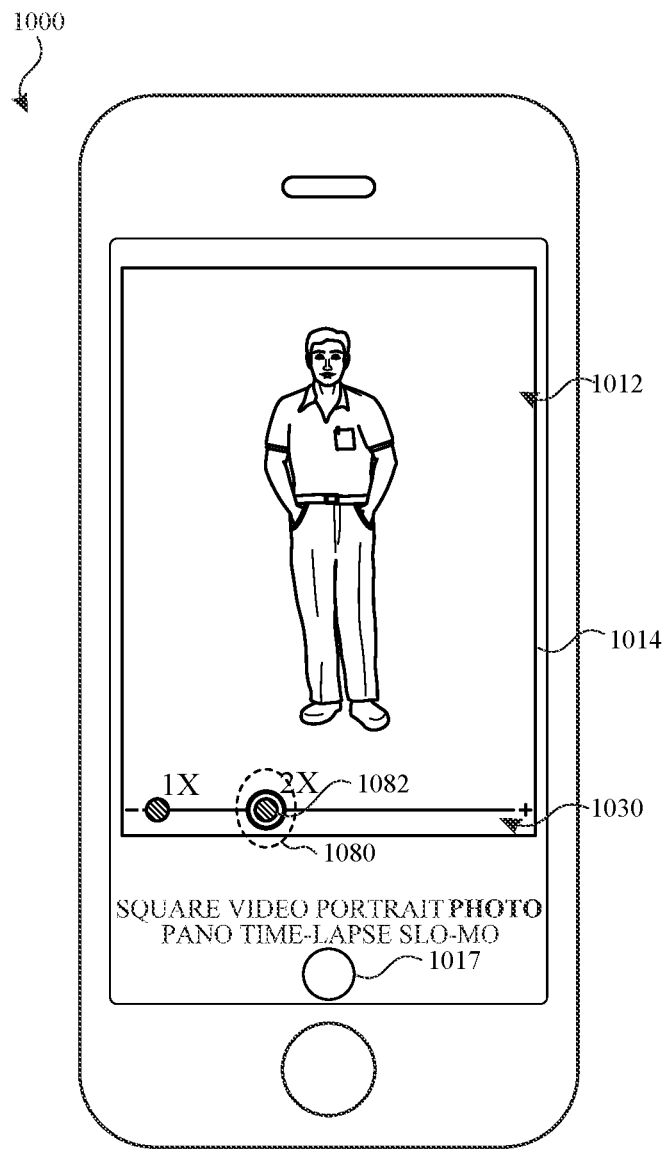

In some embodiments, as illustrated in FIG. 10P, subsequent to the electronic device 1000 detecting the gesture and subsequent to zooming the digital viewfinder from the first magnification level to the third magnification level, the electronic device 1000 detects a tap gesture 1080 (e.g., a touch gesture) at a location (e.g., 1082) corresponding to a third position of the plurality of positions (e.g., at a location on a touch-sensitive display that corresponds to the third position), wherein the third position corresponds to a fourth magnification level (e.g., 2×, corresponding to location 1082 on the zoom control) of the plurality of magnification levels. In response to detecting the tap gesture, the electronic device zooms the digital viewfinder 1014 from the third magnification level to the fourth magnification level (e.g., 2×), as illustrated in FIG. 10P. In some examples, the zooming is limited to a maximum zoom rate. In some examples, the rate of change of the zoom rate is limited to a maximum zoom-change rate. Thus, the electronic device provides a more visually pleasing zoom experience in the viewfinder and for videos recorded to memory by limiting zooms that are not smooth.

In some embodiments, as illustrated in FIGS. 10C-10H in response to detecting the gesture, the electronic device displays, on the display, a graphical magnification level indicator 1090 (e.g., including text indicating the current magnification level) that indicates a current magnification level. Thus, the electronic device informs the user as to the current magnification level.

In some embodiments, after the graphical magnification level indictor 1090 has been displayed for a predetermined period of time after zooming of the digital viewfinder has ceased, ceasing to display, on the display, the graphical magnification level indictor. In some examples, the graphical magnification level indicator is displayed while zooming the digital viewfinder and for a predetermined period of time after zooming the digital viewfinder. In some examples, the graphical zoom indicator fades out after the second predetermined amount of time has elapsed.

In some embodiments, as illustrated in FIGS. 10J-10K, after the zoom control 1030 has been displayed for a second predetermined period of time after zooming of the digital viewfinder has ceased, the electronic device 1000 ceases to display, on the display, the zoom control 1030. In some examples, the zoom control 1030 is only displayed while zooming the digital viewfinder 1014 and for a predetermined period of time after zooming the digital viewfinder 1014. In some examples, the zoom control fades out after the second predetermined amount of time has elapsed.

In some embodiments, the electronic device 1000 displays (e.g., persistently), on the display, the zoom control 1030 while displaying the digital viewfinder 1014 (e.g., zoom control is persistent). Thus, the zoom control 1030 is available to the user without the need for the user to provide additional input.

In some embodiments, the electronic device detects a pinch gesture on the digital viewfinder 1014. For example, the electronic device includes a touch-sensitive surface and the pinch gesture is detected at a location corresponding to the digital viewfinder. In response to detecting the pinch gesture, the electronic device zooms the digital viewfinder at a rate corresponding to a rate at which the pinch gesture is progressing throughout the pinch gesture (e.g., without limiting the rate of change of the zoom to smooth the rate at which the zooming occurs relative to the rate at which the gesture progresses). Thus, when the electronic device detects a pinch gesture corresponding to a zoom operation, the electronic device does not smooth the rate of the zoom. Thus, zooming that results from detecting the pinching gesture modifies the magnification level with direct manipulation such that changes in the magnification level start when the contacts start moving and end when the contacts stop moving.

Figure 10Q:
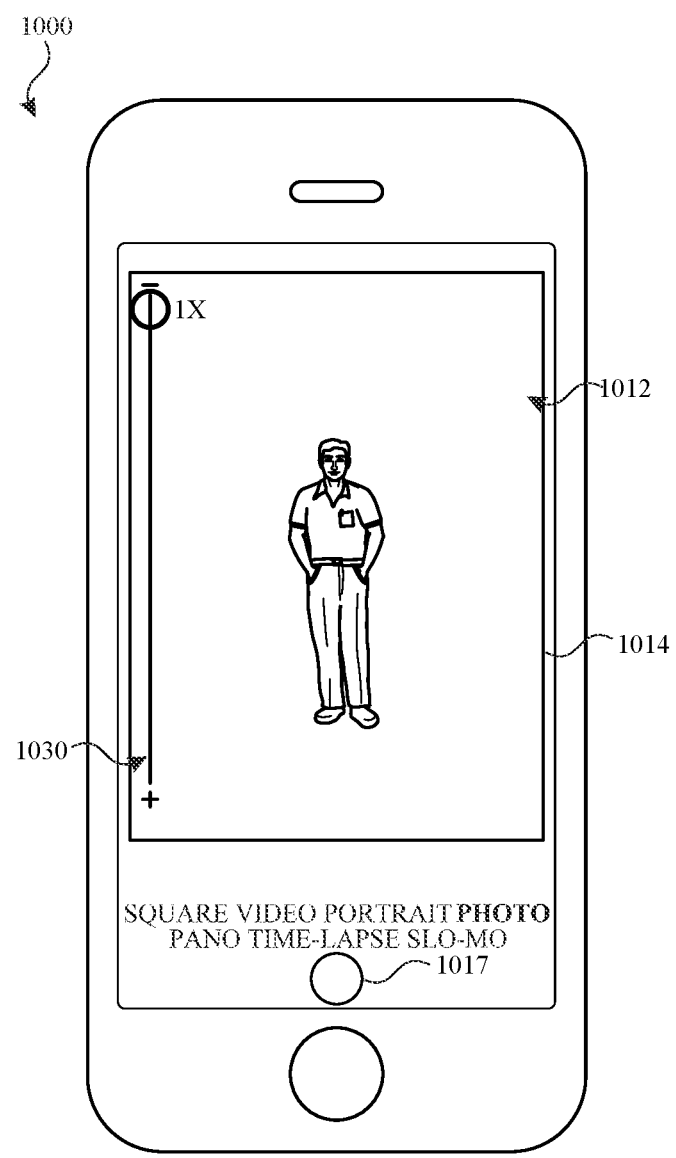
Figure 10R:
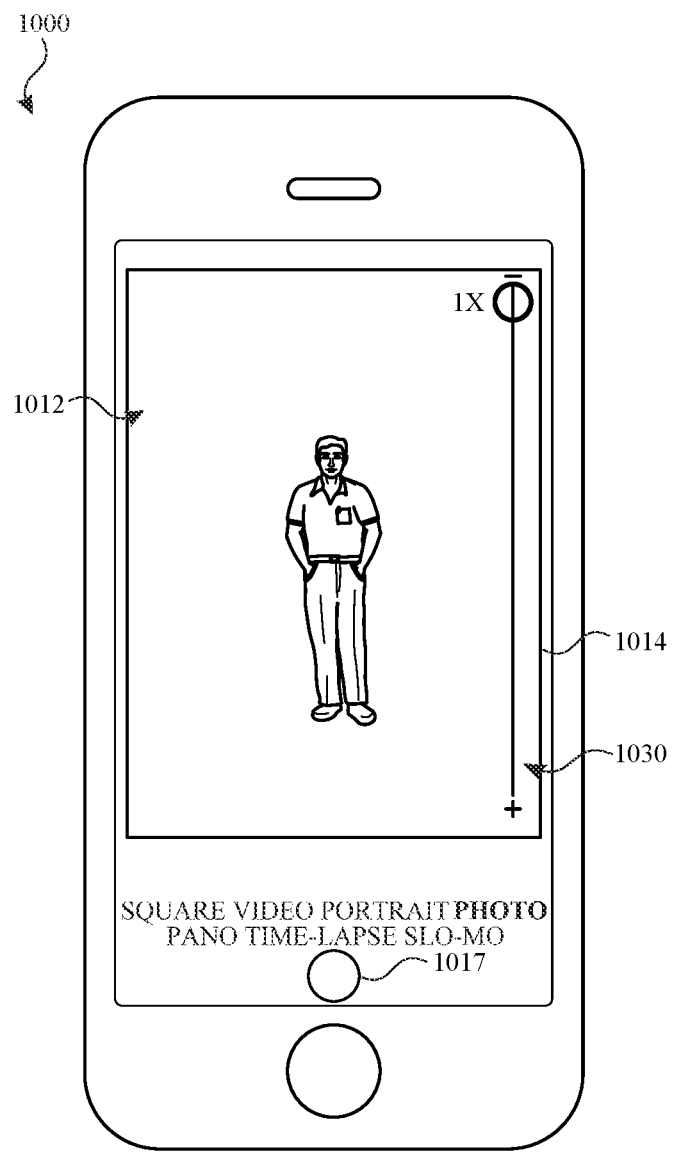

In some embodiments, as illustrated in FIGS. 10Q and 10R, displaying the zoom control 1030 includes displaying the zoom control vertically on the display. In some examples, the zoom control is a straight line. Thus, the zoom control 1030 is displayed at an orientation that is convenient for the user to access.

Figure 10S:
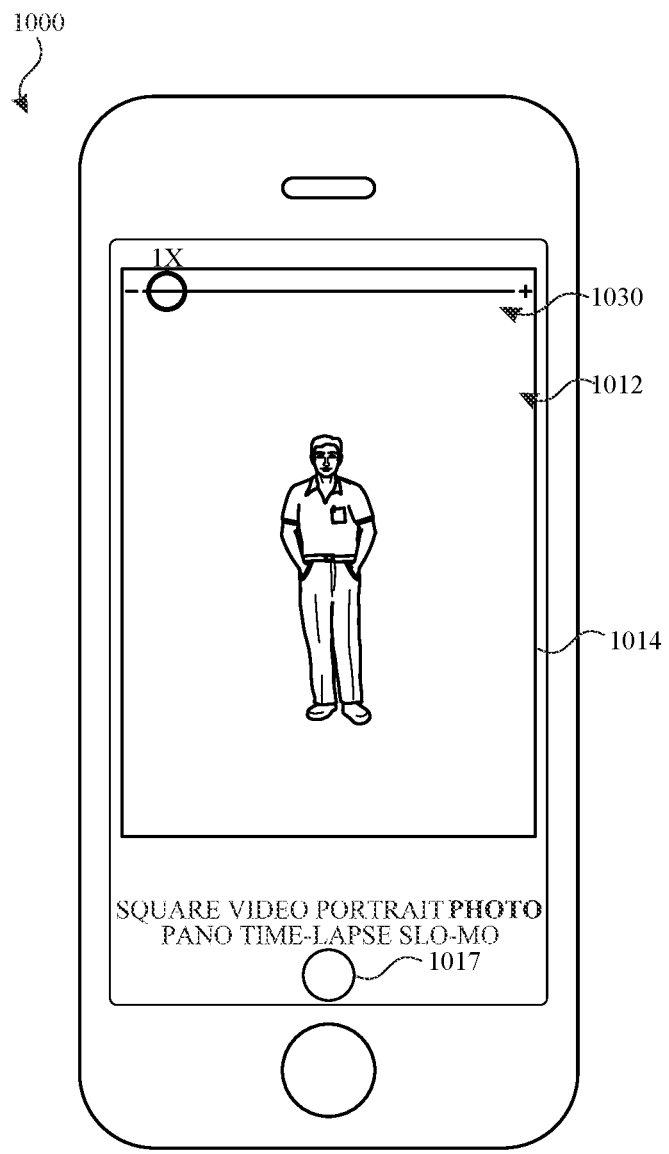

In some embodiments, as illustrated in FIGS. 10P and 10S, displaying the zoom control 1030 includes displaying the zoom control horizontally on the display. In some examples, the zoom control is a straight line. Thus, the zoom control is displayed at an orientation that is convenient for the user to access.

In some embodiments, as illustrated in FIG. 10T the plurality of positions corresponding to the plurality of magnification levels are positioned along the zoom control 1092 such that the magnification levels are not distributed linearly. In some embodiments, the plurality of positions corresponding to the plurality of magnification levels are positioned along the zoom control 1090 such that the magnification levels are distributed linearly. The examples illustrated in FIG. 10T are exemplary and the hashes and magnification levels are provided for explanatory purposes.

In some embodiments, as illustrated in FIG. 10T, the distance along the zoom control between a location 1094 corresponding to the lowest magnification level (e.g., 1× magnification) and a location 1098 corresponding to a magnification level that is double the lowest magnification level (e.g., 2× magnification) extends (e.g., 1096) more than 25% of a total distance (length) of the zoom control and less than 45% of the total distance (length) of the zoom control (e.g., 30% of the total distance of the zoom control).

In some embodiments, as illustrated in FIG. 10T, locations (e.g., 1093, 1095, 1094, 1098) along the zoom control (e.g., 1090, 1092) corresponding to optical magnification levels are visually distinguished (e.g., snap points) from locations (e.g., 1097, 1099) along the zoom control corresponding to non-optical magnification levels. In some examples, the zoom control (e.g., 1090, 1092) includes markers for the 1× and 2× magnification levels, which correspond to optical zooms of a first camera and a second camera of the electronic device.

In some embodiments, taping at a location that corresponds to an optical magnification level transitions the display from the current magnification level to the optical magnification level. In some embodiments, the third position of the plurality of positions corresponds to an optical magnification level. In some embodiments, a smoothed zooming effect, as described above, is used with other zoom controls, such as the zoom controls described with reference to method 900 and method 1300.

FIG. 11 is a flow diagram illustrating a method for managing camera effects, in accordance with some embodiments. Method 1100 is performed at an electronic device (e.g., 100, 300, 500, 600, 800, 1000) with a first camera, a second camera, and a display. Some operations in method 900 are, optionally, combined, the order of some operations are, optionally, changed, and some operations are, optionally, omitted.

At block 1102, the electronic device (e.g., 1000) displays, on the display (e.g., 1012): a digital viewfinder (e.g., 1014) based on data received from the one or more cameras (e.g., 1002, 1004) (e.g., a live or near-live preview image from either sensor). In some examples, the digital viewfinder (e.g., 1014) displays data based only one of the first and second cameras (e.g., 1002, 1004).

At block 1104, while displaying the digital viewfinder (e.g., 1014), the electronic device (e.g., 1000) detects a gesture (e.g., 1010), a drag gesture on a touch-sensitive surface) that progresses at a gesture rate (e.g., 1016), the gesture (e.g., 1010) corresponding to an instruction to zoom the digital viewfinder (e.g., 1014) from a first magnification level to a third magnification level.

At block 1106, in response to detecting the gesture (e.g., 1010), the electronic device (e.g., 1000) zooms the digital viewfinder (e.g., 1014) from the first magnification level to a second magnification level and from the second magnification level to a third magnification level, including: at block 1108, during a first portion of the gesture, the electronic device (e.g., 1000) zooms the digital viewfinder (e.g., 1014) at a first rate (e.g., an average rate) that is slower than the gesture rate (e.g., 1016) at which the gesture is progressing, and at block 1112 during a second portion of the gesture that occurs after the first portion of the gesture, the electronic device (e.g., 1000) zooms the digital viewfinder (e.g., 1014) at a second rate (e.g., an average rate) that is faster than the gesture rate (e.g., 1016) at which the gesture is progressing. Thus, by zooming the digital viewfinder (during the first portion of the gesture) at the first rate that is slower than the gesture rate, the electronic device performs smooth, cinematic-style zooms with reduced (or eliminated) sudden zooms in the viewfinder (and in recorded videos), even when the user provides imprecise or fast gestures for zooming.

Similarly, by zooming the digital viewfinder (during the second portion of the gesture) at a second rate that is faster than the gesture rate, the electronic device performs smooth, cinematic-style zooms while catching up to the user's gesture to achieve the user's requested zoom.

In some examples, the first camera (e.g., 1002) and the second camera (e.g., 1004) have fixed, but different, focal lengths. In some examples, the focal length, field of view, and optical zoom properties of the optical system is fixed for each of the cameras (e.g., 1002, 1004), but the fixed focal length is different between the first camera (e.g., 1002) and the second camera (e.g., 1004). In some examples, the electronic device (e.g., 1000) receives a request to record a video prior to detecting the gesture and, in response, the electronic device (e.g., 1000) records a video to memory, the video recording beginning before the gesture is detected and ending after the gesture ends. In some examples, the recorded video includes zooming that corresponds to the zooming performed in the digital viewfinder (e.g., 1014). In some examples, the same (or similar) images displayed in the viewfinder are stored in memory for the video.

At block 1110, during the first portion of the gesture: the gesture progresses from a first state to a second state, wherein the first state corresponds to the first magnification level and the second state corresponds to the second magnification level that is higher than the first magnification level (e.g., if the gesture is maintained at the second state for at least a predetermined period of time the magnification level will come to rest at the second magnification level), and the electronic device (e.g., 1000) zooms the digital viewfinder (e.g., 1014) from the first magnification level to an intermediate magnification level that is higher the first magnification level and lower than the second magnification level (e.g., the magnification level lags behind the gesture). Thus, by zooming the digital viewfinder (during the first portion of the gesture) to the intermediate magnification level that is less than the second magnification level (to which the second state corresponds), the electronic device performs smooth, cinematic-style zooms with reduced (or eliminated) sudden zooms in the viewfinder (and in recorded videos), even when the user provides imprecise or fast gestures for zooming.

At block 1114, during the second portion of the gesture: the gesture progresses from the second state to a third state, wherein the third state corresponds to a third magnification level that is higher than the second magnification level and the intermediate magnification level (e.g., if the gesture is maintained at the second state for at least a predetermined period of time the magnification level will come to rest at the second magnification level), and the electronic device (e.g., 1000) zooms the digital viewfinder (e.g., 1014) from the intermediate magnification level that is lower than the second magnification level to the third magnification level (e.g., the magnification level catches up to the gesture, changing from the intermediate magnification level to the third magnification level, wherein the intermediate magnification level is lower than the second magnification level). Thus, by zooming the digital viewfinder (during the second portion of the gesture) to the third magnification level (that corresponds to the third state), the electronic device performs smooth, cinematic-style zooms while catching up to the user's gesture to achieve the user's requested zoom.

In some embodiments, the first state of the gesture is a state at which the contact (e.g., 1010) is detected at a location that corresponds to a portion of a zoom control (e.g., 1030) that corresponds to the first magnification level. In some embodiments, the second state of the gesture (e.g., 1010) is a state at which the contact is detected at a location that corresponds to a portion of the zoom control (e.g., 1030) that corresponds to the second magnification level). In some embodiments, the third state of the gesture (e.g., 1010) is a state at which the contact is detected at a location that corresponds to a portion of the zoom control (e.g., 1030) that corresponds to the third magnification level.

In accordance with some embodiments, the first portion of the gesture includes movement of one or more contacts (e.g., 1010) on a touch-sensitive surface (e.g., a drag input or de-pinch input on a touch-sensitive display (e.g., 1012)) and the rate at which the first portion of the gesture is progressing is based on a rate of movement of the one or more contacts (e.g., 1010). Thus, because the rate of the gesture is based on the rate of movement of the contacts, the electronic devices provides a user-machine interface that performs intuitive zoom operations based on contact inputs. The second portion of the gesture includes continued movement of the one or more contacts (e.g., 1010) on the touch-sensitive surface (e.g., a continuation of the drag input or the de-pinch input the touch-sensitive display) and the rate at which the second portion of the gesture is progressing is based on a rate of movement of the one or more contacts (e.g., 1010), during the second portion of the gesture, the movement of the one or more contacts (e.g., 1010) ceases while the one or more contacts (e.g., 1010) continue to be detected on the touch-sensitive surface. In some examples, the electronic device 1000 continues to zoom the digital viewfinder (e.g., 1014) after the movement of the one or more contacts (e.g., 1010) has ceased (e.g., the zooming lags behind the movement of the contacts (e.g., 1010) for at least a portion of the gesture and then catches up when the movement of the contacts (e.g., 1010) stops.

In accordance with some embodiments, continuing to zoom the digital viewfinder (e.g., 1014) after the movement of the one or more contacts (e.g., 1010) has ceased includes gradually decreasing the rate at which the magnification level is increasing (e.g., decreasing the rate at which the zoom is increasing as the current magnification level approaches the third magnification level that corresponds to the position at which the one or more contacts (e.g., 1010) stopped moving). Thus, by managing the rate of the magnification based on the movement of the contacts ceasing (or slowing), the electronic device performs smooth, cinematic-style decreases in the zoom while achieving the user's requested zoom, even when the gesture includes abrupt changes.

In accordance with some embodiments, zooming the digital viewfinder (e.g., 1014) at a rate that is slower than the gesture rate (e.g., 1012) at which the gesture is progressing includes gradually increasing the rate at which the magnification level increases when the contact moves away from a starting position on the touch-sensitive surface (e.g., so that the magnification level eases into a respective rate of changing the magnification level then eases out of the rate of changing the magnification level to provide a smoother zooming effect). Thus, by managing the rate of the magnification based on the movement of the contacts away from the starting position, the electronic device performs smooth, cinematic-style increases in the zoom, even when the gesture includes abrupt changes.

In accordance with some embodiments, the electronic device (e.g., 1000) concurrently displays, on the display (e.g., 1012), with the digital viewfinder (e.g., 1014): a zoom control (e.g., 1030) (e.g., an adjustable zoom control (e.g., 1030) such as a zoom slider), wherein a plurality of positions along the zoom control (e.g., 1030) correspond to a plurality of magnification levels, and a zoom indicator affordance (e.g., 1040) (e.g., a draggable circle/square/any shape on the zoom slider). In response to the electronic device (e.g., 1000) detecting the gesture, the electronic device (e.g., 1000) updates display of the zoom indicator affordance (e.g., 1040) to transition, at the gesture rate (e.g., 1012), from a first position of the plurality of positions to a second position of the plurality of positions, wherein the first position corresponds to the first magnification level of the plurality of magnification levels and the second position corresponds to the third magnification level of the plurality of magnification levels. Thus, the electronic device (e.g., 1000) enables the user to perform the zoom operation by dragging the zoom indicator affordance (e.g., 1040) along the zoom control (e.g., 1030).

In accordance with some embodiments, zooming the digital viewfinder (e.g., 1014) from the first magnification level to the third magnification level includes zooming the digital viewfinder (e.g., 1014) while smoothing the rate at which the zooming occurs relative to the rate at which the gesture progresses, by limiting the rate of the zoom or the rate of change of the rate of the zoom. Thus, by managing the rate of the magnification, the electronic device performs smooth, cinematic-style zooms, even when the gesture includes abrupt changes or is fast. Thus, the electronic device (e.g., 1000) provides a more visually pleasing zoom experience in the viewfinder and for videos recorded to memory. In some examples, the electronic device (e.g., 1000) zooms the digital viewfinder (e.g., 1014) while smoothing the rate at which the zoom occurs by limiting the rate of the zoom (e.g., a max rate of zoom). In some examples, the electronic device (e.g., 1000) zooms the digital viewfinder (e.g., 1014) while smoothing the rate at which the zoom occurs by limiting the rate of change of the rate of the zoom. In some examples, the electronic device (e.g., 1000) zooms the digital viewfinder (e.g., 1014) while smoothing the rate at which the zoom occurs by limiting both the rate of the zoom and the rate of change of the rate of the zoom.

In accordance with some embodiments, during a third portion of the gesture that occurs before the first portion of the gesture, the electronic device (e.g., 1000) zooms the digital viewfinder (e.g., 1014) at a third rate that corresponds to the gesture rate (e.g., 1012) at which the gesture is progressing. Thus, the electronic device (e.g., 1000) provides a more visually pleasing zoom experience in the viewfinder and for videos recorded to memory.

In accordance with some embodiments, at a first time during the first portion of the gesture, the electronic device (e.g., 1000) zooms the digital viewfinder (e.g., 1014) at the first rate while a first gesture rate (e.g., 1016) of the gesture exceeds a threshold gesture rate, and (where the gesture is fast and pulling away from the zoom, assuming the first rate is the max zoom speed and the threshold gesture is the gesture speed that corresponds to the first rate) at a second time during the second portion of the gesture, the electronic device (e.g., 1000) zooms the digital viewfinder (e.g., 1014) at the first rate while a second gesture rate (e.g., 1016) of the gesture does not exceed the threshold gesture rate (where the gesture has slowed or stopped and the zoom is catching up at the max zoom speed). Thus, by limiting zooming the digital viewfinder to a maximum zoom speed, the electronic device performs smooth, cinematic-style zooms with reduced (or eliminated) high-speed zooms in the viewfinder (and in recorded videos), even when the user provides imprecise or fast gestures for zooming. Thus, in some examples, the digital viewfinder (e.g., 1014) reaches (e.g., maxes out at) a maximum zoom rate, which helps to smooth out zooms that occur while a video is being recorded. Thus, the electronic device (e.g., 1000) provides a more visually pleasing zoom experience in the viewfinder and for videos recorded to memory.

In accordance with some embodiments, subsequent to detecting the gesture (e.g., 1010) and subsequent to zooming the digital viewfinder (e.g., 1014) from the first magnification level to the third magnification level: the electronic device (e.g., 1000) detects a tap gesture (e.g., 1080, a touch gesture) at a location corresponding to a third position of the plurality of positions (e.g., at a location on a touch-sensitive display (e.g., 1012) that corresponds to the third position), wherein the third position corresponds to a fourth magnification level of the plurality of magnification levels. In response to detecting the tap gesture (e.g., 1080), the electronic device (e.g., 1000) zooms the digital viewfinder (e.g., 1014) from the third magnification level to the fourth magnification level.

In accordance with some embodiments, the zooming is limited to a maximum zoom rate. In some examples, the rate of change of the zoom rate is limited to a maximum zoom-change rate. Thus, the electronic device (e.g., 1000) provides a more visually pleasing zoom experience in the viewfinder and for videos recorded to memory by limiting zooms that are not smooth.

In accordance with some embodiments, in response to detecting the gesture, the electronic device (e.g., 1000) displays, on the display (e.g., 1012), a graphical magnification level indicator (e.g., 1090) (e.g., including text indication of the current magnification level) that indicates a current magnification level. Thus, the electronic device (e.g., 1000) informs the user as to the current magnification level.

In accordance with some embodiments, after the graphical magnification level indictor has been displayed for a predetermined period of time after zooming of the digital viewfinder (e.g., 1014) has ceased, the electronic device (e.g., 1000) ceases to display, on the display (e.g., 1012), the graphical magnification level indictor. Thus, by ceasing to display the graphical magnification level indicator when it is likely that the user needs access to the graphical magnification level indicator (e.g., after a predetermined period of time), the electronic device provides a less obstructed user interface (and, for example, viewfinder) that results in a more efficient user-machine interface. In some examples, the graphical magnification level indicator (e.g., 1090) is displayed while zooming the digital viewfinder (e.g., 1014) and for a predetermined period of time after zooming the digital viewfinder (e.g., 1014). In some examples, the graphical zoom indicator fades out after the second predetermined amount of time has elapsed.

In accordance with some embodiments, after the zoom control (e.g., 1030) has been displayed for a second predetermined period of time after zooming of the digital viewfinder (e.g., 1014) has ceased, the electronic device (e.g., 1000) ceases to display, on the display (e.g., 1012), the zoom control (e.g., 1030). In some examples, the zoom control (e.g., 1030) is only displayed while zooming the digital viewfinder (e.g., 1014) and for a predetermined period of time after zooming the digital viewfinder (e.g., 1014). In some examples, the zoom control (e.g., 1030) fades out after the second predetermined amount of time has elapsed.

In accordance with some embodiments, the electronic device (e.g., 1000) displays (e.g., persistently), on the display (e.g., 1012), the zoom control (e.g., 1030) while displaying the digital viewfinder (e.g., 1014) (e.g., zoom control (e.g., 1030) is persistent.) Thus, the zoom control (e.g., 1030) is available to the user without the need for the user to provide additional input.

In accordance with some embodiments, the electronic device (e.g., 1000) detects a pinch gesture on the digital viewfinder (e.g., 1014) (e.g., the electronic device (e.g., 1000) includes a touch-sensitive surface and the pinch gesture is detected at a location corresponding to the digital viewfinder (e.g., 1014).). In response to detecting the pinch gesture: the electronic device (e.g., 1000) zooms the digital viewfinder (e.g., 1014) at a rate corresponding to a rate at which the pinch gesture is progressing throughout the pinch gesture (e.g., without limiting the rate of change of the zoom to smooth the rate at which the zooming occurs relative to the rate at which the gesture progresses). Thus, by zooming the digital viewfinder (e.g., 1014) at a rate that corresponds to the rate of the gesture, the electronic device provides the user with a mechanism that avoids the zoom-managing techniques described above, thereby providing the user with an option to directly manipulate the zoom of the viewfinder (and recorded videos), including zooms with high speeds and abrupt changes. Thus, when the electronic device (e.g., 1000) detects a pinch gesture corresponding to a zoom operation, the electronic device (e.g., 1000) does not smooth the rate of the zoom, so that the zooming while pinching adjusts the magnification level with direct manipulation such that changes in the magnification level start when the contacts (e.g., 1010) start moving and end when the contacts (e.g., 1010) stop moving.

In accordance with some embodiments, the plurality of positions corresponding to the plurality of magnification levels are positioned along the zoom control (e.g., 1092, 1030) such that the magnification levels are not distributed linearly.

In accordance with some embodiments, a distance along the zoom control (e.g., 1030) between the lowest magnification level (e.g., 1× magnification) and a magnification level that is double the lowest magnification level (e.g., 2× magnification) extends more than 25% of a total distance of the zoom control and less than 45% of the total distance of the zoom control (e.g., 1030) (e.g., 30% of the total distance of the zoom control (e.g., 1030)).

In accordance with some embodiments, locations along the zoom control (e.g., 1030) corresponding to optical magnification levels are visually distinguished (e.g., snap points) from locations along the zoom control (e.g., 1030) corresponding to non-optical magnification levels. In some examples, the zoom control (e.g., 1030) includes markers for the 1× and 2× magnification levels, which correspond to optical zooms of a first camera and a second camera of the electronic device (e.g., 1000). Thus, by providing visually distinguished locations along the zoom control that correspond to optical magnification levels (as compared to non-optical magnification levels), the electronic device informs the user as to the magnification levels that are optical and (for example) provide higher quality image characteristics, thereby reducing the need for the user to provide multiple inputs to try varying zoom magnification levels to achieve an image with high quality.

In accordance with some embodiments, the third position of the plurality of positions corresponds to an optical magnification level.

In accordance with some embodiments, displaying the zoom control (e.g., 1030) includes displaying the zoom control (e.g., 1030 of FIGS. 10Q and 10R) vertically on the display (e.g., 1012). In some examples, the zoom control (e.g., 1030) is a straight line. Thus, the zoom control (e.g., 1030, 1092) is displayed at an orientation that is convenient for the user to access.

In accordance with some embodiments, displaying the zoom control (e.g., 1030) includes displaying the zoom control (e.g., 1030 of FIGS. 10B and 10S) horizontally on the display (e.g., 1012). In some examples, the zoom control (e.g., 1030, 1092) is a straight line. Thus, the zoom control (e.g., 1030) is displayed at an orientation that is convenient for the user to access.

Note that details of the processes described above with respect to method 1100 (e.g., FIG. 11) are also applicable in an analogous manner to the methods described below. For example, methods 700, 900, 1300, 1900, 2100, and 2300 optionally include one or more of the characteristics of the various methods described above with reference to method 1100. For example, the electronic viewfinder in method 1100 is analogous to the electronic viewfinder in methods 700, 900, 1300, 1900, 2100, and 2300. For brevity, these details are not repeated below.

FIGS. 12A-12I illustrate exemplary devices and user interfaces for managing camera effects, in accordance with some embodiments. The user interfaces in these figures are used to illustrate processes described below, including the processes in FIG. 13.

Figure 12A:
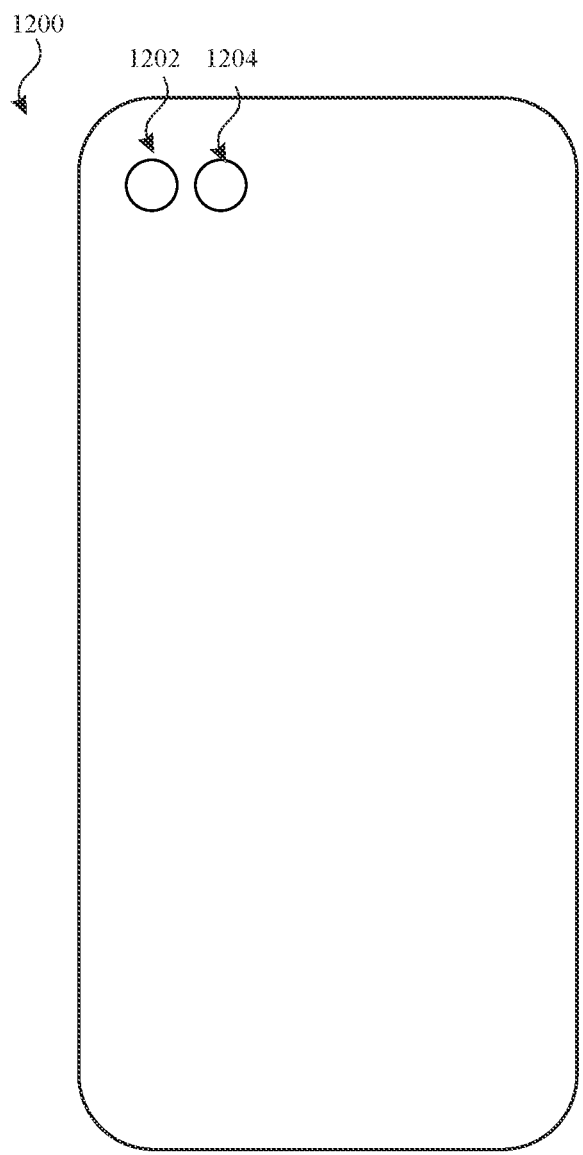
FIGS. 12A-12I illustrate exemplary devices and user interfaces for managing camera effects, in accordance with some embodiments.
Figure 13:
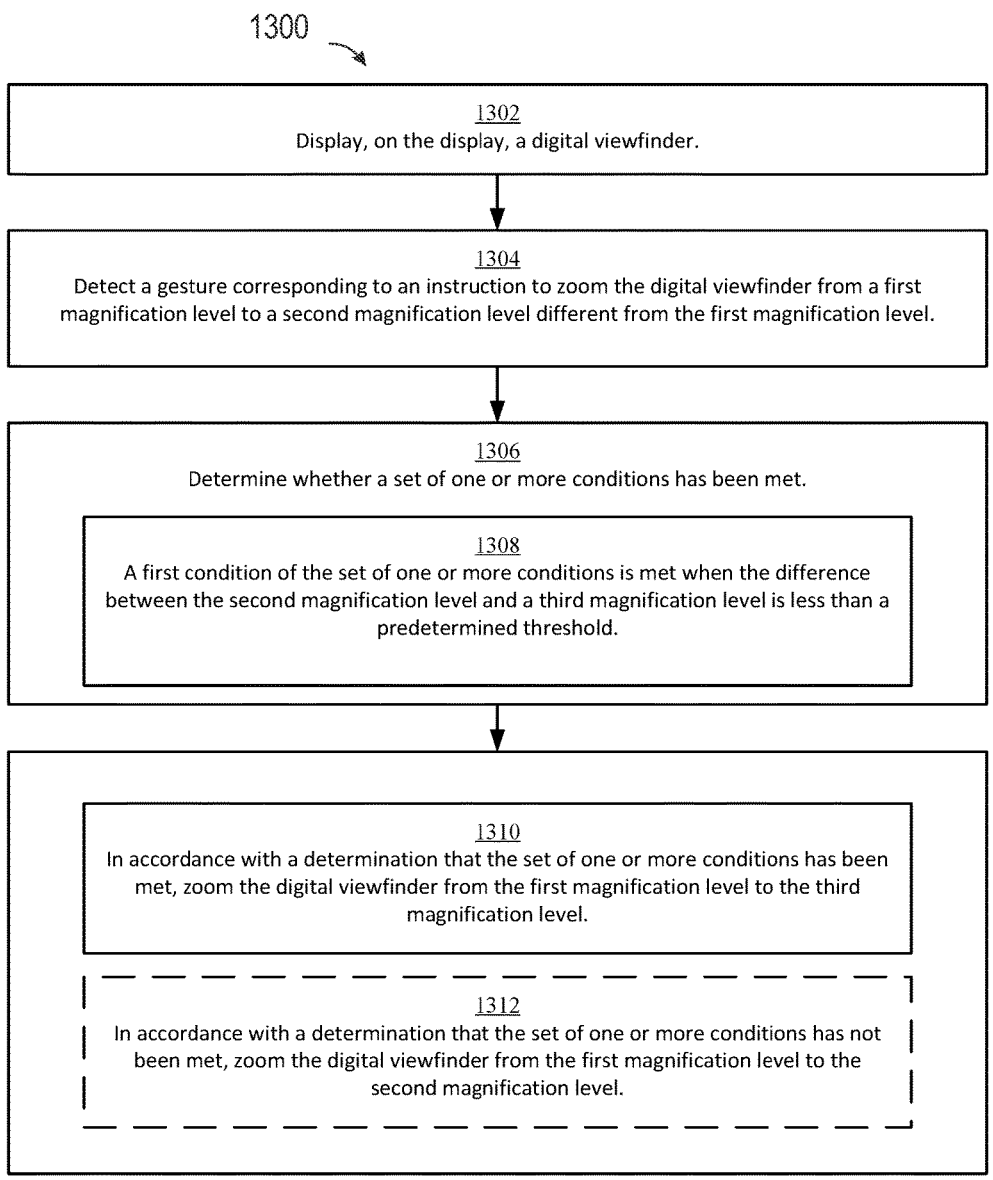
FIG. 13 is a flow diagram illustrating a method for managing camera effects, in accordance with some embodiments.

FIG. 12A illustrates an exemplary electronic device 1200 with a first camera 1202, and optionally, a second camera 1204, on the rear of the electronic device 1200. In some examples, the first camera 1202 and the second camera 1204 have fixed, but different, focal lengths. In some examples, the focal length, field of view, and/or optical magnification properties of the optical system is fixed for each of the cameras, In some embodiments, in addition to having different fixed focal lengths, the cameras (e.g., 1202, 1204) have different fixed fields of view and different fixed optical magnification properties.

In some embodiments, the first camera 1202 has a first field of view and the second camera 1204 has a second field of view, wherein the first field of view and the second field of view overlap. In some examples, the first camera 1202 and the second camera 1204 are spaced apart so that a parallax between images captured by the camera (e.g., 1202 and 1204) is used to determine depths for objects represented by different portions of the digital viewfinder. In some embodiments, the first camera 1202 and the second camera 1204 are located on a surface of the electronic device 1200 and the optical axes of the cameras (e.g., 1202 and 1204) are arranged such that they are parallel. In some examples, the first camera 1202 and the second camera 1204 capture overlapping fields of view, for example, at least 50% overlapping, at least 90% overlapping, or more. In some examples, the first camera 1202 has a wider field of view than the second camera 1204. In some examples, the second camera 1204 has a wider field of view than the first camera 1202. When a wide-angle camera (e.g., a camera with a wide-angle lens) has a wider field of view than a telephoto camera (e.g., a camera with a telephoto lens), at a 1× magnification of the wide-angle camera objects appear further away than at a 1× magnification of the telephoto camera. If the wide-angle camera and the telephoto camera have overlapping fields of view such that the field of view of the telephoto camera is approximately centered on the field of view of the wide angle camera, an image captured with the telephoto camera at a 1× magnification level will, in some circumstances (e.g., where the subject of the image is at least 1 meter away), appear to be an optical zoom of a corresponding image captured with the wide-angle camera at a 1× magnification level.

Figure 12B:
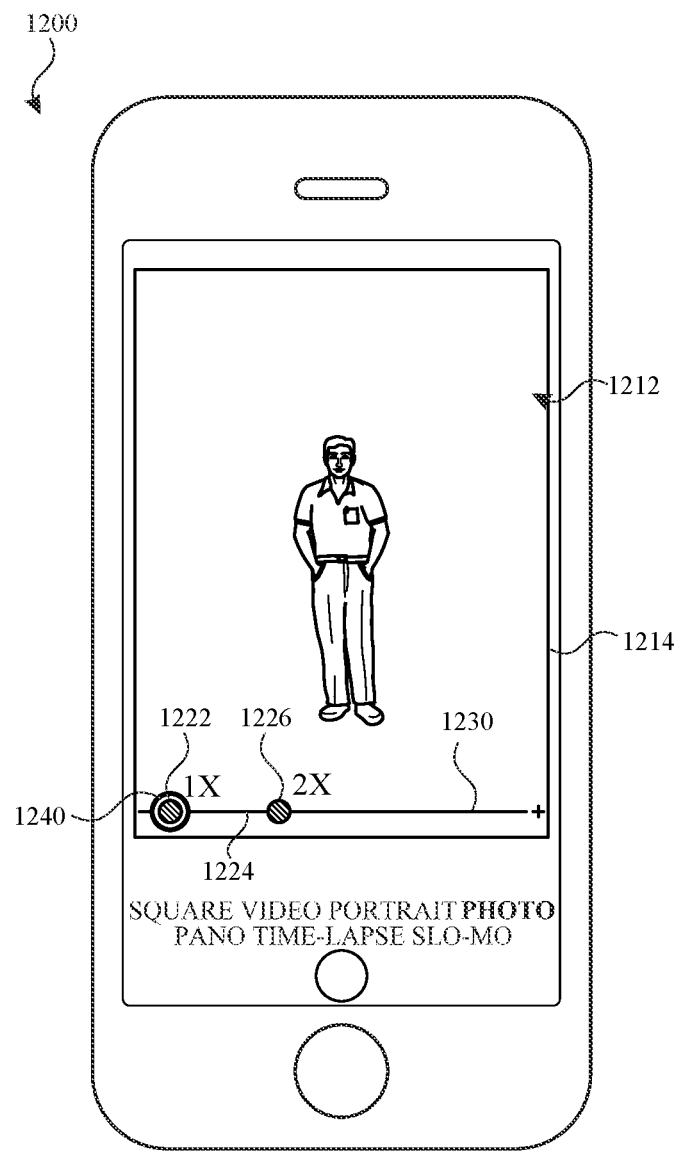

FIG. 12B illustrates the front of the electronic device 1200 including display 1212. As illustrated in FIG. 12B, in some embodiments, the electronic device displays, on the display 1212, a digital viewfinder 1214 (e.g., including a live or near-live preview image from the first camera 1202 or the second camera 1204 of the electronic device). In FIG. 12B, the digital viewfinder 1214 is at the first magnification level (e.g., corresponding to location 1222 on the zoom control 1230).

In some embodiments, as illustrated in FIG. 12B, prior to detecting the gesture, the electronic device 1200 concurrently displays, on the display, with the digital viewfinder 1214, a zoom control 1230, wherein a plurality of positions (e.g., 1222, 1224, 1226) along the zoom control 1230 correspond to a plurality of magnification levels, a zoom indicator affordance 1240 at a first position 1222 of the plurality of positions along the zoom control 1230 corresponding to the first magnification level (e.g., a draggable circle or square on the zoom control slider), and a target zoom point at a third position 1226 of the plurality of positions along the zoom control that is different from the first position 1222, wherein the third position 1226 corresponds to the third magnification level, and wherein a second position 1224 of the plurality of positions along the zoom control 1230 corresponds to the second magnification level. Thus, the electronic device 1200 provides the user with visual indications of the available magnification levels.

Figure 12C:
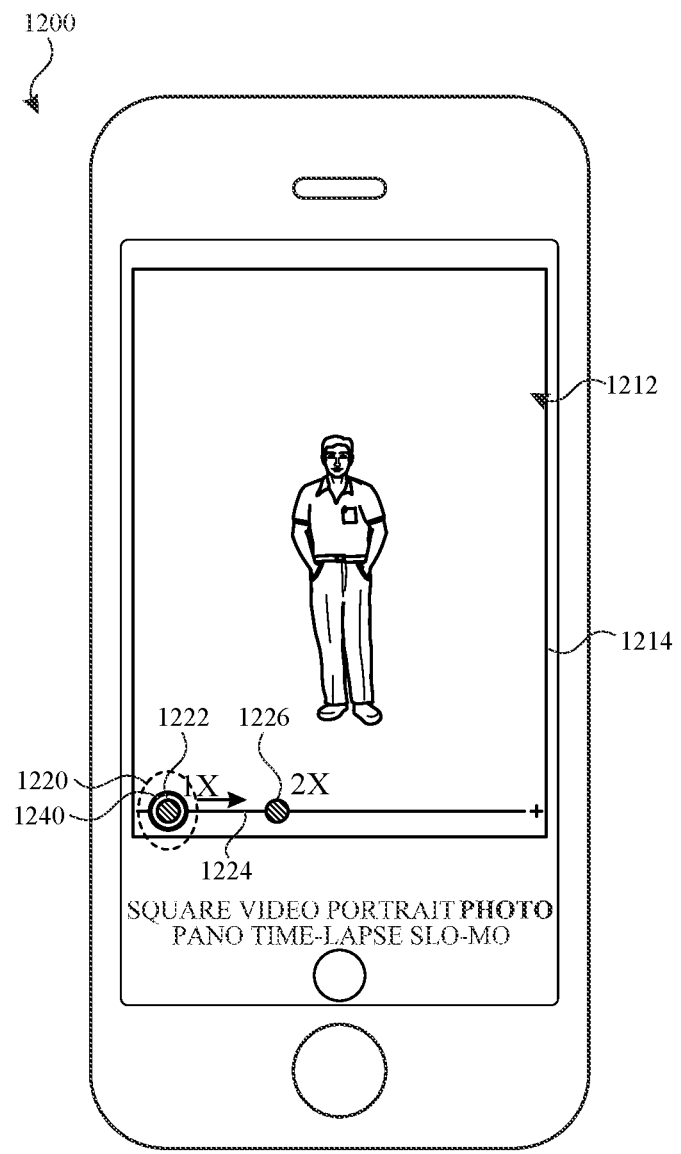
Figure 12D:
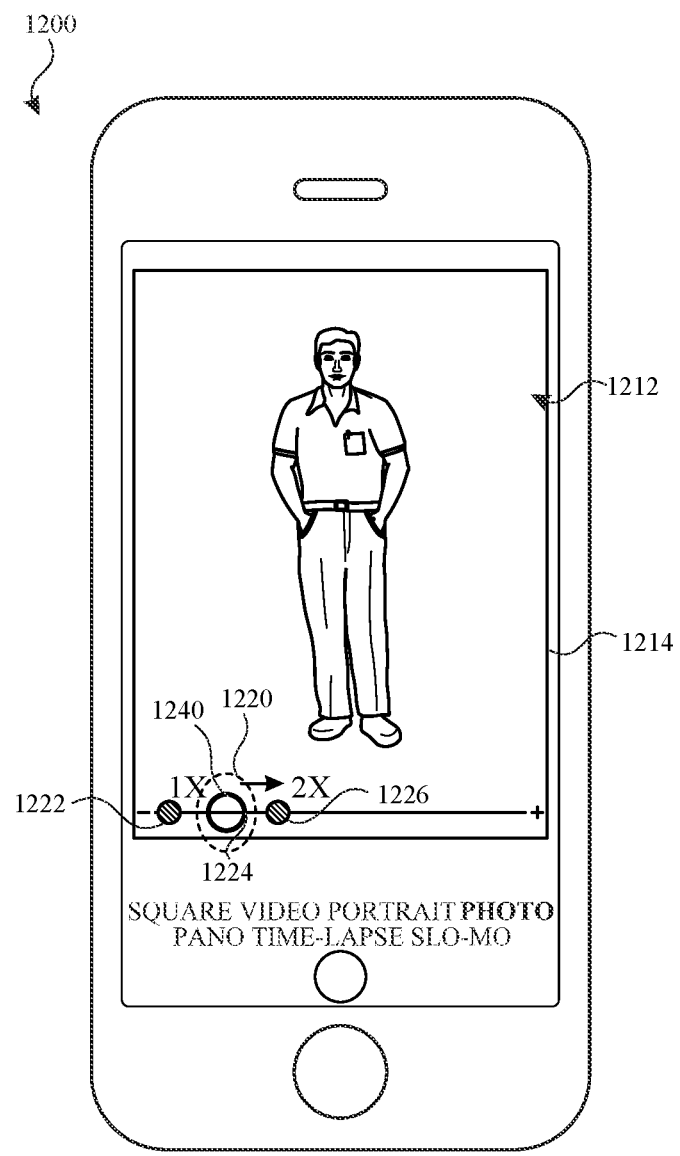
Figure 12E:
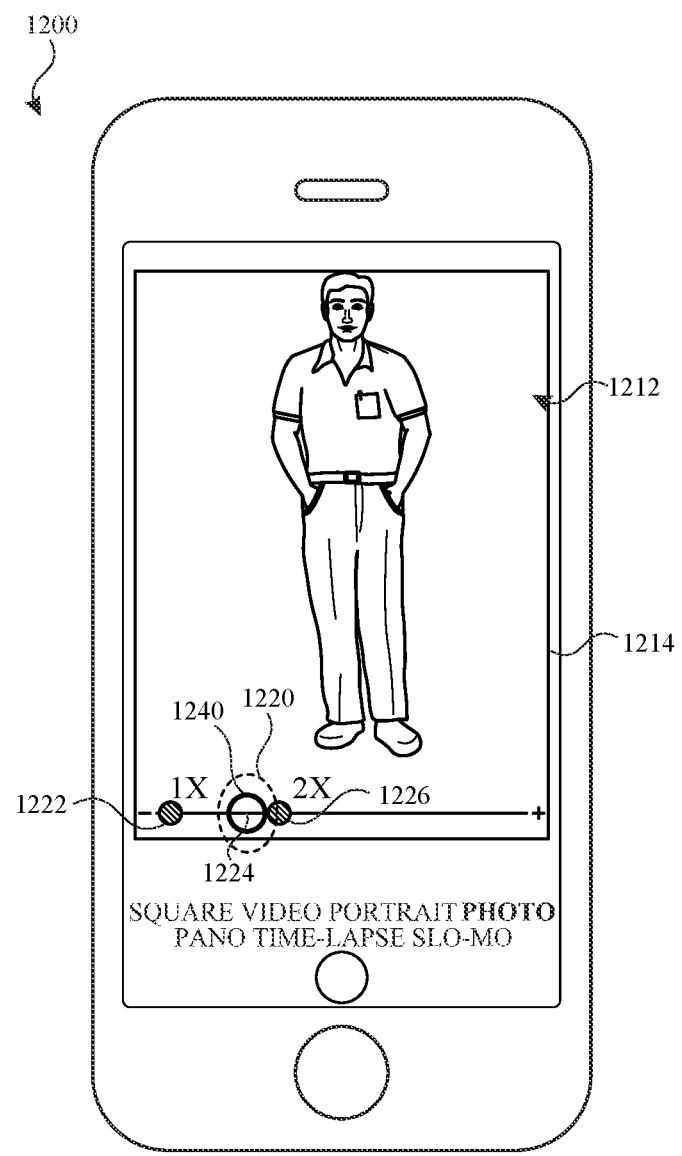

As illustrated in FIGS. 12C-12E, the electronic device 1200 detects a gesture 1220 (e.g., a drag gesture, a pinch gesture, a tap gesture) corresponding to an instruction to zoom the digital viewfinder 1214 from a first magnification level (e.g., a 1× magnification level of a first camera of the device, corresponding to location 1222 on the zoom control 1230) to a second magnification level (e.g., a magnification level corresponding to a digital zoom of the first camera, a 1.8× magnification level, a magnification level corresponding to the first camera, corresponding to location 1224 on the zoom control 1230) different from the first magnification level. The electronic device determines whether a set of one or more conditions has been met, wherein a first condition of the set of one or more conditions is met when the difference (e.g., the absolute difference) between the second magnification level (e.g., corresponding to location 1224 on the zoom control 1230) and a third magnification level (e.g., a magnification level that corresponds to a 1× magnification level of a second camera of the device with a different focal length than the first camera, corresponding to location 1226 on the zoom control 1230) is less than a predetermined threshold (e.g., within 0.25× magnification) (e.g., a magnification level corresponding to an optical magnification level, 2× magnification, a magnification level corresponding to the second camera). The electronic device, in accordance with a determination that the set of one or more conditions has been met, zooms the digital viewfinder 1214 from the first magnification level 1222 to the third magnification level 1226 (e.g., automatically, without additional user input). In some examples, the predetermined zoom threshold is small enough such that it is advantageous to zoom the viewfinder from the first magnification level (that is a digital magnification) to a second magnification level (that is an optical magnification level). In some examples, the third magnification level is different from the second magnification level.

In some examples, the third magnification level is higher than the second magnification level, and the second magnification level is higher than the first magnification level.

In some embodiments, in accordance with a determination that the set of one or more conditions has not been met, the electronic device 1200, zooms the digital viewfinder 1214 from the first magnification level (e.g., corresponding to location 1222 on the zoom control 1230) to the second magnification level (e.g., corresponding to location 1224 on the zoom control 1230) (e.g., automatically, without additional user input).

In some embodiments, as illustrated in FIG. 12E, a second condition of the set of one or more conditions is met when the second magnification level (e.g., corresponding to location 1224 on the zoom control 1230) is less than the third magnification level (e.g., corresponding to location 1226 on the zoom control 1230). In some examples, the device 1200 automatically zooms the digital viewfinder 1214 to the third magnification level if the user has initiated a change to a magnification that is less than the third magnification level.

In some embodiments, a third condition of the set of one or more conditions is met when the second magnification level (e.g., corresponding to location 1224 on the zoom control 1230) is more than the third magnification level (e.g., corresponding to location 1226 on the zoom control 1230). In some examples, the device 1200 automatically zooms the digital viewfinder 1214 to the third magnification level if the user has initiated a change to a magnification that is more than the third magnification level.

In some embodiments, a fourth condition of the set of one or more conditions is met when the absolute difference between the first magnification level (e.g., corresponding to location 1222 on the zoom control 1230) and the second magnification level (e.g., corresponding to location 1224 on the zoom control 1230) is greater than a second predetermined threshold level. In some examples, the device 1200 automatically zooms to the third magnification level if the user has initiated a change that exceeds the predetermined adjustment threshold. Thus, if the user initiates a change that is minor or relatively small, the electronic device recognizes that the user is trying to achieve a very particular magnification level and does not automatically zoom the digital viewfinder to the third magnification level.

In some embodiments, as illustrated in FIG. 12E, the second magnification level (e.g., corresponding to location 1224 on the zoom control 1230) corresponds to a digital magnification level and wherein the third magnification level (e.g., corresponding to location 1226 on the zoom control 1230) corresponds to an optical magnification level. Thus, the electronic device automatically transitions the digital viewfinder 1214 to a magnification that is optical, rather than digital. In some examples, this provides a higher quality viewfinder and higher quality images that are captured using the magnification.

In some embodiments the electronic device includes a first camera 1202 and a second camera 1204, and wherein the displayed digital viewfinder 1214 is based on data received from at least one of the first camera 1202 and the second camera 1204. In some embodiments the electronic device 1200 includes a first camera 1202 not the second camera 1204.

In some embodiments, the digital viewfinder 1214 is based on data received from the first camera 1202 (e.g., not the second camera 1204) when the digital viewfinder 1214 is zoomed to the second magnification level (e.g., corresponding to location 1224 on the zoom control 1230) and wherein the digital viewfinder 1214 is based on data received from the second camera 1204 (e.g., not the first camera 1202) when the digital viewfinder 1214 is zoomed to the third magnification level (e.g., corresponding to location 1226 on the zoom control 1230).

Figure 12F:
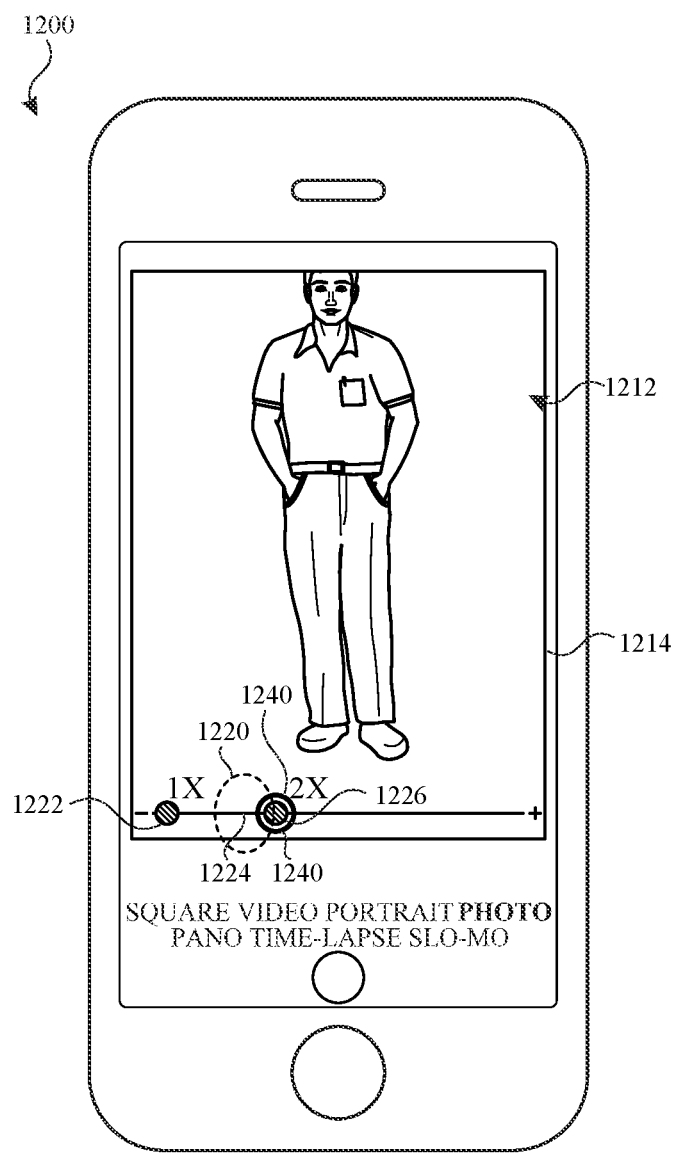
Figure 12G:
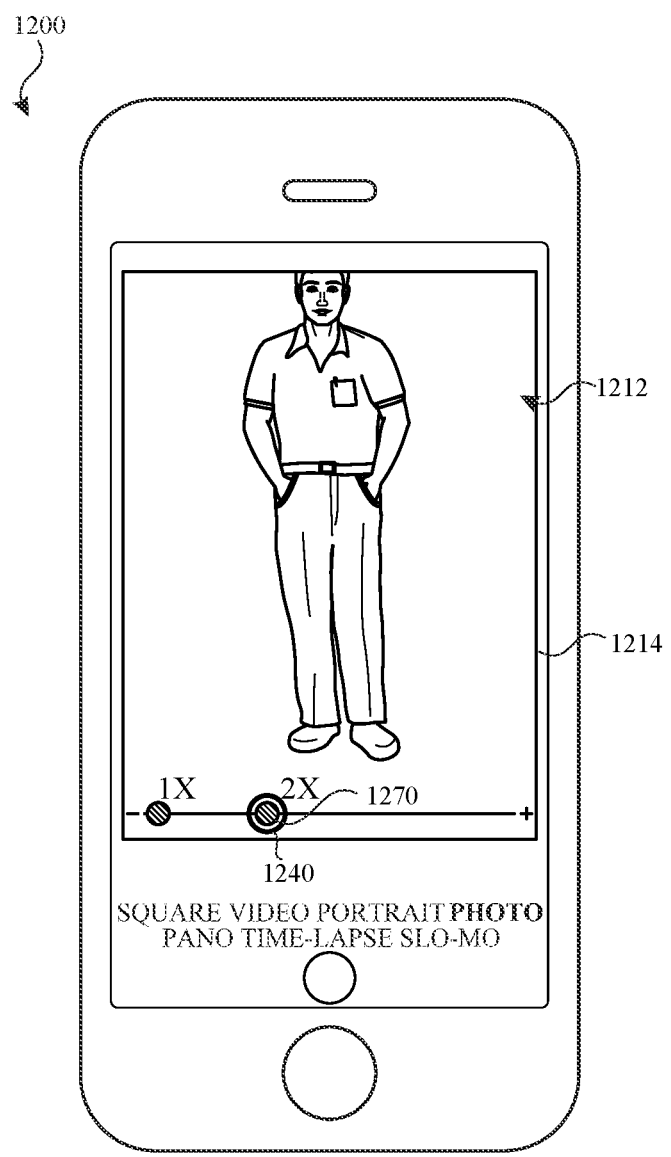

In some embodiments, as illustrated in FIG. 12F, in accordance with a determination that the set of one or more conditions has been met, the electronic device 1200, updates the display of the zoom indicator affordance 1240 from the first position 1222 to the third position 1224 corresponding to the third magnification level. Thus, the electronic device provides the user with visual indications of the current and available magnification levels. In some examples, in accordance with a determination that the set of one or more conditions has been met, the electronic device 1200 updates the display of the zoom indicator affordance 1240 to the third position 1224 corresponding to the third magnification level.

In some embodiments, in accordance with a determination that the set of one or more conditions has not been met, the electronic device 1200 updates display of the zoom indicator affordance 1240 from the first position 1222 to the second position 1224 corresponding to the second magnification level. Thus, the electronic device provides the user with visual indications of the current and available magnification levels.

Figure 12H:
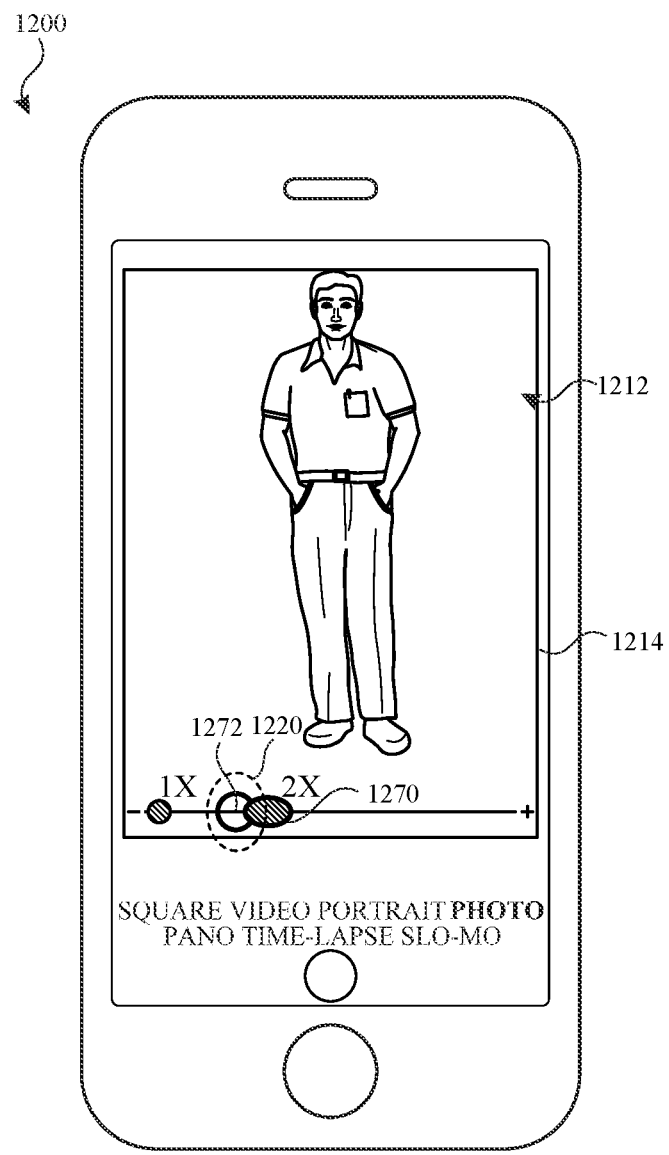
Figure 12I:
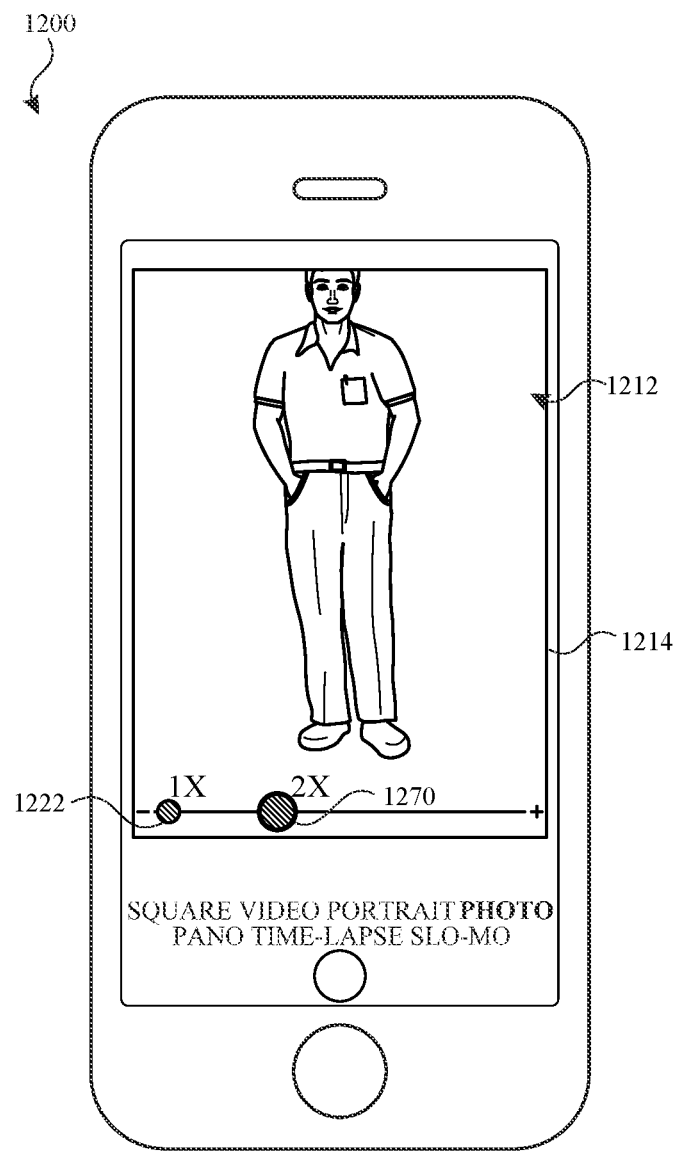

In some embodiments, as illustrated in FIG. 12H and FIG. 12I, in accordance with the determination that the set of one or more conditions has been met, the electronic device 1200 updates display of the target zoom point 1270 to expand to encapsulate the zoom indicator affordance when the zoom indicator affordance 1240 is displayed at the second position 1272 (e.g., within a predetermined distance from the target zoom point 1270, within a predetermined distance from the third position 1226). In some examples, the zoom indicator affordance 1240 expands to encapsulate the target zoom point 1270 (which, for example, remains stationary and visually unchanged) as the zoom indicator affordance 1240 gets closer to the target zoom point (e.g., within a predetermined distance from the target zoom point 1270, within a predetermined distance from the third position 1226).

In some embodiments, as illustrated in FIG. 12I, a fifth condition of the set of one or more conditions is met the electronic device 1200 detects an input lift-off signal associated with the gesture 1220. In some examples, the electronic device 1200 determines that the gesture 1220 has ended, such as by detecting a lift-off of a touch performed on a touch-sensitive surface.

In some embodiments, the first camera 1202 has a first field of view and the second camera 1204 has a second field of view. In some examples, the first field of view and the second field of view overlap. In some examples, the first field of view and the second field of view are different. In some examples, zooming the digital viewfinder 1214 from the first magnification level to the third magnification level includes, visually compensating for the difference between the first field of view and the second field of view to reduce shifting of an image displayed in the digital viewfinder 1214. In some examples, the electronic device shifts the images in the digital viewfinder to counter the parallax effect when transitioning the electronic viewfinder 1214 from display based on data from the first camera 1202 to display based on data from the second camera 1204.

In some embodiments, while the magnification level of the digital viewfinder 1214 is at a fourth magnification level that is different from the third magnification level, the electronic device 1200, detects a tap input at a location (e.g., 1226) that corresponds to a respective portion of the zoom control 1230. In response to the electronic device 1200 detecting the tap input, in accordance with a determination, at the electronic device 1200, that the respective portion of the zoom control 1230 corresponds to the third magnification level, the electronic device zooms the digital viewfinder 1214 to the third magnification level. For example, the electronic device 1214 zooms the digital viewfinder 1214 to the magnification level that corresponds to a 1× magnification level of a second camera 1204 of the device (e.g., which displays in the user interface as a "2×" magnification of the electronic viewfinder 1214, based on the second camera 1204 having an optical magnification that is 2× that of the first camera 1202) in response to a tap gesture on the portion of the zoom control that corresponds to the 1× magnification level of the second camera 1204 of the device. In accordance with a determination that the respective portion of the zoom control corresponds to a magnification level that is different from the third magnification level 1226, the electronic device maintain the digital viewfinder 1214 at the fourth magnification level.

In some embodiments, the electronic device 1214 does not zoom to a different magnification level in response to a tap gesture somewhere else on the zoom control. Thus, in some embodiments, it is easier for the user to get back to the 1× magnification level of the second camera of the device than to other magnification levels so as to make it easier for the user to select the 1× magnification level of the second camera of the device. This provides better visual quality for images than magnification levels at which a digital zoom operation is being performed by digitally cropping and enlarging a 1× magnification image captured by a corresponding camera.

In some embodiments, the 1× magnification level for the first camera 1202 can also be tapped (e.g., detecting a tap gesture) to switch to the 1× magnification level for the first camera 1202. In some embodiments, 1× magnification levels for one or more additional cameras can also be tapped to switch to the 1× magnification level for those cameras, while still discouraging the user from causing the electronic device 1200 to switch to magnification levels between 1× magnification levels for the different cameras (e.g., intermediate magnification levels between the 1× magnification levels for the different cameras, that correspond to magnification levels at which a digital zoom operation is being performed, can be reached by dragging a thumb of a zoom control to a location corresponding to one of those intermediate magnification levels).

FIG. 13 is a flow diagram illustrating a method for managing camera effects, in accordance with some embodiments. Method 1300 is performed at an electronic device (e.g., 100, 300, 500, 600, 800, 1000, 1200) with a first camera, a second camera, and a display. Some operations in method 1300 are, optionally, combined, the order of some operations are, optionally, changed, and some operations are, optionally, omitted.

At block 1302, the electronic device (e.g., 1200) displays, on the display (e.g., 1212), a digital viewfinder (e.g., 1214) (e.g., including a live or near-live preview image from a first camera (e.g., 1202) or a second camera (e.g., 1204) of the electronic device (e.g., 1200)).

At block 1304, the electronic device (e.g., 1200) detects a gesture (e.g., 1220) (e.g., a drag gesture, a pinch gesture, a tap gesture) corresponding to an instruction to zoom the digital viewfinder (e.g., 1214) from a first magnification level (e.g., a 1× magnification level of a first camera (e.g., 1202) of the electronic device (e.g., 1200)) to a second magnification level (e.g., a magnification level corresponding to a digital zoom of the first camera (e.g., 1202), a 1.8× magnification level, a magnification level corresponding to the first camera (e.g., 1202)) different from the first magnification level.

At blocks 1306-1308, the electronic device (e.g., 1200) determines whether a set of one or more conditions has been met. A first condition of the set of one or more conditions is met when the difference (e.g., the absolute difference) between the second magnification level and a third magnification level (e.g., a magnification level that corresponds to a 1× magnification level of a second camera (e.g., 1204) of the device with a different focal length than the first camera (e.g., 1202)) is less than a predetermined threshold (e.g., within 0.25× magnification) (e.g., a magnification level corresponding to an optical magnification level, 2× magnification, a magnification level corresponding to the second camera (e.g., 1204)). Thus, by including a condition that is met when the user attempts to zoom to a magnification level that is close to the third magnification level (e.g., an optical magnification level), the electronic device avoids making large changes to the magnification level requested by the user, thus avoiding the need for the user to readjust the magnification multiple times to achieve a desired effect. In some examples, the third magnification level is different from the second magnification level.

At block 1310, in accordance with a determination that the set of one or more conditions has been met, the electronic device (e.g., 1200) zooms the digital viewfinder (e.g., 1214) from the first magnification level to the third magnification level (e.g., automatically, without additional user input). In some examples, the predetermined zoom threshold is small enough such that it is advantageous to zoom the viewfinder (e.g., 1214) from the first magnification level (e.g., a digital magnification) to a second magnification level (e.g., an optical magnification level). Thus, by zooming the digital viewfinder to the third magnification level (e.g., an optical magnification level), the electronic device precisely zooms the digital viewfinder to a pre-selected magnification level even when the user input is imprecise.

At block 1312, in accordance with some embodiments, in accordance with a determination that the set of one or more conditions has not been met, the electronic device (e.g., 1200) zooms the digital viewfinder (e.g., 1214) from the first magnification level to the second magnification level (e.g., automatically, without additional user input).

In accordance with some embodiments, a second condition of the set of one or more conditions is met when the second magnification level is less than the third magnification level. In some examples, the device automatically moves to the third magnification level if the user has initiated a change to a magnification that is less than the third magnification level. Thus, by including a condition that is only met when the user-requested magnification level is less than the pre-selected magnification level (e.g., the third magnification level), the electronic device automatically overrides the user's requested zoom of the digital viewfinder in some circumstances, while the user maintains control in other circumstances, thereby eliminating the need for the user to provide inputs to selectively enable and disable the feature.

In accordance with some embodiments, a third condition of the set of one or more conditions is met when the second magnification level is more than the third magnification level. In some examples, the device automatically moves to the third magnification level if the user has initiated a change to a magnification that is more than the third magnification level. Thus, by including a condition that is only met when the user-requested magnification level is more than the pre-selected magnification level (e.g., the third magnification level), the electronic device automatically overrides the user's requested zoom of the digital viewfinder in some circumstances, while the user maintains control in other circumstances, thereby eliminating the need for the user to provide inputs to selectively enable and disable the feature.

In accordance with some embodiments, a fourth condition of the set of one or more conditions is met when the absolute difference between the first magnification level and the second magnification level is greater than a second predetermined threshold level. In some examples, the device automatically moves to the third magnification level if the user has initiated a change that exceeds the predetermined adjustment threshold. Thus, if the user initiates a change that is minor or relatively small, the electronic device (e.g., 1200) recognizes that the user is trying to achieve a very particular magnification level and does not automatically zoom the digital viewfinder (e.g., 1214) to the third magnification level, thereby providing the user with the ability to achieve precise zooming using precise user inputs, while maintaining the ability to achieve precise zooming using imprecise user inputs.

In accordance with some embodiments, the second magnification level corresponds to a digital magnification level and wherein the third magnification level corresponds to an optical magnification level. Thus, the electronic device (e.g., 1200), by automatically transitioning the digital viewfinder (e.g., 1214) to a magnification that is optical, rather than digital, overrides the user's requested magnification level (e.g., the second magnification level) so that the viewfinder (and accordingly, pictures taken while displaying the viewfinder) uses a magnification level that does not rely on digital zoom, thereby providing higher quality images. In some examples, this provides a higher quality viewfinder (e.g., 1214) and higher quality images that are captured using the magnification.

In accordance with some embodiments, the electronic device (e.g., 1200) includes a first camera (e.g., 1202) and a second camera (e.g., 1204), and wherein the displayed digital viewfinder (e.g., 1214) is based on data received from at least one of the first camera (e.g., 1202) and the second camera (e.g., 1204).

In accordance with some embodiments, the digital viewfinder (e.g., 1214) is based on data received from the first camera (e.g., 1202) (e.g., not the second camera (e.g., 1204)) when the digital viewfinder (e.g., 1214) is zoomed to the second magnification level and wherein the digital viewfinder (e.g., 1214) is based on data received from the to the second camera (e.g., 1204) (e.g., not the first camera (e.g., 1202)) when the digital viewfinder (e.g., 1214) is zoomed to the third magnification level.

In accordance with some embodiments, prior to detecting the gesture (e.g., 1220), the electronic device (e.g., 1200) concurrently displays, on the display (e.g., 1212), with the digital viewfinder (e.g., 1214): a zoom control (e.g., 1230), wherein a plurality of positions along the zoom control (e.g., 1230) correspond to a plurality of magnification levels, a zoom indicator affordance (e.g., 1240) at a first position of the plurality of positions along the zoom control (e.g., 1230) corresponding to the first magnification level (e.g., a draggable circle or square on the zoom control (e.g., 1230) slider), and a target zoom point (e.g., 1270) at a third position of the plurality of positions along the zoom control (e.g., 1230) that is different from the first position, wherein the third position corresponds to the third magnification level, and a second position of the plurality of positions along the zoom control (e.g., 1230) corresponds to the second magnification level. Thus, the electronic device (e.g., 1200) provides the user with visual indications of the current and available magnification levels.

In accordance with some embodiments, in accordance with a determination that the set of one or more conditions has been met, the electronic device (e.g., 1200) updates display of the zoom indicator affordance (e.g., 1240) from the first position to the third position corresponding to the third magnification level. Thus, the electronic device (e.g., 1200) provides the user with visual indications of the current and available magnification levels.

In accordance with some embodiments, in accordance with a determination that the set of one or more conditions has not been met, the electronic device (e.g., 1200) updates display of the zoom indicator affordance (e.g., 1240) from the first position to the second position corresponding to the second magnification level. Thus, the electronic device (e.g., 1200) provides the user with visual indications of the current and available magnification levels.

In accordance with some embodiments, in accordance with the determination that the set of one or more conditions has been met, the electronic device (e.g., 1200) updates display of the target zoom point (e.g., 1270) to expand to encapsulate the zoom indicator affordance (e.g., 1240) when the zoom indicator affordance (e.g., 1240) is displayed at the second position. In some examples, the zoom indicator affordance (e.g., 1240) expands to encapsulate the target zoom point (e.g., 1270) as the zoom indicator affordance (e.g., 1240) gets closer to the target zoom point (e.g., 1270). Thus, by expanding the target zoom point to encapsulate the zoom indicator affordance, the electronic device informs the user that the requested magnification level will be automatically overridden with the third magnification level, thereby prompting the user to make necessary accommodations. In some embodiments, in accordance with the determination that the set of one or more conditions has been met, the electronic device (e.g., 1200) updates display of the zoom indicator affordance (e.g., 12040) to encapsulate the target zoom point (e.g., 1270) when the zoom indicator affordance (e.g., 1240) is displayed at the second position. Thus, by expanding the zoom indicator affordance to encapsulate the target zoom point, the electronic device informs the user that the requested magnification level will be automatically overridden with the third magnification level, thereby prompting the user to make necessary accommodations.

In accordance with some embodiments, a fifth condition of the set of one or more conditions is met when the electronic device (e.g., 1200) detects an input lift-off signal associated with the gesture (e.g., 1220). In some examples, the electronic device (e.g., 1200) determines that the gesture (e.g., 1220) has ended, such as by detecting a lift-off of a touch performed on a touch-sensitive surface.

In accordance with some embodiments, the first camera (e.g., 1202) has a first field of view and the second camera (e.g., 1204) has a second field of view, wherein the first field of view and the second field of view overlap, wherein the first field of view and the second field of view are different, and wherein zooming the digital viewfinder (e.g., 1214) from the first magnification level to the third magnification level includes: the electronic device (e.g., 1200) visually compensating for the difference between the first field of view and the second field of view to reduce shifting of an image displayed in the digital viewfinder (e.g., 1214). In some examples, the electronic device (e.g., 1200) shifts the image in the digital viewfinder (e.g., 1214) to counter the parallax effect when transitioning the viewfinder (e.g., 1214) to display based on data from the first camera (e.g., 1202) to display based on data from the second camera (e.g., 1204).

In accordance with some embodiments, while the magnification level of the digital viewfinder (e.g., 1214) is a fourth magnification level that is different from the third magnification level, the electronic device (e.g., 1200) detects a tap input at a location that corresponds to a respective portion of the zoom control (e.g., 1230). In response to the electronic device (e.g., 1200) detecting the tap input: in accordance with a determination that the respective portion of the zoom control (e.g., 1230) corresponds to the third magnification level, the electronic device (e.g., 1200) zooms the digital viewfinder (e.g., 1214) to the third magnification level, and (e.g., zoom to the magnification level that corresponds to a 1× magnification level of a second camera (e.g., 1204) of the device in response to a tap gesture (e.g., 1220) on the portion of the zoom control (e.g., 1230) that corresponds to the 1× magnification level of a second camera (e.g., 1204) of the device), in accordance with a determination that the respective portion of the zoom control (e.g., 1230) corresponds to a magnification level that is different from the third magnification level, the electronic device (e.g., 1200) maintains the digital viewfinder (e.g., 1214) at the fourth magnification level (e.g., don't zoom to a different magnification level in response to a tap gesture somewhere else on the zoom control (e.g., 1230)).

In some examples, it is easier to get back to the 1× magnification level of the second camera (e.g., 1204) of the device than to other magnification levels of the device so as to make it easier for users to select the 1× magnification level of the second camera (e.g., 1204, shown as 2X in FIG. 12F because it is approximately 2× of the 1× zoom of the first camera) of the device which provides better visual quality for images than magnification levels at which a digital zoom operation is being performed by digitally cropping and enlarging a 1× magnification image captured by a the corresponding camera.

In some examples, the 1× magnification level for the first camera (e.g., 1202) can also be tapped to switch to the 1× magnification level for the first camera (e.g., 1202). In some examples, 1× magnification levels for one or more additional cameras can also be tapped to switch to the 1× magnification level for those cameras (e.g., 1202, 1204), while still preventing the user from switching to magnification levels between 1× magnification levels for the different cameras (e.g., 1202, 1204)) (e.g., intermediate magnification levels between the 1× magnification levels for the different cameras (e.g., 1202, 1204), that correspond to magnification levels at which a digital zoom operation is being performed, can be reached by dragging a thumb of a zoom control (e.g., 1230) to a location corresponding to one of those intermediate magnification levels).

Note that details of the processes described above with respect to method 1300 (e.g., FIG. 13) are also applicable in an analogous manner to the methods described below. For example, methods 700, 900, 1100, 1900, 2100, and 2300 optionally include one or more of the characteristics of the various methods described above with reference to method 1300. For example, the electronic viewfinder in method 1300 is analogous to the electronic viewfinder in methods 700, 900, 1100, 1900, 2100, and 2300. For brevity, these details are not repeated below.

Figure 14:
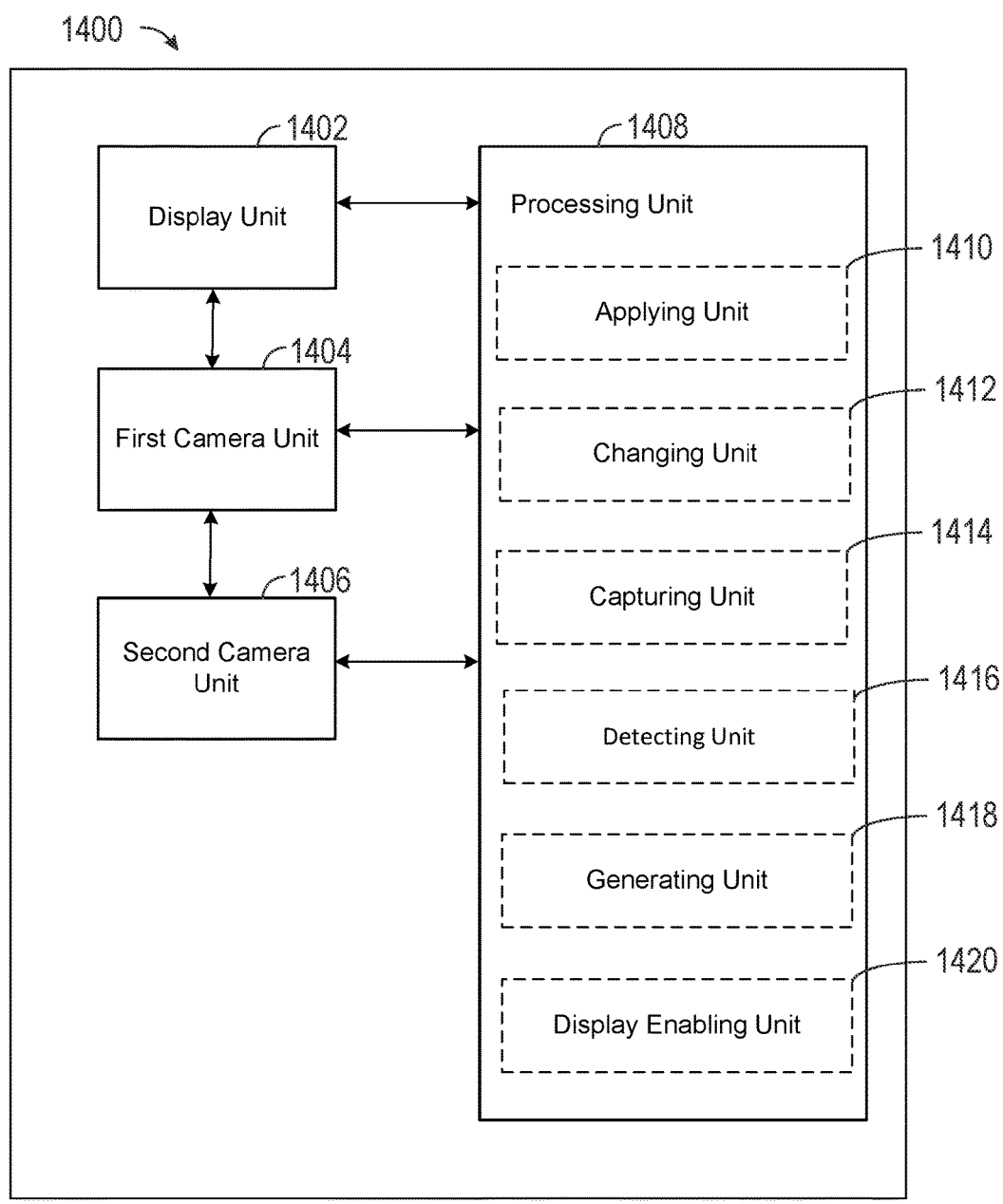
FIGS. 14-17 are functional block diagrams, in accordance with some embodiments.

In accordance with some embodiments, FIG. 14 shows an exemplary functional block diagram of an electronic device 1400 configured in accordance with the principles of the various described embodiments. In accordance with some embodiments, the functional blocks of electronic device

1400 are configured to perform the techniques described above. The functional blocks of the device 1400 are, optionally, implemented by hardware, software, or a combination of hardware and software to carry out the principles of the various described examples. It is understood by persons of skill in the art that the functional blocks described in FIG. 14 are, optionally, combined or separated into sub-blocks to implement the principles of the various described examples. Therefore, the description herein optionally supports any possible combination or separation or further definition of the functional blocks described herein.

As shown in FIG. 14, an electronic device 1400 includes a display unit 1402 configured to display a graphic user interface, a first camera unit 1404, a second camera unit 1406, and a processing unit 1408 coupled to the display unit 1402, the first camera unit 1404, and the second camera unit 1406. In some embodiments, the processing unit 1408 includes an applying unit 1410, a changing unit 1412, a capturing unit 1414, a detecting unit 1416, a generating unit 1418, and a display enabling unit 1420.

The processing unit 1408 is configured to: enable display (e.g., with display enabling unit 1420), on the display unit 1402, of a digital viewfinder including a preview based on data received from the first camera unit 1404; and while enabling display (e.g., with display enabling unit 1420) of the digital viewfinder: in accordance with a determination that a set of one or more conditions is met, wherein a first condition of the set of one or more conditions is met when a subject is detected within a predetermined distance from the device, apply (e.g., with applying unit 1410) a simulated optical effect to the preview displayed in the digital viewfinder, wherein the simulated optical effect is based on data received from the first camera unit 1404 and the second camera unit 1406; and in accordance with a determination that the set of one or more conditions is not met, enable display (e.g., with display enabling unit 1420) of the preview in the digital viewfinder without applying the simulated optical effect.

In some embodiments, prior to applying the simulated optical effect to the preview in the digital viewfinder, the preview in the digital viewfinder is not based on the second camera unit 1406. In some embodiments, the simulated optical effect is a simulated bokeh. In some embodiments, the simulated optical effect is applied differently to different portions of the preview in the digital viewfinder.

In some embodiments, a first portion of the preview depicts a first object, wherein the first object is at a first distance from the electronic device, a second portion of the preview depicts a second object, wherein the second object is a second distance from the electronic device, and applying the simulated optical effect to the preview includes applying the simulated optical effect to the first portion with a first magnitude and applying the simulated optical effect to the second portion with a second magnitude that is different from the first magnitude.

In some embodiments, the first camera unit 1404 has a first field of view and the second camera unit 1406 has a second field of view, wherein the first field of view and the second field of view overlap.

In some embodiments, the processing unit 1408 is further configured to: generate (e.g., with generating unit 1418) a depth map based on data received from the first camera unit 1404 and the second camera unit 1406; and wherein the simulated optical effect is based on the depth map.

In some embodiments, the electronic device automatically determines a distance to the subject. In some embodiments, a second condition of the set of one or more conditions is met when a focus distance of the first camera unit 1404 exceeds a minimum distance threshold.

In some embodiments, a third condition of the set of one or more conditions is met when a focus distance of the first camera unit 1404 does not exceed a maximum distance threshold. In some embodiments, a fourth condition of the set of one or more conditions is met when the subject is detected beyond a predetermined minimum distance from the device. In some embodiments, a fifth condition of the set of one or more conditions is met when an amount of detected light exceeds a minimum light threshold.

In some embodiments, a sixth condition of the set of one or more conditions is met when an amount of detected light does not exceed a maximum light threshold.

In some embodiments, the determination of whether the set of one of more conditions is met is based on data from the first camera unit 1404.

In some embodiments, the determination of whether the set of one of more conditions is met is based on data from the second camera unit 1406.

In some embodiments, the processing unit 1408 is further configured to: in accordance with the determination that the set of one or more conditions are not met: enable display (e.g., with display enabling unit 1420), on the display unit 1402, of a graphical indication of a condition that is not met.

In some embodiments, the processing unit 1408 is further configured to: in response to detecting the subject, enable display (e.g., with display enabling unit 1420), on the digital viewfinder on the display unit 1402, of one or more visual markers that identify the subject; and wherein a first visual characteristic of the one or more visual markers is based on whether the set of one or more conditions is met.

In some embodiments, the processing unit 1408 is further configured to: in accordance with the determination that the set of one or more conditions is met, change (e.g., with changing unit 1412) the first visual characteristic of the one or more visual markers.

In some embodiments, the processing unit 1408 is further configured to: in accordance with detecting the subject, enable display (e.g., with display enabling unit 1420), in the digital viewfinder on the display unit 1402, of one or more visual markers identifying the subject; and wherein a second characteristic of the one or more visual markers is based on a characteristic of the subject.

In some embodiments, the processing unit 1408 is further configured to: in accordance with failing to detect the subject, enable display (e.g., with display enabling unit 1420), in the digital viewfinder on the display unit 1402, of one or more visual markers that are centered in the digital viewfinder.

In some embodiments, the processing unit 1408 is further configured to: in accordance with detecting a plurality of subjects, enable display (e.g., with display enabling unit 1420), in the digital viewfinder on the display unit 1402, of a plurality of one or more visual markers corresponding to the plurality of subjects.

In some embodiments, the processing unit 1408 is further configured to: in accordance with applying the simulated optical effect to the preview displayed in the digital viewfinder, enable display (e.g., with display enabling unit 1420), on the display unit 1402, of a graphical indication that the simulated optical effect is being applied to the preview displayed in the digital viewfinder; and in accordance with displaying the preview in the digital viewfinder without applying the simulated optical effect, forgo enabling display (e.g., with display enabling unit 1420), on the display unit 1402, of the graphical indication that the simulated optical effect is being applied to the preview displayed in the digital viewfinder.

In some embodiments, the processing unit 1408 is further configured to: detect (e.g., with detecting unit 1416) user input requesting to capture an image; and in response to detecting the user input requesting to capture the image: in accordance with the determination that the set of one or more conditions is not met, capture (e.g., with capturing unit 1414) the image without the simulated optical effect; in accordance with the determination that the set of one or more conditions is met, capture (e.g., with capturing unit 1414) the image with the simulated optical effect.

In some embodiments, the processing unit 1408 is further configured to: while the preview is displayed in the digital viewfinder without applying the simulated optical effect, detect (e.g., with detecting unit 1416) a change in the scene in front of the camera units 1404-1406; and in response to detecting the change in the scene: in accordance with a determination that the change in the scene has caused the set of one or more conditions to be met, apply (e.g., with applying unit 1414) the simulated optical effect to the preview displayed in the digital viewfinder; and in accordance with a determination that the change in the scene has not caused the set of one or more conditions to be met, maintain display (e.g., with display enabling unit 1420) of the preview in the digital viewfinder without applying the simulated optical effect.

The operations described above with reference to FIGS. 7A-7B are, optionally, implemented by components depicted in FIGS. 1A-1B or FIG. 14. For example, displaying operation 702 and displaying operation 722, and dividing operation 706 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 15:
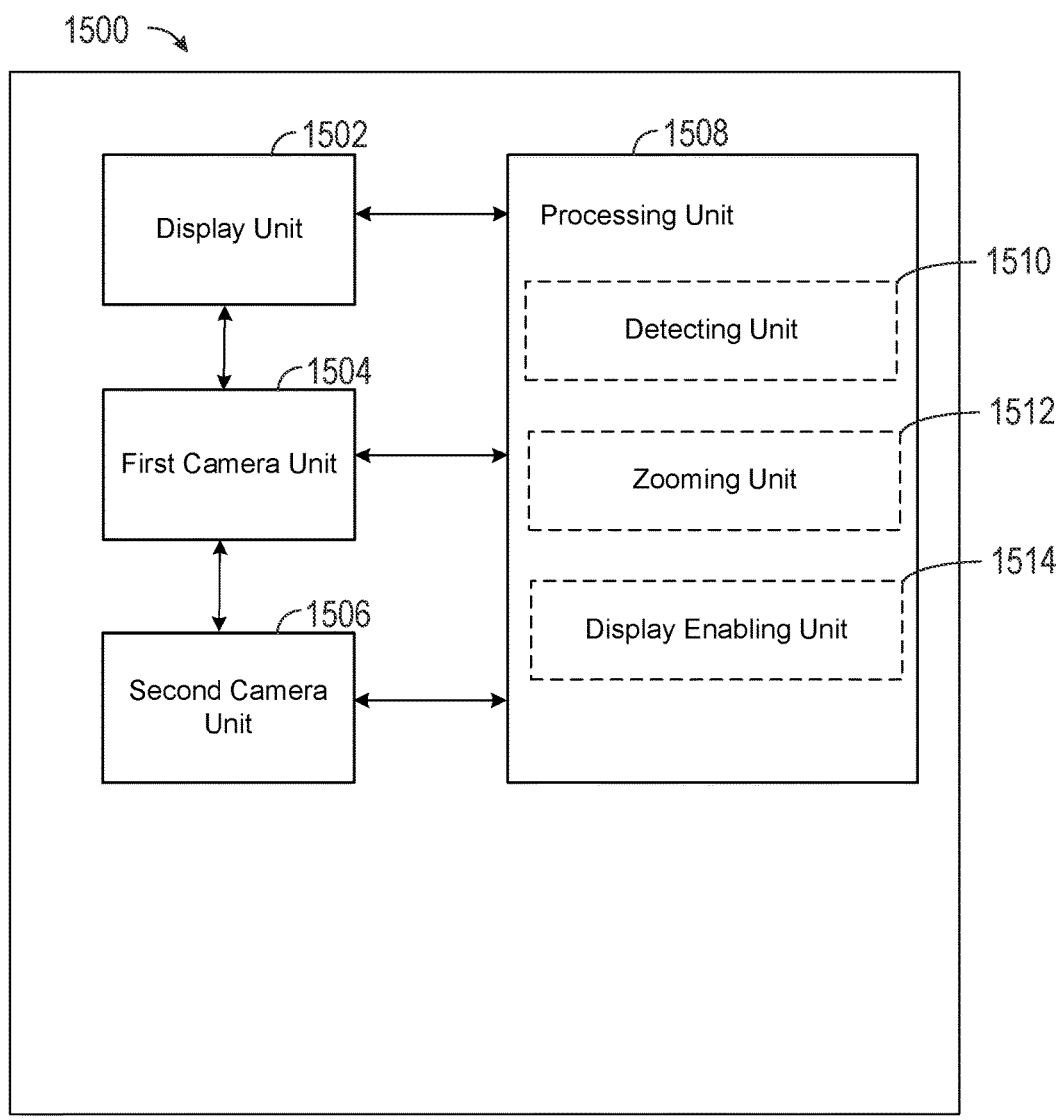

In accordance with some embodiments, FIG. 15 shows an exemplary functional block diagram of an electronic device 1500 configured in accordance with the principles of the various described embodiments. In accordance with some embodiments, the functional blocks of electronic device 1500 are configured to perform the techniques described above. The functional blocks of the device 1500 are, optionally, implemented by hardware, software, or a combination of hardware and software to carry out the principles of the various described examples. It is understood by persons of skill in the art that the functional blocks described in FIG. 15 are, optionally, combined or separated into sub-blocks to implement the principles of the various described examples. Therefore, the description herein optionally supports any possible combination or separation or further definition of the functional blocks described herein.

As shown in FIG. 15, an electronic device 1500 includes a display unit 1502 configured to display a graphic user interface, a first camera unit 1504, a second camera unit 1506, and a processing unit 1508 coupled to the display unit 1502, the first camera unit 1504, and the second camera unit 1506. In some embodiments, the processing unit 1508 includes a detecting unit 1510, a zooming unit 1512, and a display enabling unit 1514.

The processing unit 1508 is configured to: concurrently enable display (e.g., with display enabling unit 1514), on the display unit 1502, of: a user interface for capturing photos based on data received from the first camera unit 1504 that includes displaying a digital viewfinder with a first magnification; and an affordance for modifying the magnification of photos captured by the device using one or more of the first and second camera units 1504-1506; detect (e.g., with detecting unit 1510) activation of the affordance; in response to detecting activation of the affordance: cease to enable (e.g., with display enabling unit 1514) display, on the display unit 1502, of the user interface for capturing photos based on data received from the first camera unit 1504; and enable display (e.g., with display enabling unit 1514), on the display unit 1502, of a user interface for capturing photos based on data received from the second camera unit 1506 that includes displaying a digital viewfinder with a second magnification that is greater than the first magnification.

In some embodiments, the processing unit 1508 is further configured to: detecting (e.g., with detecting unit 1510) a user input in the digital viewfinder; in response to detecting the user input: enable display (e.g., with display enabling unit 1514), on the display unit 1502, of a zoom control; and perform a zoom of the digital viewfinder in accordance with the user input.

In some embodiments, the user input corresponds to a pinch gesture in the digital viewfinder. In some embodiments, the user input corresponds to a drag gesture in the digital viewfinder. In some embodiments, the user input corresponds to a swipe gesture in the digital viewfinder. In some embodiments, the zoom control includes a zoom indicator affordance.

In some embodiments, the zoom control includes a plurality of locations corresponding to a plurality of magnification levels, and wherein a first location of the plurality of locations corresponds to a first optical magnification level and a second location of the plurality of locations corresponds to a second optical magnification level that is different from the first optical magnification level.

In some embodiments, the processing unit 1508 is further configured to: detect (e.g., with detecting unit 1510) a gesture corresponding to the zoom control, the gesture having a direction and a length; in response to detecting the gesture corresponding to the zoom control and in accordance with the direction being a first direction, perform (e.g., with zooming unit 1512) a zoom-out of the digital viewfinder at a speed based on the magnitude of the gesture; and in response to detecting the gesture corresponding to the zoom control and in accordance with the direction being a second direction different from the first direction, perform (e.g., with zooming unit 1512) a zoom-in of the digital viewfinder at a speed based on the magnitude of the gesture.

In some embodiments, the affordance for modifying the magnification is displayed in accordance with a determination that the electronic device includes camera units 1504-1506 with overlapping fields of view.

In some embodiments, the processing unit 1508 is further configured to: detect (e.g., with detecting unit 1514) a second activation of the affordance for modifying the magnification; in response to detecting the second activation of the affordance for modifying the magnification: cease to enable display (e.g., with display enabling unit 1514), on the display unit 1502, of the user interface for capturing photos based on data received from the second camera unit 1506; and enable display (e.g., with display enabling unit 1514), on the display unit 1502, of the user interface for capturing photos based on data received from the first camera unit 1504 that includes displaying the digital viewfinder with the first magnification.

In some embodiments, the displayed zoom control fades out in response to detecting an input lift-off signal associated with the user input in the digital viewfinder and wherein the displayed affordance for modifying the magnification does not fade out in response detecting the input lift-off signal associated with the user input in the digital viewfinder.

In some embodiments, displaying, on the display unit 1502, the zoom control includes replacing display of the affordance for modifying the magnification with display of the zoom control.

The operations described above with reference to FIG. 9 are, optionally, implemented by components depicted in FIGS. 1A-1B or FIG. 15. For example, displaying operation 902 and detecting operation 908 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 16:
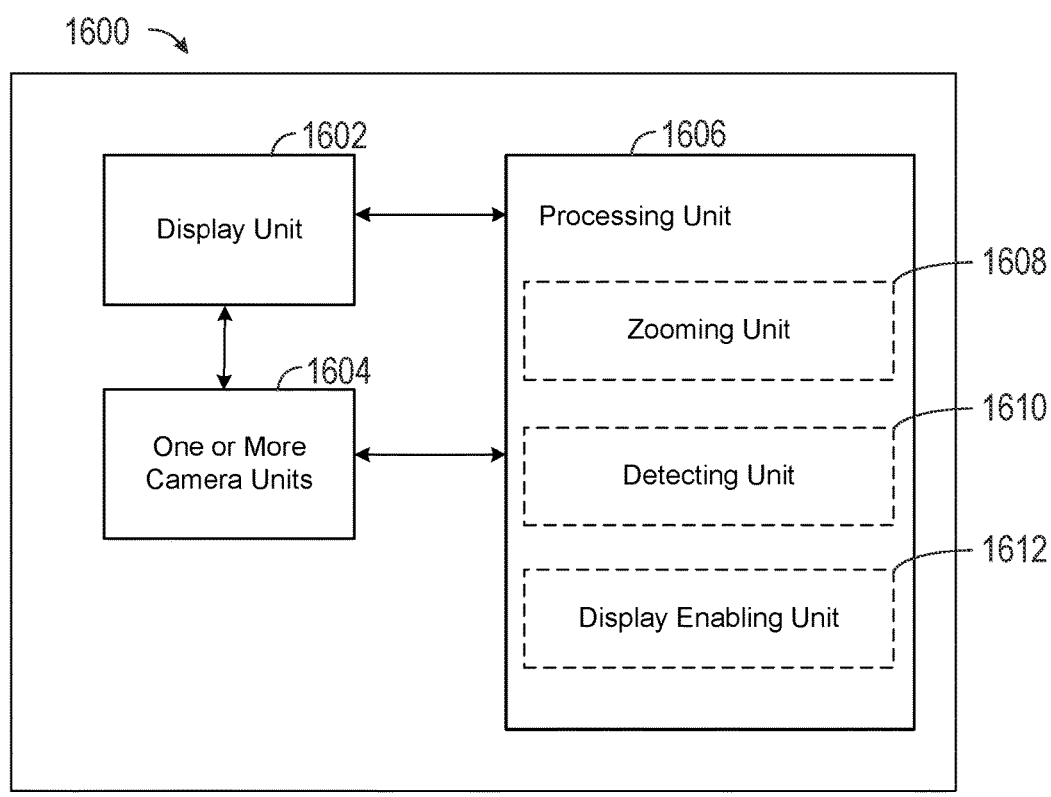

In accordance with some embodiments, FIG. 16 shows an exemplary functional block diagram of an electronic device 1600 configured in accordance with the principles of the various described embodiments. In accordance with some embodiments, the functional blocks of electronic device 1600 are configured to perform the techniques described above. The functional blocks of the device 1600 are, optionally, implemented by hardware, software, or a combination of hardware and software to carry out the principles of the various described examples. It is understood by persons of skill in the art that the functional blocks described in FIG. 16 are, optionally, combined or separated into sub-blocks to implement the principles of the various described examples. Therefore, the description herein optionally supports any possible combination or separation or further definition of the functional blocks described herein.

As shown in FIG. 16, an electronic device 1600 includes a display unit 1602 configured to display a graphic user interface, one or more camera units 1604, and a processing unit 1606 coupled to the display unit 1602 and the one more camera units 1604. In some embodiments, the processing unit 1606 includes a zooming unit 1608, a detecting unit 1610, and a display enabling unit 1612.

The processing unit 1606 is configured to: enable display (e.g., with display enabling unit 1612), on the display unit 1602, of: a digital viewfinder based on data received from the one or more camera units 1604; while enabling display of the digital viewfinder, detect a gesture that progresses at a gesture rate, the gesture corresponding to an instruction to zoom the digital viewfinder from a first magnification level to a third magnification level; in response to detecting the gesture, zoom (e.g., with zooming unit 1608) the digital viewfinder from the first magnification level to a second magnification level and from the second magnification level to a third magnification level, including: during a first portion of the gesture, zoom (e.g., with zooming unit 1608) the digital viewfinder at a first rate that is slower than the gesture rate at which the gesture is progressing; and during a second portion of the gesture that occurs after the first portion of the gesture, zoom (e.g., with zooming unit 1608) the digital viewfinder at a second rate that is faster than the gesture rate at which the gesture is progressing.

In some embodiments, during the first portion of the gesture: the gesture progresses from a first state to a second state, wherein the first state corresponds to the first magnification level and the second state corresponds to the second magnification level that is higher than the first magnification level; and zooming the digital viewfinder from the first magnification level to an intermediate magnification level that is higher the first magnification level and lower than the second magnification level; and during the second portion of the gesture: the gesture progresses from the second state to a third state, wherein the third state corresponds to a third magnification level that is higher than the second magnification level and the intermediate magnification level; and zooming the digital viewfinder from the intermediate magnification level that is lower than the second magnification level to the third magnification level.

In some embodiments, the first portion of the gesture includes movement of one or more contacts on a touch-sensitive surface and the rate at which the first portion of the gesture is progressing is based on a rate of movement of the one or more contacts; the second portion of the gesture includes continued movement of the one or more contacts on the touch-sensitive surface and the rate at which the second portion of the gesture is progressing is based on a rate of movement of the one or more contacts; during the second portion of the gesture, the movement of the one or more contacts ceases while the one or more contacts continue to be detected on the touch-sensitive surface; and the method including continuing to zoom the digital viewfinder after the movement of the one or more contacts has ceased.

In some embodiments, continuing to zoom the digital viewfinder after the movement of the one or more contacts has ceased includes gradually decreasing the rate at which the magnification level is increasing.

In some embodiments, zooming the digital viewfinder at a rate that is slower than the gesture rate at which the gesture is progressing includes gradually increasing the rate at which the magnification level increases when the contact moves away from a starting position on the touch-sensitive surface.

In some embodiments, the processing unit 1606 is further configured to: concurrently enable display (e.g., with display enabling unit 1612), on the display unit 1602, with the digital viewfinder, of: a zoom control, wherein a plurality of positions along the zoom control correspond to a plurality of magnification levels; and a zoom indicator affordance; and in response to detecting the gesture, update display (e.g., with display enabling unit 1612) of the zoom indicator affordance to transition, at the gesture rate, from a first position of the plurality of positions to a second position of the plurality of positions, wherein the first position corresponds to the first magnification level of the plurality of magnification levels and the second position corresponds to the third magnification level of the plurality of magnification levels.

In some embodiments, zooming the digital viewfinder from the first magnification level to the third magnification level includes zooming the digital viewfinder while smoothing the rate at which the zooming occurs relative to the rate at which the gesture progresses, by limiting the rate of the zoom or the rate of change of the rate of the zoom.

In some embodiments, during a third portion of the gesture that occurs before the first portion of the gesture, zoom the digital viewfinder at a third rate that corresponds to the gesture rate at which the gesture is progressing.

In some embodiments, at a first time during the first portion of the gesture, zooming the digital viewfinder at the first rate while a first gesture rate of the gesture exceeds a threshold gesture rate; and at a second time during the second portion of the gesture, zooming the digital viewfinder at the first rate while a second gesture rate of the gesture does not exceed the threshold gesture rate.

In some embodiments, the processing unit 1606 is further configured to: subsequent to detecting the gesture and subsequent to zooming the digital viewfinder from the first magnification level to the third magnification level: detect (e.g., with detecting unit 1610) a tap gesture at a location corresponding to a third position of the plurality of positions, wherein the third position corresponds to a fourth magnification level of the plurality of magnification levels; and in response to detecting the tap gesture, zoom (e.g., with zooming unit 1608) the digital viewfinder from the third magnification level to the fourth magnification level.

In some embodiments, the processing unit 1606 is further configured to: in response to detecting the gesture, enable display (e.g., with display enabling unit 1612), on the display unit 1602, of a graphical magnification level indicator that indicates a current magnification level.

In some embodiments, the processing unit 1606 is further configured to: after the graphical magnification level indictor has been displayed for a predetermined period of time after zooming of the digital viewfinder has ceased, cease to enable display (e.g., with display enabling unit 1612), on the display unit 1602, of the graphical magnification level indictor.

In some embodiments, the processing unit 1606 is further configured to: after the zoom control has been displayed for a second predetermined period of time after zooming of the digital viewfinder has ceased, cease to enable display (e.g., with display enabling unit 1612), on the display unit 1602, of the zoom control.

In some embodiments, the processing unit 1606 is further configured to: enable display (e.g., with display enabling unit 1612), on the display unit 1602, of the zoom control while enabling display of the digital viewfinder.

In some embodiments, the processing unit 1606 is further configured to: detect (e.g., with detecting unit 1610) a pinch gesture on the digital viewfinder; in response to detecting the pinch gesture: zoom (e.g., with zooming unit 1608) the digital viewfinder at a rate corresponding to a rate at which the pinch gesture is progressing throughout the pinch gesture.

In some embodiments, the plurality of positions corresponding to the plurality of magnification levels are positioned along the zoom control such that the magnification levels are not distributed linearly.

In some embodiments, a distance along the zoom control between the lowest magnification level and a magnification level that is double the lowest magnification level extends more than 25% of a total distance of the zoom control and less than 45% of the total distance of the zoom control.

In some embodiments, locations along the zoom control corresponding to optical magnification levels are visually distinguished from locations along the zoom control corresponding to non-optical magnification levels. In some embodiments, the third position of the plurality of positions corresponds to an optical magnification level. In some embodiments, displaying the zoom control includes displaying the zoom control vertically on the display. In some embodiments, displaying the zoom control includes displaying the zoom control horizontally on the display.

The operations described above with reference to FIG. 11 are, optionally, implemented by components depicted in FIGS. 1A-1B or FIG. 16. For example, displaying operation 1102 and detecting operation 1104 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 17:
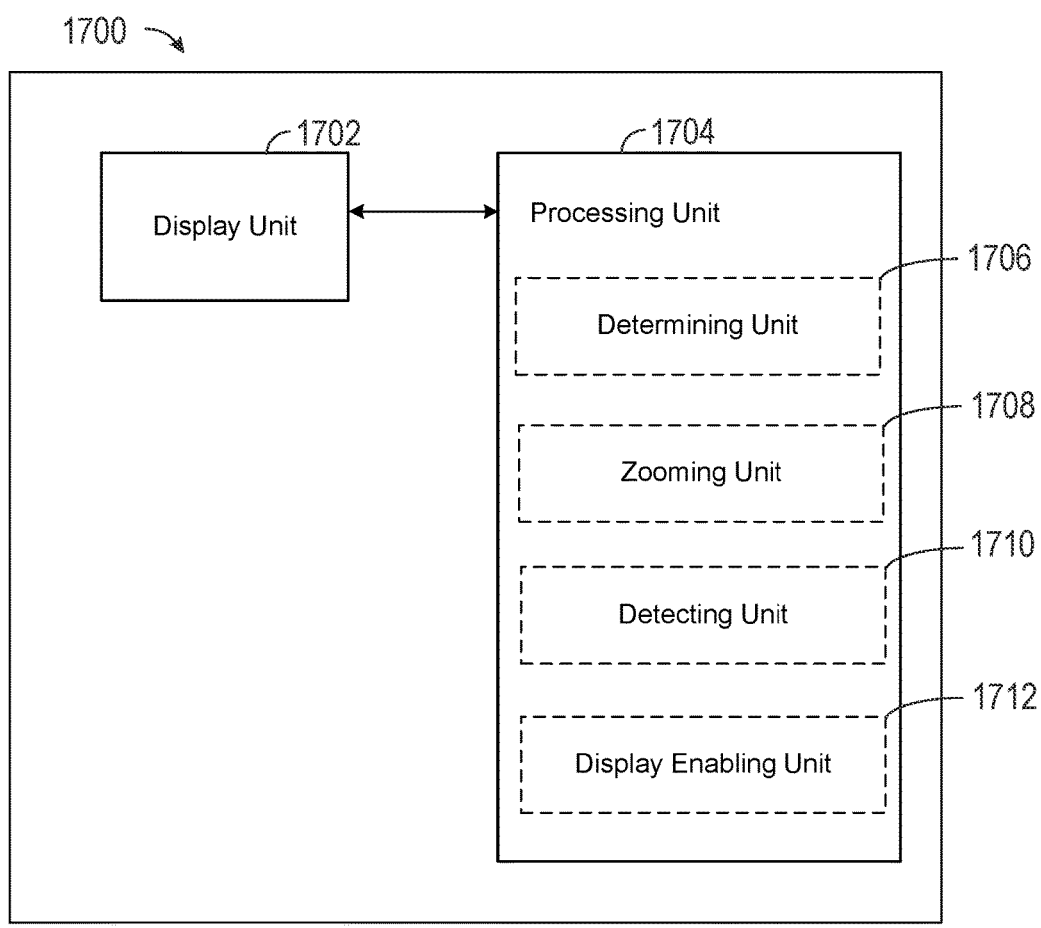

In accordance with some embodiments, FIG. 17 shows an exemplary functional block diagram of an electronic device 1700 configured in accordance with the principles of the various described embodiments. In accordance with some embodiments, the functional blocks of electronic device 1700 are configured to perform the techniques described above. The functional blocks of the device 1700 are, optionally, implemented by hardware, software, or a combination of hardware and software to carry out the principles of the various described examples. It is understood by persons of skill in the art that the functional blocks described in FIG. 17 are, optionally, combined or separated into sub-blocks to implement the principles of the various described examples. Therefore, the description herein optionally supports any possible combination or separation or further definition of the functional blocks described herein.

As shown in FIG. 17, an electronic device 1700 includes a display unit 1702 configured to display a graphic user interface and a processing unit 1704 coupled to the display unit 1702. In some embodiments, the processing unit 1706 includes a determining unit 1706, a zooming unit 1708, detecting unit 1710, and a display enabling unit 1712.

The processing unit 1704 is configured to: enable display (e.g., with display enabling unit 1702), on the display unit

1702, of a digital viewfinder; detect (e.g., with detecting unit 1710) a gesture corresponding to an instruction to zoom the digital viewfinder from a first magnification level to a second magnification level different from the first magnification level; determine whether a set of one or more conditions has been met, wherein a first condition of the set of one or more conditions is met when the difference between the second magnification level and a third magnification level is less than a predetermined threshold; and in accordance with a determination that the set of one or more conditions has been met, zoom (e.g., with zooming unit 1708) the digital viewfinder from the first magnification level to the third magnification level.

In some embodiments, the processing unit 1704 is further configured to: in accordance with a determination that the set of one or more conditions has not been met, zoom (e.g., with zooming unit 1708) the digital viewfinder from the first magnification level to the second magnification level.

In some embodiments, a second condition of the set of one or more conditions is met when the second magnification level is less than the third magnification level.

In some embodiments, a third condition of the set of one or more conditions is met when the second magnification level is more than the third magnification level.

In some embodiments, a fourth condition of the set of one or more conditions is met when the absolute difference between the first magnification level and the second magnification level is greater than a second predetermined threshold level.

In some embodiments, the second magnification level corresponds to a digital magnification level and wherein the third magnification level corresponds to an optical magnification level.

In some embodiments, the electronic device includes a first camera and a second camera, and wherein the displayed digital viewfinder is based on data received from at least one of the first camera and the second camera.

In some embodiments, the digital viewfinder is based on data received from the first camera when the digital viewfinder is zoomed to the second magnification level and wherein the digital viewfinder is based on data received from the to the second camera when the digital viewfinder is zoomed to the third magnification level.

In some embodiments, the processing unit 1704 is further configured to: prior to detecting the gesture, concurrently enable display (e.g., with display enabling unit 1702), on the display unit 1702, with the digital viewfinder, of: a zoom control, wherein a plurality of positions along the zoom control correspond to a plurality of magnification levels; a zoom indicator affordance at a first position of the plurality of positions along the zoom control corresponding to the first magnification level; and a target zoom point at a third position of the plurality of positions along the zoom control that is different from the first position, wherein the third position corresponds to the third magnification level; and wherein a second position of the plurality of positions along the zoom control corresponds to the second magnification level.

In some embodiments, the processing unit 1704 is further configured to: in accordance with a determination that the set of one or more conditions has been met, update display (e.g., with display enabling unit 1702) of the zoom indicator affordance from the first position to the third position corresponding to the third magnification level.

In some embodiments, the processing unit 1704 is further configured to: in accordance with a determination that the set of one or more conditions has not been met, update display (e.g., with display enabling unit 1702) of the zoom indicator affordance from the first position to the second position corresponding to the second magnification level.

In some embodiments, the processing unit 1704 is further configured to: in accordance with the determination that the set of one or more conditions has been met, update display (e.g., with display enabling unit 1702) of the target zoom point to expand to encapsulate the zoom indicator affordance when the zoom indicator affordance is displayed at the second position.

In some embodiments, a fifth condition of the set of one or more conditions is met when the electronic device detects an input lift-off signal associated with the gesture.

In some embodiments, the first camera has a first field of view and the second camera has a second field of view, wherein the first field of view and the second field of view overlap, wherein the first field of view and the second field of view are different, and wherein zooming the digital viewfinder from the first magnification level to the third magnification level includes: visually compensating for the difference between the first field of view and the second field of view to reduce shifting of an image displayed in the digital viewfinder.

In some embodiments, the processing unit 1704 is further configured to: while the magnification level of the digital viewfinder is a fourth magnification level that is different from the third magnification level, detect (e.g., with detecting unit 1710) a tap input at a location that corresponds to a respective portion of the zoom control; and in response to detecting the tap input: in accordance with a determination that the respective portion of the zoom control corresponds to the third magnification level, zoom (e.g., with zooming unit 1708) the digital viewfinder to the third magnification level; and in accordance with a determination that the respective portion of the zoom control corresponds to a magnification level that is different from the third magnification level, maintain (e.g., with display enabling unit 1712) the digital viewfinder at the fourth magnification level.

The operations described above with reference to FIG. 13 are, optionally, implemented by components depicted in FIGS. 1A-1B or FIG. 17. For example, displaying operation 1302, detecting operation 1304, and determining operation 1306 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 18A-18AN illustrate exemplary devices and user interfaces for various magnification (e.g., zoom) techniques, in accordance with some embodiments. The user interfaces in these figures are used to illustrate various magnification processes described below, including the processes in FIGS. 19A-19B.

FIG. 18A illustrates an exemplary electronic device 1800 with a first camera 1802 and a second camera 1804 that are located, for example, on the rear of the electronic device. In some examples, the first camera 1802 and the second camera 1804 have fixed, but different, focal lengths. In some examples, the focal length, field of view, and/or optical magnification properties of the optical system is fixed for each of the cameras (e.g., 1802, 1804). In some embodiments, in addition to having different fixed focal lengths, the cameras (e.g., 1802, 1804) have different fixed fields of view and different fixed optical magnification properties.

In some embodiments, the first camera 1802 has a first field of view and the second camera 1804 has a second field of view, wherein the first field of view and the second field of view overlap. In some examples, the first camera 1802 and the second camera 1804 are spaced apart so that a parallax between images detected (e.g., captured) by the cameras is used to determine distances to objects represented by different portions of a digital viewfinder displaying image data from one or more of camera 1802 and camera 1804. In some embodiments, the first camera 1802 and the second camera 1804 are located on a surface of the electronic device 1800 and the optical axes of the cameras 1802 and 1804 are arranged such that they are parallel or substantially parallel. In some examples, the first camera 1802 and the second camera 1804 capture overlapping fields of view, for example, at least 50% overlapping, at least 90% overlapping, or more. In some examples, the first camera 1802 has a wider field of view than the second camera 1804. In some examples, the second camera has a wider field of view than the first camera. When a wide-angle camera (e.g., a camera with a wide-angle lens) has a wider field of view than a telephoto camera (e.g., a camera with a telephoto lens), at a 1× magnification of the wide-angle camera objects appear further away than at a 1× magnification of the telephoto camera. If the wide-angle camera and the telephoto camera have overlapping fields of view such that the field of view of the telephoto camera is approximately centered on the field of view of the wide angle camera, an image captured with the telephoto camera at a 1× magnification level will, in some circumstances (e.g., where the subject of the image is at least 1 meter away), appear to be an optical zoom of a corresponding image captured with the wide-angle camera at a 1× magnification level.

Figure 18B:
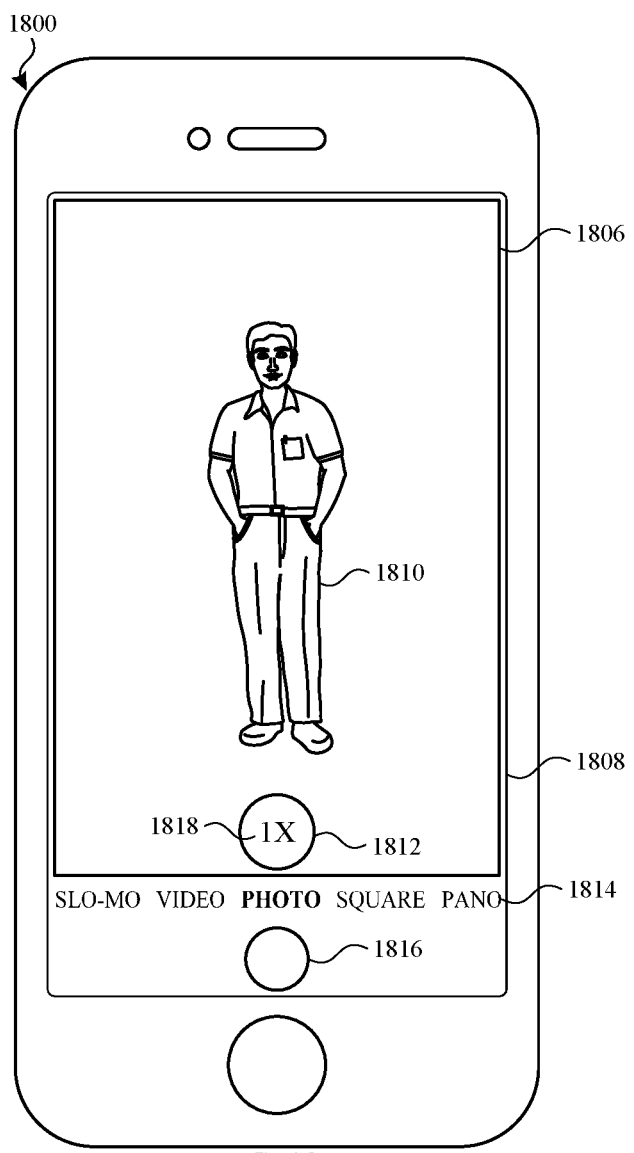

FIG. 18B illustrates the front of exemplary electronic device 1800 including display 1808 with one or more input devices and shutter button 1816. The electronic device 1800 concurrently displays, on the display 1808, a digital viewfinder 1806 for capturing media with the one or more cameras 1802, 1804 at a first magnification level. In some embodiments, an object or a subject 1810 is displayed in the viewfinder 1806 at a first magnification level. In some embodiments, the magnification level is represented using an alphanumeric system 1818. In some embodiments, the magnification level is represented using images, icons, or pictures. In some embodiments, the digital viewfinder 1806 includes live or near-live preview images.

As further illustrated in FIG. 18B, the electronic device displays, on the display 1808 a magnification adjustment affordance 1812. In some examples, the magnification adjustment affordance 1812 is represented as a 1×/2× label, an icon, or a textual representation indicating the magnification level.

Figure 18C:
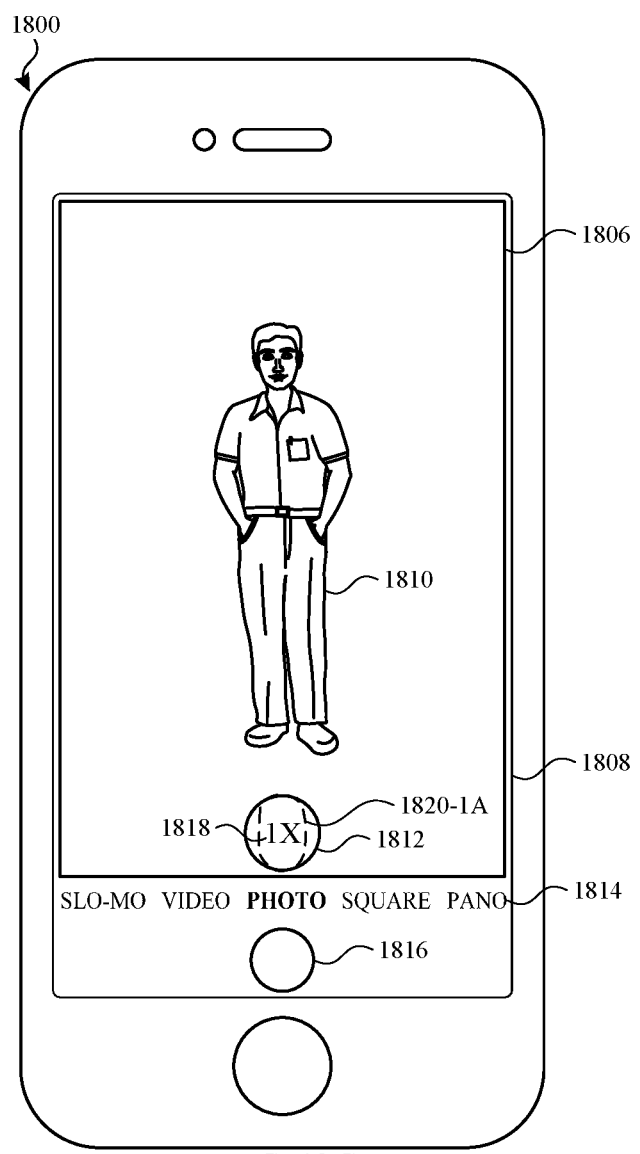
Figure 18D:
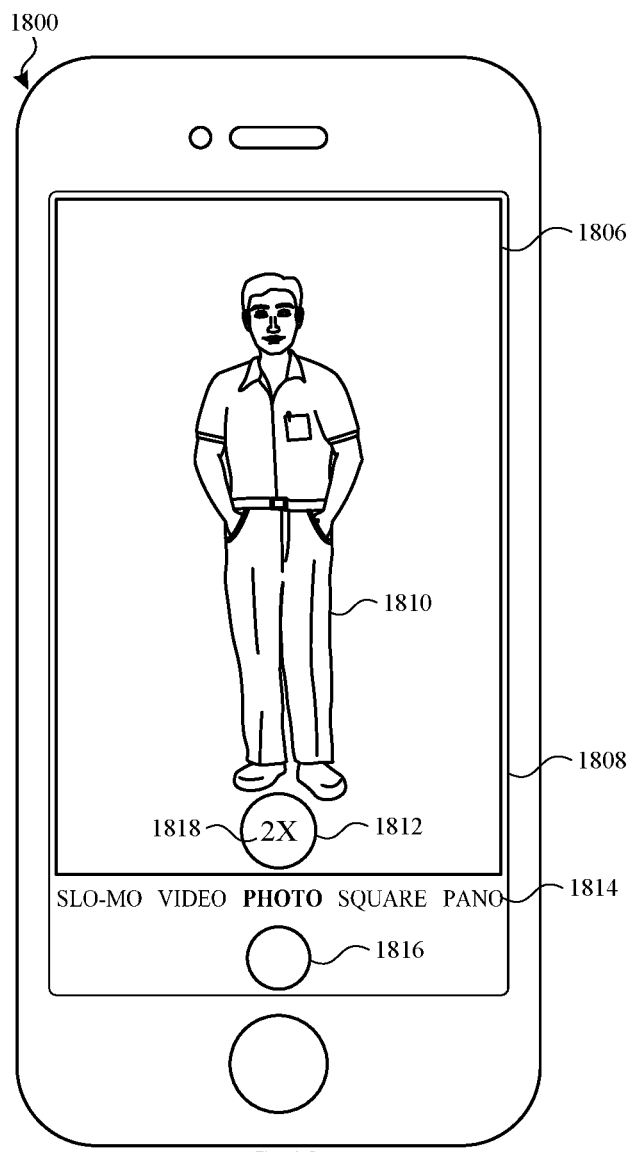

As illustrated in FIGS. 18B-18D, in some embodiments, the electronic device receives a tap gesture on the one or more input devices (e.g., a touch-sensitive surface, a touch-sensitive display) to transition from a 1× (e.g., optical) magnification to a 2× (e.g., optical) magnification. In some embodiments, as shown in FIG. 18C, while concurrently displaying the digital viewfinder 1806 and the magnification adjustment affordance 1812, the electronic device 1800 detects via the one or more input devices, a first gesture (e.g., tap gesture 1820-1A) at a location corresponding to the magnification adjustment affordance 1812. In some examples, the first gesture is a swipe, tap, or tap and hold. As illustrated in FIG. 18C, the first type of input is a tap gesture (e.g., tap gesture 1820-1A).

In some embodiments, in accordance with and, for example, in response to a determination that the first gesture (e.g., tap gesture 1820-1A) is of a first type (e.g., a tap gesture), the electronic device 1800 prepares to capture media with the one or more cameras 1802 and 1804 at a second, optionally predefined, magnification level (e.g., a 2× magnification level represented by indicator 1818 of FIG. 18D) different from the first magnification level (e.g., a 1× magnification level represented by indicator 1818 of FIG. 18B). In some examples, the electronic device 1800 toggles between predetermined magnification levels. Toggling allows the user to select a specific magnification level and for the digital viewfinder to transition to the selected magnification level. In some examples, the electronic device selects the second magnification level (e.g., a 2× magnification level represented by indicator 1818 of FIG. 18D) without regard to a magnitude of the first gesture (e.g., tap gesture 1820-1A), as long as the gesture is the first type of gesture (e.g., a tap gesture). Thus, in some examples, the duration, movement, and/or the intensity of the contact do not change which magnification level is selected as the second magnification level as long as the contact is still determined to be a tap gesture. In some embodiments, the electronic device 1800 preparing to capture media with the one or more cameras 1802 and 1804 at the second magnification level includes updating display of the digital viewfinder 1806, for example, using data received from the camera 1802 or 1804 of FIG. 18A, to show the preview at the second magnification level (e.g., a 2× magnification level represented by indicator 1818 of FIG. 18D).

As illustrated in FIG. 18E-18H, in some embodiments, a swipe input on a magnification adjustment affordance results in preparing to capture media at a dynamically-selected magnification level. In one embodiment, in accordance with and, for example, in response to a determination that the first gesture (e.g., gesture 1820-1B) is of a second type (e.g., a swipe gesture) different from the first type (e.g., a tap gesture or a tap), the electronic device 1800 prepares to capture media with the one or more cameras 1802 and 1804 at a dynamically-selected magnification level (e.g., a 7.4× magnification level represented by indicator 1818 of FIGS. 18F-H). In some examples, the dynamically-selected magnification level is different from the first magnification level (e.g., a 1× magnification level represented by indicator 1818 of FIG. 18B. In some examples, the dynamically-selected magnification level (e.g., a 7.4× magnification level represented by indicator 1818 of FIG. 18G), is different from the second magnification level (e.g., a 2× magnification level represented by indicator 1818 of FIG. 18D). In some embodiments, the dynamically-selected magnification level (e.g., a 7.4× magnification level represented by indicator

Figure 18E:
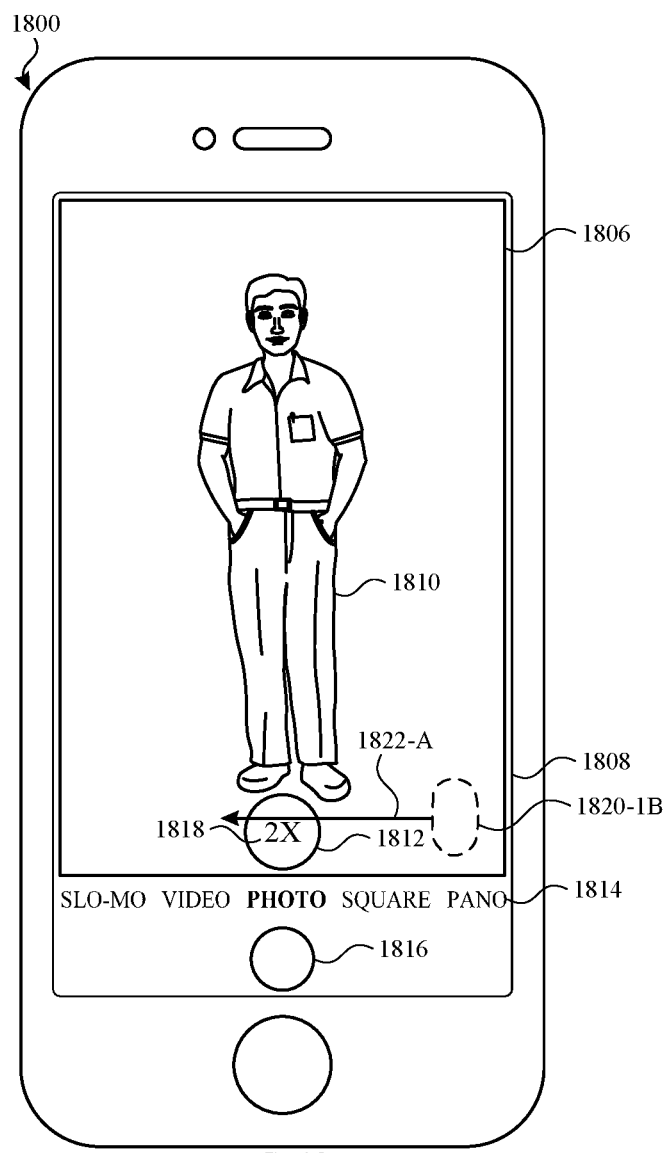
Figure 18F:
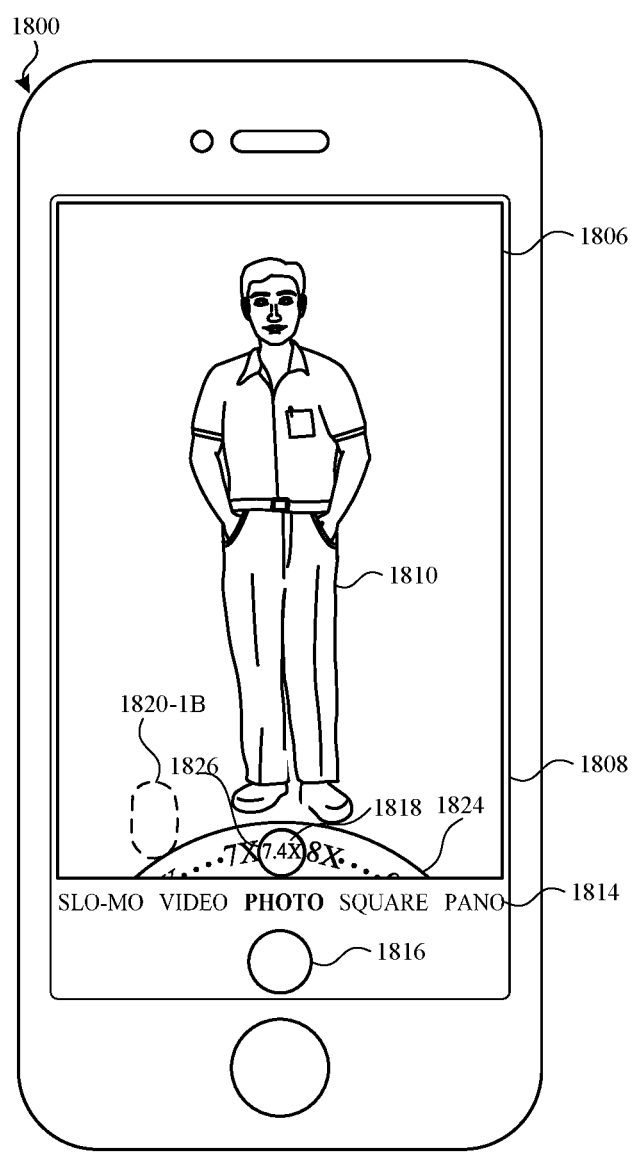
Figure 18G:
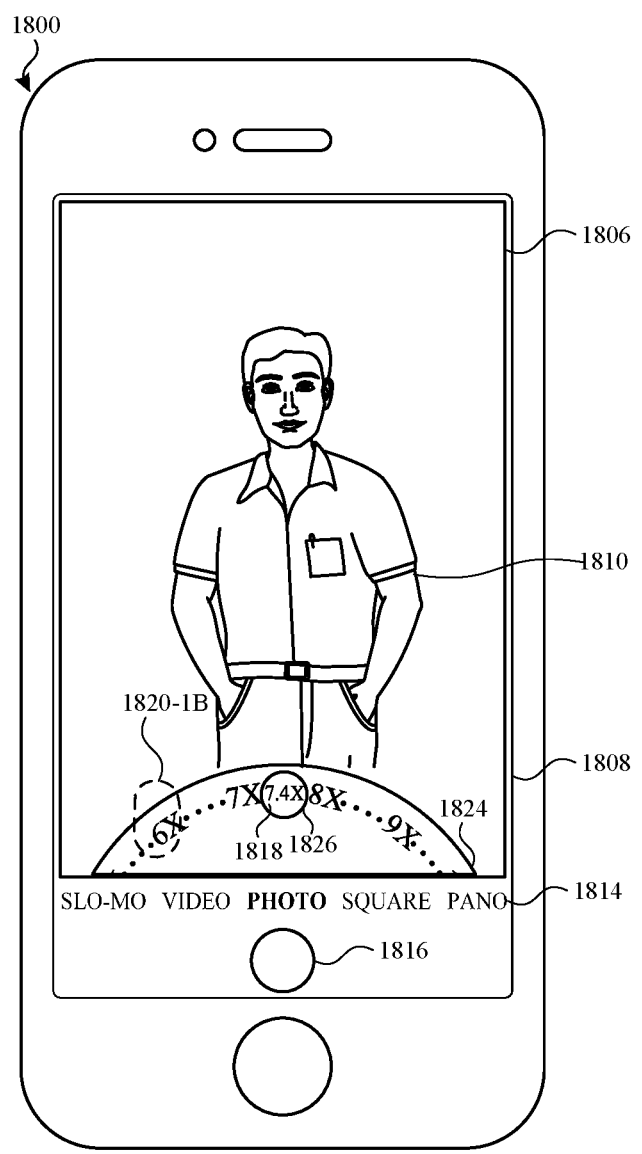

1818 of FIG. 18G), is selected based on a magnitude (e.g., distance 1822-A of FIG. 18E) of the first gesture (e.g., 1820-1B of FIG. 18E).

Figure 18H:
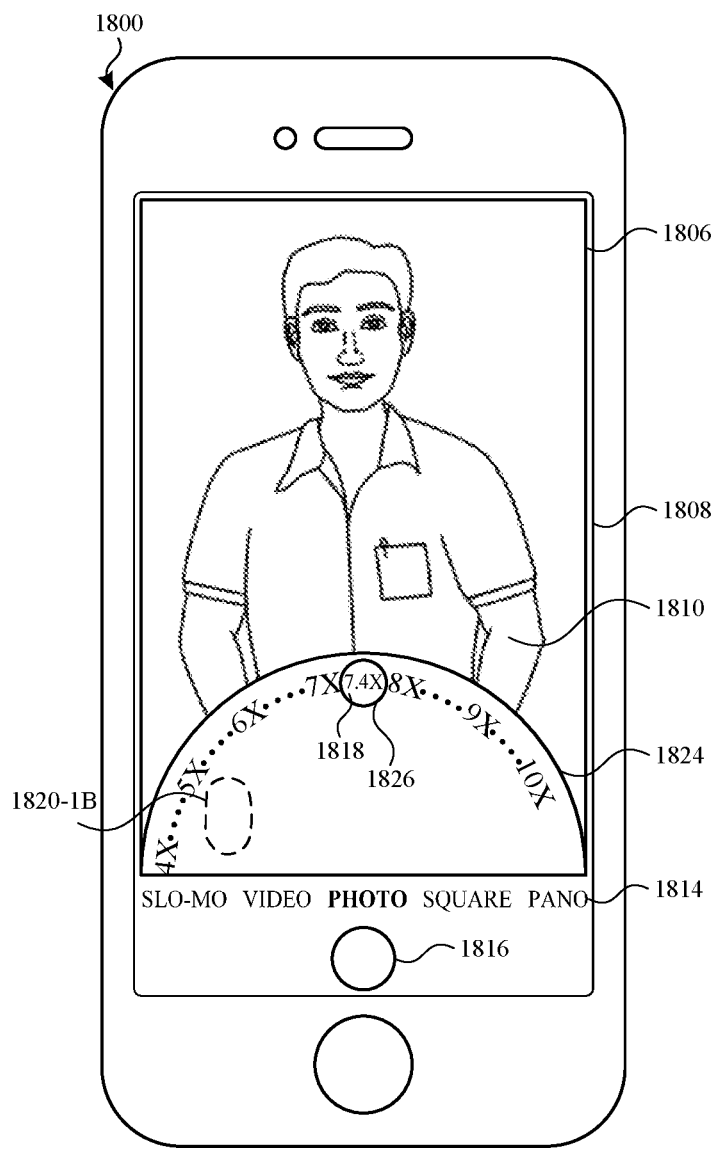

As illustrated in FIGS. 18F-18H, in some embodiments, a zoom control 1824 transitions onto the display 1808 as a result of a gesture (e.g., gesture 1820-1B) of the second type (e.g., a swipe gesture). In some embodiments, as a result of the first gesture (e.g., swipe gesture 1820-1B) being a gesture of a second type (e.g., a swipe gesture), the zoom control 1824 gradually slides onto the screen to reveal the full dial 1824 of FIG. 18H. In some examples, the zoom control 1824 is a dial. In some examples, the zoom control (e.g., the entire/partial zoom control dial) gradually appears onto the display 1808 by changing color, shape, hue, brightness or translucence. In some examples, the zoom control transition includes changing the zoom control's position and/or visual characteristic. In some examples, the swipe gesture corresponds to rotation of the zoom control 1824. Thus, in response to the electronic device 1800 detecting a user's finger swiping, the electronic device rotates the displayed zoom control 1824 and updates the magnification level based on a characteristic of the first gesture, such as updating the magnification level based on the magnitude 1822-A, for example, distance, of the swipe gesture. In some examples, longer swipe gestures will result in a greater change of the magnification level than shorter swipe gestures. In some examples, faster swipe gestures result in a greater change of the magnification level than slower swipe gestures.

As illustrated in FIG. 18E-18F, in some embodiments, a change in the magnification level corresponds to the magnitude (e.g., 1822-A) of the gesture (e.g., 1820-1B). In some embodiments, in accordance with a determination that the magnitude of the first gesture (e.g., 1820-1B) is a first magnitude (e.g., 1822-A), the dynamically-selected magnification level is a first dynamically-selected magnification level (e.g., a 7.4× magnification level represented by indicator 1818 of FIG. 18G), different from the first magnification level (e.g., a 1× magnification level represented by indicator 1818 of FIG. 18B). In some embodiments, in accordance with a determination that the magnitude of the first gesture is a second magnitude that is different from the first magnitude (e.g., 1822-A), the dynamically-selected magnification level is a second dynamically-selected magnification level (e.g., 7.8× magnification level) different from the first magnification level (e.g., a 1× magnification level represented by indicator 1818 of FIG. 18B) and the first dynamically-selected magnification level (e.g., a 7.4× magnification level represented by indicator 1818 of FIG. 18G). In some examples, a greater magnitude input, for example a longer swipe, on the touch-sensitive surface will result in a greater magnification change than a shorter magnitude input, for example a shorter swipe. In some embodiments, the magnitude of the magnification change is determined based on a speed or direction of movement of the input (e.g., as described in greater detail below with reference to method 2300).

As further illustrated in FIGS. 18F-18H, in some embodiments, a swipe input on a magnification adjustment affordance results in the display of the zoom control. In some embodiments, in accordance with and, for example, in response to the determination that the first gesture (e.g., swipe gesture 1820-1B) is of the second type (e.g., a swipe gesture) different from the first type (e.g., a tap gesture), the electronic device 1800, displays, on the display, a zoom control 1824. In some embodiments, in accordance with and, for example, in response to the determination that the first gesture (e.g., tap gesture 1820-1A) is of the first type (e.g., a tap gesture), the electronic device foregoes displaying the zoom control for selecting a dynamically-selected magnification level from a plurality of magnification levels (e.g., do not display 1824 of FIG. 18F).

As further illustrated in FIGS. 18F-18H, in some embodiments, when the zoom control is displayed, the magnification adjustment affordance's position is shifted. In some embodiments, the electronic device 1800 displaying, on the display 1808, the zoom control 1824 further includes shifting a display location (e.g., 1826 is closer to the middle of the display in FIG. 18H as compared to FIG. 18G), on the display 1808, of the magnification adjustment affordance 1826 away from an edge of the display (or touchscreen display screen) toward a center of the display 1808. In some examples, if the device is in a portrait mode or is held vertically, the affordance would appear to shift up. In some examples, if the device is in a landscape mode or is held horizontally, the affordance would appear to shift left, toward the left edge of the display device.

As further illustrated in FIGS. 18F-18H, in some embodiments, the size of the magnification adjustment affordance (e.g., affordance 1826) changes as it becomes a part of the zoom control (e.g., it reduces in size). In some embodiments, the electronic device 1800 displaying, on the display 1808, the zoom control 1824 further includes reducing a display size of the magnification adjustment affordance (e.g., 1812 of FIG. 18D becomes 1826 of FIG. 18F). In some embodiments, the magnification adjustment affordance 1812 is constant in size and does not reduce in size as it becomes part of the zoom control. In some embodiments, the magnification adjustment affordance 1812 changes a visual property (e.g., color, contrast, hue, transparency, shape) as it becomes part of the zoom control 1824.

As further illustrated in FIGS. 18F-18H, in some embodiments, the zoom control 1824 is represented in the viewfinder 1806 as a dial 1824. In some embodiments, the electronic device 1800 displaying, on the display, the zoom control 1824 further includes: displaying a portion of a zoom control dial 1824. In some examples the zoom control is a displayed as a wheel, dial, semi-dial, a portion of a dial, or slider. In some examples, the zoom control displays various magnification levels at which media is or will be, optionally, captured. In some examples, the representations of the various magnification levels are distributed along the zoom control 1824. In some examples, the representations of the various magnification levels change (e.g., rotate) when the zoom control rotates.

As further illustrated in FIGS. 18F-18H, in some embodiments, when the zoom control is initially displayed, it increases in size. In some embodiments, displaying the zoom control 1824 includes sliding the zoom control onto the display 1808. In some examples, displaying the zoom control 1824 includes displaying the zoom control 1824 at a first size and then increasing the zoom control 1824 to a second size larger than the first size.

As illustrated in FIGS. 18I-18L, in some embodiments, after a liftoff event (e.g., the user lifts his/her finger) with the touch sensitive surface, the zoom control 1824 will shrink over time and only the affordance 1812 will be displayed. In some embodiments, the magnification adjustment affordance shifts down (e.g., away from a center of the display 1808). In some embodiments, in accordance with the electronic device 1800 not detecting, via the one or more input devices, input at any location corresponding to the zoom control 1824 for a predetermined period of time, the electronic device slides the display of the magnification adjustment affordance 1818 toward the edge of the display (or device 1800) and away from the center of the display. In some embodiments, a predetermined period of time is a predetermined period of time after lift-off or after the user breaks contact with the touch screen. In some embodiments, if the device is in a portrait mode or is held vertically, the magnification adjustment affordance appears to shift (e.g., slide) down. In some embodiments, if the device is in a landscape mode or is held horizontally, the magnification adjustment affordance 1818 appears to shift right, away from the left edge of the display device.

Figure 18I:
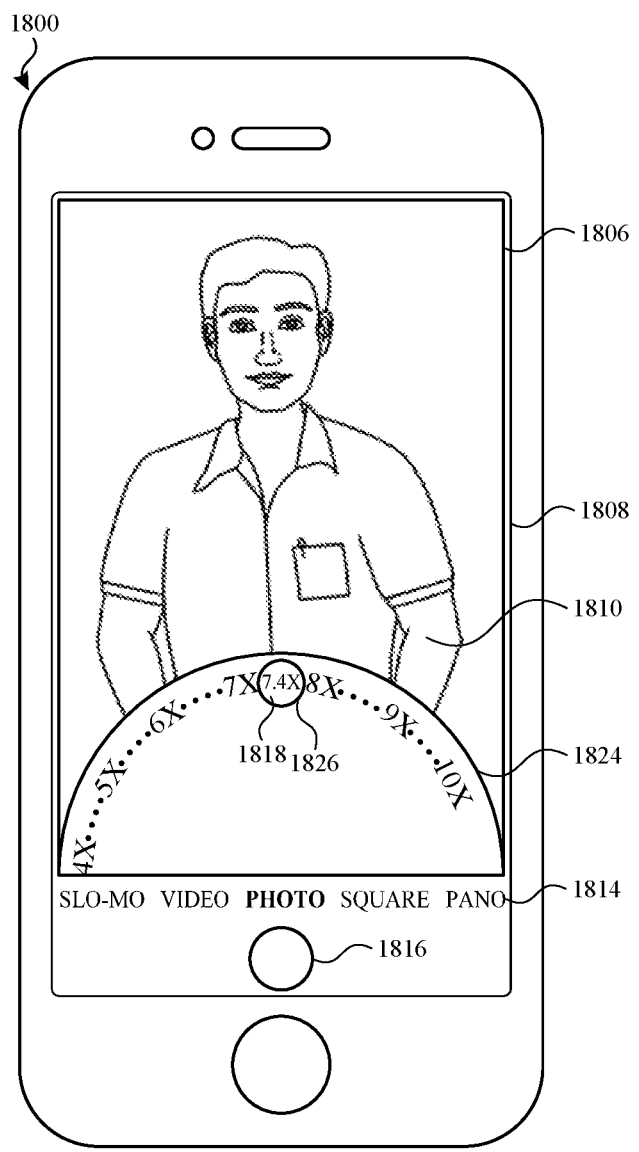
Figure 18J:
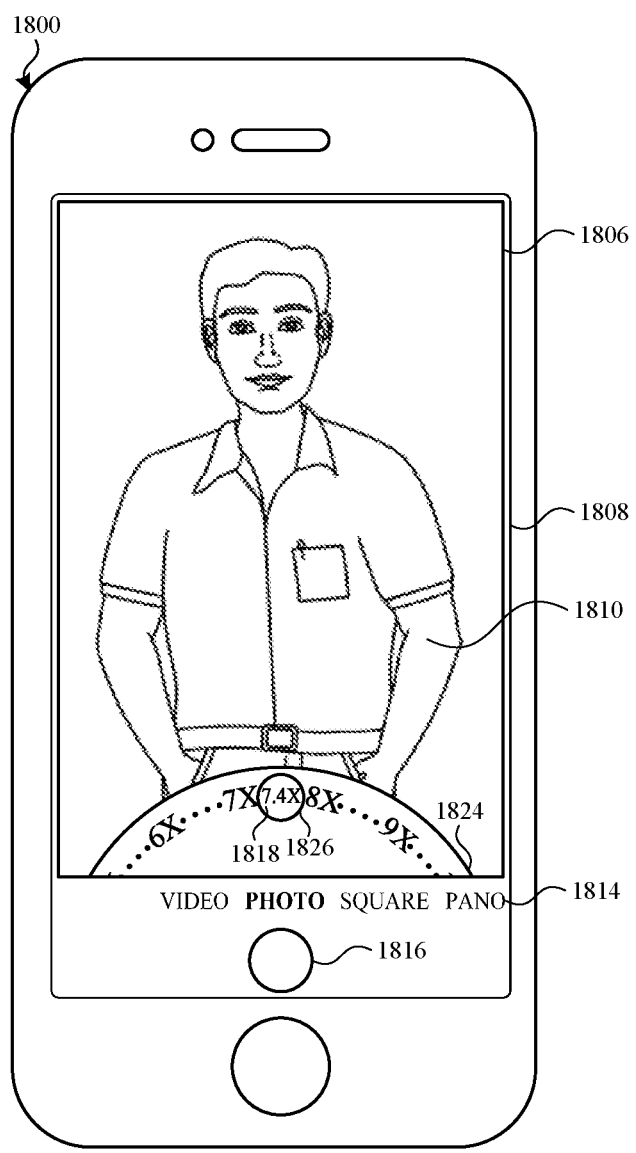
Figure 18K:
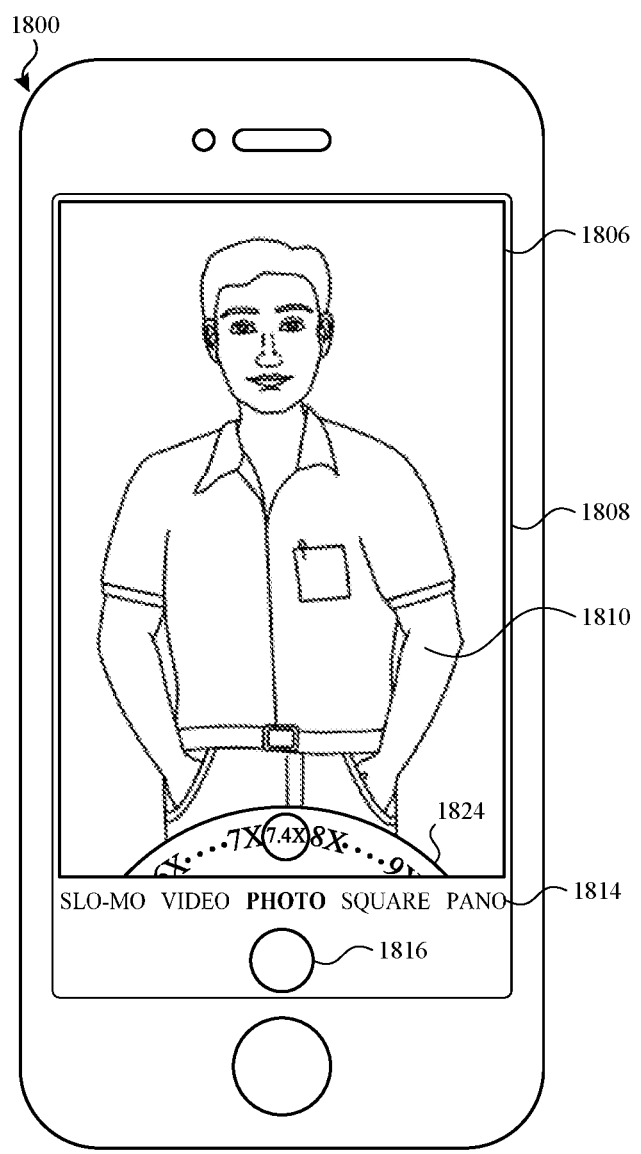
Figure 18L:
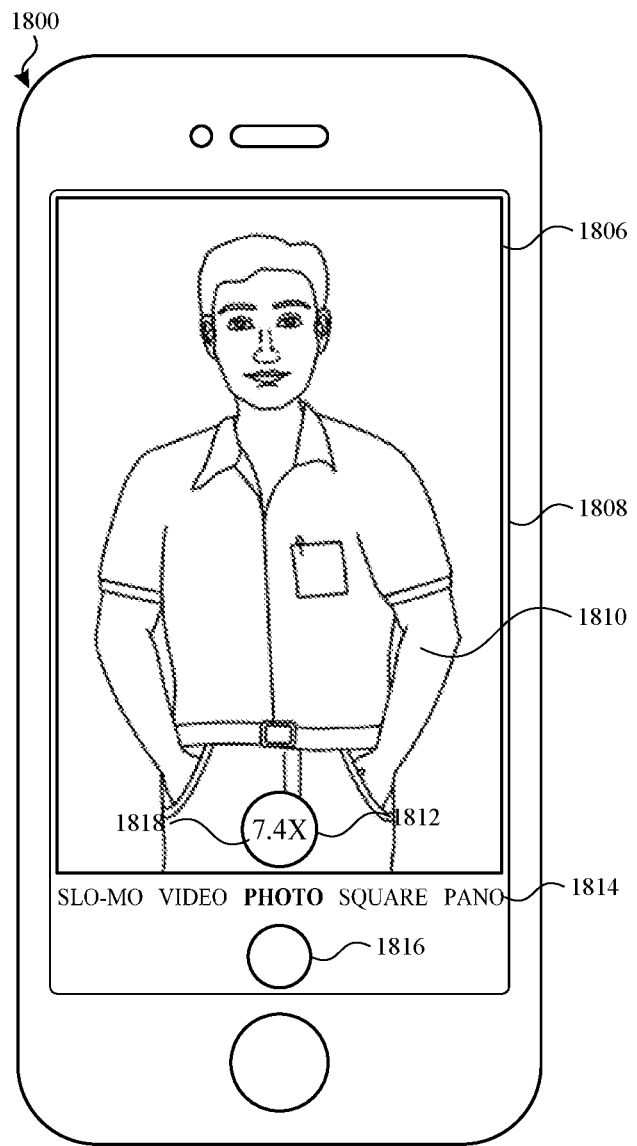

As further illustrated in FIG. 18I-18L, in some embodiments, the zoom control 1824 fades as it shrinks. In some embodiments, in accordance with the electronic device 1800 not detecting, via the one or more input devices, input at any location corresponding to the zoom control 1824 for a predetermined period of time (e.g., after a predetermined period of time after lift-off, after the user breaks contact with the touch screen), the electronic device ceases to display of the zoom control 1824. The transition from FIG. 18H to 18I illustrates a user breaking contact with the input device. In some embodiments, the zoom control 1824 slides off of the display 1808, for example, away from the center of the display and off the edge of the display, and/or fades away. FIG. 18L illustrates the result of the zoom control shrinking and only the magnification adjustment affordance 1812 remains. In some embodiments, the zoom control 1824 changes color, translucence, hue, contract, and/or shape while it disappears from the display.

Figure 18M:
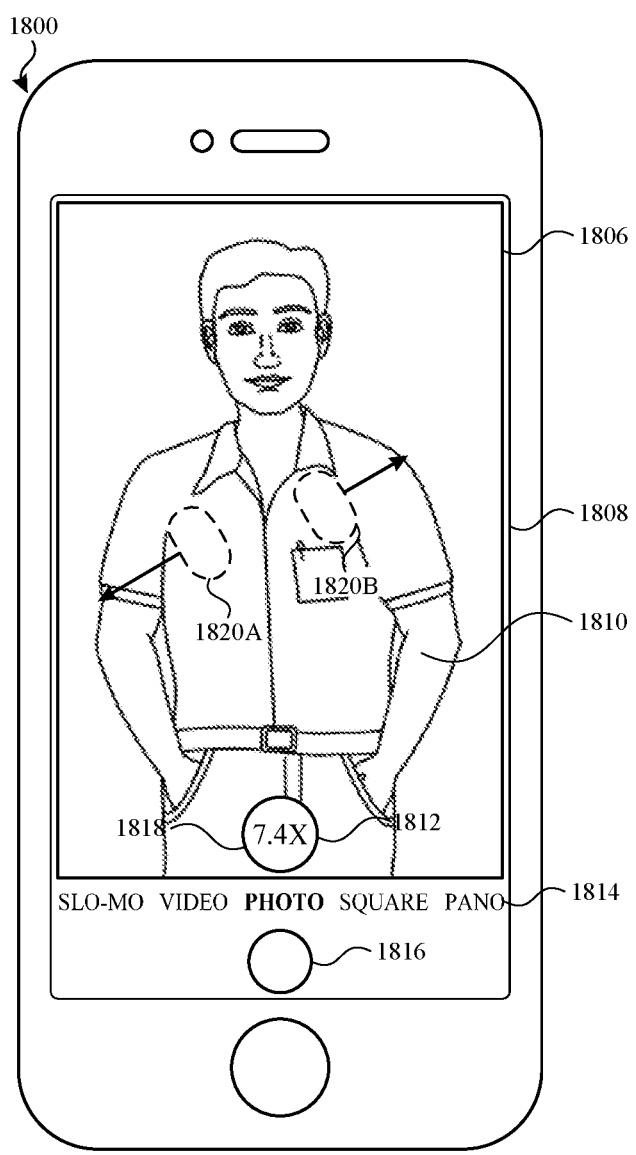
Figure 18N:
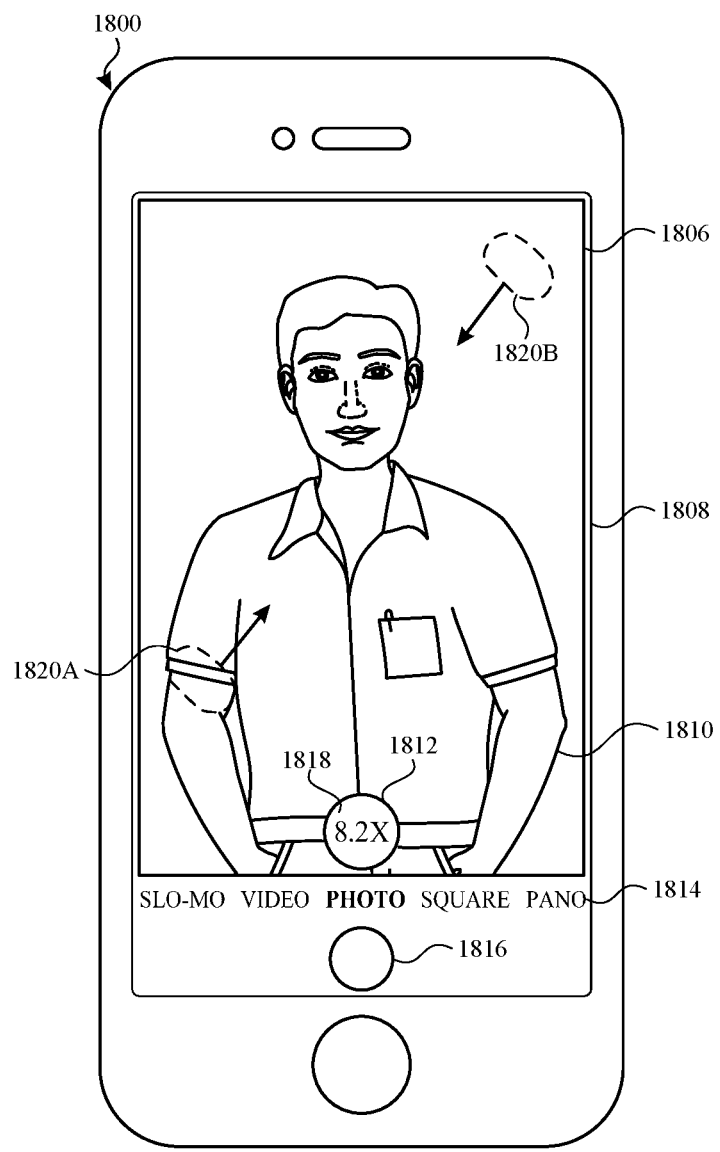
Figure 18O:
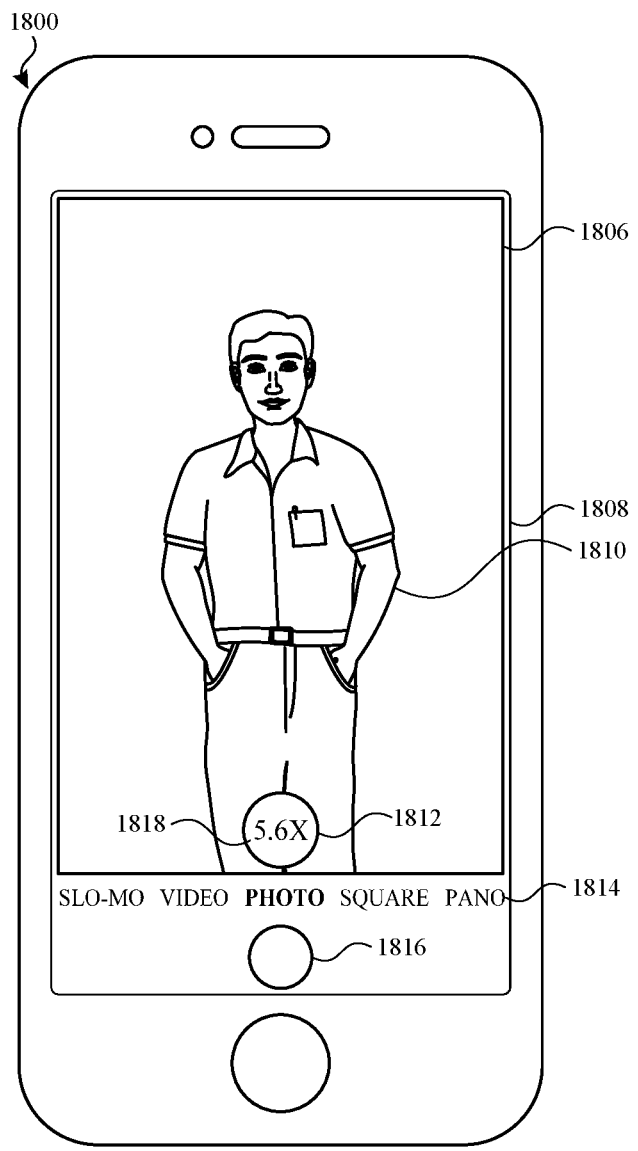

As illustrated in FIGS. 18M-18O, in some embodiments, a pinch gesture on the input device will result in a magnification command without displaying the zoom control 1824. In some embodiments, while the electronic device 1800 displays, on the display 1808, the digital viewfinder 1806 (e.g., that includes live or near-live preview images) for capturing media with the one or more cameras 1802, 1804 at a fourth magnification level and not displaying, on the display, the zoom control 1824, the electronic device detects, via the one or more input devices, a fourth gesture 1820A and 1820B (e.g., a pinch, or de-pinch, gesture) at a location corresponding to the digital viewfinder 1806.

As further illustrated in FIGS. 18M-18O, in some embodiments, in accordance with (and, for example, in response to) the electronic device 1800 determining that the fourth gesture (e.g., 1820A and 1820B) is of a fourth type (e.g., a pinch gesture), the electronic device 1800 prepares to capture media with the one or more cameras 1802, 1804 at a second dynamically-selected magnification level (e.g., a magnification level illustrated in FIG. 18N) different from the fourth magnification level. In some embodiments, the respective magnification level is selected based on a magnitude (e.g., speed, acceleration, intensity, magnitude of displacement) of the fourth gesture (e.g., pinch or depinch gesture 1820A and 1820B). Additionally, in some embodiments, the electronic device 1800, forgoes displaying, on the display 1808, the zoom control 1824.

As further illustrated in FIGS. 18M-18O, in some examples, the device 1800 concurrently displays, with the digital viewfinder 1806, the magnification adjustment affordance 1812 with the current magnification level (e.g., 1818, illustrating the magnification level) for capturing media with the one or more cameras 1802, 1804 and the current magnification level for the viewfinder 1806. In some examples, the current magnification level is represented as a 1×/2× affordance label, an icon, textual representation indicating the magnification level, or image. In some embodiments, in accordance with and, optionally, in response to the electronic device 1800 detecting the fourth gesture, the electronic device 1800 updates the displayed current magnification level (e.g., 1818, illustrating the magnification level) for capturing media with the one or more cameras 1802, 1804 and the current magnification level for the viewfinder 1806.

Figure 18P:
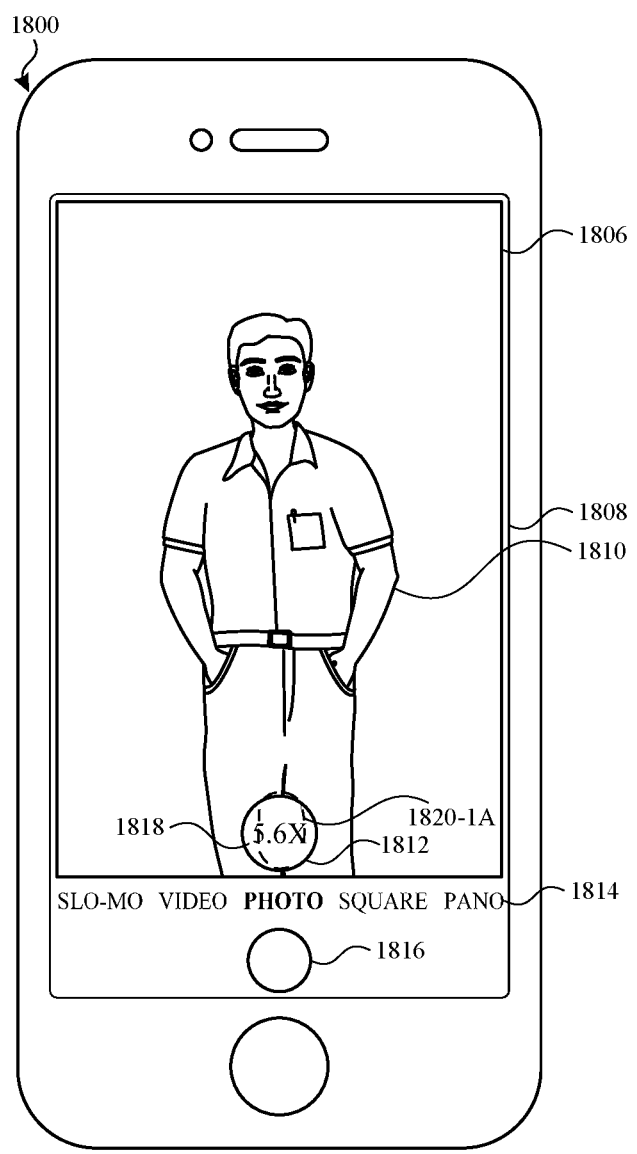
Figure 18Q:
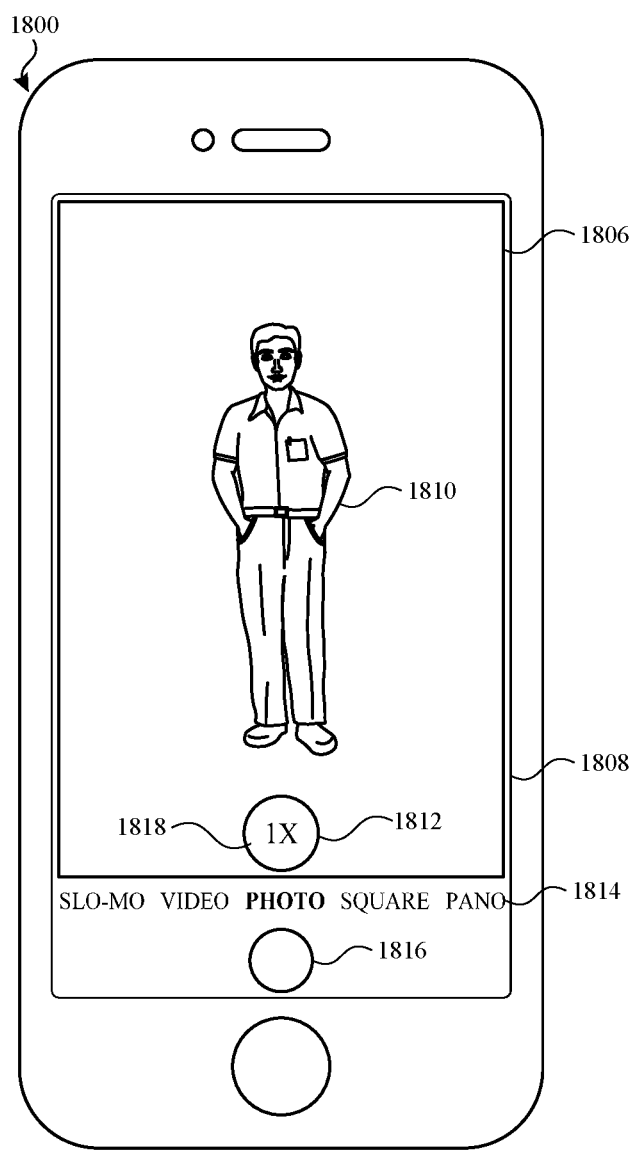
Figure 18R:
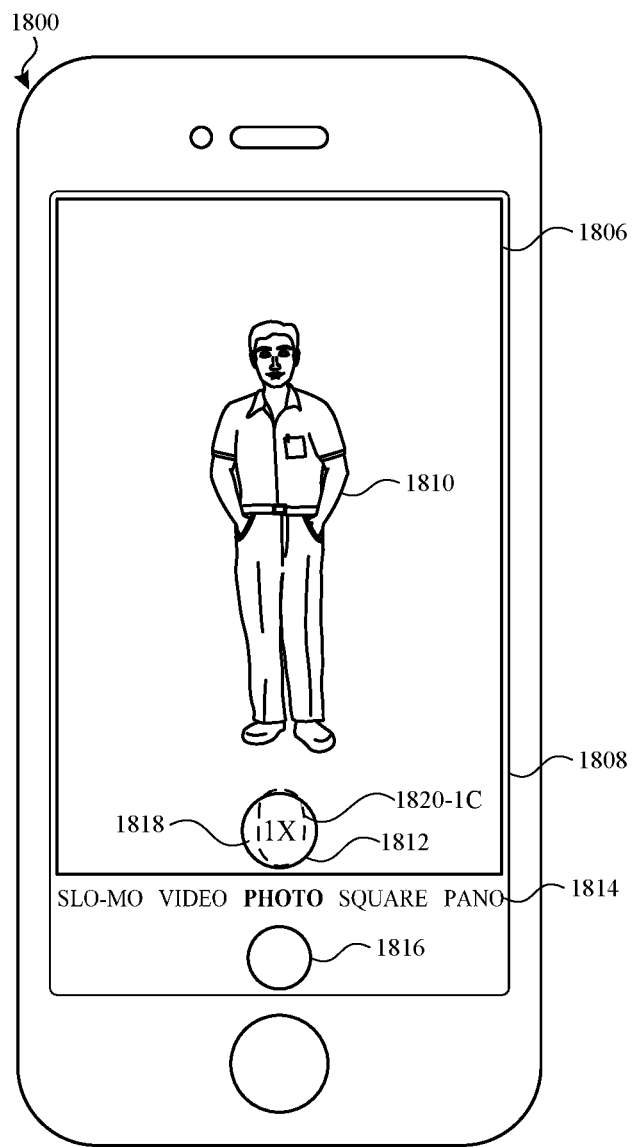
Figure 18S:
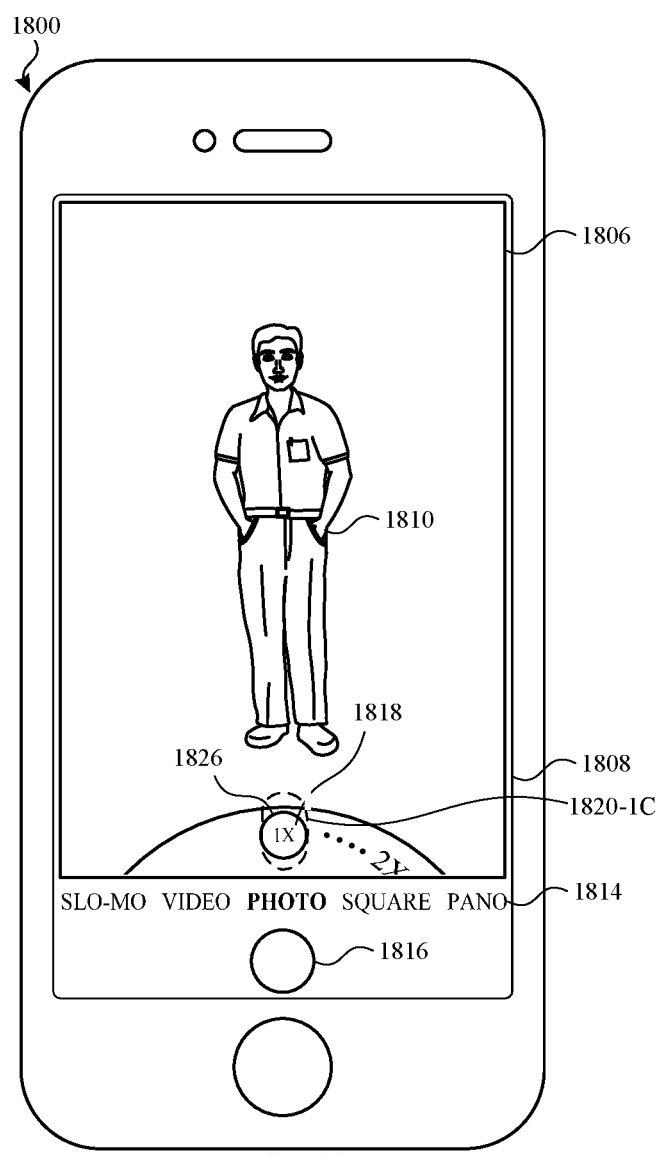
Figure 18T:
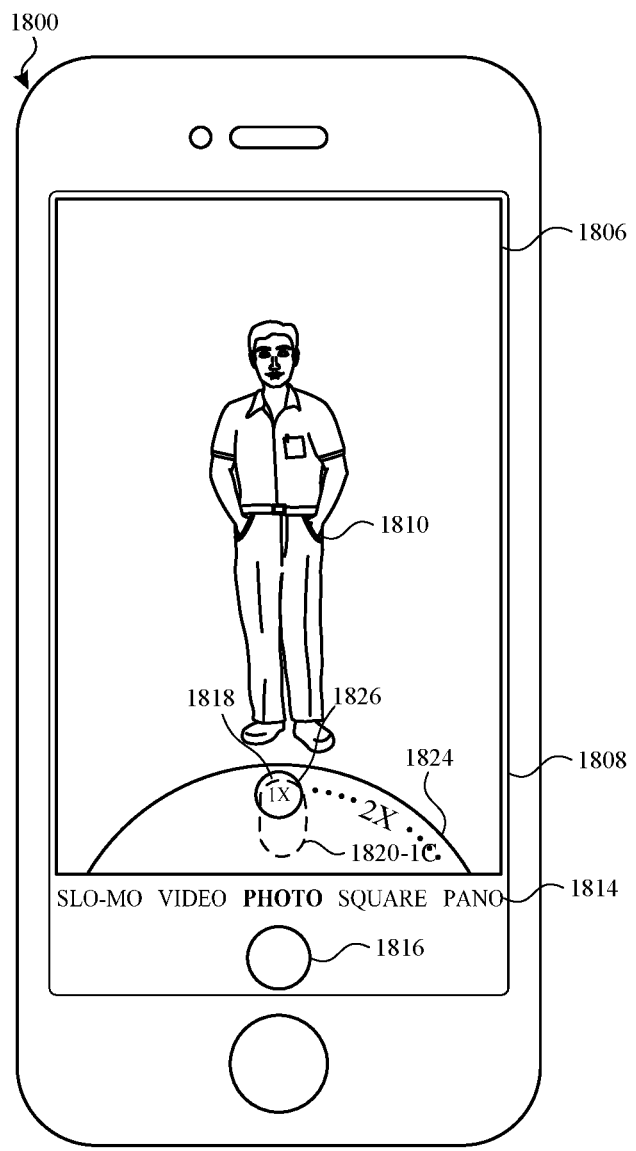
Figure 18U:
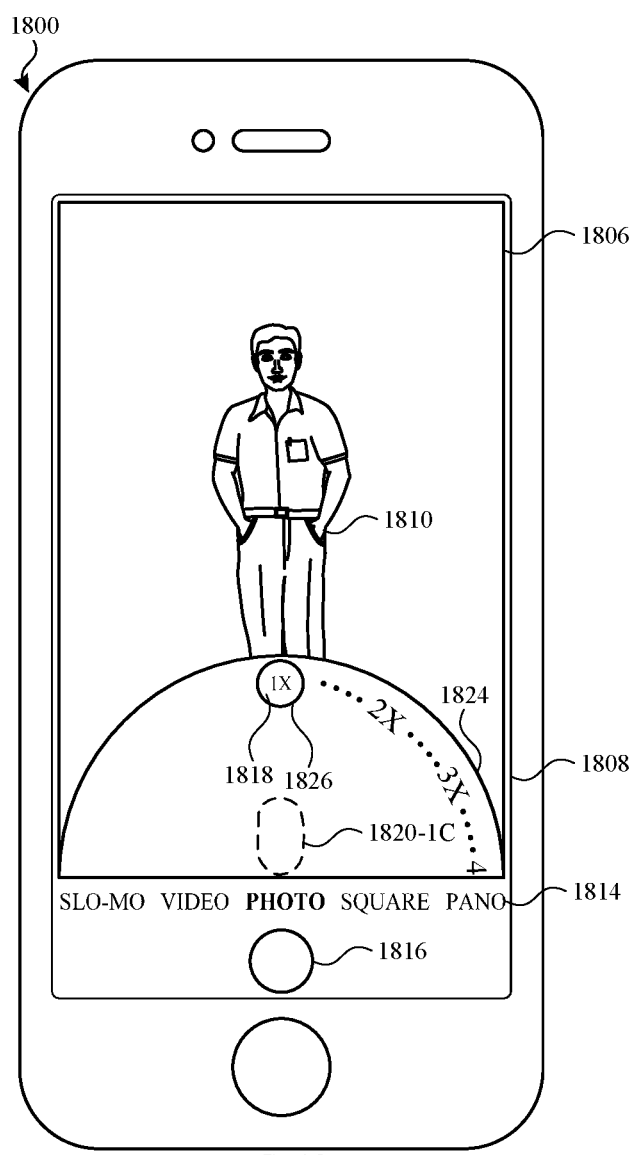
Figure 18V:
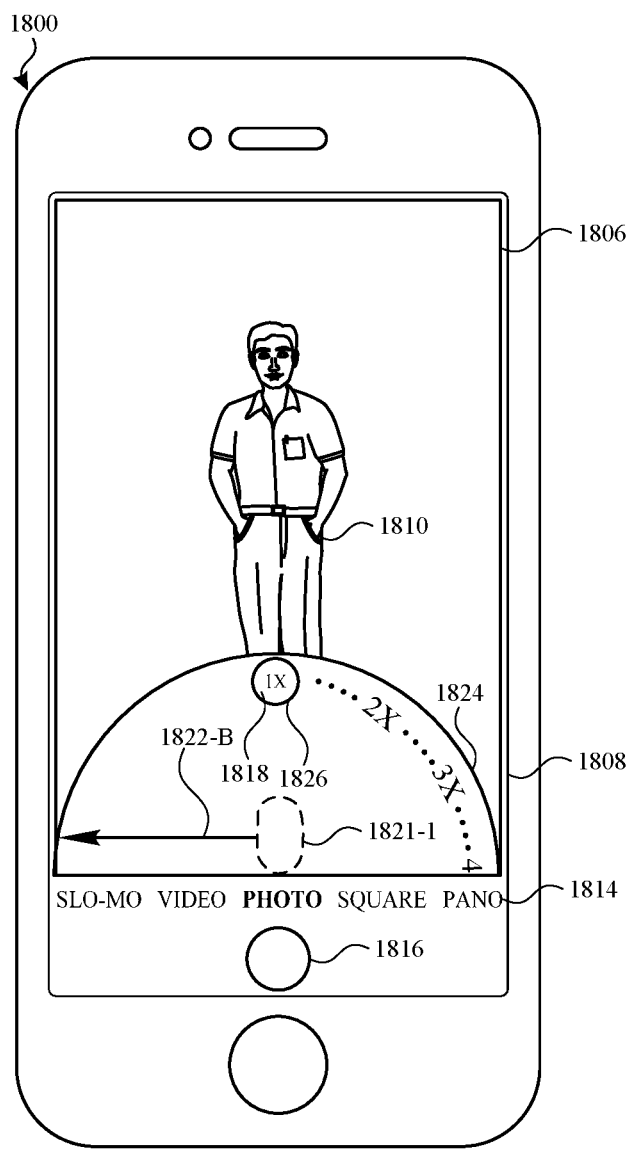
Figure 18W:
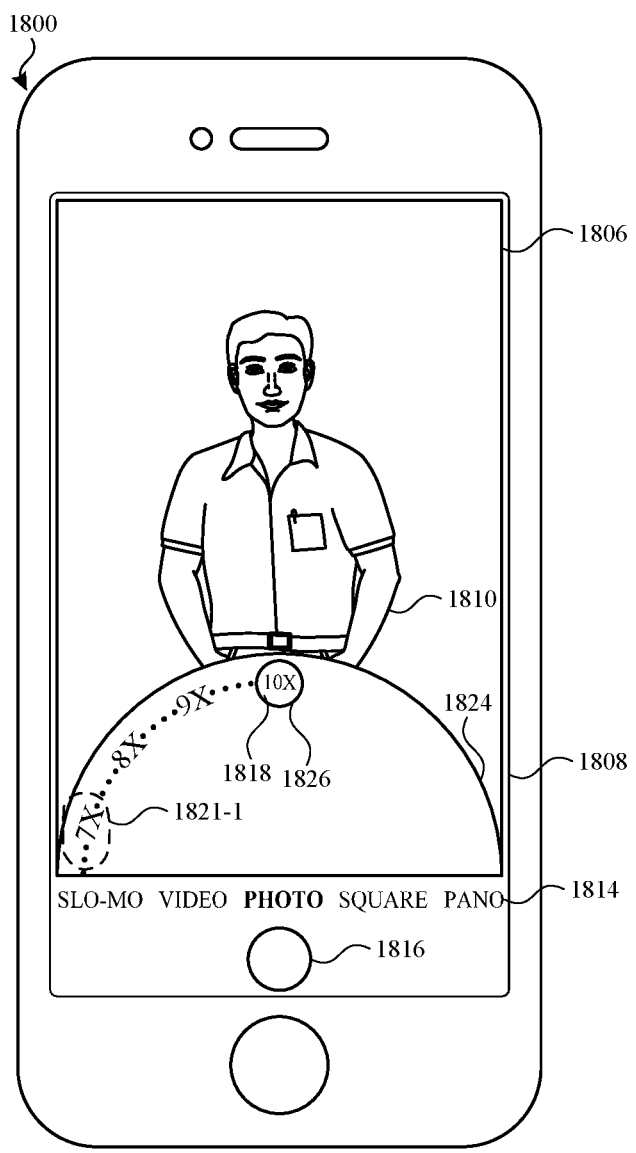
Figure 18X:
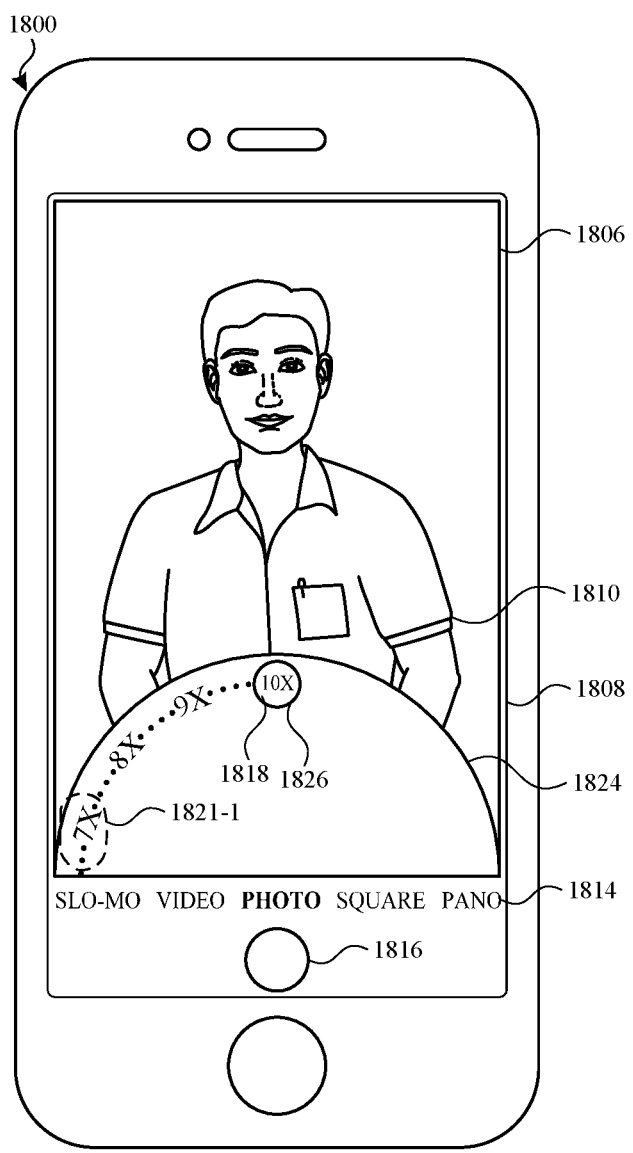
Figure 18Y:
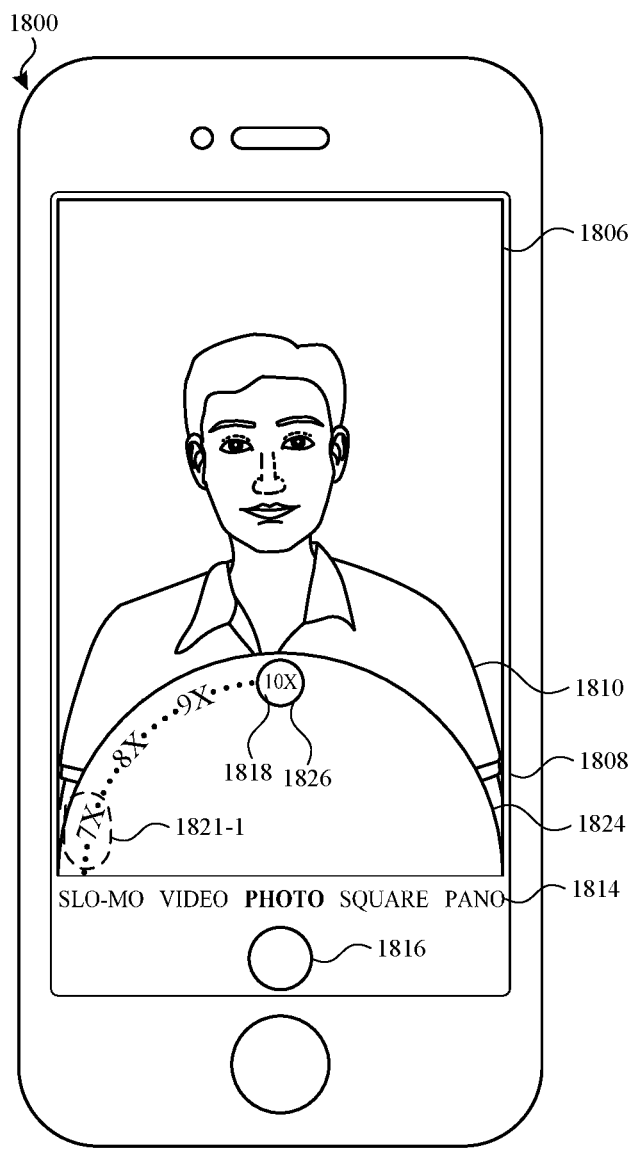

As illustrated in FIGS. 18P-18Q, in some embodiments, when a gesture 1820-1A (e.g., tap gesture) is detected at a location corresponding to the magnification adjustment affordance 1812, the electronic device 1800 prepares to capture media with the one or more cameras 1802, 1804 at a predetermined magnification level. In some embodiments, the predetermined magnification level corresponds to the lowest, optionally optical, magnification level available (e.g., 1×). In some embodiments, the predetermined magnification level corresponds to the highest, optionally optical, magnification level (e.g., 10×).

As illustrated in FIGS. 18R-18U, in some embodiments, when the first gesture (e.g., 1820-1C) is determined to be a tap and hold, the electronic device 1800 displays, on the display 1808, a zoom control for selecting a dynamically-selected magnification level from a plurality of magnification levels. In some embodiments, in accordance with a determination that the first gesture (e.g., 1820-1C) is of a third type (e.g., tap-and-hold gesture) different from the first type (e.g., tap gesture) and the second type (e.g., swipe gesture), the electronic device displays, on the display 1808, a zoom control 1824 for selecting a dynamically-selected magnification level from a plurality of magnification levels. In some embodiments, a tap and hold gesture is determined when the electronic device detects an input for greater than a predetermined amount of time. In some embodiments, as illustrated in FIGS. 18R-18U, the representation of the magnification level 1818 (e.g., 1×) remains constant while the zoom control 1824 slides onto the display 1808. In some embodiments, as illustrated in FIGS. 18R-18U, the magnification level remains constant while the zoom control 1824 slides onto the display 1808. In some embodiments, while the zoom control is sliding onto the display 1800, the magnification level will adjust if the electronic device detects a movement of the input.

As illustrated in FIGS. 18V-18Y, in some embodiments, if the zoom control dial 1824 is displayed on the display 1808 and the electronic device 1800 detects a swipe gesture at a location corresponding to the zoom control dial 1824, the zoom control dial will appear to rotate and the locations of the magnification levels displayed within the zoom control will change accordingly. In some embodiments, while displaying the zoom control 1824 and while the electronic device 1800 is prepared to capture media with the one or more cameras 1802, 1804 at a third magnification level (e.g., a 1× magnification level represented by indicator 1818 of FIG. 18V), the electronic device 1800 detects, via the one or more input devices, a second gesture (e.g., swipe gesture 1821-1) at a location corresponding to the zoom control 1824. In some embodiments, in accordance with and, for example, in response to a determination that the second gesture (e.g., 1821-1) is of the second type (e.g., a swipe gesture), the electronic device 1800 rotates display of the zoom control 1824 (e.g., rotating by an amount that corresponds to a magnitude 1822-B of the second gesture). In some embodiments, the electronic device prepares to capture media with the one or more cameras at a fourth magnification level (e.g., a 10× magnification level represented by indicator 1818 of FIG. 18Z) (e.g., based on a magnitude 1822-B of the second gesture 1821-1) that is different from the third magnification level. In some examples, the zoom control dial 1824 and the magnification levels displayed within appear to rotate, like a wheel. In some examples, the zoom control dial 1824 appears to rotate at a rate that is accelerated based on one or more of: a speed of movement of the contact, a direction of movement of the contact, and/or a proximity of the contact to an edge of a touch-sensitive surface (e.g., as described in greater detail with reference to FIGS. 22A-22J and 23A-23B).

Figure 18Z:
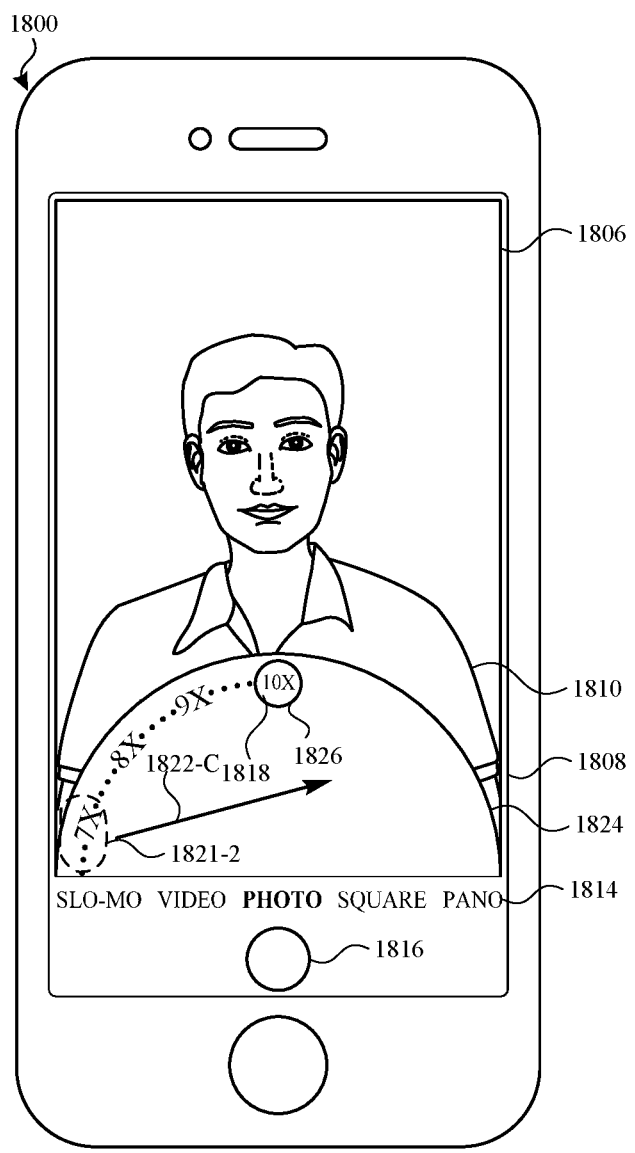
Figure 18A:
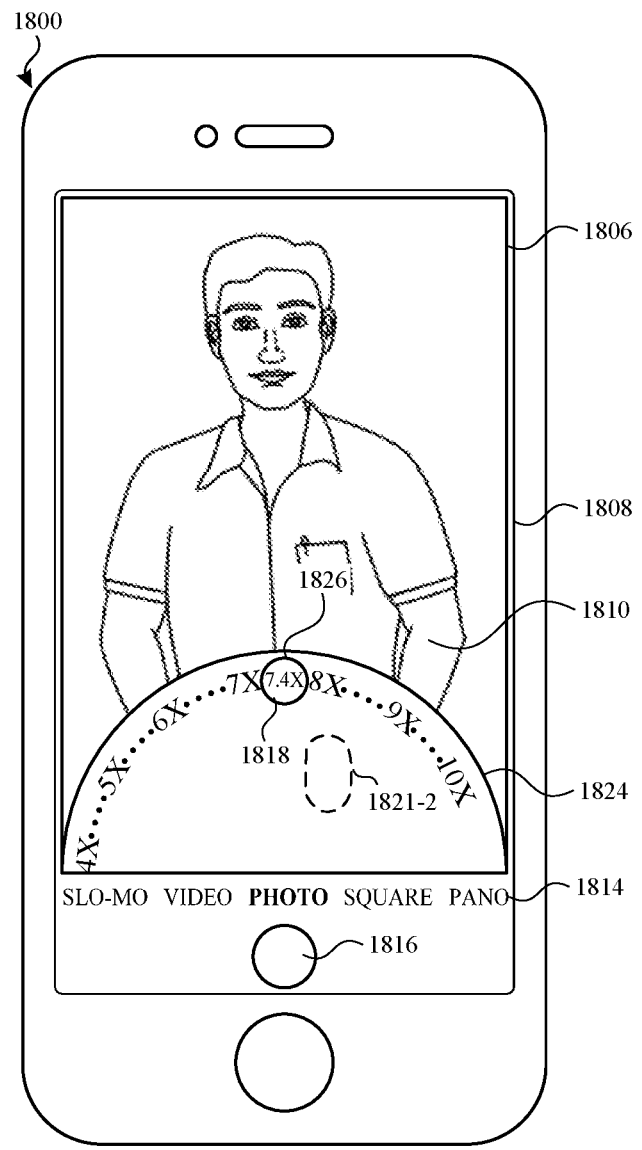
Figure 18A:
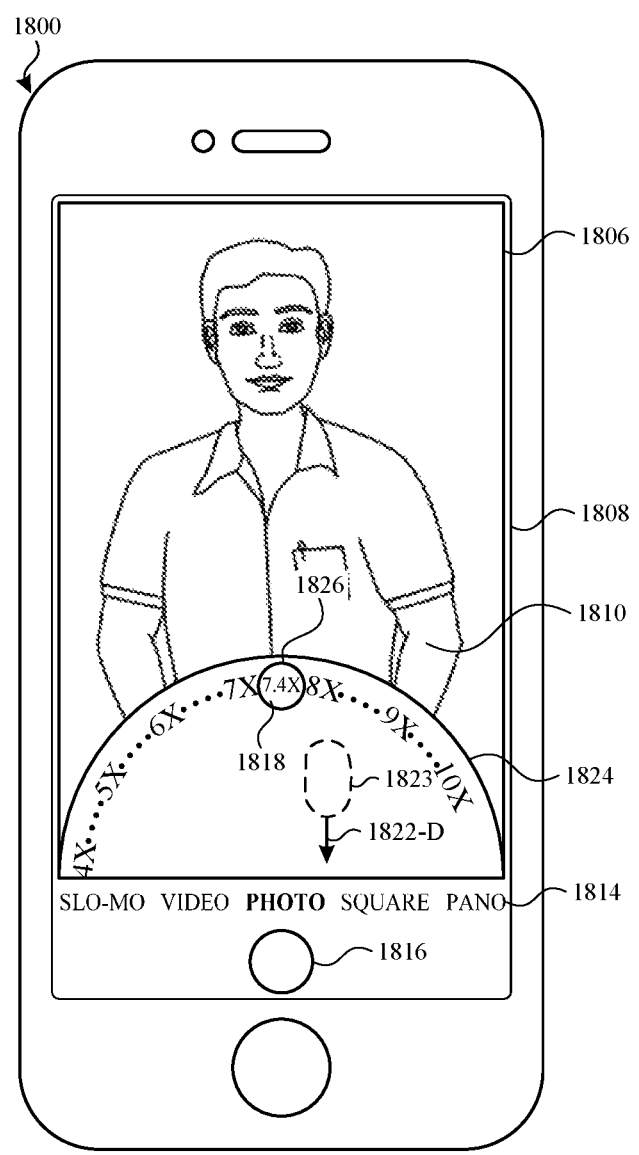
Figure 18A:
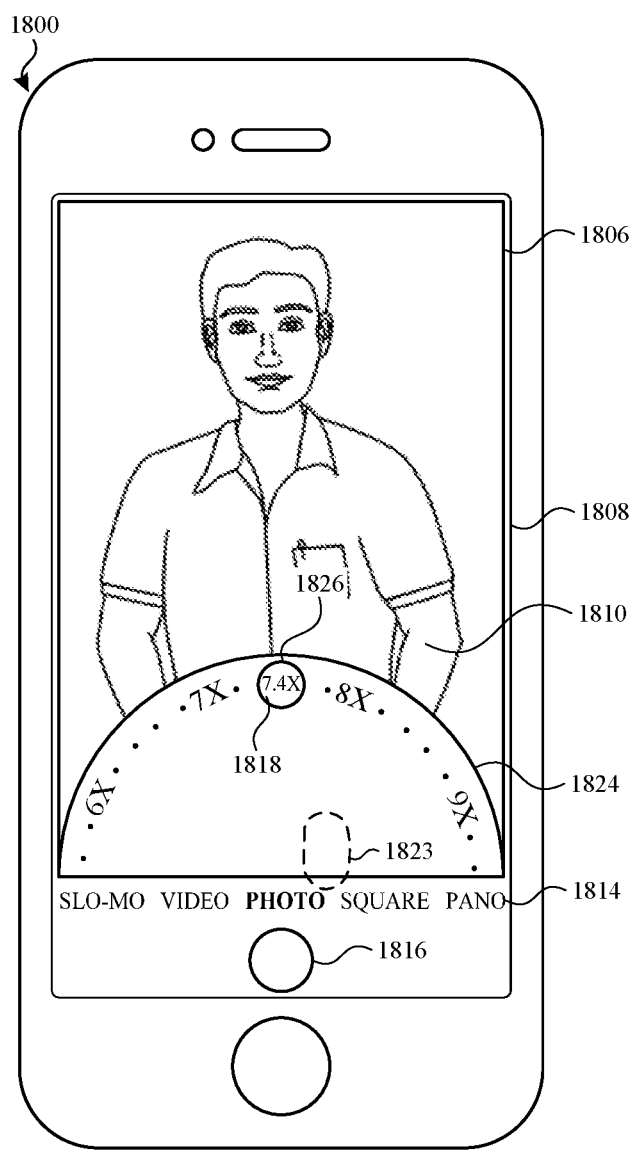
Figure 18A:
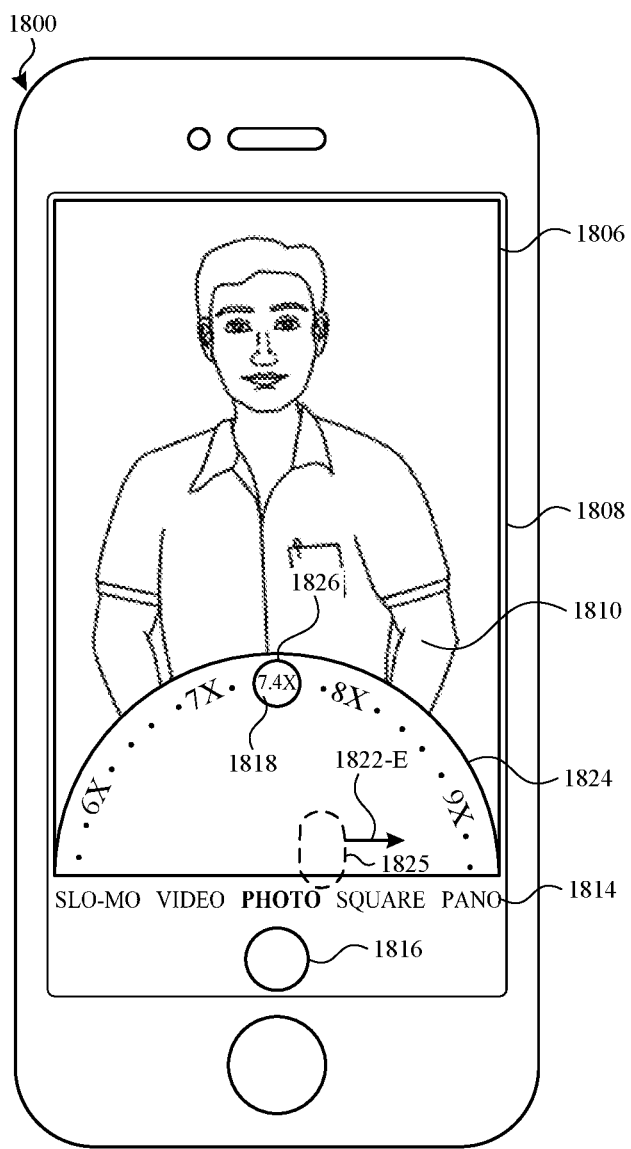
Figure 18A:
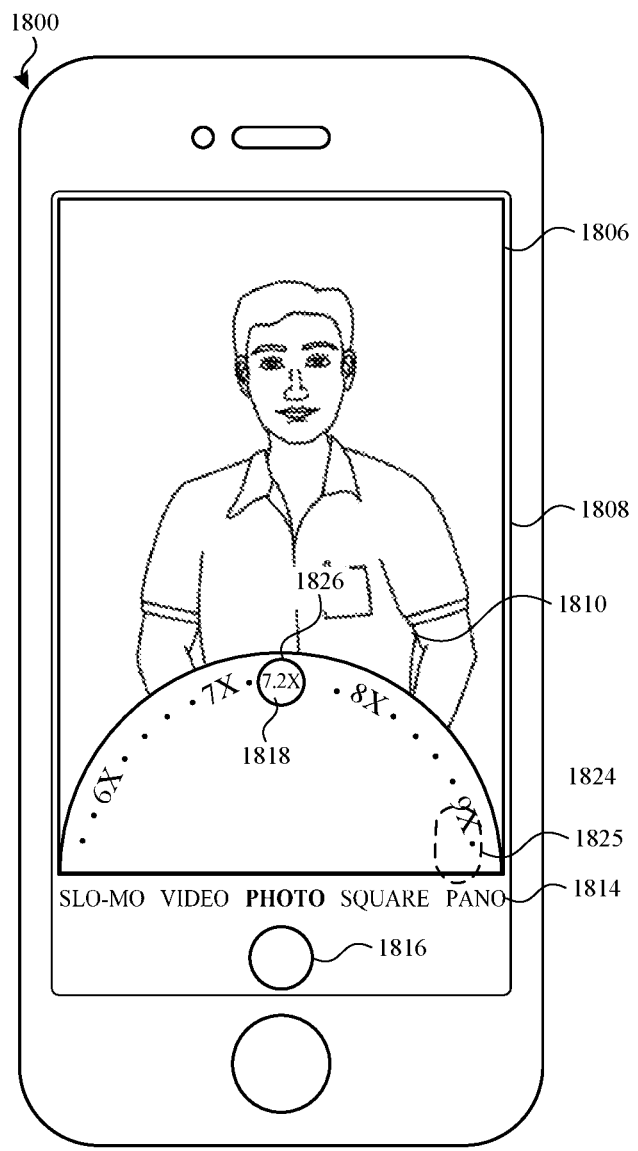
Figure 18A:
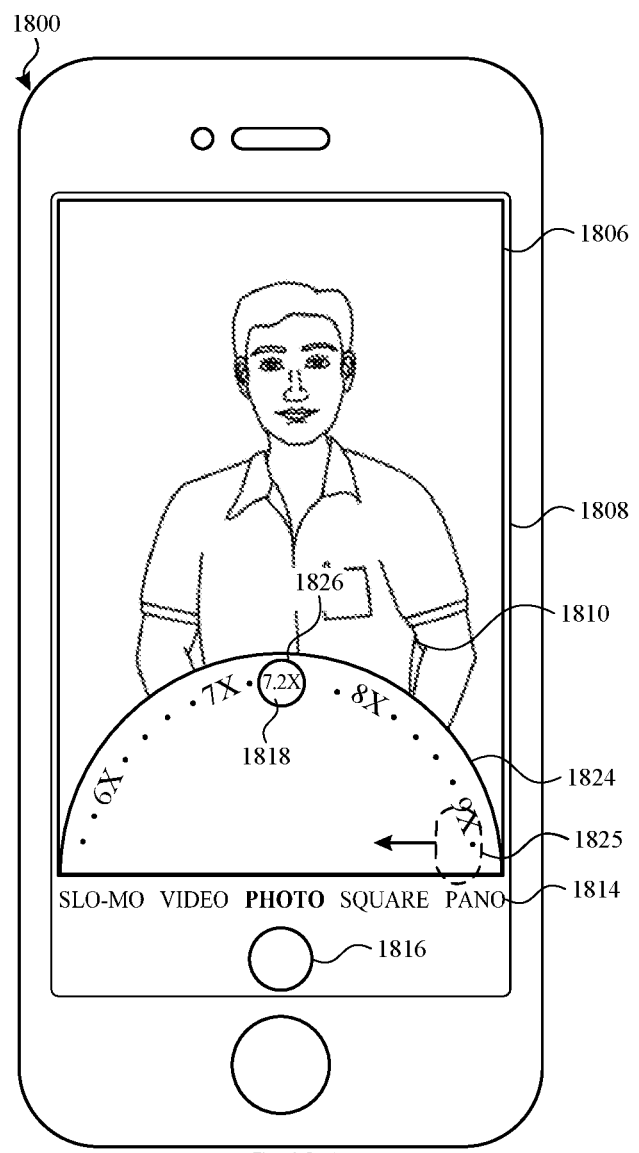
Figure 18A:
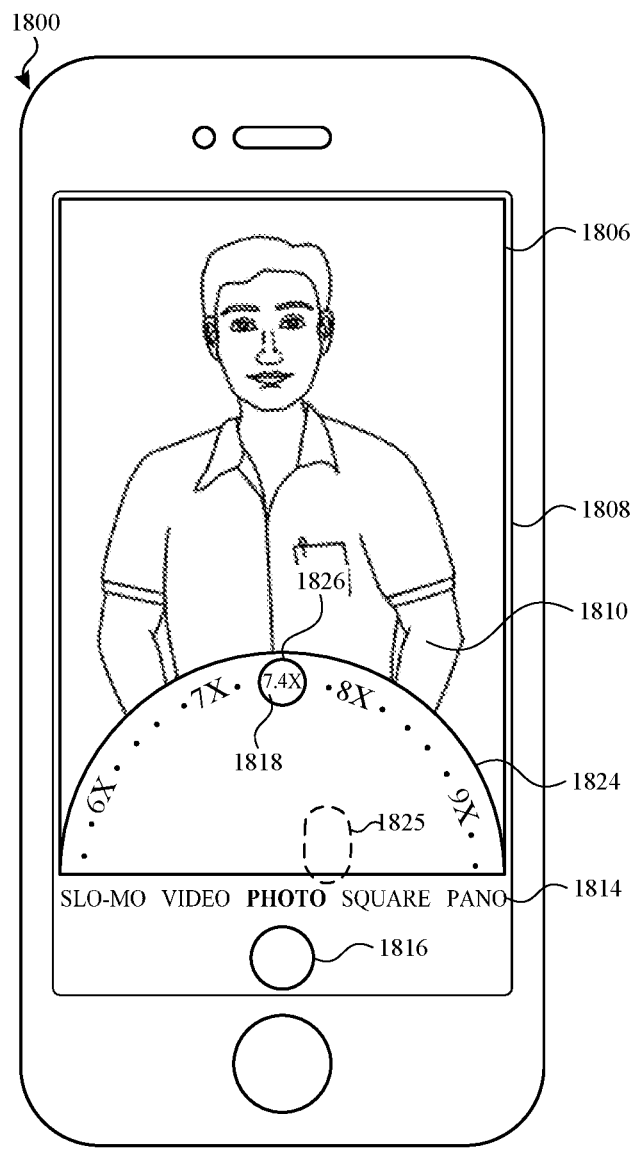
Figure 18A:
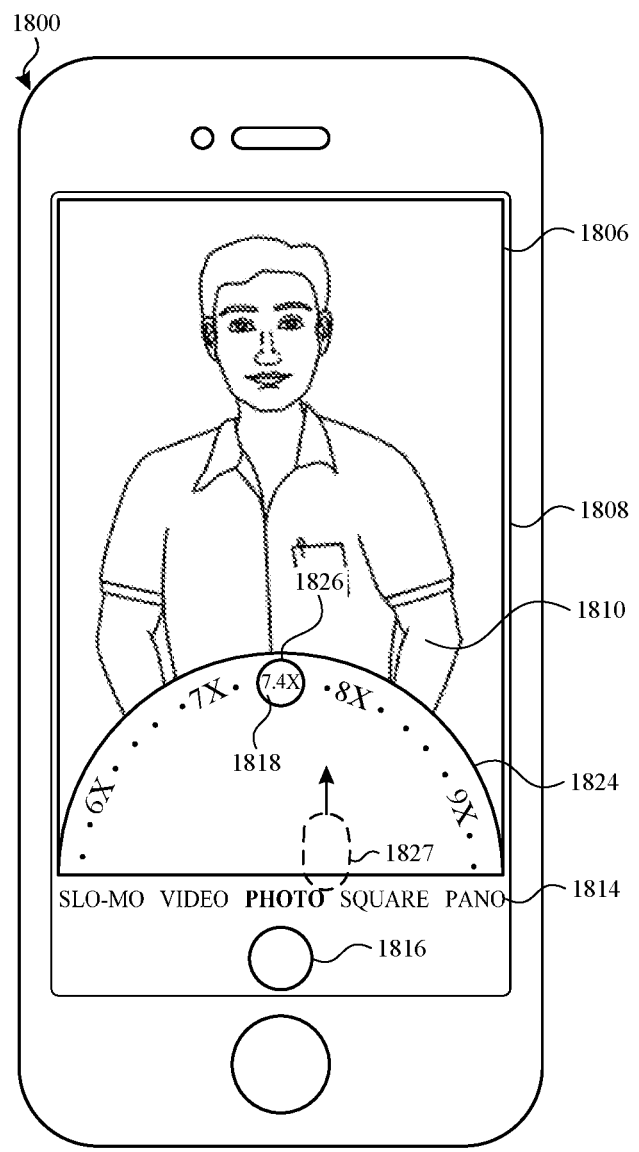
Figure 18A:
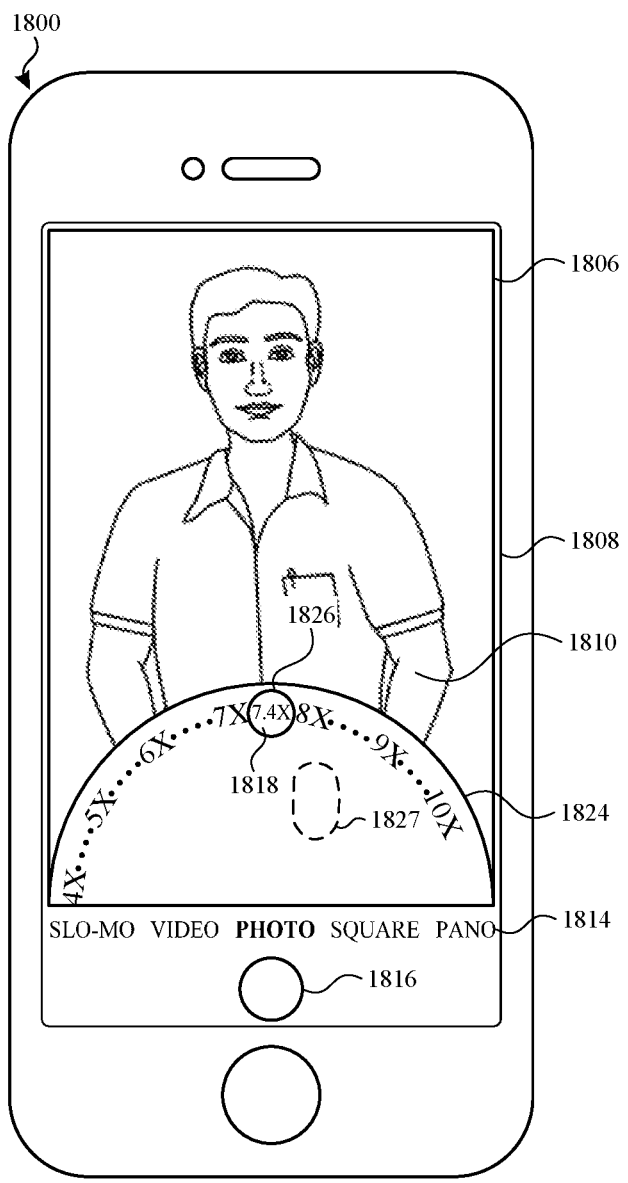
Figure 18A:
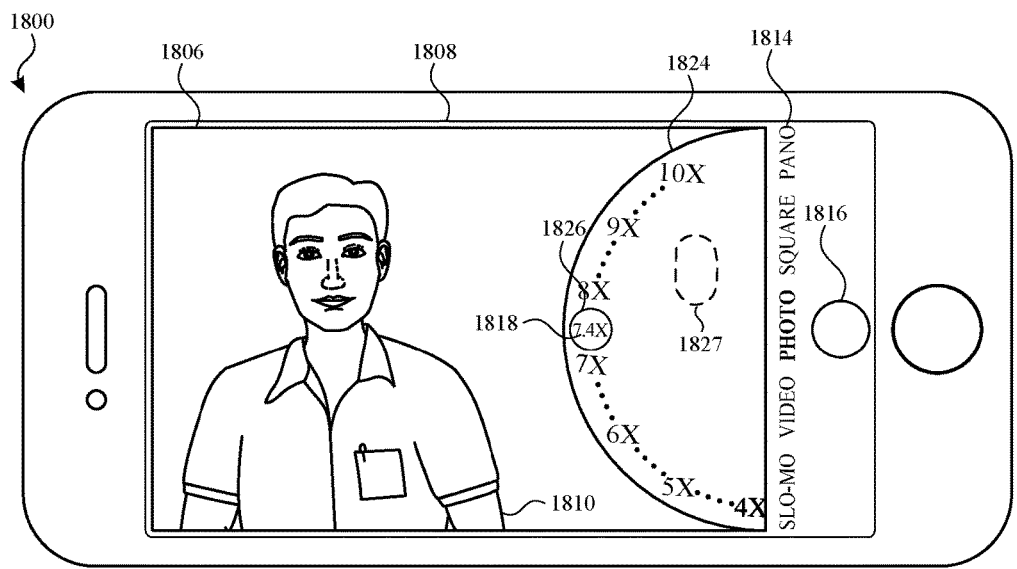
Figure 18A:
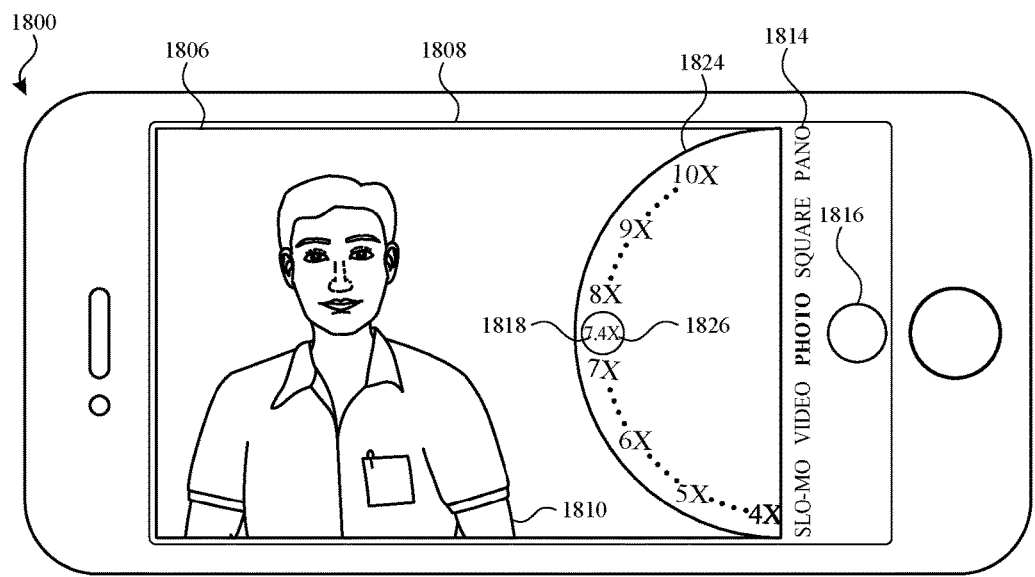
Figure 18A:
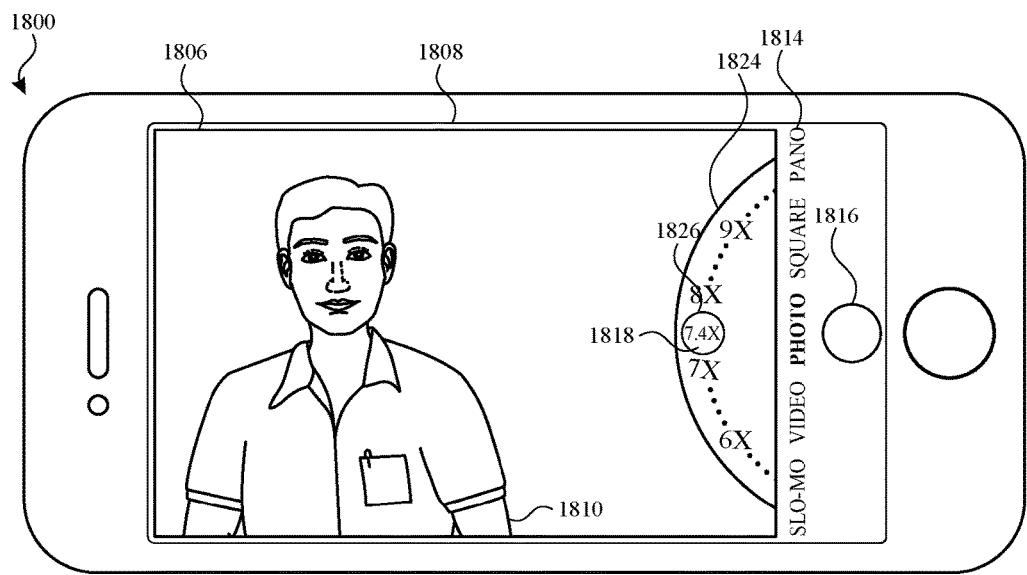
Figure 18A:
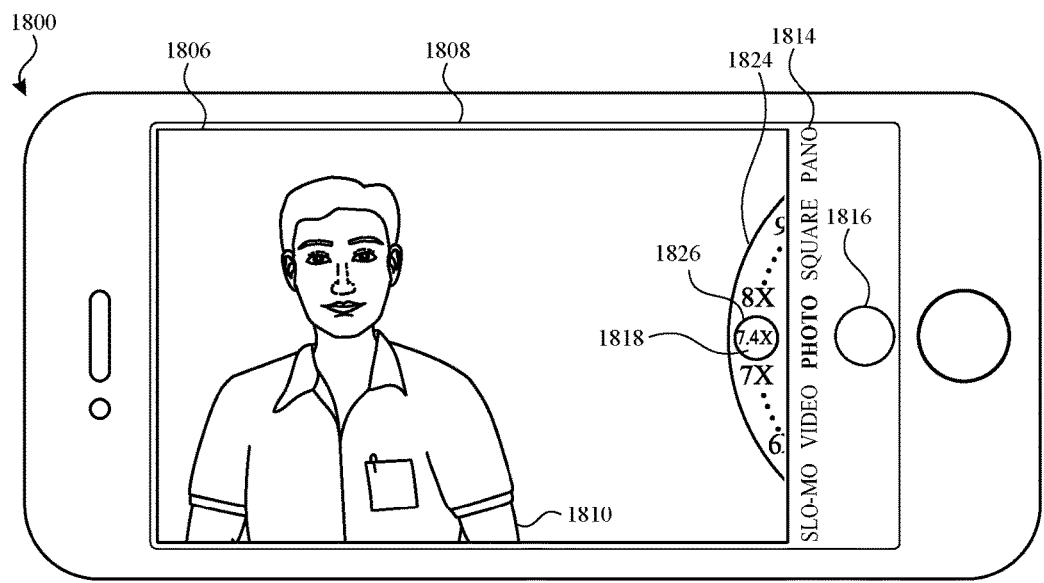
Figure 18A:
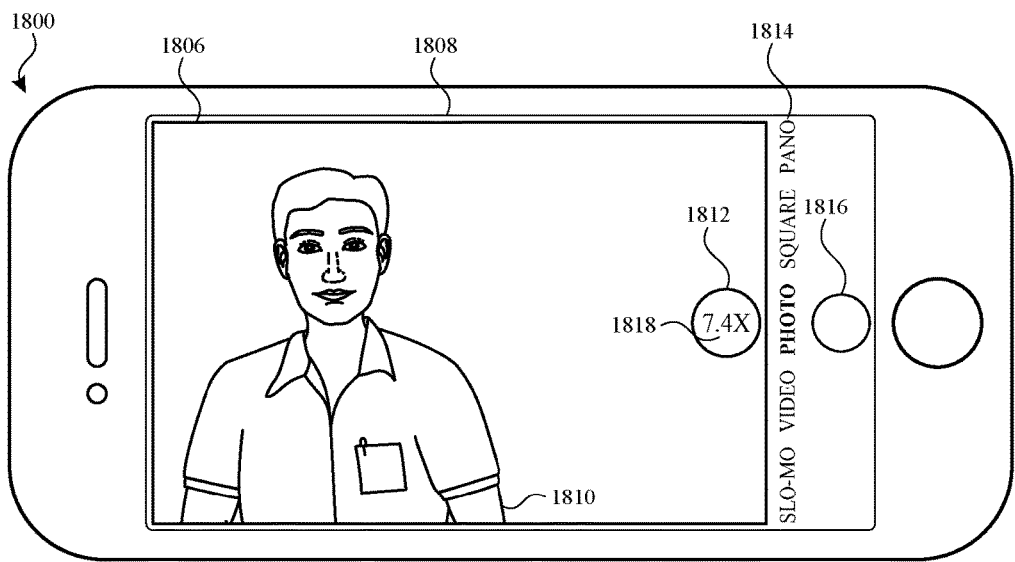

As further illustrated in FIGS. 18Z-18AA, in some embodiment, the electronic device 1800 will determine the magnitude of a swipe gesture. Based on the magnitude (e.g. 1822-C) of the swipe gesture (1821-2), the electronic device will rotate the zoom control on the display 1808, corresponding to the magnitude of the swipe gesture. In some examples, a longer swipe gesture will result in the zoom control appearing to rotate more than a shorter swipe gesture.

As further illustrated in FIGS. 18V-18Y, the electronic device 1800 performs smooth, cinematic-style zooms with reduced (or eliminated) sudden zooms in the viewfinder (and in recorded videos), even when the magnification adjustment affordance is already at the desired magnification level. For example, as illustrated in FIGS. 18V-18Y, even though the magnification level displayed in the magnification adjustment affordance is already at the desired final magnification level (10×), the magnification level at which the viewfinder is displayed does not immediately match the indicated magnification level (e.g., 10×) 1818. Instead, the viewfinder smoothly, over time (e.g., fractions of seconds, seconds) changes the viewfinder's 1806 magnification level so as to match the user's desired target magnification level, which is already indicated in the magnification adjustment affordance 1818. This technique is described in greater detail above, with reference to FIGS. 10A-10T and 11.

In some embodiments, the viewfinder zoom rate is increased when the gesture acceleration threshold is met. In some embodiments, in accordance with and, for example, in response to the electronic device 1800 determining that a rate of the second gesture is less than a predetermined threshold, magnifying the digital viewfinder at a first rate. In some embodiments, in accordance with and, for example, in response to the electronic device determining that the rate of the second gesture is greater than (or greater than or equal to) the predetermined threshold, magnifying the digital viewfinder at a second rate, wherein the first rate is less than the second rate. Exemplary techniques for speeding up navigation and/or magnification are described in greater detail with reference to FIGS. 22A-22J and 23A-23B.

In some embodiments, if the rate of change of arc degrees of the gesture (e.g., with respect to a center of the dial) exceeds a predetermined threshold, the zoom rate is increased. In some embodiments in accordance with and, for example, in response to the electronic device determining that the rate of change of the second gesture (e.g., the rate of change of arc degrees with respect to a center of the partial circle) is less than a second predetermined threshold, magnifying the digital viewfinder 1806 at a first rate. In some embodiments in accordance with and, for example, in response to the electronic device determining that the rate of the second gesture (e.g., the rate of change of arc degrees with respect to a center of the partial circle) is greater than (or greater than or equal to) the second predetermined threshold, magnifying the digital viewfinder at a second rate, wherein the first rate is less than the second rate. In some embodiments the zoom rate is determined based on a rate of movement of a contact along a particular axis of the touch-sensitive surface or a linear rate of movement of the contact on the touch-sensitive surface.

As illustrated in FIGS. 18AB-18AC, in some embodiments, a swipe down gesture (e.g., 1823) will result in changing the granularity of the zoom control 1824. In some embodiments, while displaying, on the display 1808, a zoom control 1824 (e.g., a zoom control dial) for changing the magnification level for capture media with the one or more cameras 1802, 1804, wherein the zoom control has a degree of granularity (e.g., a first input having a first input characteristic affects the degree of magnification based on the degree of granularity of the zoom control), the electronic device 1800 detects a third gesture (e.g., swipe down gesture 1823 away from the center of the display, towards an edge of the display) at a location corresponding to the zoom control (e.g., 1824) with a magnitude (e.g., 1822-D). In some embodiments, in response to detecting the third gesture (e.g., 1823), the electronic device changes the degree of granularity of the zoom control (while continuing to display the zoom control 1824). In some examples, the same input (e.g., 1823) alters the magnification level to a first value when the zoom control 1824 is at a first degree of granularity and alters the magnification level to a second value, greater than the first value, when the zoom control 1824 is at a second degree of granularity lower than the first degree of granularity.

As illustrated in FIGS. 18AB-18AC, in some embodiments, the change in granularity is represented as a visual indication (e.g., by expanding the dots on the zoom control). In some embodiments, the zoom control includes representations of a plurality of magnification levels (e.g., the numbers inside 1824), and changing the degree of granularity of the zoom control includes changing (e.g., increasing, decreasing) the spacing (or distance) between the representations of the plurality of magnification levels. FIG. 18AC illustrates representations of magnification levels (e.g., 6×, 7×, 8×) being further apart than in FIG. 18AB.

As illustrated in FIGS. 18AD-18AG, in some embodiments, a gesture (e.g., swipe) on the zoom control 1824 which shows magnification values with greater granularity will result in the zoom control dial 1824 appearing to rotate. As a result, a user is able to more precisely change the magnification level of the viewfinder 1806. In the example illustrated, a left swipe or a right swipe (e.g., 1825) results in the magnification changing. In some examples, a greater magnitude (e.g., 1822-E) swipe results in a greater change of magnification.

As illustrated in FIGS. 18AH-18AI, the electronic device 1800 detects a swipe up gesture and as a result, the electronic device displays, on display 1808, the original zoom control 1824 (e.g., in the state before the granularity was changed).

As illustrated in FIGS. 18AJ-18AN, in some embodiments, if the electronic device 1800 determines that the electronic device was rotated (e.g., from a portrait mode to a landscape mode), the electronic device 1800 rotates the display of the magnification level representations (e.g., 1.1×, 1.2×), but maintains the location of the zoom control 1824. In some embodiments, the electronic device 1800 detects a request to change between a portrait mode and a landscape mode (e.g., detecting, using an accelerometer, rotation of the electronic device). In some embodiments, in response to detecting the request to change the electronic device between the portrait mode and the landscape mode, the electronic device 1800 rotates the representations of the plurality of magnification levels. In some examples, the location of the zoom control does not change in response to detecting the request to change the electronic device between the portrait mode and the landscape mode. In some examples, the location of the magnification adjustment affordance does not change in response to detecting the request to change the electronic device between the portrait mode and the landscape mode. FIG. 18AN illustrates the display after the zoom dial control slides off the screen and only the magnification adjustment affordance is displayed 1812.

As illustrated in FIGS. 18B-18AN, in some embodiments, the magnification level representations are displayed in the 1×/2× control affordance. In some embodiments, the electronic device displays, on the display 1808, a representation of a current magnification level 1818 for capturing media with the one or more cameras 1802, 1804 (and for the viewfinder) at a location that corresponds to the magnification adjustment affordance 1812 and 1826. In some examples, the magnification adjustment affordance acts as a focus region for the magnification levels to scroll through.

FIGS. 19A-19B is a flow diagram illustrating a method for various magnification techniques. Method 1900 is performed at a device (e.g., 100, 300, 500, 1800) with a display and one or more input devices. In some examples, the one or more input devices include a touch-sensitive surface. In some examples, the touch-sensitive surface and the display combine to form a touch-sensitive display. In some examples, the electronic device includes one or more cameras 1802 and 1804. Some operations in method 1900 are, optionally, combined, the order of some operations is, optionally, changed, and some operations are, optionally, omitted.

As described below, method 1900 provides an intuitive way for modifying the magnification level for one or more cameras and/or for a viewfinder. The method reduces the need for a user to maintain eye contact with the device while using the device, thereby creating a more efficient human-machine interface.

The electronic device (e.g., 1800) concurrently displays (1902), on the display (e.g., 1808) a digital viewfinder (1904) (e.g., 1806) (e.g., that includes live or near-live preview images) for capturing media with the one or more cameras (e.g., 1802, 1804) at a first magnification level (e.g., a 1× magnification level represented by indicator 1818 of FIG. 18B) and a magnification adjustment affordance (1906) (e.g., 1812); (e.g., 1×/2× affordance, icon, textual representation indicating the magnification level). In some embodiments, while concurrently displaying (1908) the digital viewfinder (e.g., 1806) and the magnification adjustment affordance (e.g., 1812), the electronic device 1800 detects, via the one or more input devices, a first gesture (e.g., 1820-1A) at a location corresponding to the magnification adjustment affordance (e.g., 1812) (e.g., swipe, tap and hold, tap).

In accordance with some embodiments, in accordance with (and, for example, in response to) the electronic device determining that the first gesture (e.g., 1820-1A) is of a first type (e.g., a tap gesture) (1910), the electronic device prepares (1912) to capture media with the one or more cameras (e.g., 1802 and 1804) at a second (predefined) magnification level (e.g., a 2× magnification level represented by indicator 1818 of FIG. 18D) different from the first magnification level (e.g., a 1× magnification level represented by indicator 1818 of FIG. 18B). In some embodiments, a toggle between zoom levels, allows the user to select a specific zoom level and for the digital viewfinder to transition to the selected zoom level. In some embodiments, the second magnification level is selected without regard to a magnitude of the first gesture so long as the gesture is the first type of gesture (e.g., the duration, movement, intensity of the contact don't change which magnification level is selected as the second magnification level as long as the contact is still determined to be a tap gesture). In some embodiments, preparing to capture media with the one or more cameras (e.g., 1802 and 1804) at the second magnification level includes updating display of the digital viewfinder (e.g., 1806) (e.g., using data received from the camera) to show the preview at the second magnification level. The magnification adjustment affordance enables the user to accurately access a predefined magnification level, as compared to requiring the user to navigate through a plurality of magnification values, which requires the input to have an additional degree of precision, to achieve the desired magnification level. This provides the user with an opportunity to quickly change the magnification level and thereby freeing the user from maintaining unnecessary eye contact with the interface and giving the user more time to concentrate on framing the shot. In accordance with some embodiments, in accordance with (and, for example, in response to) the determination that the first gesture (e.g., 1820-1A) is of the first type (e.g., a tap gesture), foregoing displaying the zoom control (1914).

In accordance with some embodiments, in accordance with (and, for example, in response to) the electronic device determining that the first gesture is of a second type (e.g., a swipe gesture 1820-1B) different from the first type (e.g., tape gesture) (1916), the electronic device prepares (1918) to capture media with the one or more cameras (e.g., 1802, 1804) at a dynamically-selected magnification level (e.g., a 7.4× magnification level represented by indicator 1818 of FIG. 18H) different from the first magnification level (e.g., a 1× magnification level represented by indicator 1818 of FIG. 18B). In some examples, the dynamically-selected magnification and the second magnification are different magnification levels. In some embodiments, the dynamically-selected magnification level is selected based on a magnitude (e.g., 1822-A) (e.g., distance) of the first gesture (e.g., 1820). In some embodiments, the swipe gesture corresponds to rotation of the zoom dial (e.g., 1824). Thus, in some embodiments, in response to the electronic device detecting a user's finger swipe input, the electronic device rotates the displayed zoom dial and updates the zoom level based on a characteristic of the first gesture, such as updating the zoom level to correspond to the magnitude of the swipe gesture. In some examples, longer swipe gestures will result in a greater change of the zoom level than shorter swipe gestures. In some examples, faster swipe gestures result in a greater change of the zoom level than slower swipe gestures. In some examples, preparing to capture media with the one or more cameras at the second magnification level includes updating display of the digital viewfinder (e.g., using data received from the camera) to show the preview at the second magnification level.

A swipe input gesture on the magnification adjustment affordance enables the user to initiate a precise magnification operation by using only the hand that is holding the device. In some examples, one handed-operation is especially beneficial if the device is at position where two handed operation is not desirable/possible, for example recording a video at a concert. Because the user does not need to repeatedly lower the device to change the magnification level, one handed operation magnification adjustment provides the user with an opportunity to quickly change the magnification level while continuously recoding a video, resulting in a stabilized video.

In accordance with some embodiments, in accordance with a determination (1920) that the magnitude of the first gesture (e.g., swipe gesture 1820-1B) is a first magnitude (e.g., 1822-A), the dynamically-selected magnification level is a first dynamically-selected magnification level (e.g., a 7.4× magnification level represented by indicator 1818 of FIG. 18H) different from the first magnification level (e.g., a 1× magnification level represented by indicator 1818 of FIG. 18B).

In accordance with some embodiments, in accordance with a determination (1922) that the magnitude of the first gesture is a second magnitude that is different from the first magnitude (e.g., 1822-A), the dynamically-selected magnification level is a second dynamically-selected magnification level (e.g., 10× magnification level) different from the first magnification level (e.g., a 1× magnification level represented by indicator 1818 of FIG. 18B) and the first dynamically-selected magnification level (e.g., a 7.4× magnification level represented by indicator 1818 of FIG. 18H).

In accordance with some embodiments, in accordance with (and, for example, in response to) the determination (1916) that the first gesture (e.g., 1820-1B) is of the second type (e.g., a swipe gesture) different from the first type, the electronic device displays (1924), on the display, a zoom control (e.g., 1824).

In accordance with some embodiments, in accordance with (and, for example, in response to) the determination that the first gesture (e.g., 1820-1A) is of the first type (e.g., a tap gesture), display, on the display at a location that corresponds to the magnification adjustment affordance (e.g., 1812), a representation (e.g., image, textual) of the second magnification level (e.g., FIG. 18D, 1818, illustrates the magnification level).

In accordance with some embodiments, in accordance with (and, for example, in response to) the determination that the first gesture (e.g., 1820-1B) is of the second type (e.g., a swipe gesture), display, on the display (e.g., 1808) at the location that corresponds to the magnification adjustment affordance (e.g., 1826), a representation (e.g., image, textual) of the dynamically-selected magnification level. Displaying a representation of the magnification level allows for a more intuitive man-machine interface because a user will be able to quickly discern the amount of magnification applied within the digital viewfinder based on the representation.

In accordance with some embodiments, in accordance with a determination that the first gesture (e.g., 1820-1C) is of a third type (e.g., tap-and-hold gesture) (e.g., for greater than a predetermined amount of time) different from the first type and the second type, display, on the display, a zoom control for selecting a dynamically-selected magnification level from a plurality of magnification levels (e.g., 1824).

In accordance with some embodiments, displaying, on the display, the zoom control further includes shifting a display location, on the display (e.g., display 1808), of the magnification adjustment affordance away from an edge of the display (or touchscreen display screen) toward a center of the display. In some examples, if the device is held vertically, the affordance would appear to shift up. On the other hand, if the device was held horizontally, the affordance would appear to shift left, away from the right edge of the display device.

In accordance with some embodiments, displaying, on the display, the zoom control further includes reducing a display size of the magnification adjustment affordance (e.g., 1826).

In accordance with some embodiments, displaying, on the display, the zoom control (e.g., 1824) further includes displaying a portion of a zoom control dial. In some examples, the zoom control (e.g., 1824) is a displayed as a wheel, dial, semi-dial, a portion of a dial, or slider. In some examples, the zoom control (e.g., 1824) displays various magnification levels at which media is or will be, optionally, captured. The zoom control dial enables the user to select a desired magnification level from among a plurality of magnification levels and to change among the plurality of magnification levels. In some examples, this provides the user with the opportunity to quickly change the magnification level using touch input and without the need to reposition his/her finger. As a result, the user is able to concentrate on framing the shot. Further, a video recorded while changing magnification will be more stable because the user will not need to repeatedly tap (or touch/lift off) on the device to adjust the magnification level.

In accordance with some embodiments, the first type (of gesture) is a tap gesture (e.g., tap 1820-1A) and the second type (of gesture) is a swipe gesture (e.g., swipe 1820-1B).

In accordance with some embodiments, displaying the zoom control (e.g., 1824) includes sliding the zoom control onto the display (e.g., 1808). In some examples, displaying the zoom control (e.g., 1824) includes displaying the zoom control (e.g. 1824) at a first size and then increasing the zoom control to a second size larger than the first size.

In accordance with some embodiments, while the electronic device (e.g., 1800) displays the zoom control (e.g., 1824) and while the electronic device (e.g., 1800) is prepared to capture media with the one or more cameras at a third magnification level, the electronic device detects, via the one or more input devices, a second gesture (e.g., a swipe gesture 1821-1) at a location corresponding to the zoom control. In accordance with (and, for example, in response to) a determination that the second gesture is of the second type (e.g., a swipe gesture 1821-1), the electronic device rotates display of the zoom control (e.g., 1824) and prepares to capture media with the one or more cameras at a fourth magnification level (e.g., a magnification level represented by 1818 of FIG. 18W) (e.g., based on a magnitude of the second gesture) that is different from the third magnification level (e.g., a magnification level represented by 1818 of FIG. 18V). In some embodiments, amount of rotation corresponds to a magnitude of the second input. In some embodiments, the zoom control and the magnification levels displayed within appear to rotate, like a wheel. In some embodiments, the zoom control (e.g. 1824) rotates at a rate that is accelerated based on one or more of: a speed of movement of the contact, a direction of movement of the contact, and/or a proximity of the contact to an edge of a touch-sensitive surface. Exemplary techniques for speeding up navigation, control rotation, and/or magnification are described in greater detail with reference to FIGS. 22A-22J and 23A-23B.

In accordance with some embodiments, in accordance with (and, for example, in response to) a determination that a rate of the second gesture is less than a predetermined threshold, zooming the digital viewfinder (e.g., 1806) at a first rate. In accordance with (and, for example, in response to) a determination that the rate of the second gesture is greater than (or greater than or equal to) the predetermined threshold, the electronic device zooms the digital viewfinder (e.g., 1806) at a second rate, wherein the first rate is less than the second rate. Exemplary techniques for speeding up navigation, control rotation, and/or magnification are described in greater detail with reference to FIGS. 22A-22J and 23A-23B.

In accordance with some embodiments, in accordance with (and, for example, in response to) a determination that the rate of change of the second gesture (e.g., the rate of change of arc degrees with respect to a center of the partial circle) is less than a second predetermined threshold, zooming the digital viewfinder (e.g., 1806) at a first rate, and in accordance with (and, for example, in response to) a determination that the rate of the second gesture (e.g., the rate of change of arc degrees with respect to a center of the partial circle) is greater than (or greater than or equal to) the second predetermined threshold, zooming the digital viewfinder (e.g., 1806) at a second rate, wherein the first rate is less than the second rate.

In accordance with some embodiments, while the electronic device displays, on the display, a zoom control (e.g., 1824) (e.g., a zoom control dial) for changing the magnification level for capturing media with the one or more cameras, wherein the zoom control (e.g., 1824) has a degree of granularity, the electronic device detects a third gesture (e.g., a swipe down gesture 1823 away from the center of the display, towards an edge of the display) at a location corresponding to the zoom control. In some embodiments, in response to detecting the third gesture, the electronic device changes the degree of granularity of the zoom control (e.g., 1824 of FIG. 18AC) (while continuing to display the zoom control). In some examples, a first input which has a first input characteristic affects the degree of zoom based on the degree of granularity of the zoom control. Increasing the granularity of the zoom control via a swipe down gesture allows a user to precisely change the magnification level by using the same hand that is holding the device. In some examples, increasing the granularity with a swipe down command allows users the ability to fine tune the magnification level without requiring the user to lift his/her finger. In some examples, the user does not have to maintain eye contact with the display screen and, instead, can focus more on the subjects in front of him/her.

In some embodiments, the same input (e.g., 1820) alters the magnification level to a first value when the zoom control (e.g., 1824) is at a first degree of granularity and alters the magnification level to a second value, greater than the first value, when the zoom control is at a second degree of granularity lower than the first degree of granularity.

In accordance with some embodiments, the zoom control (e.g., 1824) includes representations of a plurality of magnification levels, and changing the degree of granularity of the zoom control includes changing (e.g., increasing, decreasing) the spacing (or distance) between the representations of the plurality of magnification levels.

In accordance with some embodiments, a displayed zoom control includes representations of a plurality of magnification levels. The electronic device (e.g., 1800) detects a request to change between a portrait mode and a landscape mode (e.g., detecting, using an accelerometer, rotation of the electronic device). In response to detecting the request to change the electronic device (e.g., 1800) between the portrait mode and the landscape mode, the electronic device rotates the representations of the plurality of magnification levels (e.g., FIG. 18AJ, 1824 illustrates the representations in the dial rotated). In some examples, the location of the zoom control (e.g., 1824) does not change in response to detecting the request to change the electronic device between the portrait mode and the landscape mode. In some examples, the location of the magnification adjustment affordance does not change in response to detecting the request to change the electronic device between the portrait mode and the landscape mode.

In accordance with some embodiments, the electronic device (e.g., 1800), displays, on the display, a representation of a current magnification level for capturing media with the one or more cameras (e.g., 1802 and 1804) (and for the viewfinder (e.g., 1806)) at a location that corresponds to the magnification adjustment affordance (e.g., 1818). In some embodiments, the magnification adjustment affordance acts as a focus region for the magnification levels to scroll through.

In accordance with some embodiments, in accordance with the electronic device not detecting, via the one or more input devices, input at any location corresponding to the zoom control (e.g., 1824) for a predetermined period of time, the electronic device slides display of the magnification adjustment affordance toward the edge of the display (or device) and away from the center of the display (e.g., 1808). In some embodiments, the predetermined period of time is after a predetermined period of time after lift-off, after the user breaks contact with the touch screen. In some embodiments, if the electronic device is held vertically, the magnification adjustment affordance would appear to shift down. On the other hand, in some embodiments, if the electronic device was held horizontally, the magnification adjustment affordance would appear to shift right, away from the right edge of the display device.

In accordance with some embodiments, in accordance with the electronic device (e.g., 1800) not detecting, via the one or more input devices, input at any location corresponding to the zoom control (e.g., 1824) for a predetermined period of time (e.g., after a predetermined period of time after lift-off, after the user breaks contact with the touch screen), the electronic device ceases to display the zoom control (e.g., 1824). In some embodiments, the zoom control slides off the display (e.g., 1808) (away from the center of the display and off the edge of the display) and/or fades away. The zoom control sliding off the screen allows for more information/data to be displayed in the digital viewfinder when the zoom control is not in use. A user not interacting with the zoom control is one indication that the user is not interested in making magnification adjustments. Thus, in some examples, removing display of the zoom control allows the user to see more of the viewfinder and, more importantly, the user will be able to see representations of objects previously hidden behind the zoom control.

In accordance with some embodiments, while the electronic device (e.g., 1800) displays, on the display, the digital viewfinder (e.g., 1806) (e.g., that includes live or near-live preview images) for capturing media with the one or more cameras (e.g., 1802 and 1804) at a fourth magnification level and not displaying, on the display, the zoom control, the electronic device detects, via the one or more input devices, a fourth gesture (e.g., 1820A and 1820B) (e.g., a pinch (or de-pinch) gesture) at a location corresponding to the digital viewfinder (e.g., 1806). In accordance with (and, for example, in response to) the determination that the fourth gesture (e.g., 1820A and 1820B) is of a fourth type (e.g., pinch gesture), the electronic device prepares to capture media with the one or more cameras (e.g., 1802 and 1804) at a second dynamically-selected magnification level different from the fourth magnification level (e.g., FIG. 18N, 1818, illustrates magnification level), and the electronic device (e.g., 1800) forgoes displaying, on the display, the zoom control (e.g., 1824). In some examples, the respective magnification level is selected based on a magnitude (e.g., distance) of the fourth gesture (e.g., 1820A and 1820B).

In some examples, the electronic device (e.g., 1800) concurrently displays, with the digital viewfinder (e.g., 1806), the magnification adjustment affordance (e.g., 1812 and 1826) with the current magnification level (e.g., 1818) for capturing media with the one or more cameras (and for the viewfinder). In some embodiments, the magnification adjustment affordance is represented as a 1×/2× affordance label, an icon, an image, or a textual representation indicating the magnification level. In some embodiments, in accordance with (and, optionally, in response to) detecting the fourth gesture, the device updates the displayed current magnification level for capturing media with the one or more cameras (and for the viewfinder).

Note that details of the processes described above with respect to method 1900 (e.g., FIGS. 19A-19B) are also applicable in an analogous manner to the methods described below and above. For example, methods 700, 900, 1100, 1300, 2100, and 2300 optionally include one or more of the characteristics of the various methods described above with reference to method 2100. For example, elements of the viewfinder magnification techniques, affordances, and controls from among the various methods can be combined. For another example, the viewfinder in method 2100 is analogous to the viewfinder in methods 700, 900, 1100, 1300, 2100, and 2300. For brevity, these details are not repeated below. For brevity, these details are not repeated below.

FIGS. 20A-20R illustrate exemplary devices and user interfaces for a camera application, in accordance with some embodiments. The user interfaces in these figures are used to illustrate the processes described below, including the processes in FIGS. 21A-B.

FIG. 20A illustrates an exemplary electronic device 2000 with one or more cameras. The one or more cameras optionally include a first camera 2002, and optionally, a second camera 2004, on the rear of the electronic device 2000. In some examples, the first camera 2002 and the second camera 2004 have fixed, but different, focal lengths. In some examples, the focal length, field of view, and/or optical magnification properties of the optical system is fixed for each of the cameras, In some embodiments, in addition to having different fixed focal lengths, the cameras (e.g., 2002, 2004) have different fixed fields of view and different fixed optical magnification properties.

In some embodiments, the first camera 2002 has a first field of view and the second camera 2004 has a second field of view, wherein the first field of view and the second field of view overlap. In some examples, the first camera 2002 and the second camera 2004 are spaced apart so that a parallax between images captured by the camera (e.g., 2002 and 2004) is used to determine depths for objects represented by different portions of the digital viewfinder. In some embodiments, the first camera 2002 and the second camera 2004 are located on a surface of the electronic device 2000 and the optical axes of the cameras (e.g., 2002 and 2004) are arranged such that they are parallel. In some examples, the first camera 2002 and the second camera 2004 capture overlapping fields of view, for example, at least 50% overlapping, at least 90% overlapping, or more. In some examples, the first camera 2002 has a wider field of view than the second camera 2004. In some examples, the second camera 2004 has a wider field of view than the first camera 2002. When a wide-angle camera (e.g., a camera with a wide-angle lens) has a wider field of view than a telephoto camera (e.g., a camera with a telephoto lens), at a 1× magnification of the wide-angle camera objects appear further away than at a 1× magnification of the telephoto camera. If the wide-angle camera and the telephoto camera have overlapping fields of view such that the field of view of the telephoto camera is approximately centered on the field of view of the wide angle camera, an image captured with the telephoto camera at a 1× magnification level will, in some circumstances (e.g., where the subject of the image is at least 1 meter away), appear to be an optical zoom of a corresponding image captured with the wide-angle camera at a 1× magnification level.

FIGS. 20B-1 and 20B-2 illustrate the front of the electronic device 2000 including display 2022. The electronic device 2000 also includes a one or more input devices, such as including a touch-sensitive surface. In some examples, the touch-sensitive surface and the display form a touch-sensitive display. FIGS. 20B-1 and 20B-2 also illustrates different areas at which, for example, input can be received: viewfinder area 2006, zoom area 2 2008, 1×/2× button area 2 2010, zoom area 1 2012, 1×/2× button area 1 2014, mode area 2016, and shutter button area 2018. These areas are illustrated with dotted lines, which are provided for the ease of understanding of the reader. The dotted lines are not part of the user interface illustrated. In some examples, areas that surround another area do not include the surrounded area. For example, zoom area 1 (e.g., 2012) does not include 1×/2× button 1 area (e.g., 2014). In some examples, detecting various gestures at various areas while the device is in various states results in the electronic device performing various. Many exemplary input gestures and their resulting functions are described in the tables below. In some examples, as illustrated in FIGS. 20B-1 and 20B-2, the locations and/or sizes of the various areas do not change when the electronic device transitions between a landscape mode and a portrait mode. In some examples, one or more of the locations and/or one or more of the sizes of the various areas change when the electronic device transitions between a landscape mode and a portrait mode.

Figure 20C:
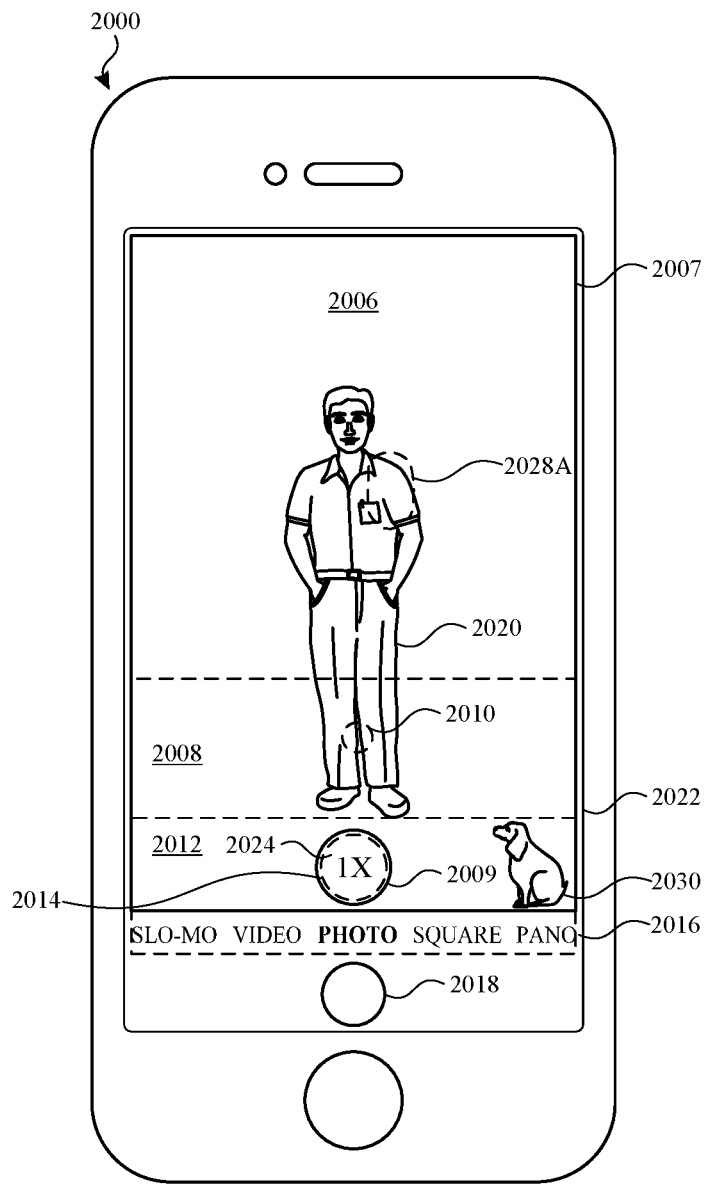

As illustrated in FIG. 20C, while the device 2000 is prepared to capture media with the one or more cameras at a first magnification level (e.g., 1× magnification), the electronic device displays, on the display, a digital viewfinder (e.g., 2007, including live or near-live preview images) based on data received from the one or more cameras (e.g., 2002 and 2004). The digital viewfinder (e.g., 2007) includes one or more representations (e.g., 2020, 2030) of one or more objects within a field of view of the one or more cameras (e.g., 2002, 2004). In the exemplary user interface of FIG. 20C, the digital viewfinder (e.g., 2007) includes a representation 2020 of a person and a representation of 2030 of a dog. The user interface also includes a displayed magnification adjustment affordance (e.g., 2009). In some examples, the magnification adjustment affordance (e.g., 2009) includes a representation 2024 (e.g., "1×") of a current magnification level (e.g., a magnification level at which the electronic device is prepared to capture media, a target magnification level, a magnification level of the digital viewfinder). In some examples, the magnification adjustment affordance corresponds to the location of the area 2014. In some examples, the mode area 2016 includes a plurality of affordances corresponding to a plurality of camera capture modes. In the user interface of FIG. 20C, the "photo" affordance is bolded, indicating that the electronic device is in a camera capture mode.

While displaying the digital viewfinder (e.g., 2007), the electronic device detects, via the one or more input devices (e.g., a touch-sensitive surface, a touch-sensitive display), a first gesture (e.g., 2028). For example, the gesture (e.g., 2028) is a swipe, a tap and hold, or a tap.

In some examples, the electronic device determines whether a first set of one or more condition is met, wherein a first condition of the first set of one or more conditions is met when the first gesture is a tap gesture within a first area (e.g., corresponding to viewfinder area 2006).

As illustrated in FIG. 20C, in accordance with a determination that a first set of one or more conditions is met (e.g., a tap on the viewfinder area 2006), wherein a first condition of the first set of one or more conditions is met when the first gesture (e.g., gesture 2028A of FIG. 20C) is at a first location (e.g., as illustrated in FIG. 20C, on the touch-sensitive surface, the first location corresponding to the viewfinder area 2006), the electronic device updates display of the digital viewfinder (e.g., 2007) to focus (e.g., based on an estimated distance to the respective object) on a representation (e.g., 2020 of FIG. 20C) of a respective object (e.g., corresponding to 2020) of the one or more objects in the field of view of the one or more cameras that corresponds to a location of the first gesture (e.g., 2028A) on the one or more input devices (e.g., an object that is displayed at a location of the tap input on the touch-screen display) without preparing to capture media with the one or more cameras at a second magnification level different from the first magnification level. In some examples, when the user performs a tap gesture at the first location (e.g., within viewfinder area 2006), the electronic changes the focus of the camera from a first item in the field of view of the camera to a second item (e.g., represented by 2020) in the field of view of the camera, wherein the first item and the second item are different. In some examples, changing focus of the camera from the first item to the second item includes adjusting a focal point of the camera to bring the second item into focus.

In some embodiments, a second condition of the first set of one or more conditions is met when a zoom control is not displayed. In some examples, a tap in zoom area 1 or zoom area 2 when the zoom control is not displayed will result in a focus operation.

In some embodiments, in accordance with (and/or in response to) the determination that the first set of one or more conditions is met (e.g., the tap was on the viewfinder area 2006), the electronic device forgoes (e.g., does not do) one or more of the following: changing the magnification level at which the device is prepared to capture media; changing a camera capture mode of the electronic device; displaying the zoom control; locking a focus or (or alternatively, and) exposure setting; changing the exposure at which the device is prepared to capture media.

In some embodiments, displaying the digital viewfinder (e.g., 2007) while the device (e.g., 2000) is prepared to capture media with the one or more cameras at the first magnification level includes displaying, on the display, representations (e.g., 2020) of the one or more objects at the first magnification level.

For example, when the electronic device is in an image capture mode and detects activation of the shutter affordance 2018, the electronic device captures (e.g., stores in memory) an image with the corresponding magnification level. For another example, when the electronic device is in a video capture mode and detects activation of the shutter affordance 2018, the electronic device captures (e.g., stores in memory) video at the corresponding magnification level until, for example, activation of the shutter affordance 2018 is detected. In some examples, the electronic device enables the user to select a value of the plurality of values using an adjustable control 2026 while media is not being captured (e.g., before capturing an image or recording video). In some examples, the electronic device enables the user to select a value of the plurality of values using the adjustable control 2026 (FIG. 20I) while media is being captured (e.g., during recording of a video), thus resulting in the recorded video including a zoom in and/or zoom out that corresponds to the selection of the value using the adjustable control 2026.

Figure 20D:
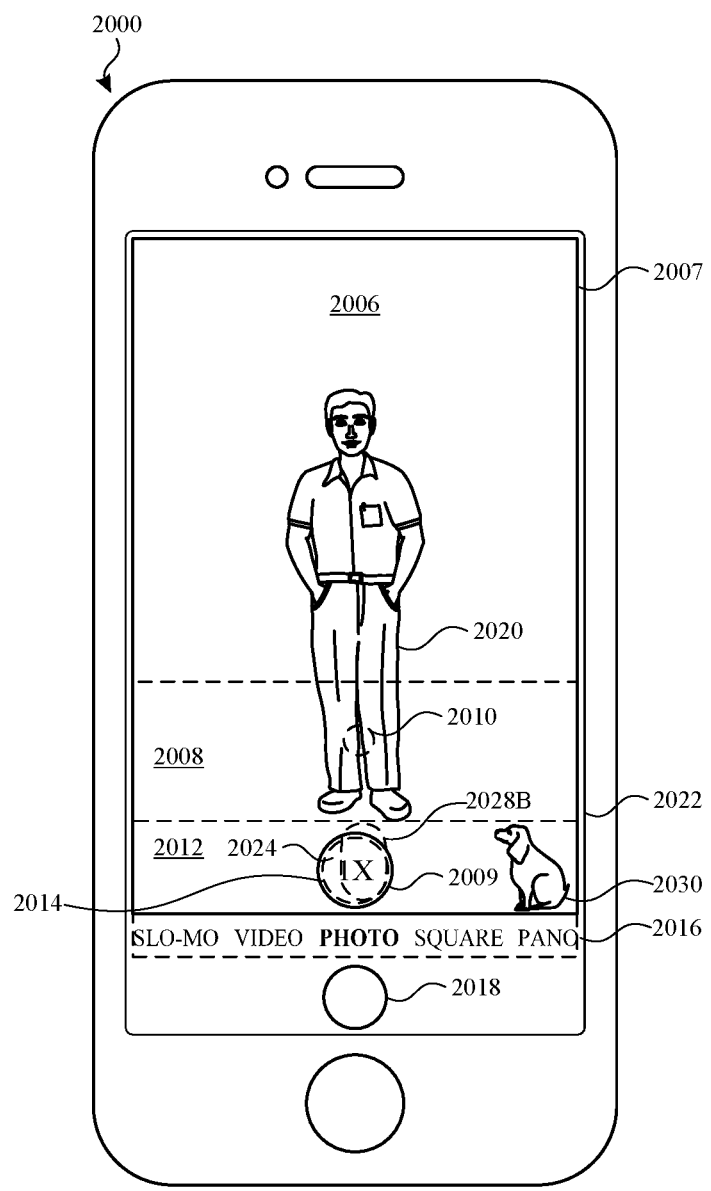

FIG. 20D illustrates a tap gesture 2028B. In some examples, the electronic device (e.g., 2000) determines whether a second set of one or more condition is met, wherein a first condition of the second set of one or more conditions is met when the detected gesture (e.g., 2028B of FIG. 20D) is a tap gesture within a second area different from the first area (e.g., 1×/2× button 1 area 2014).

Figure 20E:
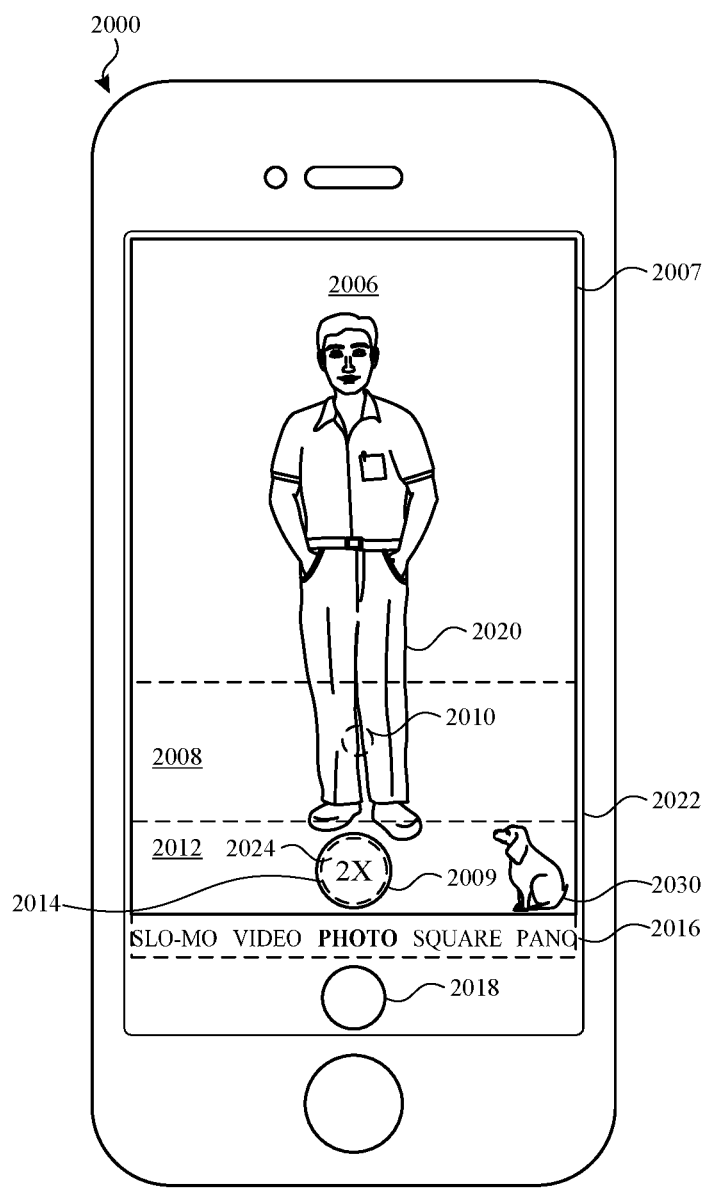

As illustrated in FIGS. 20D-20E, in accordance with a determination that a second set of one or more conditions is met (e.g., the magnification adjustment affordance 2019 is activated), wherein a first condition of the second set of one or more conditions is met when the first gesture (e.g., a tap gesture 2028B) is at a second location (e.g., on the touch-sensitive surface, the second location corresponding to the 1×/2× button 1 area 2014) different from the first location, the electronic device prepares to capture media with the one or more cameras (e.g., 2002 and 2004) at the second magnification level (e.g., 2× magnification level, as illustrated in FIG. 20E) different from the first magnification level (e.g., 1× magnification level, as illustrated in FIG. 20C) (e.g., toggle between zoom levels).

As illustrated in FIG. 20E, in accordance with some embodiments, preparing to capture media with the one or more cameras at the second magnification level includes updating display of the digital viewfinder (e.g., using data received from the one or more cameras) to show a preview (e.g., a live or near-live preview) at the second magnification level. In some embodiments, displaying the digital viewfinder (e.g., 2007) while the device (e.g., 2000) is prepared to capture media with the one or more cameras at the second magnification level includes displaying, on the display, representations (e.g., 2020) of the one or more objects at the second magnification level.

In some embodiments, in accordance with (and/or in response to) the determination that the second set of one or more conditions is met (e.g., the magnification adjustment affordance 2009 was activated), the electronic device forgoes (e.g., does not do) one or more of the following: updating display of the digital viewfinder to change the focus to a representation of a respective object; changing a camera capture mode of the electronic device; displaying the zoom control; locking a focus or (or alternatively, and) exposure setting; changing the exposure at which the device is prepared to capture media.

Figure 20F:
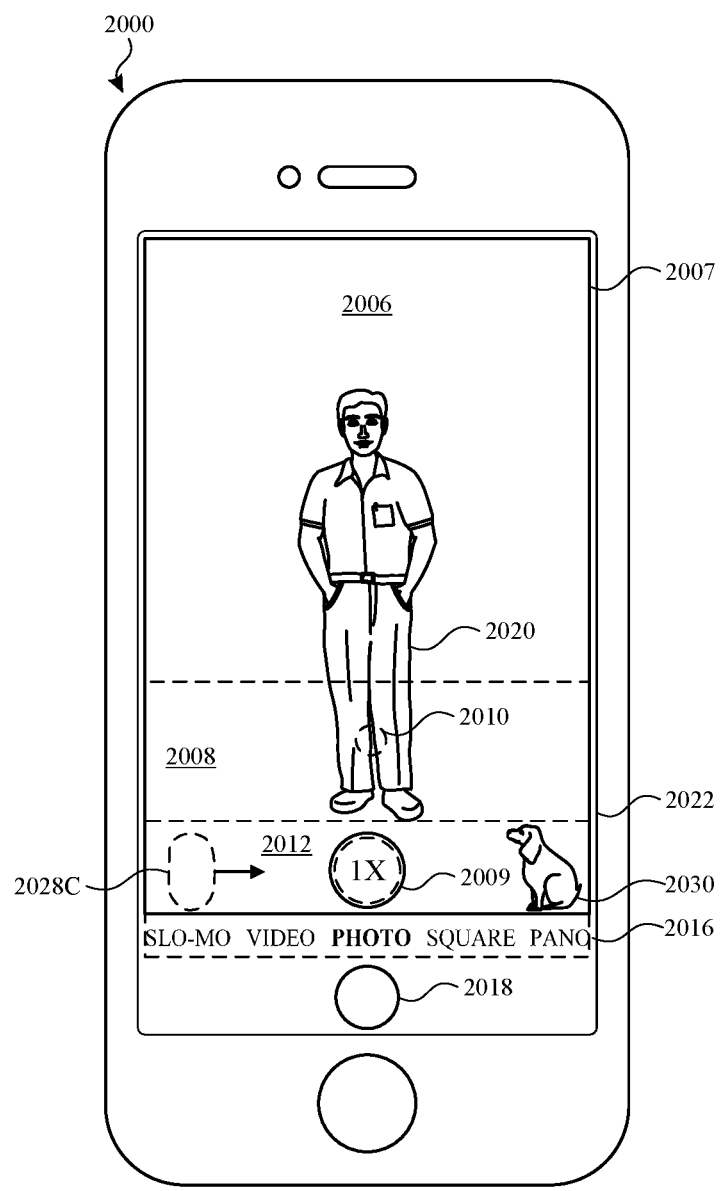

As illustrated in FIG. 20F, in some embodiments the first input is a swipe gesture (e.g., 2028C) in zoom area 1 2012. In accordance with a determination that a third set of one or more conditions is met (e.g., a swipe gesture 2028C at zoom area 1 2012), wherein a first condition of the third set of one or more conditions is met when the first gesture (e.g., 2028C, a swipe gesture) is at a third location (e.g., on the touch-sensitive surface, the third location corresponding to zoom area 1 2012) different from the first location, preparing to capture media with the one or more cameras at a third magnification level that is based on a magnitude (e.g., distance traversed, illustrated by the arrow of 2028C) of the first gesture (e.g., 2028C). In some examples, a second condition of the third set of one or more conditions is met when the first gesture (e.g., 2028C, a swipe gesture) is a swipe gesture with a component toward a first input boundary (e.g., a left edge of the touch-sensitive surface) or a component toward a second input boundary (e.g., a right edge of the touch-sensitive surface), such as described with references to FIGS. 22A-22J and 23A-23B.

In some embodiments, in accordance with (and/or in response to) the determination that the third set of one or more conditions is met (e.g., swipe gesture at zoom area 1 2012), the electronic device (e.g., 2000) displays (or updates display of) a zoom control, as discussed with reference to FIGS. 18A-18AN and FIGS. 22A-22J.

In some embodiments, in accordance with (and/or in response to) the determination that the third set of one or more conditions is met (e.g., swipe gesture at zoom area 1 2012), the electronic device (e.g., 2000) forgoes (e.g., does not do) one or more of the following: updating display of the digital viewfinder to change the focus to a representation of a respective object; changing a camera capture mode of the electronic device; locking a focus or (or alternatively, and) exposure setting; changing the exposure at which the device is prepared to capture media.

Figure 20G:
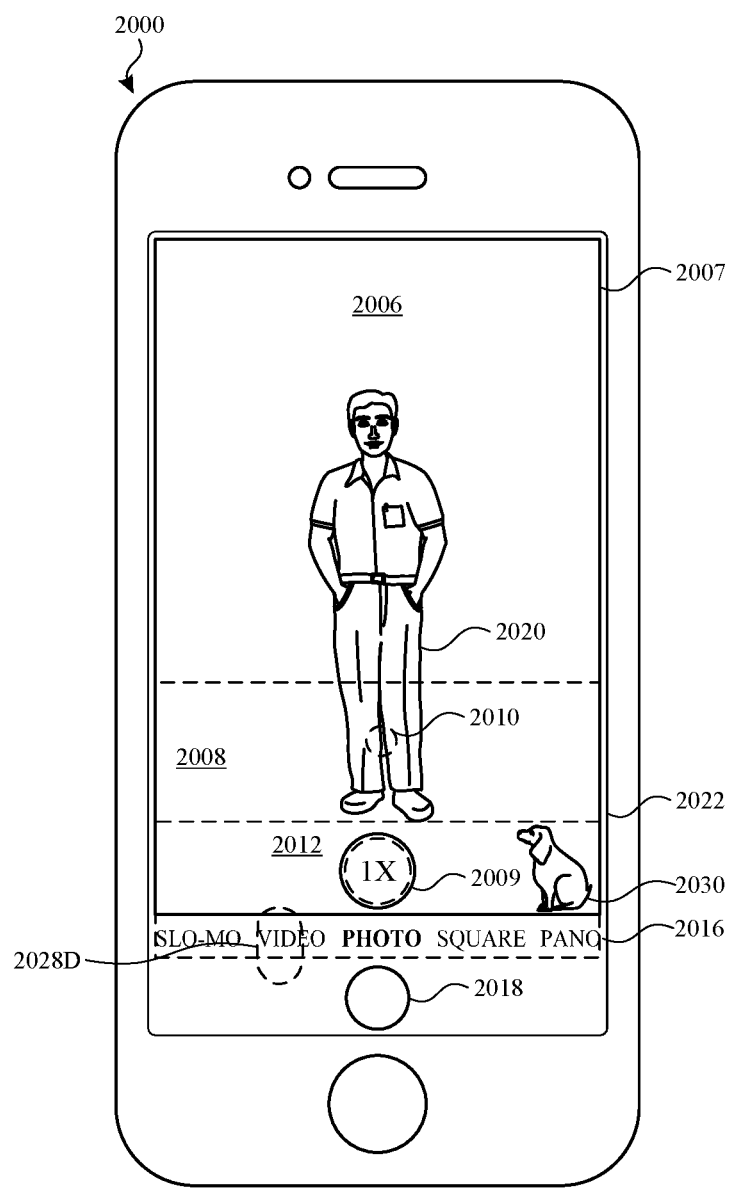

As illustrated in FIG. 20G, in some embodiments, the first input is a tap gesture 2028D in mode area 2016. In accordance with a determination that a fifth set of one or more conditions is met (e.g., tap 2028D in mode area 2016), wherein a first condition of the fifth set of one or more conditions is met when the first gesture (e.g., a tap gesture 2028D) is at a fourth location (e.g., on the touch-sensitive surface, the fourth location corresponding to the mode area 2016) different from the first location, the second location, and the third location, the electronic device changes a camera capture mode of the electronic device to a mode corresponding to a location of the first gesture (e.g., changing from an image or photo capture mode to video capture mode, changing from preparing to capture still media to preparing to capturing video media). In some embodiments, a second condition of the fifth set of one or more conditions is met when the first gesture (e.g., a tap gesture 2028D) is a tap gesture.

In some embodiments, in accordance with (and/or in response to) the determination that the fifth set of one or more conditions is met (e.g., tap 2028D in mode area 2016), the electronic device forgoes (e.g., does not do) one or more of the following: changing the magnification level at which the device is prepared to capture media; updating display of the digital viewfinder to change the focus to a representation of a respective object; displaying the zoom control; locking a focus or (or alternatively, and) exposure setting; changing the exposure at which the device is prepared to capture media.

Figure 20H:
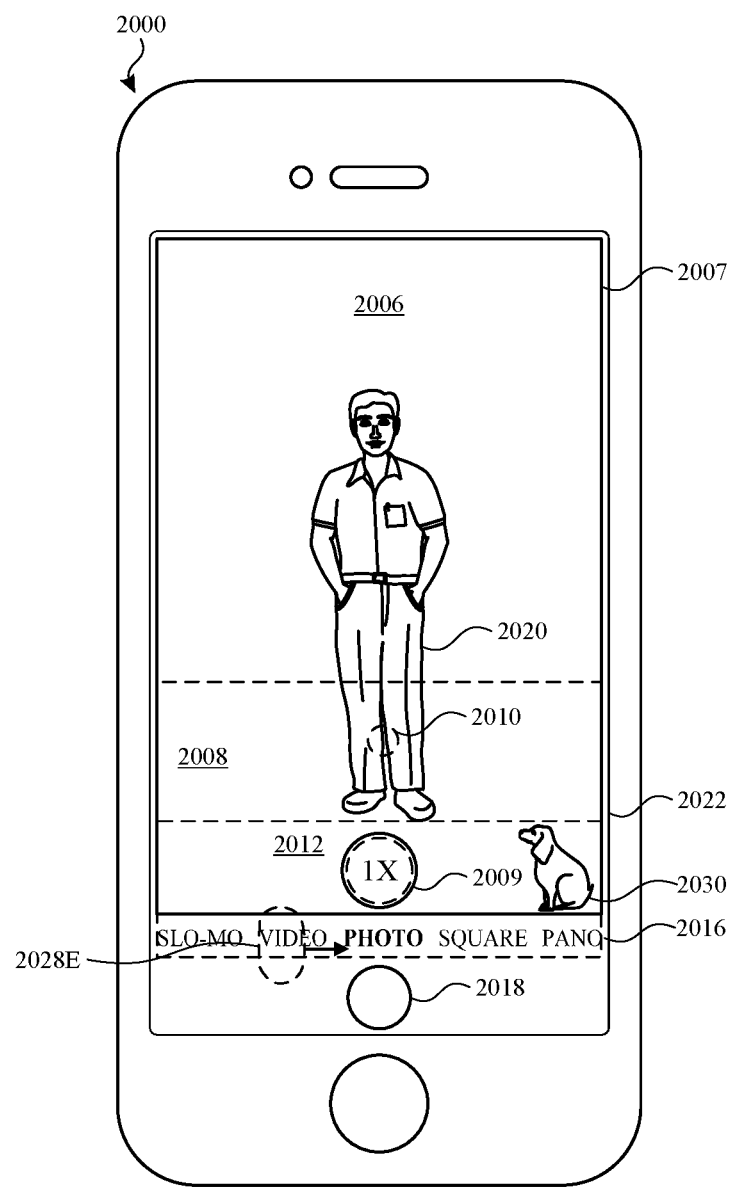

As illustrated in FIG. 20H, in some embodiments, the first gesture is a swipe 2028E in mode area 2016. In accordance with a determination that a sixth set of one or more conditions is met (e.g., swipe 2028E in mode area 2016), wherein a first condition of the sixth set of one or more conditions is met when the first gesture (e.g., a left or right swipe gesture 2028E) is at the fourth location (e.g., on the touch-sensitive surface, the fourth location corresponding to the mode area 2016), the electronic device changes a camera capture mode of the electronic device based on a directional component (e.g., left, right, up, down) of the first gesture (e.g., changing from an image capture mode to video capture mode, changing from preparing to capture still media to preparing to capturing video media). In some embodiments, the modes are traversed one at a time in that one swipe results in one mode traversal. In some embodiments, the number of modes traversed per swipe depends on the magnitude of the swipe gesture.

In some embodiments, in accordance with (and/or in response to) the determination that the sixth set of one or more conditions is met (e.g., swipe 2028E in mode area 2016), the electronic device forgoes (e.g., does not do) one or more of the following: changing the magnification level at which the device is prepared to capture media; updating display of the digital viewfinder to change the focus to a representation of a respective object; displaying the zoom control; locking a focus or (or alternatively, and) exposure setting; changing the exposure at which the device is prepared to capture media.

As illustrated in FIGS. 20I-20L, the electronic device optionally displays adjustable controls 2026A-2026C based on the camera capture mode of the electronic device. In some examples, the adjustable control 2026 is the same control element as described with reference to FIGS. 18A-18AN and FIGS. 22A-22J.

Figure 20I:
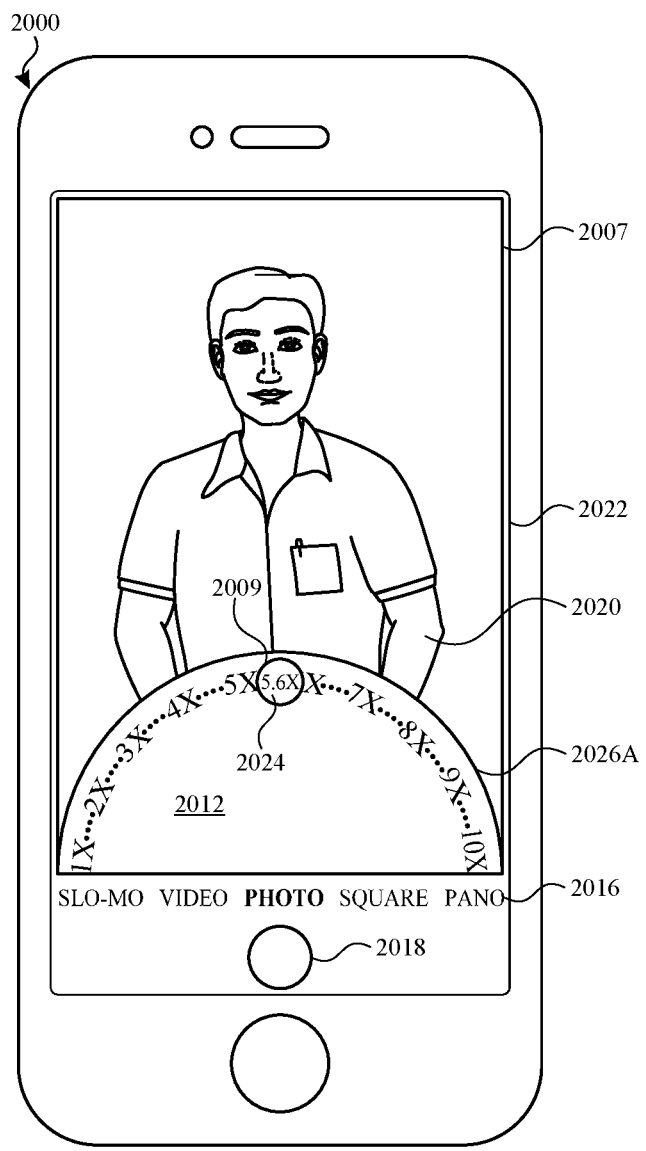

As illustrated in FIG. 20I, in accordance with some embodiments, the electronic device is in a first camera capture mode (e.g., for capturing still images), wherein the electronic device is configurable (e.g., using the adjustable control 2026A), while in the first camera capture mode, to prepare to capture media within a first range of magnification levels (e.g., 1× to 10× magnification, as illustrated in FIG. 20I). In some examples, the electronic device is not configurable, while in the first camera capture mode, to prepare to capture media outside of the first range of magnification levels. In some examples, the adjustable control 2026A can be rotated to select a magnification level, as described with reference to FIGS. 18A-18AN and FIGS. 22A-22J.

Figure 20J:
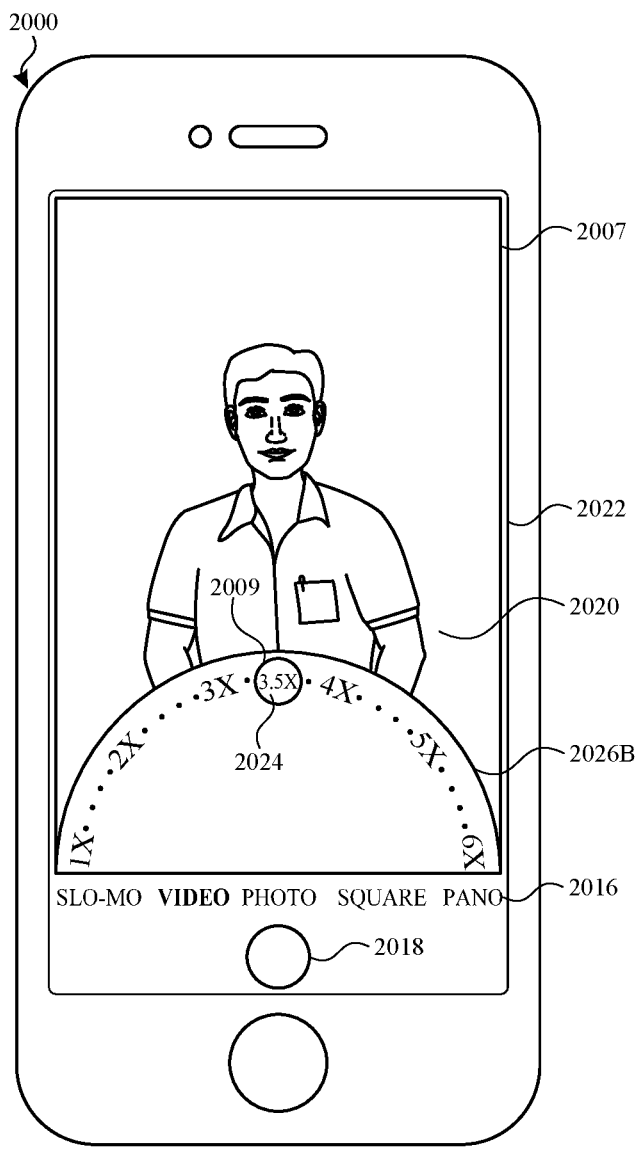

As illustrated in FIG. 20J, in accordance with some embodiments, the electronic device is in a second camera capture mode (e.g., for capturing videos), wherein the electronic device is configurable (e.g., using the adjustable control 2026B), while in the second camera capture mode, to prepare to capture media within a second range of magnification levels (e.g., 1× to 6× magnification, as illustrated in FIG. 20J), wherein the second range of magnification levels is within the first range of magnification levels. In some examples, the electronic device is not configurable, while in the second camera capture mode, to prepare to capture media outside of the second range of magnification levels. In some examples, the adjustable control 2026B can be rotated to select a magnification level, as described with reference to FIGS. 18A-18AN and FIGS. 22A-22J.

Figure 20K:
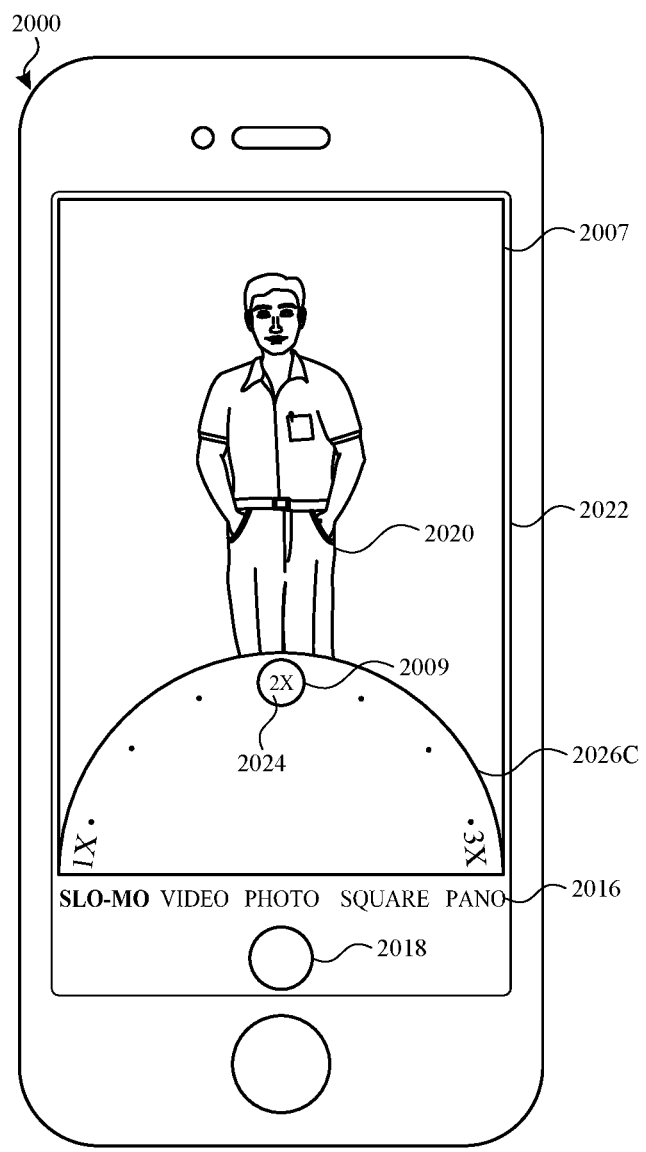
Figure 20L:
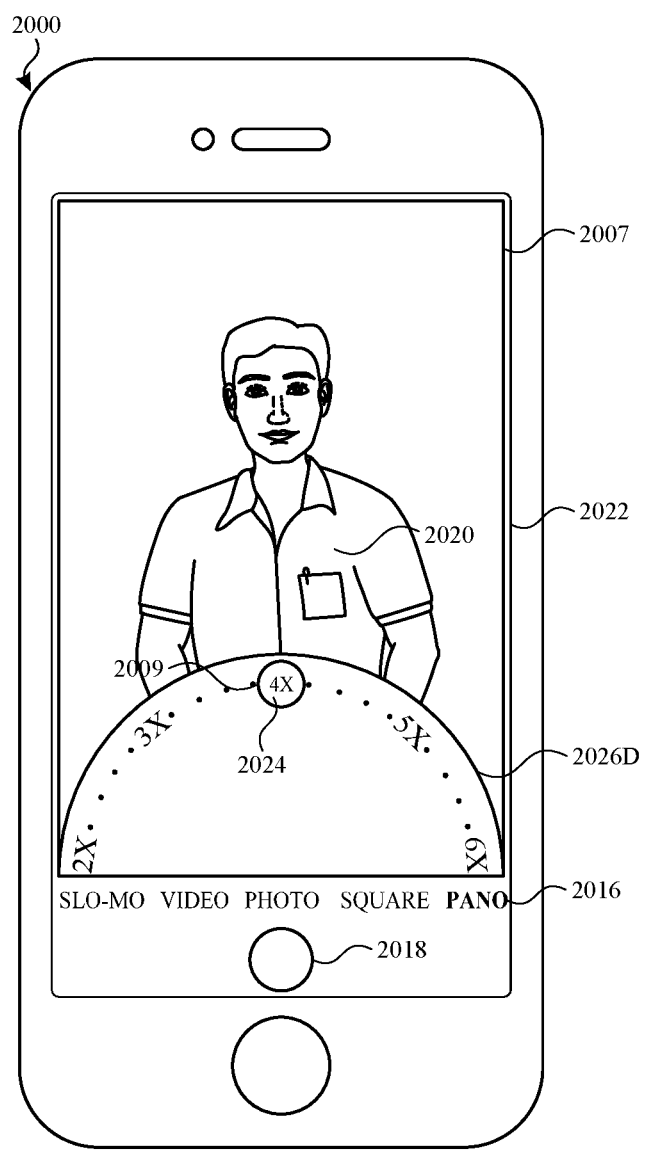

As illustrated in FIGS. 20K-20L, in accordance with some embodiments, the electronic device is in a third camera capture mode (e.g., for capturing slow-motion videos), wherein the electronic device is configurable (e.g., using the adjustable control 2026C or 2026D), while in the third camera capture mode, to prepare to capture media within a third range of magnification levels (e.g., 1× to 3× magnification when using a first camera of the electronic device, as illustrated in FIG. 20K; 2× to 6× magnification when using a second camera of the electronic device, as illustrated in FIG. 20L), wherein the third range of magnification levels is within the second range of magnification levels. In some examples, the electronic device is not configurable, while in the third camera capture mode, to prepare to capture media outside of the third range of magnification levels. In some examples, the adjustable controls 2026C and 2026D can be rotated to select a magnification level, as described with reference to FIGS. 18A-18AN and FIGS. 22A-22J.

In accordance with some embodiments, the electronic device is in a fourth camera capture mode (e.g., for capturing timelapse and/or panoramic images), wherein the electronic device is configurable, while in the fourth camera capture mode, to prepare to capture media at a first predetermined magnification level (e.g., 1× magnification) and at a second predetermined magnification level (e.g., 2× magnification), wherein the first predetermined magnification level (e.g., 1×  magnification) and the second predetermined magnification level (e.g., 2×) are within the second range of magnification levels (e.g., within 1× to 6×). In some examples, the electronic device is not configurable, while in the fourth camera capture mode, to prepare to capture media at magnification levels other than the first predetermination magnification level and the predetermined second magnification level. In some examples, the adjustable control is not displayed while in the third camera capture mode.

Figures 1, 20M:
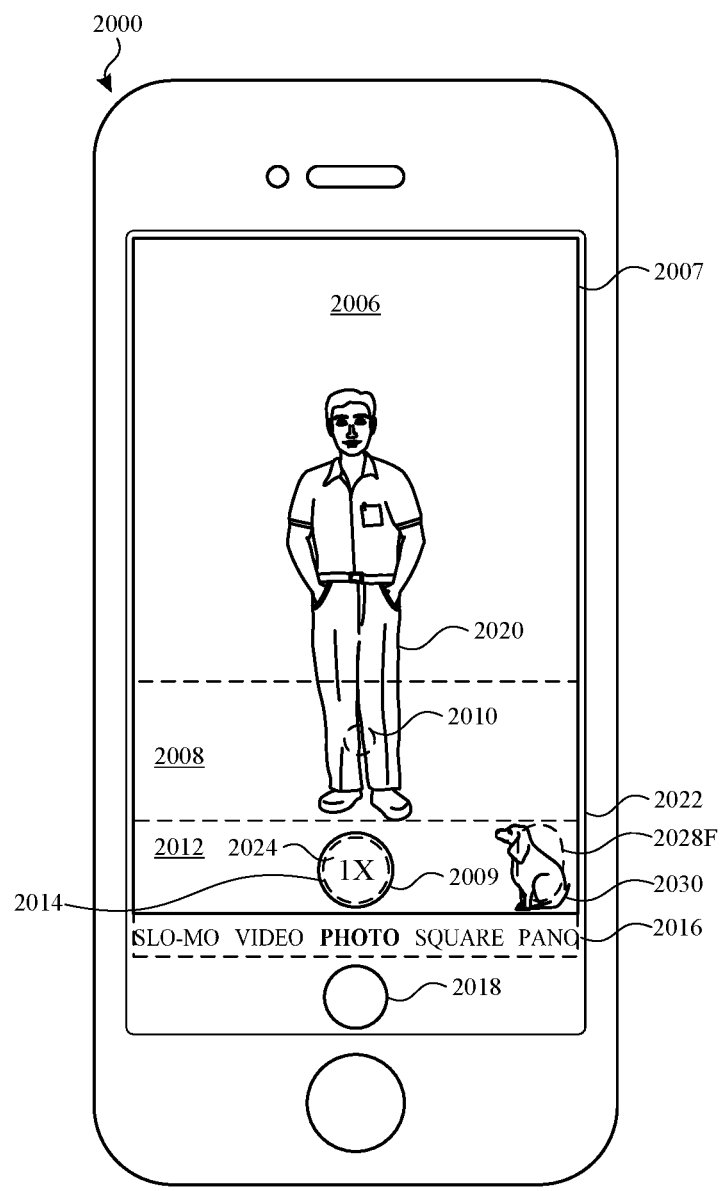
Figures 2, 20M:
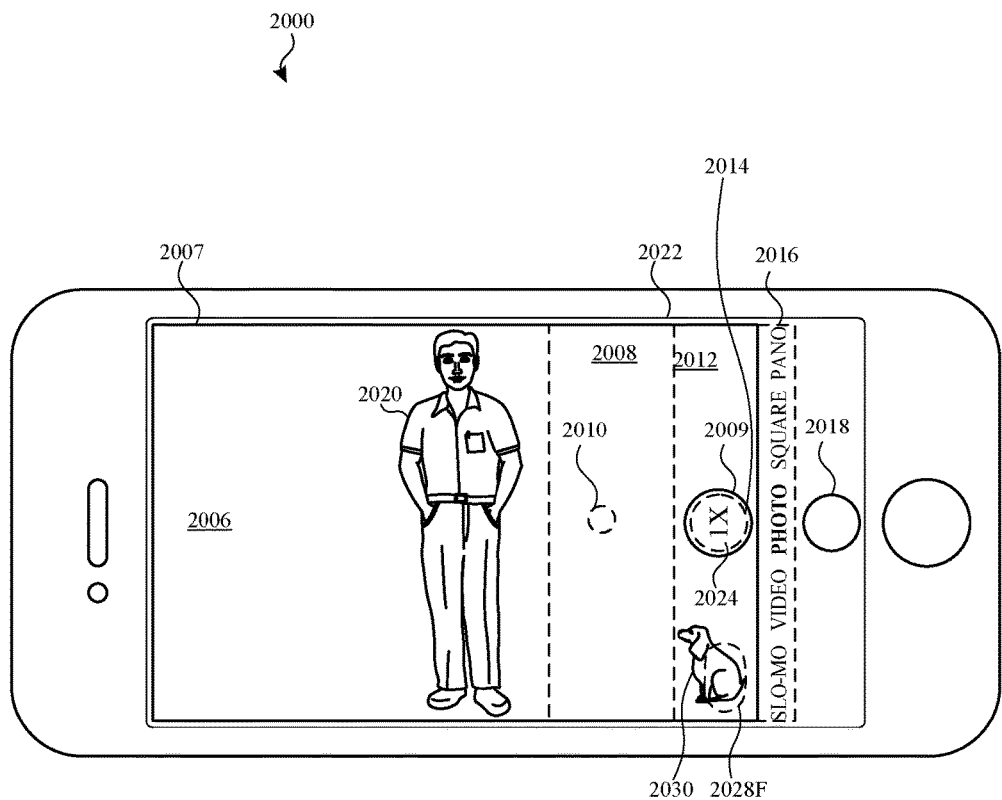
Figures 1, 20N:
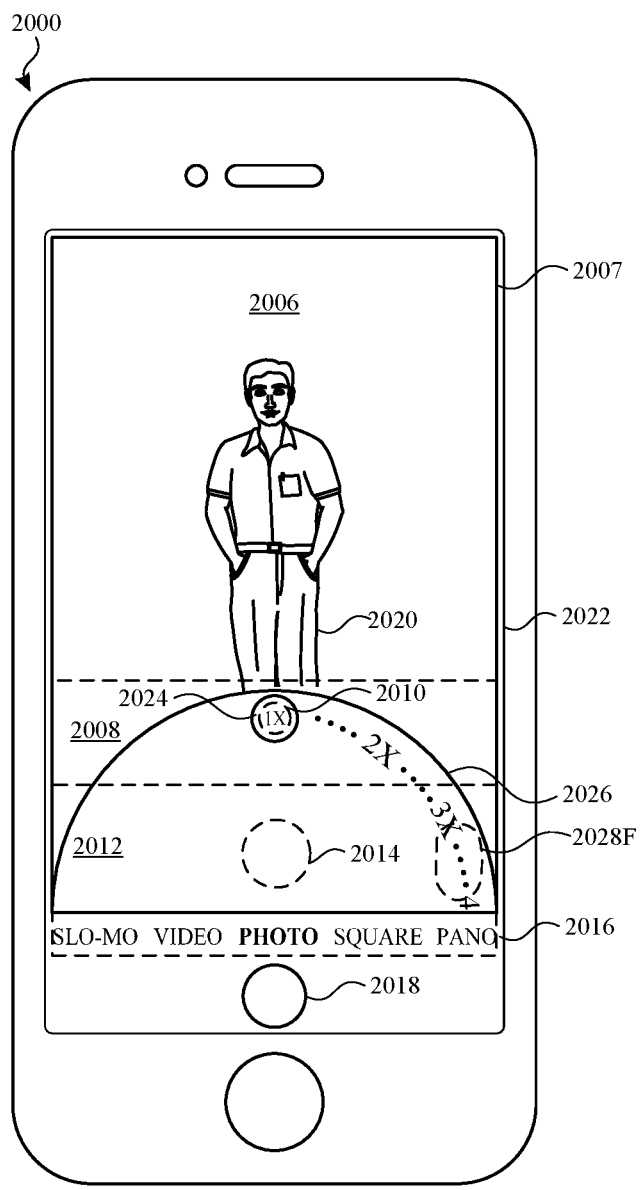
Figures 2, 20N:
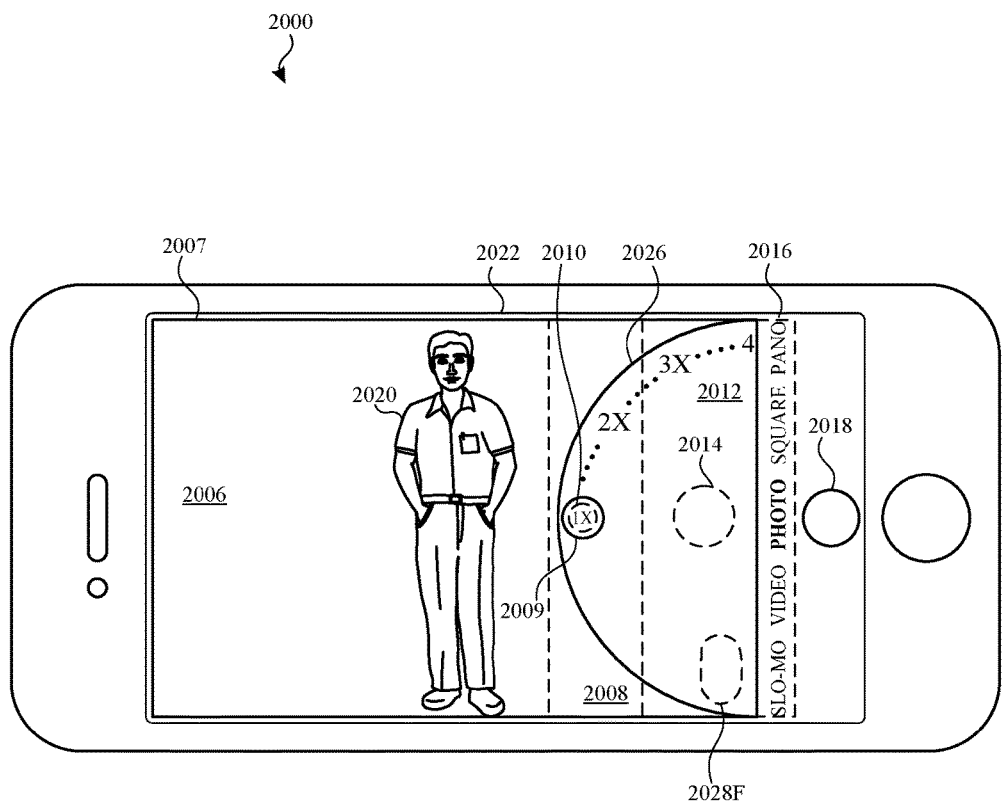

As illustrated in FIGS. 20M-1 to 20N-2, a tap gesture (e.g., 2028F) in zoom area 1 2012 when adjustable control 2026 (e.g., a zoom dial) is not displayed results in changing a focus (e.g., to focus on the object represented by 2030), and a tap gesture (e.g., 2028G) in zoom area 1 2012 when adjustable control 2026 (e.g., a zoom dial) is displayed results in not changing a focus. FIG. 20M-1 and FIG. 20M-2 illustrate similar concepts, with the device of FIG. 20M-1 being in the portrait mode and the device of FIG. 20M-2 being in a landscape mode. Similarly, FIG. 20N-1 and FIG. 20N-2 illustrate similar concepts, with the device of FIG. 20N-1 being in the portrait mode and the device of FIG. 20N-2 being in a landscape mode.

As illustrated in FIGS. 20M-1 and 20M-2, in some examples, when the electronic device is prepared to capture media at the first magnification level, in accordance with a determination that a set of one or more conditions is met (e.g., a tap 2028F on zoom area 1 2012), wherein a first condition of the set of one or more conditions is met when the gesture (e.g., gesture 2028F) is at a location (e.g., on the touch-sensitive surface, the location corresponding to the zoom area 1 2012), and a second condition of the set of one or more conditions is met when an adjustable control is not displayed, the electronic device updates display of the digital viewfinder (e.g., 2007) to focus (e.g., based on an estimated distance to the respective object) on a representation (e.g., 2030 of FIGS. 20M-1 and 20M-2) of a respective object (e.g., corresponding to 2030) of the one or more objects in the field of view of the one or more cameras that corresponds to a location of the gesture (e.g., 2028F) on the one or more input devices (e.g., an object that is displayed at a location of the tap input on the touch-screen display).

As illustrated in FIGS. 20N-1 and 20N-2, in some examples, when the electronic device is prepared to capture media at the first magnification level, in accordance with a determination that a different set of one or more conditions is met (e.g., a tap on zoom area 1 2012), wherein a first condition of the different set of one or more conditions is met when the gesture (e.g., gesture 2028F) is at a location (e.g., on the touch-sensitive surface, the location corresponding to the zoom area 1 2012), and a second condition of the different set of one or more conditions is met when an adjustable control is displayed, the electronic device foregoes updating display of the digital viewfinder (e.g., 2007) to focus (e.g., based on an estimated distance to the respective object) on a representation of a respective object of the one or more objects in the field of view of the one or more cameras that corresponds to a location of the gesture (e.g., 2028F) on the one or more input devices (e.g., an object that would be displayed at a location of the tap input on the touch-screen display).

Figure 20O:
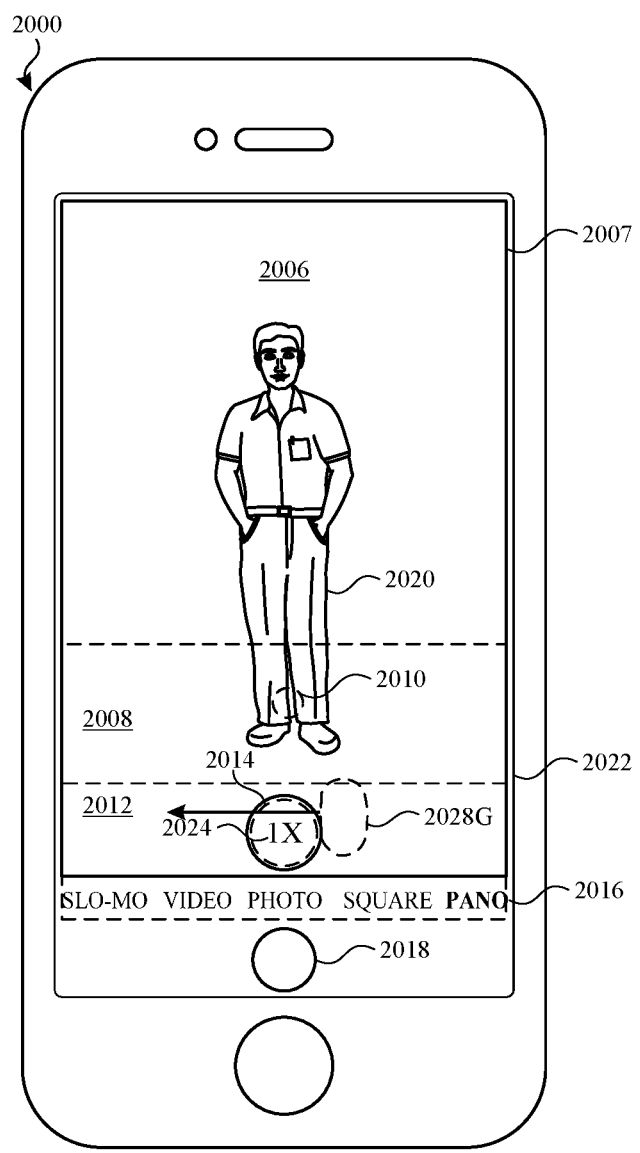
Figure 20P:
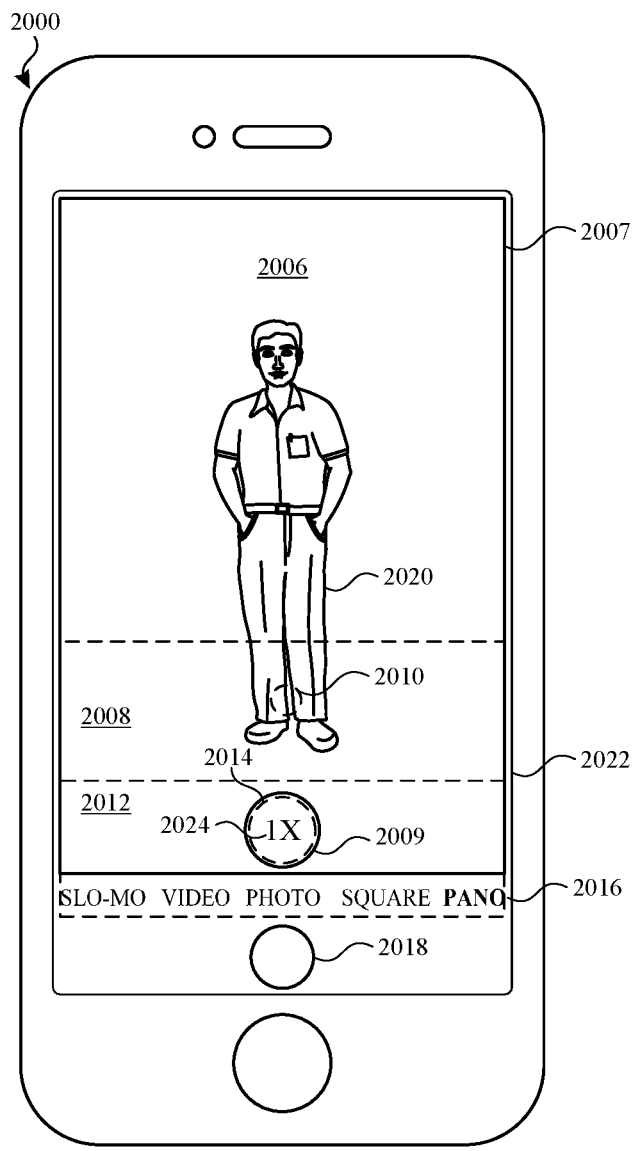

As illustrated in FIGS. 20O-20P, in accordance with some embodiments, the first gesture is a swipe gesture (e.g., 2028G) at a location corresponding to the 1×/2× button 1 2014, when the adjustable control is not displayed. In response to detecting the first input is a swipe gesture at a location corresponding to the 1×/2× button 1 2014, the electronic device transitions from a magnification level (e.g., 1×, as illustrated in FIG. 20O) to a different magnification level (e.g., 2× magnification, as illustrated in FIG. 20P).

In accordance with some embodiments, the first input is a tap and hold (e.g., hold for a predetermined period of time) at 1×/2× button area 1 2014. In accordance with a determination that a seventh set of one or more conditions is met (e.g., tap and hold on the magnification adjustment affordance 2019), wherein a first condition of the seventh set of one or more conditions is met when the first gesture (e.g., a tap and hold gesture) is at the second location (e.g., on the touch-sensitive surface, the second location corresponding to the magnification adjustment affordance 2019), displaying, on the display, the zoom control (e.g., a zoom dial, as described above with reference to FIGS. 18R-18U).

In some embodiments, in accordance with (and/or in response to) the determination that the seventh set of one or more conditions is met (e.g., tap and hold on the magnification adjustment affordance 2019), the electronic device forgoes (e.g., does not do) one or more of the following: changing the magnification level at which the device is prepared to capture media; updating display of the digital viewfinder to change the focus to a representation of a respective object; changing a camera capture mode of the electronic device; locking a focus or (or alternatively, and) exposure setting; changing the exposure at which the device is prepared to capture media.

In some embodiments, in accordance with a determination that a seventh set of one or more conditions is met (e.g., tap and hold on 1×/2× button area 1 2014, which corresponds to the magnification adjustment affordance 2019), wherein a first condition of the seventh set of one or more conditions is met when the first gesture (e.g., a tap and hold gesture) is at the second location (e.g., 1×/2× button area 1 2014 on the touch-sensitive surface, the second location corresponding to the magnification adjustment affordance 2019), the electronic device displays, on the display, the zoom control (e.g., a zoom dial), as described in greater detail above with reference to FIGS. 18R-18U. In some examples, a second condition of the seventh set of one or more conditions is met when the zoom control is not displayed, on the display, when the first input is detected.

In some embodiments, in accordance with (and/or in response to) the determination that the seventh set of one or more conditions is met (e.g., tap and hold on 1×/2× button area 1 2014, which corresponds to the magnification adjustment affordance 2019), the electronic device forgoes (e.g., does not do) one or more of the following: changing the magnification level at which the device is prepared to capture media; updating display of the digital viewfinder to change the focus to a representation of a respective object; changing a camera capture mode of the electronic device; locking a focus or (or alternatively, and) exposure setting; changing the exposure at which the device is prepared to capture media.

In some embodiments, in accordance with a determination that an eight set of one or more conditions is met (e.g., tap and hold on viewfinder area 2006), wherein a first condition of the eight set of one or more conditions is met when the first gesture (e.g., a tap and hold gesture) is at the first location (e.g., on the touch-sensitive surface, the first location corresponding to the viewfinder area 2006), locking a focus or (or alternatively, and) exposure setting based on a characteristic of a respective object (e.g., based on an estimated distance to the respective object) of the one or more objects in the field of view of the one or more cameras that corresponds to a location of the first gesture on the one or more input devices (e.g., an object that displayed at a location of the tap input on the touch-screen display).

In some embodiments, in accordance with (and/or in response to) the determination that the eight set of one or more conditions is met (e.g., tap and hold on viewfinder area), the electronic device forgoes (e.g., does not do) one or more of the following: changing the magnification level at which the device is prepared to capture media; changing a camera capture mode of the electronic device; displaying the zoom control; changing the exposure at which the device is prepared to capture media.

In some embodiments, when the first input is a swipe gesture on a displayed adjustable control (e.g., 2026), the electronic device changes a magnification level at which the electronic device is prepared to capture media. In some embodiments, in accordance with a determination that a ninth set of one or more conditions is met (e.g., swipe on zoom area 2 2008), wherein a first condition of the ninth set of one or more conditions is met when the first gesture (e.g., a swipe gesture) is at a fifth location (e.g., on the touch-sensitive surface, the fifth location corresponding to the zoom area 2 2008), and a second condition of the ninth set of one or more conditions is met when a zoom dial is displayed on the display, the electronic device prepares to capture media with the one or more cameras at a fifth magnification level based on a magnitude of the first gesture.

In some embodiments, in accordance with (and/or in response to) the determination that the ninth set of one or more conditions is met (e.g., swipe on zoom area 2), the electronic device forgoes (e.g., does not do) one or more of the following: updating display of the digital viewfinder to change the focus to a representation of a respective object; changing a camera capture mode of the electronic device; locking a focus or (or alternatively, and) exposure setting; changing the exposure at which the device is prepared to capture media.

In some embodiments, when the first input is a swipe gesture in the viewfinder area 2006 when a focus setting or exposure setting is locked, the electronic device changes the respective focus or exposure (e.g., based on a magnitude of the first input). In some embodiments, the electronic device is prepared to capture media, using a first exposure, with the one or more cameras with a focus or (or alternatively, and) exposure setting locked. In accordance with a determination that a tenth set of one or more conditions is met (e.g., swipe on the viewfinder area 2006), wherein a first condition of the tenth set of one or more conditions is met when the first gesture (e.g., a swipe gesture, such as a swipe left or swipe right gesture) is at the first location (e.g., on the touch-sensitive surface, the first location corresponding to the viewfinder area 2006), preparing to capture media, using a second exposure (different from the first exposure), with the one or more cameras, wherein the second exposure is based on a magnitude of the first input. In some embodiments, a second condition of the tenth set of one or more conditions is met when a focus setting or exposure setting of the electronic device is locked.

In some embodiments, when the electronic device detects the first gesture (e.g., swipe) at a location corresponding to the viewfinder while the focus and/or exposure setting is locked, the electronic device changes a camera capture mode of the electronic device based on a directional component of the first gesture (e.g., changing from an image capture mode to video capture mode, changing from preparing to capture still media to preparing to capturing video media). In some embodiments, when the zoom control is displayed and the electronic device detects the first gesture (e.g., swipe) at a location corresponding to the zoom control while the focus and/or exposure setting is locked, the electronic device prepares to capture media with the one or more cameras at a dynamically-selected magnification level, wherein the respective magnification level is selected based on a magnitude (e.g., distance) of the first gesture. In some embodiments, when the electronic device detects the first gesture (e.g., swipe) at a location corresponding to the camera capture mode while the focus and/or exposure setting is locked, the electronic device changes a camera capture mode of the electronic device based on a directional component of the first gesture (e.g., changing from an image capture mode to video capture mode, changing from preparing to capture still media to preparing to capturing video media).

In some embodiments, in accordance with (and/or in response to) the determination that the tenth set of one or more conditions is met (e.g., swipe on the viewfinder area 2006), the electronic device forgoes (e.g., does not do) one or more of the following: changing the magnification level at which the device is prepared to capture media; updating display of the digital viewfinder to change the focus to a representation of a respective object; changing a camera capture mode of the electronic device; displaying the zoom control; and locking a focus or (or alternatively, and) exposure setting.

In some embodiment, an exposure setting is based on one or more of an f-stop, an aperture size, and an ISO value (or simulations thereof). In some embodiments, with a focus or (or alternatively, and) exposure setting locked, a swipe up or swipe down gesture at the first location results in a change in the exposure setting.

In some embodiments, the first location (e.g., on the touch-sensitive surface, the first location corresponding to the viewfinder area 2006), the second location (e.g., on the touch-sensitive surface, 1×/2× button 1 2014 corresponding to the magnification adjustment affordance 2019), the third location (e.g., on the touch-sensitive surface, the third location corresponding to zoom area 1 2012), the fourth location (e.g., on the touch-sensitive surface, the fourth location corresponding to the mode area 2016), and the fifth location (e.g., on the touch-sensitive surface, the fifth location corresponding to the zoom area 2 2008), and locations corresponding to the 1×/2× button area 2 2010 are independent (e.g., different, distinct, separate, adjacent, do not overlap) from one another.

Figure 20Q:
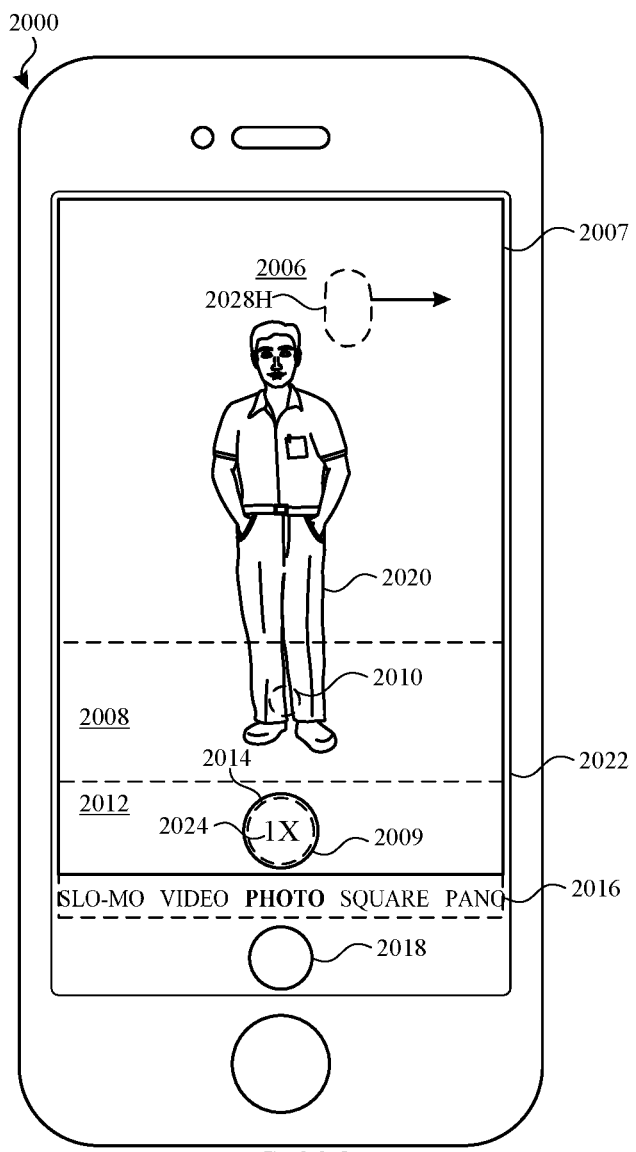
Figure 20R:
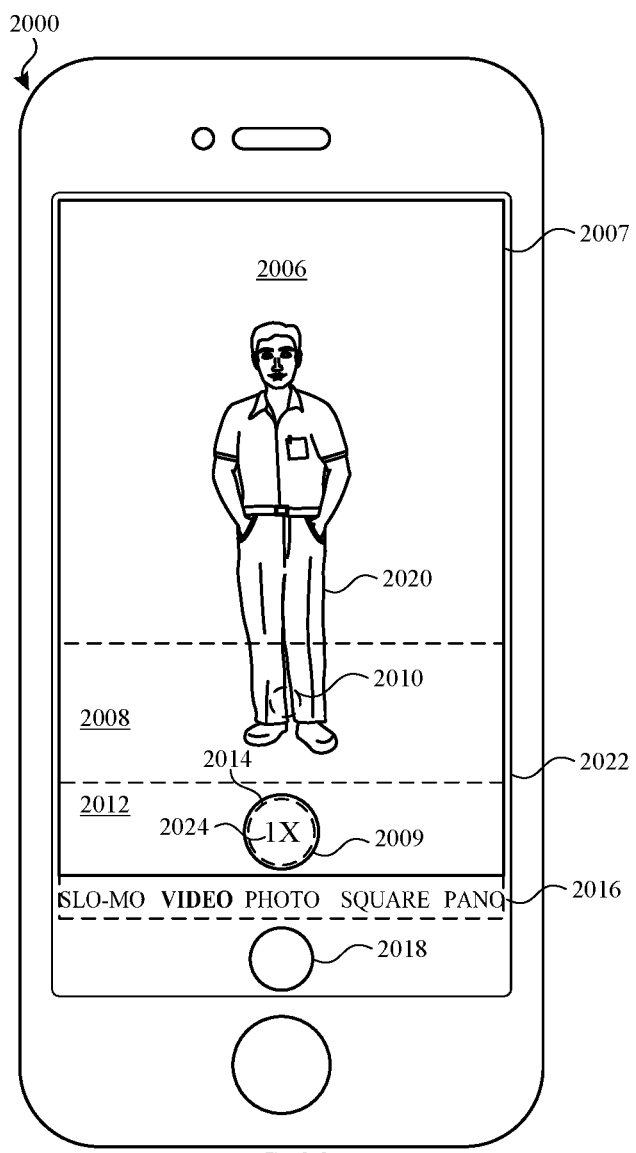
Figure 21B:
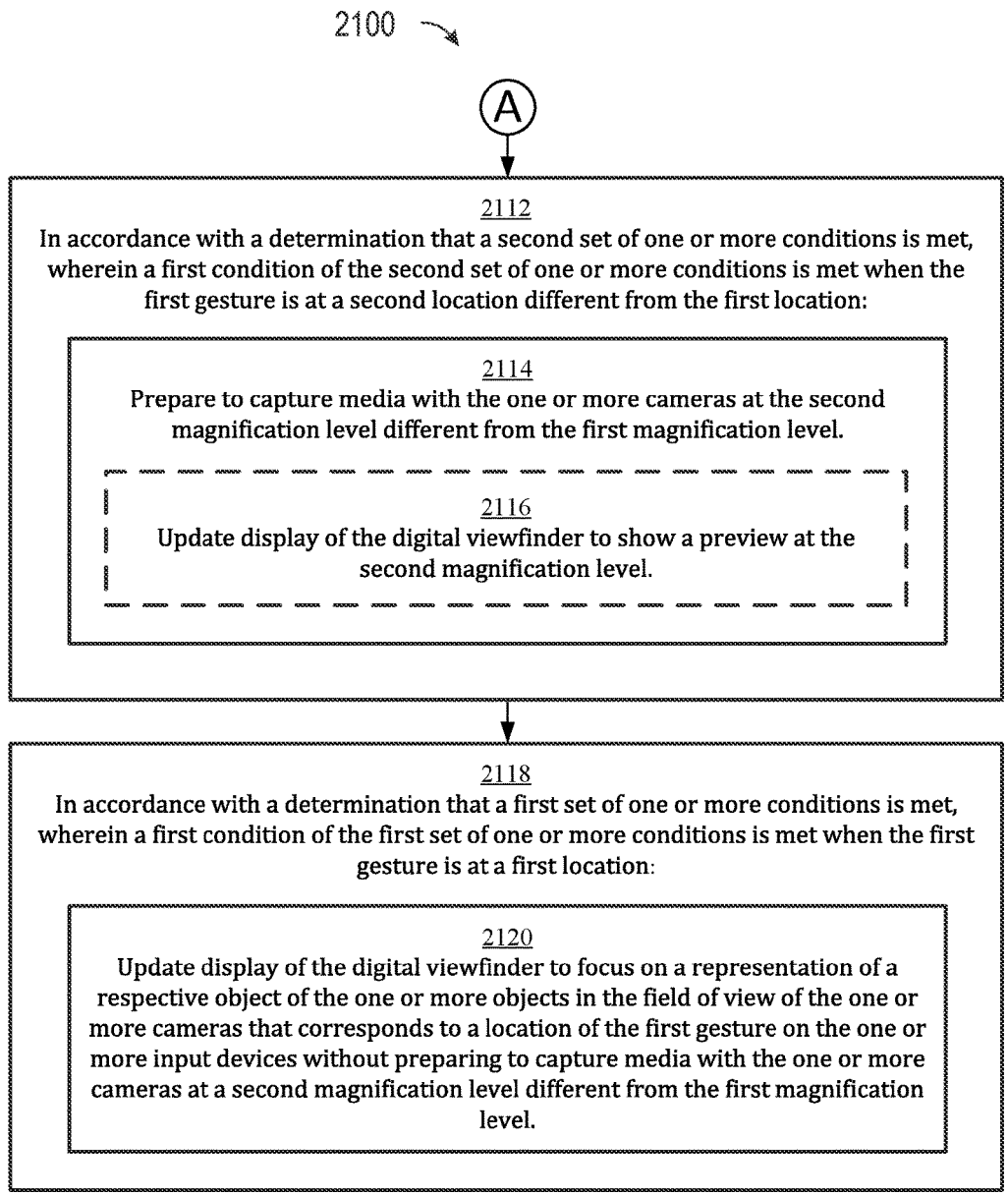

As illustrated in FIGS. 20Q-20R, in accordance with a determination that a fourth set of one or more conditions is met (e.g., swipe gesture 2028H on viewfinder area 2006), wherein a first condition of the fourth set of one or more conditions is met when the first gesture (e.g., a swipe gesture 2028H) is at the first location (e.g., on the touch-sensitive surface, the first location corresponding to the viewfinder area 2006), the electronic device 2000 changes a camera capture mode of the electronic device (e.g., changes among the modes described with reference to FIGS. 20I-20L, from an image or photo capture mode to a video capture mode, changing from preparing to capture still media to preparing to capturing video media, as illustrated in FIG. 20J). In some examples, a second condition of the fourth set of one or more conditions is met when the first gesture (e.g., a swipe gesture 2028H) has a directional component along the x-axis that, optionally, exceeds a minimum threshold magnitude (e.g., a speed of movement, a distance of movement, and/or an acceleration of movement).

In some embodiments, in accordance with (and/or in response to) the determination that the fourth set of one or more conditions is met (e.g., swipe gesture 2028H on viewfinder area 2006), the electronic device 2000 forgoes (e.g., does not do) one or more of the following: changing the magnification level at which the device is prepared to capture media; updating display of the digital viewfinder to change the focus to a representation of a respective object; displaying the zoom control; locking a focus or (or alternatively, and) exposure setting; changing the exposure at which the device is prepared to capture media.

The tables below provide exemplary conditions for the electronic device 2000 to perform particular functions. In Table 1, an adjustable control, such as a zoom dial, is not displayed on the display. In Table 2, an adjustable control, such as a zoom dial, is displayed on the display. In some instances, input received by the electronic device causes performing the same function regardless of the adjustable control being displayed. In other instances, input received by the electronic device causes performing different (or additional) functions when the adjustable control is displayed as compared to when the adjustable control is not displayed. In some examples, the first two columns provide additional criterion to be met for the electronic device to perform the function specified in the third column. For example, the first column specifies the location at which the gesture is received, such as locations on a touch-sensitive surface corresponding to the areas described with reference to FIGS. 20B-1 and 20B-2, and the second column describes the type of gesture that is received.

For example, a swipe left gesture and a swipe right gesture are gestures that have a component along the X-axis of the touch-sensitive surface. In some examples, the function of bringing up a zoom control includes transitioning the device from a state where the adjustable control is not displayed to a state where the adjustable device is displayed, such as described with reference to FIGS. 18R-18U. In some examples, a zoom function includes changing the magnification level at which the electronic device is prepared to capture media, such as described with reference to FIGS. 22A-22J. In some examples, the zoom function includes rotating the adjustable control to reflect the updated magnification level and/or updating the viewfinder to display representations of objects in the field of view of the one or more cameras at the updated magnification level. A focus function includes preparing the electronic device to capture media at an updated focus, such as described with reference to FIG. 20C. In some examples, changing a camera capture mode includes changing between different virtual cameras, such as described with reference to FIGS. 20G-20L. In some examples, an AE/EF lock function includes locking a focus setting and/or exposure setting based on a characteristic of a respective object.

TABLE 1

ADJUSTABLE CONTROL NOT DISPLAYED

| Area | Gesture | Function |
| --- | --- | --- |
| Viewfinder Area 2006 | Tap | Focus |
| Viewfinder Area 2006 | Swipe Left or Right | Change camera capture mode |
| Viewfinder Area 2006 | Tap and Hold | AE/AF lock |
| Zoom Area 2 2008 | Tap | Focus |
| Zoom Area 2 2008 | Swipe Left or Right | Change camera capture mode |
| Zoom Area 2 2008 | Tap and Hold | AE/AF lock |
| 1x/2x button 2 2010 | Tap | Focus |
| 1x/2x button 2 2010 | Swipe Left or Right | Change camera capture mode |
| 1x/2x button 2 2010 | Tap and Hold | AE/AF lock |
| Zoom Area 1 2012 | Tap | Focus |
| Zoom Area 1 2012 | Swipe Left or Right | Bring up zoom control + zoom based on magnitude of swipe |
| Zoom Area 1 2012 | Tap and Hold | Bring up zoom control |
| 1x/2x button 1 2014 | Tap | Zoom to predetermined level |
| 1x/2x button 1 2014 | Swipe Left or Right | Bring up zoom control + zoom |
| 1x/2x button 1 2014 | Tap and Hold | Bring up zoom control |
| Mode Area 2016 | Tap | Change camera capture mode |
| Mode Area 2016 | Swipe Left or Right | Change camera capture mode |
| Mode Area 2016 | Tap and Hold | Change camera capture mode (on liftoff) |

TABLE 2

ADJUSTABLE CONTROL DISPLAYED

| Area | Gesture | Function |
| --- | --- | --- |
| Viewfinder Area 2006 | Tap | Focus |
| Viewfinder Area 2006 | Swipe Left or Right | Change camera capture mode |
| Viewfinder Area 2006 | Tap and Hold | AE/AF lock |
| Zoom Area 2 2008 | Tap | Reset timer for hiding zoom control |
| Zoom Area 2 2008 | Swipe Left or Right | Zoom based on magnitude of swipe |
| Zoom Area 2 2008 | Tap and Hold | Maintain display of zoom control |
| Zoom Area 2 2008 | Swipe Down | Change zoom granularity |
| 1x/2x button 2 2010 | Tap | Zoom to predetermined level |
| 1x/2x button 2 2010 | Swipe Left or Right | Zoom based on magnitude of swipe |
| 1x/2x button 2 2010 | Tap and Hold | Indicate that zoom control is selected (enlarge 1x/2x button) |
| Zoom Area 1 2012 | Tap | Reset timer for hiding zoom control |
| Zoom Area 1 2012 | Swipe Left or Right | Zoom based on magnitude of swipe |
| Zoom Area 1 2012 | Tap and Hold | Maintain display of zoom control |
| Zoom Area 1 2012 | Swipe Down | Change zoom granularity |
| 1x/2x button 1 2014 | Tap | Reset timer for hiding zoom control |
| 1x/2x button 1 2014 | Swipe Left or Right | Zoom based on magnitude of swipe |
| 1x/2x button 1 2014 | Tap and Hold | Maintain display of zoom control |
| 1x/2x button 1 2014 | Swipe Down | Change zoom granularity |
| Mode Area 2016 | Tap | Change camera capture mode |
| Mode Area 2016 | Swipe Left or Right | Change camera capture mode |
| Mode Area 2016 | Tap and Hold | Change camera capture mode (on liftoff) |

Tables 1 and 2 above show a plurality of different responses to different inputs in different regions of a touch-sensitive surface. While the examples above describe tap inputs, swipe inputs, and tap and hold inputs for a plurality of regions, in some embodiments, one or more of the regions is not included on the touch-sensitive surface and/or one or more of the gesture types is not detected for a particular region or for all of the regions. As such, it should be understood that use of various combinations of various subsets of the responses to the inputs described above is contemplated. Tables 1 and 2 show comparatively how a particular type of input (e.g., a swipe left or right) is interpreted by the device in varying ways depending on where the swipe input is detected (e.g., as a zoom input when detected in zoom area 1 or as a mode change input when detected in mode area) without requiring that the device respond to all of the various inputs shown above in every situation. Similarly, tables 1 and 2 show comparatively how the device can respond differently to different inputs in a particular region (e.g., zoom area 1) depending on what type of input is detected (e.g., focusing for a tap input, zooming for a swipe input without requiring that the device respond to all of the various inputs shown above in every situation. Additionally, tables 1 and 2 show comparatively how the device can respond differently to different inputs in a particular region (e.g., zoom area 2) depending on what a current user interface state (e.g., swipe to change modes if the adjustable control is not displayed or swipe to zoom if the adjustable control is displayed) without requiring that the device respond to all of the various inputs shown above in every situation.

FIGS. 21A-21B are a flow diagram illustrating a method for managing user inputs at an electronic device, in accordance with some embodiments. Method 2100 is performed at a device (e.g., 100, 300, 500, 2000) with one or more cameras (e.g., 2002 and 2004), one or more input devices (e.g., a touch-sensitive surface), and a display. In some embodiments, the device has a plurality of camera, with each camera having a different focal length. In some embodiments, the one or more input devices include a touch-sensitive surface. In some embodiments, the touch-sensitive surface and the display are part of a touch-sensitive display. Some operations in method 2100 are, optionally, combined, the order of some operations is, optionally, changed, and some operations are, optionally, omitted.

As described below, method 2100 provides an intuitive way for managing user inputs at an electronic device. The method reduces the cognitive burden on a user for providing inputs corresponding to functions, thereby creating a more efficient human-machine interface. For battery-operated computing devices, enabling a user to initiate various functions faster and more efficiently conserves power and increases the time between battery charges.

While (2102) the device (e.g., 2000) is prepared to capture media with the one or more cameras (e.g., 2002 and 2004) at a first magnification level (e.g., a magnification level corresponding to the value displayed in 2014), displaying (2104), on the display a digital viewfinder (e.g., 2007, including live or near-live preview images) based on data received from the one or more cameras (e.g., 2002 and 2004). The digital viewfinder (e.g., 2007) includes (2106) a representation (e.g., 2020, 2030) of one or more objects within a field of view of the one or more cameras (e.g., 2002, 2004).

In accordance with some embodiments, displaying the digital viewfinder (e.g., 2007) while the device (e.g., 2000) is prepared to capture media with the one or more cameras at the first magnification level includes displaying (2108), on the display, representations (e.g., 2020) of the one or more objects at the first magnification level.

While displaying the digital viewfinder (e.g., 2007), detecting (2110), via the one or more input devices, a first gesture (e.g., 2028; swipe, tap and hold, tap).

In some accordance with some embodiments, the electronic device determines whether a first set of one or more condition is met, wherein a first condition of the first set of one or more conditions is met when the first gesture is a tap gesture within a first area (e.g., corresponding to viewfinder area 2006).

In accordance with a determination (2112) that the first set of one or more conditions is met (e.g., the tap was on the viewfinder area 2006), wherein a first condition of the first set of one or more conditions is met when the first gesture (e.g., gesture 2028A of FIG. 20C) is at a first location (e.g., as illustrated in FIG. 20C, on the touch-sensitive surface, the first location corresponding to the viewfinder area 2006), the electronic device updates (2114) display of the digital viewfinder (e.g., 2007) to focus (e.g., based on an estimated distance to the respective object) on a representation (e.g., 2020 of FIG. 20C) of a respective object (e.g., corresponding to 2020) of the one or more objects in the field of view of the one or more cameras that corresponds to a location of the first gesture (e.g., 2028A) on the one or more input devices (e.g., an object that is displayed at a location of the tap input on the touch-screen display) without preparing to capture media with the one or more cameras at a second magnification level different from the first magnification level. In some examples, when the user performs a tap at the first location (e.g., within viewfinder area 2006), the electronic device changes the focus of the camera from a first item in the field of view of the camera to a second item (e.g., represented by 2020) in the field of view of the camera, wherein the first item and the second item are different.

In some examples, the electronic device (e.g., 2000) determines whether a second set of one or more condition is met, wherein a first condition of the second set of one or more conditions is met when the detected gesture (e.g., 2028B of FIG. 20D) is a tap gesture within a second area different from the first area (e.g., 1×/2× button 1 area 2014); and In accordance with a determination (2116) that the second set of one or more conditions is met, wherein a first condition of the second set of one or more conditions is met when the first gesture (e.g., 2028B, a tap gesture) is at a second location (e.g., on the touch-sensitive surface, the second location corresponding to the 1×/2× button 1 area 2014) different from the first location, the electronic device prepares (2118) to capture media with the one or more cameras (e.g., 2002 and 2004) at the second magnification level (e.g., 2× magnification level, as illustrated in FIG. 20E) different from the first magnification level (e.g., 1× magnification level, as illustrated in FIG. 20C) (e.g., toggle between zoom levels). Distinguishing between a tap gesture on the viewfinder and a tap gesture on the magnification adjustment affordance allows for an intuitive man-machine interface whereby the device disambiguates the users input to instruct the device to perform a focus function and a magnification function. This ability to disambiguate enables the user interface to make both functions (and additional functions) available to the user without the need to use submenus, thereby increasing the efficiency of using the device and reducing energy usage of the device and increasing battery life for battery-powered devices.

In accordance with some embodiments, preparing to capture media with the one or more cameras at the second magnification level includes updating (2116) display of the digital viewfinder (e.g., using data received from the one or more cameras) to show a preview at the second magnification level.

In accordance with some embodiments, in accordance with (and/or in response to) the determination that the first set of one or more conditions is met (e.g., the tap was on the viewfinder area 2006), the electronic device forgoes (e.g., does not do) one or more of the following: changing the magnification level at which the device is prepared to capture media; changing a camera capture mode of the electronic device; displaying the zoom control; locking a focus or (or alternatively, and) exposure setting; changing the exposure at which the device is prepared to capture media.

In accordance with some embodiments, in accordance with (and/or in response to) the determination that the second set of one or more conditions is met (e.g., the magnification adjustment affordance 2009 was activated), the electronic device forgoes (e.g., does not do) one or more of the following: updating display of the digital viewfinder to change the focus to a representation of a respective object; changing a camera capture mode of the electronic device; displaying the zoom control; locking a focus or (or alternatively, and) exposure setting; changing the exposure at which the device is prepared to capture media.

In accordance with some embodiments, in accordance with a determination that a third set of one or more conditions is met (e.g., swipe gesture 2028C at zoom area 1 2012), wherein a first condition of the third set of one or more conditions is met when the first gesture (e.g., 2028C, a swipe gesture) is at a third location (e.g., on the touch-sensitive surface, the third location corresponding to zoom area 1 2012) different from the first location, the electronic device prepares to capture media with the one or more cameras at a third magnification level that is based on a magnitude (e.g., distance traversed, illustrated by the arrow of 2028C) of the first gesture. A swipe input gesture on the magnification adjustment affordance enables the user to initiate a precise magnification operation by, for example, using only the hand that is holding the device. This is especially beneficial if the device is at position where two handed operation is not desirable, for example recording a video at a concert. Because the user does not need to repeatedly lower the device to change the magnification level, one-handed operation magnification adjustment provides the user with an opportunity to quickly change the magnification level while continuously recoding a video, resulting in a stabilized video.

In accordance with some embodiments, in accordance with (and/or in response to) the determination that the third set of one or more conditions is met (e.g., swipe gesture at zoom area 1 2012), the electronic device (e.g., 2000) forgoes (e.g., does not do) one or more of the following: updating display of the digital viewfinder to change the focus to a representation of a respective object; changing a camera capture mode of the electronic device; locking a focus or (or alternatively, and) exposure setting; changing the exposure at which the device is prepared to capture media.

In accordance with some embodiments, in accordance with a determination that a fourth set of one or more conditions is met (e.g., swipe gesture 2028H on viewfinder area 2006), wherein a first condition of the fourth set of one or more conditions is met when the first gesture (e.g., a swipe gesture 2028H) is at the first location (e.g., on the touch-sensitive surface, the first location corresponding to the viewfinder area 2006), the electronic device changes a camera capture mode of the electronic device (e.g., from an image or photo capture mode to a video capture mode, changing from preparing to capture still media to preparing to capturing video media). Distinguishing between a swipe gesture on the viewfinder and a tap gesture on the viewfinder allows for an intuitive man-machine interface whereby the device disambiguates the users input to instruct the device to perform a mode change or a focus change. This ability to disambiguate enables the user interface to make both functions (and additional functions) available to the user without the need to use submenus. A swipe in the viewfinder area to change a mode also provides the user a bigger input area in which to initiate a mode change, thus not requiring the user to use the smaller mode area to change modes.

In accordance with some embodiments, in accordance with (and/or in response to) the determination that the fourth set of one or more conditions is met (e.g., swipe gesture 2028H on viewfinder area 2006), the electronic device forgoes (e.g., does not do) one or more of the following: changing the magnification level at which the device is prepared to capture media; updating display of the digital viewfinder to focus on a representation of a respective object; displaying the zoom control; locking a focus or (or alternatively, and) exposure setting; changing the exposure at which the device is prepared to capture media.

In accordance with some embodiments, in accordance with a determination that a fifth set of one or more conditions is met (e.g., tap 2028D in mode area 2016), wherein a first condition of the fifth set of one or more conditions is met when the first gesture (e.g., a tap gesture 2028D) is at a fourth location (e.g., on the touch-sensitive surface, the fourth location corresponding to the mode area 2016) different from the first location, the second location, and the third location, the electronic device changes a camera capture mode of the electronic device to a mode corresponding to a location of the first gesture (e.g., changing from an image or photo capture mode to video capture mode, changing from preparing to capture still media to preparing to capturing video media). A tap in the mode area to change a mode allows the user to quickly change the mode without unnecessary steps. In some examples, if the user wanted to change the mode to the last mode listed in the mode list, instead of swiping repeatedly to get to the desired mode, the user would only need to tap once on the desired mode to activate the desired mode. In some examples, as a result the user would save time by not having to perform unnecessary intermediate steps.

In accordance with some embodiments, in accordance with (and/or in response to) the determination that the fifth set of one or more conditions is met (e.g., tap 2028D in mode area 2016), the electronic device forgoes (e.g., does not do) one or more of the following: changing the magnification level at which the device is prepared to capture media; updating display of the digital viewfinder to change the focus to a representation of a respective object; displaying the zoom control; locking a focus or (or alternatively, and) exposure setting; changing the exposure at which the device is prepared to capture media.

In accordance with some embodiments, in accordance with a determination that a sixth set of one or more conditions is met (e.g., swipe 2028E in mode area 2016), wherein a first condition of the sixth set of one or more conditions is met when the first gesture (e.g., a left or right swipe gesture 2028E) is at the fourth location (e.g., on the touch-sensitive surface, the fourth location corresponding to the mode area 2016), the electronic device changes a camera capture mode of the electronic device based on a directional component (e.g., left, right, up, down) of the first gesture (e.g., changing from an image capture mode to video capture mode, changing from preparing to capture still media to preparing to capturing video media). In some embodiments, the modes are traversed one at a time in that one swipe results in one mode traversal. In some embodiments, the number of modes traversed per swipe depends on the magnitude of the swipe gesture.

In accordance with some embodiments, in accordance with (and/or in response to) the determination that the sixth set of one or more conditions is met (e.g., swipe 2028E in mode area 2016), the electronic device forgoes (e.g., does not do) one or more of the following: changing the magnification level at which the device is prepared to capture media; updating display of the digital viewfinder to change the focus to a representation of a respective object; displaying the zoom control; locking a focus or (or alternatively, and) exposure setting; changing the exposure at which the device is prepared to capture media.

In accordance with some embodiments, the electronic device is configured to change (e.g., based on user input) among one or more of a first camera capture mode, a second camera capture mode, a third camera capture mode, and a fourth camera capture mode.

In the first camera capture mode (e.g., for capturing still images), the electronic device is configurable, while in the first camera capture mode, to prepare to capture media within a first range of magnification levels (e.g., 1× to 10× magnification, as illustrated in FIG. 20I). In some examples, the electronic device is not configurable, while in the first camera capture mode, to prepare to capture media outside of the first range of magnification levels. In some examples, the adjustable control (e.g., 2026A) can be rotated to select a magnification level, as described with reference to FIGS. 18A-18AN and FIGS. 22A-22J.

In the second camera capture mode (e.g., for capturing videos), the electronic device is configurable, while in the second camera capture mode, to prepare to capture media within a second range of magnification levels (e.g., 1× to 6× magnification, as illustrated in FIG. 20J), wherein the second range of magnification levels is within the first range of magnification levels, In some examples, the electronic device is not configurable, while in the second camera capture mode, to prepare to capture media outside of the second range of magnification levels. In some examples, the adjustable control (e.g., 2026B) can be rotated to select a magnification level, as described with reference to FIGS. 18A-18AN and FIGS. 22A-22J.

In the third camera capture mode (e.g., for capturing slow-motion videos), the electronic device is configurable, while in the third camera capture mode, to prepare to capture media within a third range of magnification levels (e.g., 1× to 3× magnification when using a first camera of the electronic device, as illustrated in FIG. 20K; 2× to 6× magnification when using a second camera of the electronic device, as illustrated in FIG. 20L), wherein the third range of magnification levels is within the second range of magnification levels, and In some examples, the electronic device is not configurable, while in the third camera capture mode, to prepare to capture media outside of the third range of magnification levels. In some examples, the adjustable controls (e.g., 2026C and 2026D) can be rotated to select a magnification level, as described with reference to FIGS. 18A-18AN and FIGS. 22A-22J.

In the fourth camera capture mode (e.g., for capturing timelapse and/or panoramic images), the electronic device is configurable, while in the fourth camera capture mode, to prepare to capture media at a first predetermined magnification level (e.g., 1× magnification) and at a second predetermined magnification level (e.g., 2× magnification), wherein the first predetermined magnification level (e.g., 1× magnification) and the second predetermined magnification level (e.g., 2×) are within the second range of magnification levels (e.g., within 1× to 6×). In some examples, the electronic device is not configurable, while in the fourth camera capture mode, to prepare to capture media at magnification levels other than the first predetermination magnification level and the predetermined second magnification level. In some examples, the adjustable control is not displayed while in the third camera capture mode.

In accordance with some embodiments, a second condition of the first set of one or more conditions is met when a zoom control is not displayed. In some examples, a tap in zoom area 1 and zoom area 2 when the zoom control is not displayed will result in a focus operation.

In accordance with some embodiments, in accordance with a determination that a seventh set of one or more conditions is met (e.g., tap and hold on 1×/2× button area 1 2014, which corresponds to the magnification adjustment affordance 2019), wherein a first condition of the seventh set of one or more conditions is met when the first gesture (e.g., a tap and hold gesture) is at the second location (e.g., 1×/2× button area 1 2014 on the touch-sensitive surface, the second location corresponding to the magnification adjustment affordance 2019), the electronic device displays, on the display, the zoom control (e.g., a zoom dial), such as described above with reference to FIGS. 18R-18U. In some examples, a second condition of the seventh set of one or more conditions is met when the zoom control is not displayed when the first input is detected.

In accordance with some embodiments, in accordance with (and/or in response to) the determination that the seventh set of one or more conditions is met (e.g., tap and hold on 1×/2× button area 1 2014, which corresponds to the magnification adjustment affordance 2019), the electronic device forgoes (e.g., does not do) one or more of the following: changing the magnification level at which the device is prepared to capture media; updating display of the digital viewfinder to change the focus to a representation of a respective object; changing a camera capture mode of the electronic device; locking a focus or (or alternatively, and) exposure setting; changing the exposure at which the device is prepared to capture media.

In accordance with some embodiments, in accordance with a determination that an eight set of one or more conditions is met (e.g., tap and hold on viewfinder area 2006), wherein a first condition of the eight set of one or more conditions is met when the first gesture (e.g., a tap and hold gesture) is at the first location (e.g., on the touch-sensitive surface, the first location corresponding to the viewfinder area 2006), the electronic device locks a focus or (or alternatively, and) exposure setting based on a characteristic of a respective object (e.g., based on an estimated distance to the respective object) of the one or more objects in the field of view of the one or more cameras that corresponds to a location of the first gesture on the one or more input devices (e.g., an object that displayed at a location of the tap input on the touch-screen display).

In accordance with some embodiments, in accordance with (and/or in response to) the determination that the eight set of one or more conditions is met (e.g., tap and hold on viewfinder area), the electronic device forgoes (e.g., does not do) one or more of the following: changing the magnification level at which the device is prepared to capture media; updating display of the digital viewfinder to change the focus to a representation of a respective object; changing a camera capture mode of the electronic device; displaying the zoom control; changing the exposure at which the device is prepared to capture media.

In accordance with some embodiments, in accordance with a determination that a ninth set of one or more conditions is met (e.g., swipe on zoom area 2 2008), wherein a first condition of the ninth set of one or more conditions is met when the first gesture (e.g., a swipe gesture) is at a fifth location (e.g., on the touch-sensitive surface, the fifth location corresponding to the zoom area 2 2008), and a second condition of the ninth set of one or more conditions is met when a zoom dial is displayed on the display, the electronic device prepares to capture media with the one or more cameras at a fifth magnification level based on a magnitude of the first gesture.

In accordance with some embodiments, in accordance with (and/or in response to) the determination that the ninth set of one or more conditions is met (e.g., swipe on zoom area 2), the electronic device forgoes (e.g., does not do) one or more of the following: updating display of the digital viewfinder to change the focus to a representation of a respective object; changing a camera capture mode of the electronic device; locking a focus or (or alternatively, and) exposure setting; changing the exposure at which the device is prepared to capture media.

In accordance with some embodiments, the electronic device is prepared to capture media, using a first exposure, with the one or more cameras with a focus or (or alternatively, and) exposure setting locked, and in accordance with a determination that a tenth set of one or more conditions is met (e.g., swipe on the viewfinder area 2006), where a first condition of the tenth set of one or more conditions is met when the first gesture (e.g., a swipe gesture, such as a swipe left or swipe right gesture) is at the first location (e.g., on the touch-sensitive surface, the first location corresponding to the viewfinder area 2006), the electronic device prepares to capture media, using a second exposure (different from the first exposure), with the one or more cameras, wherein the second exposure is based on a magnitude of the first input. In some embodiments, when the electronic device detects the first gesture (e.g., swipe) at a location corresponding to the viewfinder while the focus and/or exposure setting is locked, the electronic device changes a camera capture mode of the electronic device based on a directional component of the first gesture (e.g., changing from an image capture mode to video capture mode, changing from preparing to capture still media to preparing to capturing video media). In some embodiments, when the zoom control is displayed and the electronic device detects the first gesture (e.g., swipe) at a location corresponding to the zoom control while the focus and/or exposure setting is locked, the electronic device prepares to capture media with the one or more cameras at a dynamically-selected magnification level, where the respective magnification level is selected based on a magnitude (e.g., distance) of the first gesture. In some embodiments, when the electronic device detects the first gesture (e.g., swipe) at a location corresponding to the camera capture mode while the focus and/or exposure setting is locked, the electronic device changes a camera capture mode of the electronic device based on a directional component of the first gesture (e.g., changing from an image capture mode to video capture mode, changing from preparing to capture still media to preparing to capturing video media).

In accordance with some embodiments, in accordance with (and/or in response to) the determination that the tenth set of one or more conditions is met (e.g., swipe on the viewfinder 2006), the electronic device forgoes (e.g., does not do) one or more of the following: changing the magnification level at which the device is prepared to capture media; updating display of the digital viewfinder to change the focus to a representation of a respective object; changing a camera capture mode of the electronic device; displaying the zoom control; and locking a focus or (or alternatively, and) exposure setting.

In accordance with some embodiments, an exposure setting is based on one or more of an f-stop, an aperture size, and an ISO value (or simulations thereof). In some embodiments, with a focus or (or alternatively, and) exposure setting locked, a swipe up or swipe down gesture at the first location results in a change in the exposure setting.

In accordance with some embodiments, the first location (e.g., on the touch-sensitive surface, the first location corresponding to the viewfinder area), the second location (e.g., on the touch-sensitive surface, the second location corresponding to the magnification adjustment affordance 2019), the third location (e.g., on the touch-sensitive surface, the third location corresponding to zoom area 1), the fourth location (e.g., on the touch-sensitive surface, the fourth location corresponding to the mode area), and the fifth location (e.g., on the touch-sensitive surface, the fifth location corresponding to the zoom area 2) are independent (e.g., different, distinct, separate, adjacent, do not overlap) from one another.

Note that details of the processes described above with respect to method 2100 (e.g., FIGS. 21A-21B) are also applicable in an analogous manner to the methods described below and above. For example, methods 700, 900, 1100, 1300, 1900, and 2300 optionally include one or more of the characteristics of the various methods described above with reference to method 2100. For example, elements of the viewfinder magnification techniques, affordances, and controls from among the various methods can be combined. For another example, the viewfinder in method 2100 is analogous to the viewfinder in methods 700, 900, 1100, 1300, 1900, and 2300. For brevity, these details are not repeated below. For brevity, these details are not repeated below.

FIGS. 22A-22J illustrate exemplary user interfaces for navigating among a plurality of values using an adjustable control, in accordance with some embodiments. The user interfaces in these figures are used to illustrate the processes described below, including the processes in FIG. 23A-23B.

In accordance with some embodiments, navigating among a plurality of values using an adjustable control, such as on the zoom control described above with respect to FIGS. 18A-18AN and 20A-20L, without appropriate acceleration of the control may require the user to provide multiple swipe inputs on the control to select a desired value, such as a desired magnification level. This is particularly relevant when the adjustable control is a dial and a portion of the dial is not displayed on the display of the device and/or cannot be interacted with using the touch-sensitive surface. For example, in the exemplary adjustable control 2210 illustrated in FIG. 22B, a user's attempt to turn the dial (without acceleration) from 3× to 9× when their finger is already near the edge (e.g., 2216) of the touch-sensitive display may require the user to lift their finger off of the touch-sensitive display and reposition their finger to provide additional room (e.g., additional space on the touch-sensitive display in the direction of the intended input motion) for a swipe gesture with a larger magnitude. This additional input requires additional time and may make the user interface less efficient than desired. Using appropriate acceleration to aid in navigation among a plurality of values is beneficial because, in some embodiments, it allows the user to access a larger range of values without the need to reposition their finger.

Figure 22A:
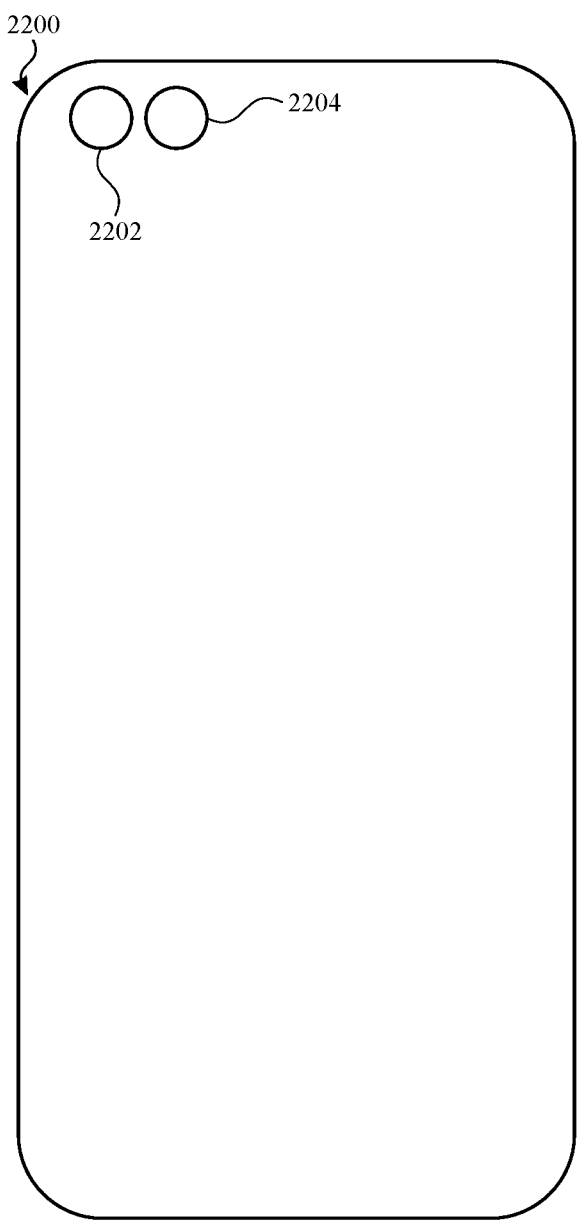
FIGS. 22A-22J illustrate exemplary devices and user interfaces for navigating through a plurality of values, in accordance with some embodiments.
Figure 23B:
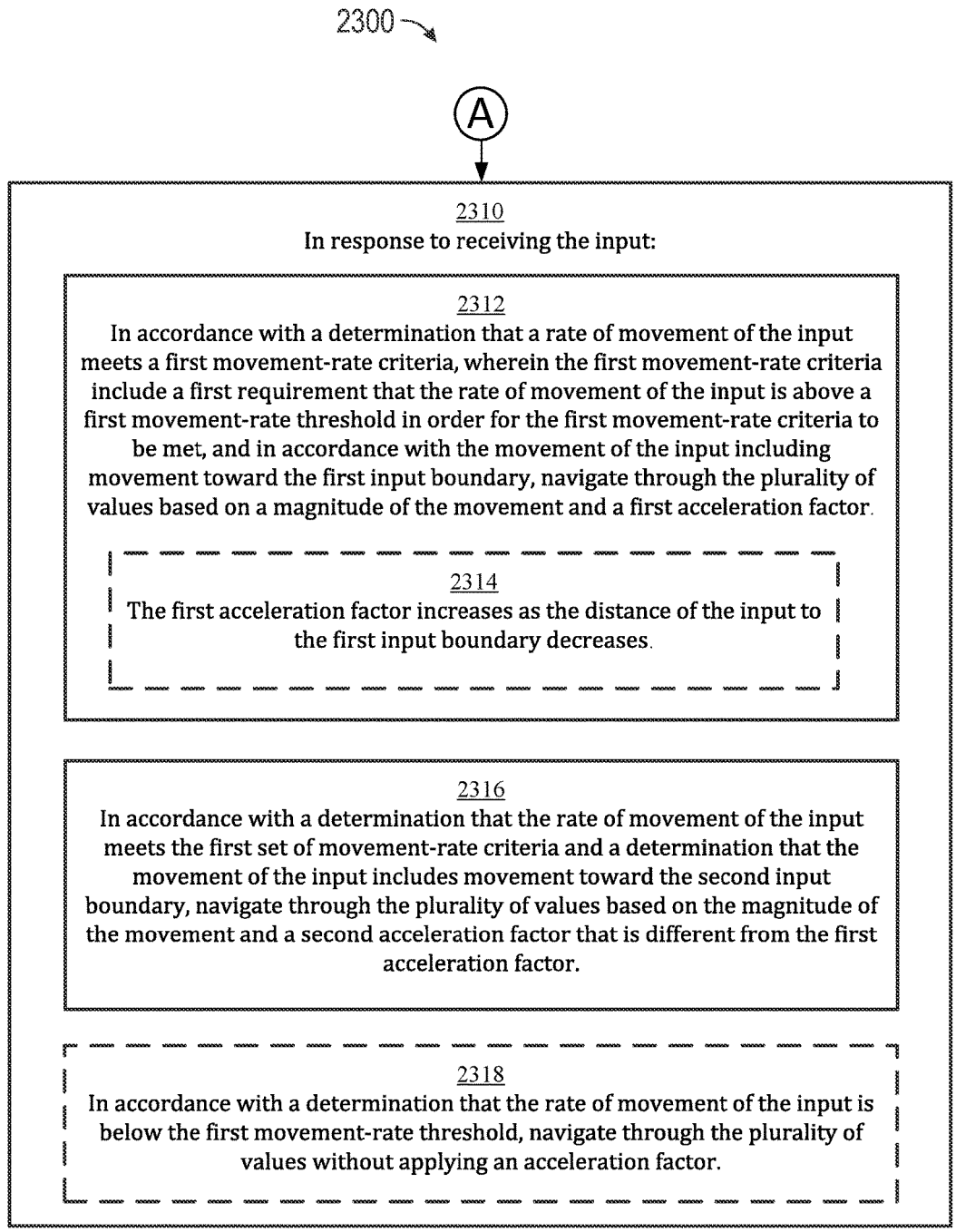

FIG. 22A illustrates an electronic device 2200 with one or more cameras, such as a first camera 2202 and a second camera 2204 (e.g., on the rear of the electronic device 2200). In some examples, the first camera 2202 and the second camera 2204 have fixed, but different, focal lengths. In some examples, the focal length, field of view, and/or optical magnification properties of the optical system is fixed for each of the cameras. In some embodiments, in addition to having different fixed focal lengths, the cameras (e.g., 2202, 2204) have different fixed fields of view and different fixed optical magnification properties.

Figure 22B:
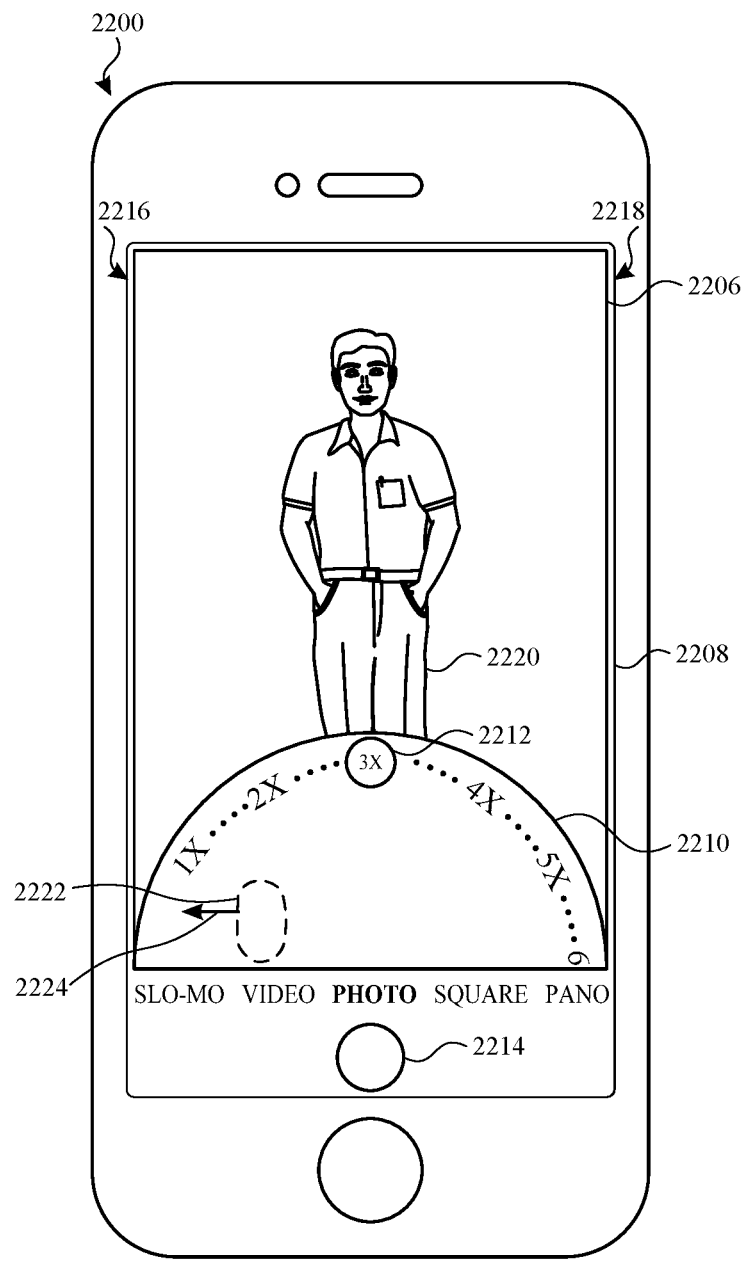

FIG. 22B illustrates the electronic device 2200 with a display 2208 and one or more input devices. In some examples, the one or more input devices include a touch-sensitive surface. In some examples, the touch-sensitive surface and the display 2208 combine to form a touch-sensitive display.

At FIG. 22B, the user interface includes a displayed adjustable control (e.g., 2210) for selecting a value of a plurality of values from a minimum value (e.g., 1× on the adjustable control) to a maximum value (e.g., 10× on the adjustable control). In some examples, the electronic device 2200 also concurrently displays (with the adjustable control 2210) a viewfinder (e.g., 2206) that includes a live preview of a field of view of the one or more cameras (e.g., 2202, 2204). For example, the preview includes a representation of a person (e.g., 2220). In accordance with some embodiments, the adjustable control (e.g., 2210) includes a magnification affordance 2212 (such as a magnification adjustment affordance) that identifies a target or current magnification level of the viewfinder. In accordance with some embodiments, the adjustable control (e.g., 2210) includes a magnification affordance 2212 (such as a magnification adjustment affordance) that identifies a target or current magnification level at which the electronic device is prepared for capturing media, such as images or video. In some embodiments, the magnification affordance 2212 and adjustable control 2210 have one or more of the properties of the adjustable control and magnification affordance described above with reference to FIGS. 18A-18AN and 20A-20R.

For example, when the electronic device is in an image capture mode and detects activation of the shutter affordance 2214, the electronic device captures (e.g., stores in memory) an image with the corresponding magnification level. For another example, when the electronic device is in a video capture mode and detects activation of the shutter affordance 2214, the electronic device captures (e.g., stores in memory) video at the corresponding magnification level until, for example, activation of the shutter affordance 2214 is detected. In some examples, the electronic device enables the user to select a value of the plurality of values using the adjustable control 2210 while media is not being captured (e.g., before capturing an image or recording video). In some examples, the electronic device enables the user to select a value of the plurality of values using the adjustable control 2210 while media is being captured (e.g., during recording of a video), thus resulting in the recorded video including a zoom in and/or zoom out that corresponds to the selection of the value using the adjustable control 2210.

As illustrated in FIG. 22B, while the electronic device 2200 is displaying the adjustable control (e.g., 2210), the electronic device 2200 receives an input (e.g., 2222), at the one or more input devices (e.g., via a touch-sensitive surface or a touch-screen display), that includes movement (e.g., 2224) detected via the one or more input devices. The movement (e.g., 2224) is constrained by a first input boundary (e.g., 2216) and a second input boundary (e.g., 2218). The input (e.g., 2222) is at a location (e.g., on a touch-sensitive display or a touch-sensitive surface) closer to the first input boundary (e.g., 2216) than the second input boundary (e.g., 2218). Note that the arrows that represent the movement (e.g., 2224) of inputs are illustrated for the understanding of the reader and are not part of the user interface of the electronic device 2200.

In accordance with some embodiments, the one or more input devices include a touch-sensitive surface, the first input boundary (e.g., 2216) is a first edge (e.g., a left edge) of the touch-sensitive surface, and the second input boundary (e.g., 2218) is a second edge (e.g., a right edge) of the touch-sensitive surface. In some examples, the first edge and the second edge of the touch sensitive surface are opposite edges of the touch-sensitive surface (e.g., they are parallel to each other). In some examples, the first edge and the second edge are edges of a touch-sensitive display on which the control is displayed, and where the one or more input devices and the display make up the touch-sensitive display. In some examples, the first input boundary and the second input boundary are (e.g., opposite) edges of a display-region on the touch-sensitive display on which the control is displayed. In some examples, the input is received at the respective touch-sensitive surface or touch-sensitive display.

In the example of FIG. 22B, the input (e.g., 2222 of FIG. 22B) is closer to the first input boundary (e.g., 2216) than to the second input boundary (e.g., 2218). The input is a swipe input that includes a component in the direction of the first input boundary (e.g., 2216).

A first movement-rate criteria includes a first requirement that the rate of movement of the input (e.g., 2222) is above a first movement-rate threshold (e.g., a threshold that is between 0.5 and 1 inches per second for a touch-sensitive surface with a width of approximately 3 inches in the direction of movement of the contact along an axis that is parallel to the direction of motion of the contact, or, alternatively a threshold that is between ⅙× the width of the touch-sensitive surface per second and ⅓× the width of the touch-sensitive surface per second along an axis that is parallel to the direction of motion of the contact) (e.g., a threshold greater than zero, such as 0.9 inches/second) in order for the first movement-rate criteria to be met. In response to receiving the input (e.g., 2222 of FIG. 22B), in accordance with a determination that a rate of movement of the input (e.g., 2222) meets the first movement-rate criteria, and in accordance with the movement (e.g., 2224) of the input (e.g., 2222) including movement toward the first input boundary (e.g., 2216), the electronic device navigates through the plurality of values (e.g., through a range of the values) based on a magnitude of the movement (e.g., a distance traversed by the input on the one or more input devices, such as a touch-sensitive surface or touch-screen display; a distance along an x-axis) and a first acceleration factor (e.g., a direction-based acceleration factor 2230, an acceleration factor greater than zero).

In some examples, navigating through values includes updating display of the adjustable control, such as by rotating the control, to reflect a selected value (or to identify a selected value). In some examples, navigating through the values includes updating one or more displayed characteristics, such as a magnification level of objects (e.g., 2220) displayed in a camera application viewfinder (e.g., 2206). In some examples, navigating through the values includes preparing to capture media with one or more cameras based on a selected value, such as described above with reference to FIGS. 18A-18AN and FIGS. 20A-20L.

Figure 22C:
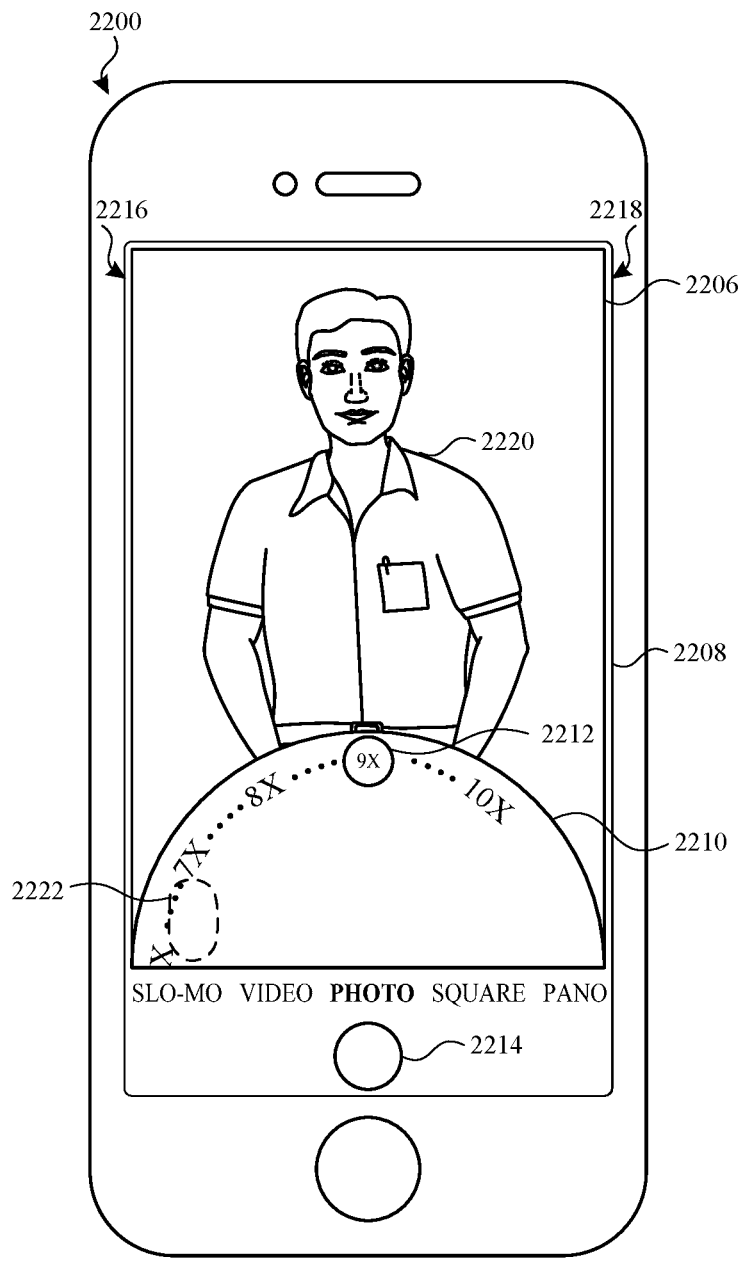

As illustrated in FIG. 22C, as a result of the navigation the electronic device updates display of the adjustable dial to transition from the selection of the 3× magnification level in FIG. 2B to selection of the 9× magnification level in FIG. 2C, as identified by the magnification affordance 2212. In addition, the electronic device updates the viewfinder 2206 to a corresponding magnification level, such as 9× magnification.

Figure 22D:
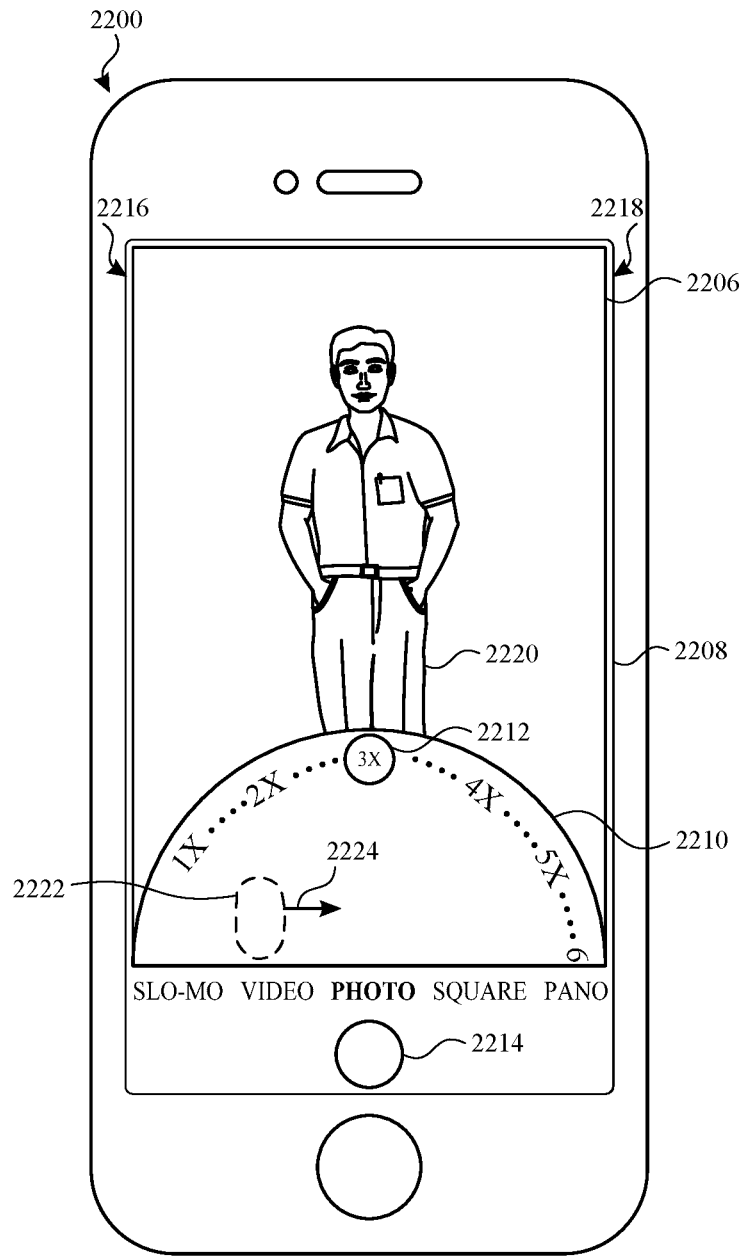

In the example of FIG. 22D, the input (e.g., 2222 of FIG. 22D) is closer to the first input boundary (e.g., 2216) than to the second input boundary (e.g., 2218). The input is a swipe input that does not include a component in the direction of the first input boundary (e.g., 2216).

In response to receiving the input (e.g., 2222 of FIG. 22D), in accordance with a determination that the rate of movement of the input (e.g., 2222) meets the first set of movement-rate criteria and a determination that the movement of the input includes movement toward the second input boundary (e.g., 2218) (and, optionally, does not include movement toward the first input boundary), the electronic device navigates through the plurality of values (e.g., through a range of the values) based on the magnitude of the movement (e.g., 2224 of FIG. 22D) and a second acceleration factor that is different from the first acceleration factor.

Figure 22E:
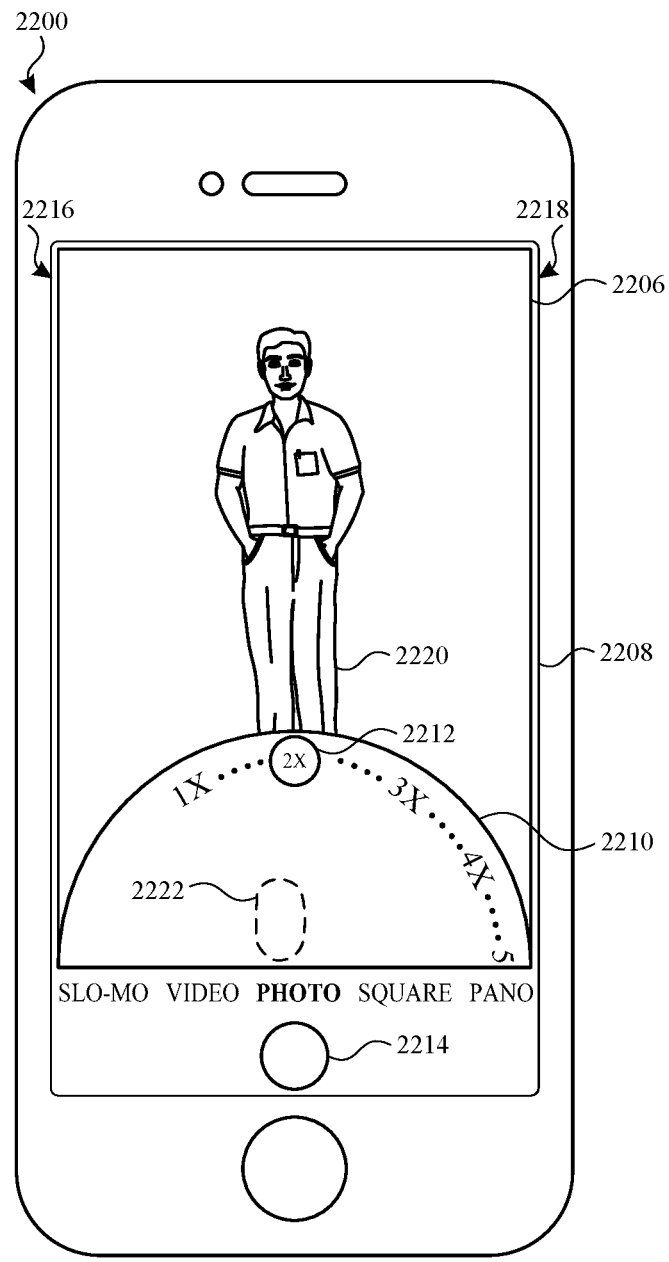

As illustrated in FIG. 22E, as a result of the navigation the electronic device updates display of the adjustable dial to transition from the selection of the 3× magnification level in FIG. 22D to selection of the 2× magnification level in FIG. 22E, as identified by the magnification affordance 2212. In addition, the electronic device updates the viewfinder 2206 to a corresponding magnification level, such as 2× magnification.

Thus, in the examples of FIGS. 22C-22E, user inputs (e.g., 2222 of FIG. 22B and 2222 of FIG. 22D) with the same magnitude (e.g., the same absolute distance) cause the electronic device to navigate through different amounts of values when the input is within a particular region of the touch-sensitive surface (e.g., on the left side of the display, on the left 40% of the display) and the movement of one input includes movement toward the first input boundary (e.g., 2216) and the movement of the other input includes movement toward the second input boundary (e.g., 2218) (and/or does not include movement toward the first input boundary).

Figure 22F:
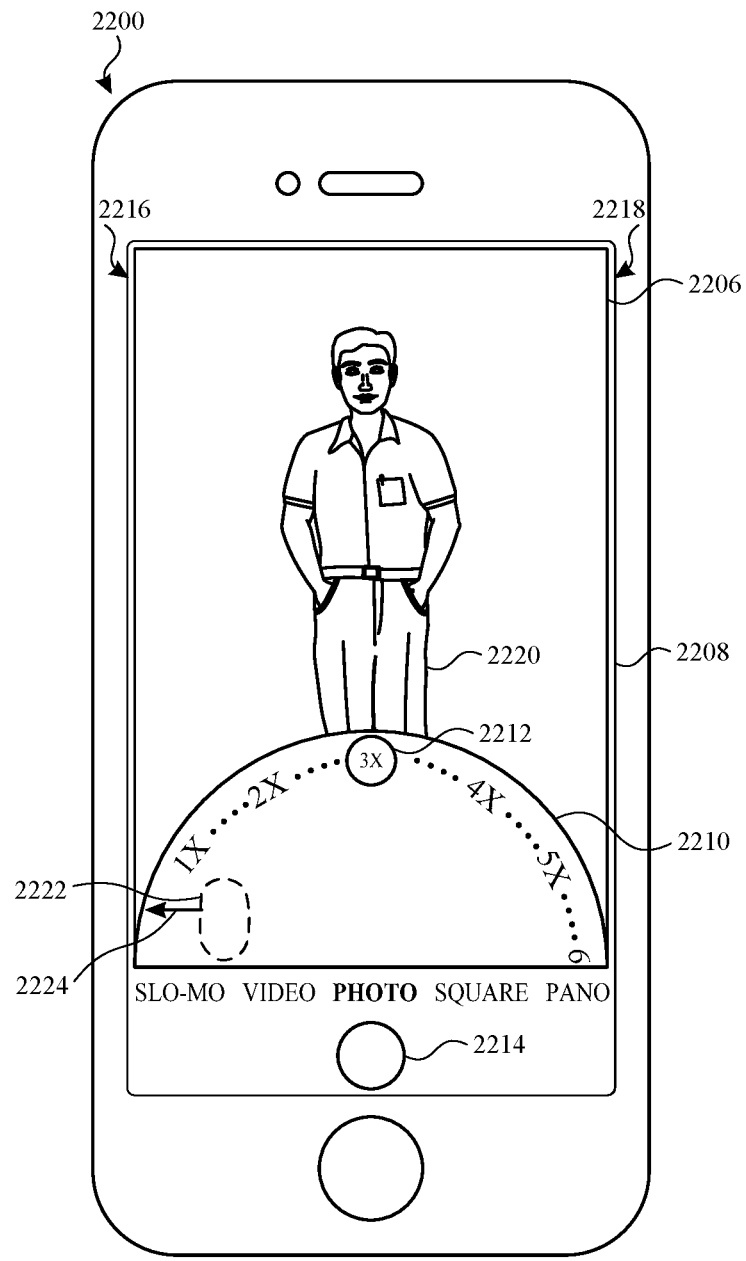
Figure 22G:
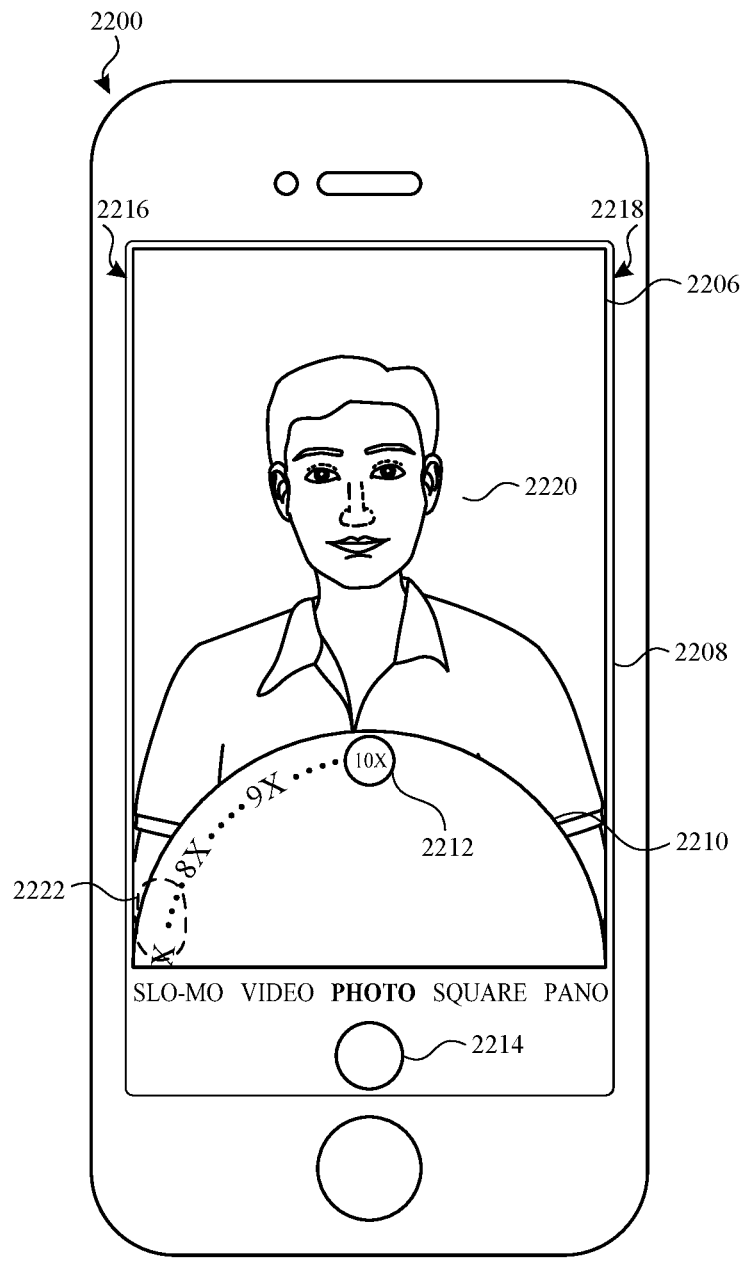

As illustrated in FIGS. 22F-22G, as the input (e.g., 2222 of FIG. 22F) is closer to the edge that the input is moving towards, the first acceleration factor increases, thereby causing the electronic device to navigate through a larger number of values. In some examples, the first acceleration factor (e.g., 2230) increases as the distance of the input (e.g., 2222) to the first input boundary (e.g., 2216) decreases.

Contrasting FIGS. 22B-22C with FIGS. 22F-22G helps illustrate this concept. The input 2222 of FIG. 22B has the same magnitude (e.g., distance traveled along the touch-sensitive surface) as the input 2222 of FIG. 22F. However, the first acceleration factor is higher for the example in FIG. 22F because the distance between input 2222 of FIG. 22F and the first input boundary 2216 is less than the distance between input 2222 of FIG. 22C and the first input boundary 2216.

The result of this higher first acceleration factor is illustrated in FIG. 22G. In response to the input 2222 of FIG. 22F, the electronic device navigates the plurality of values, causing the electronic device to update display of the adjustable dial to transition from the selection of the 3× magnification level in FIG. 2F to selection of the 10× magnification level in FIG. 2G, as identified by the magnification affordance 2212. In addition, the electronic device updates the viewfinder 2206 to a corresponding magnification level, such as 10× magnification. Thus, magnitudes of inputs that are closer to the boundary (or edge) are amplified more than magnitudes of inputs that are further from the boundary (or edge).

In accordance with some embodiments, the second acceleration factor is zero, and the first acceleration factor (e.g., a direction-based acceleration factor 2230) is greater than zero. Thus, when the movement (e.g., 2224) is toward the second input boundary (e.g., 2218) as illustrated in FIG. 22D, the navigation resulting from the input is not amplified. In some examples, when the movement (e.g., 2224) is toward the second input boundary (e.g., 2218) illustrated in FIG. 22D, navigating through the plurality of values occurs at a rate that is the same as when the rate of movement of the input is toward the first input boundary (e.g., 2216) and the rate of the input is not above the first movement-rate threshold. In some examples, when the movement (e.g., 2224) is toward the second input boundary (e.g., 2218) illustrated in FIG. 22D, the electronic device navigates through the same number of values as when the rate of movement of the input is toward the first input boundary (e.g., 2216) and the rate of the input is not above the first movement-rate threshold. Thus, in some examples (e.g., when not applying rate-based acceleration) an input that has movement toward the first input boundary (e.g., 2216), that has a particular magnitude, and that has a low speed results in navigating through the same number of values as another input that has movement away from the first input boundary (e.g., 2216), and that has the same particular magnitude, regardless of the speed of the another input.

In accordance with some embodiments, an acceleration technique is described with reference to the following acceleration equation:

$$\text{Acceleration factor} = 1 + \text{direction-based acceleration factor} * \text{acceleration-modification factor} + \text{rate-based acceleration factor} * \text{acceleration-modification factor} + \text{progress-based acceleration factor} * \text{acceleration-modification factor}$$

In some examples, the acceleration-modification factor is not applied to one or more of: the direction-based acceleration factor, the rate-based acceleration factor, and the progress-based acceleration factor. In some examples, the acceleration-modification factor is applied to one or more of: the direction-based acceleration factor, the rate-based acceleration factor, and the progress-based acceleration factor.

Figure 22H:
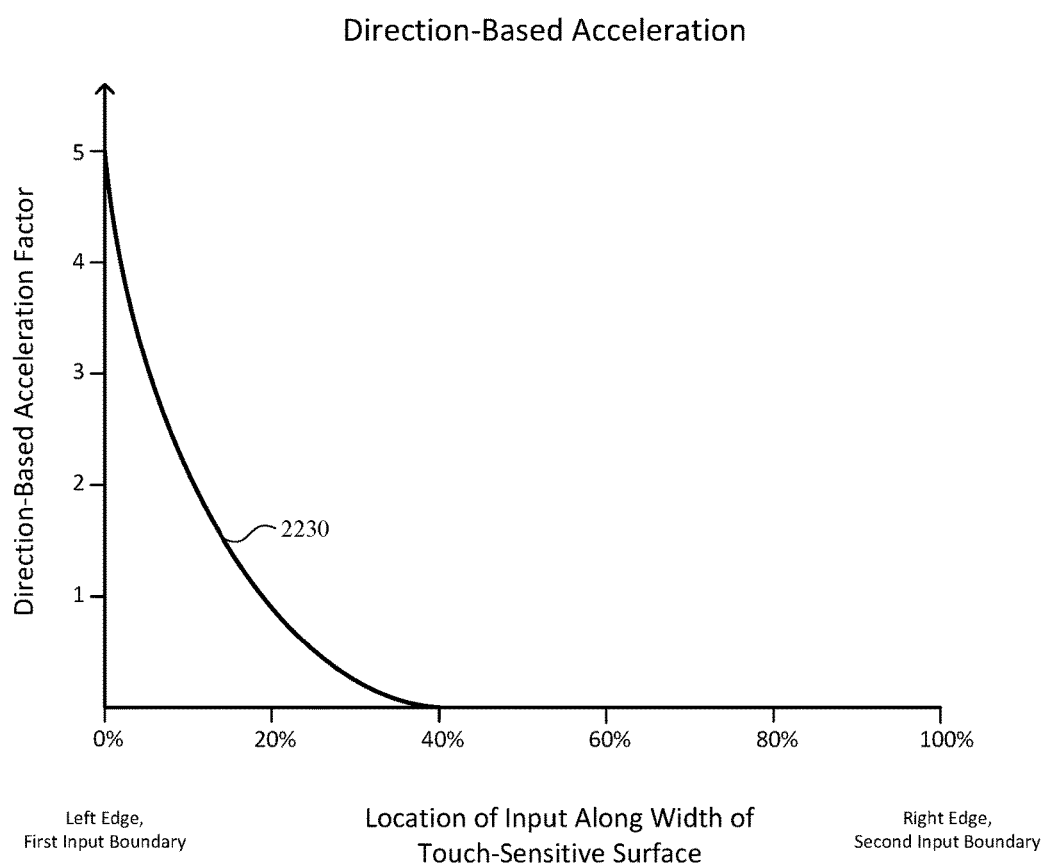
Figure 22I:
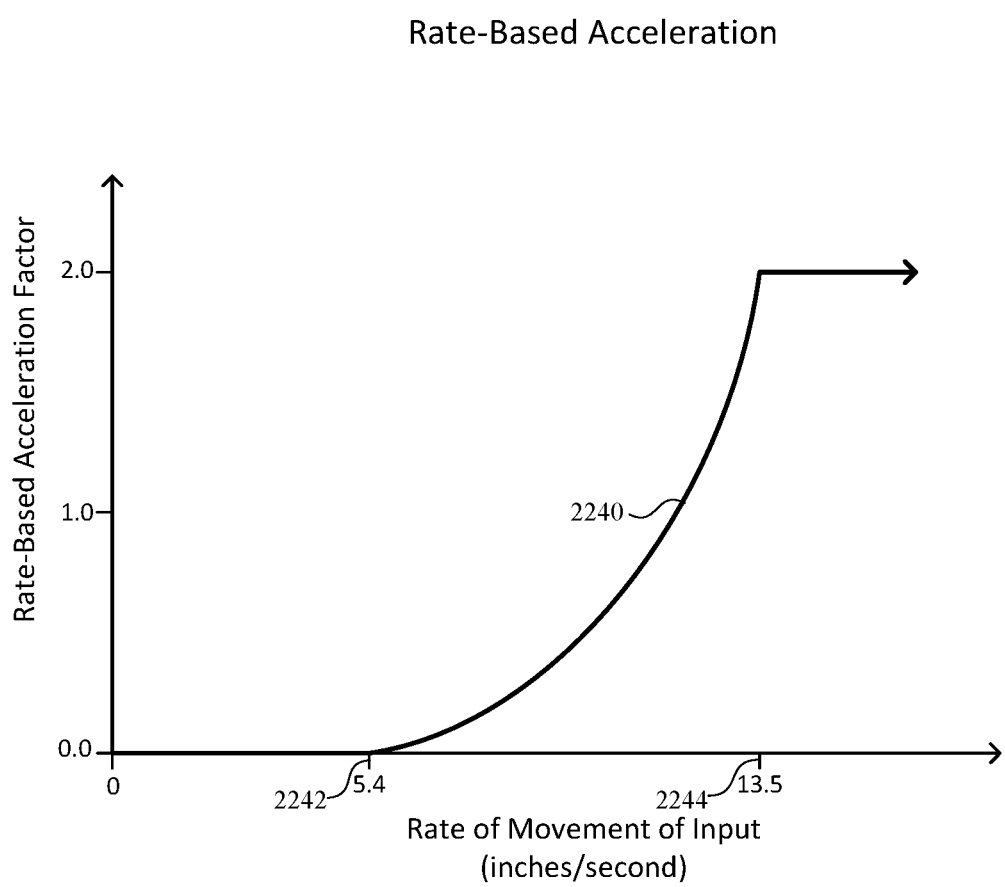

In some examples, a direction-based acceleration factor 2230 is applied when the movement of the input is towards a closest boundary. As illustrated in FIG. 22H, the value of the direction-based acceleration factor is dependent on the distance from the location of the input to the boundary. In the example of FIG. 22H, for inputs towards the first input boundary, the value of the direction-based acceleration factor 2230 is zero when the input is on the right 60% of the touch-sensitive surface. In some examples, the direction-based acceleration factor 2230 is multiplied by an acceleration-modification factor 2250, illustrated in FIG. 22J. In some examples, the value of the acceleration-modification factor 2250 is zero when the rate of movement of the input is less than 0.9 inches/second. As a result, the value of the product of the direction-based acceleration factor and acceleration-modification factor is zero when the rate of movement of the input is less than 0.9 inches/second, resulting in no acceleration from this product. In some examples, the value of the acceleration-modification factor 2250 is one when the rate of movement of the input is more than 1.8 inches/second. As a result, in some examples, the value of the product of the direction-based acceleration factor and acceleration-modification factor is the same as the direction-based acceleration factor when the rate of movement of the input is more than 1.8 inches/second, resulting in acceleration from this product. In the above exemplary acceleration equation, the product of the direction-based acceleration factor and acceleration-modification factor is added to a product of the acceleration-modification factor and the rate-based acceleration factor 2240, illustrated in FIG. 22I. In some examples acceleration equations, the product of the direction-based acceleration factor and acceleration-modification factor is added to a product of the rate-based acceleration factor.

In some examples, when the movement of an input is slow and not toward a nearby edge and there are only a few number of values to navigate through (e.g., based on the direction of the movement of the input), the acceleration factor is low, such as equal to 1. In some examples, when the movement of an input is fast and toward a nearby edge and there are numerous values to navigate through (e.g., based on the direction of the movement of the input), the acceleration factor is high, such as equal to 9.

In some examples, when the rate of movement of the input is below the second movement-rate threshold (e.g., a threshold that is between 4.8 and 6 inches per second for a touch-sensitive surface with a width of approximately 3 inches in the direction of movement of the contact along an axis that is parallel to the direction of motion of the contact, or, alternatively a threshold that is between 1.6× the width of the touch-sensitive surface per second and 2× the width of the touch-sensitive surface per second along an axis that is parallel to the direction of motion of the contact) (e.g., 5.4 inches/second), the value of the rate-based acceleration factor 2240 is zero, resulting in no additional acceleration. In some examples, when the rate of movement of the input is greater than the second movement-rate threshold (e.g., 5.4 inches/second), the value of the rate-based acceleration factor 2240 is greater than zero, resulting in additional acceleration.

In accordance with some embodiments, the second acceleration factor increases as the distance of the input (e.g., 2222) to the second input boundary decreases. In some examples, the second acceleration factor only increases as the distance of the input to the second input boundary (e.g., 2218) decreases, regardless of whether the input is closer to the second input boundary (e.g., 2218) or to the first input boundary (e.g., 2216). In some examples, the second acceleration factor increases as the distance of the input to the second input boundary (e.g., 2218) decreases in accordance with the input being closer to the second input boundary (e.g., 2218) than to the first input boundary (e.g., 2216).

In accordance with some embodiments, the electronic device navigates through the plurality of values (e.g., through a range of the values) using a fixed acceleration when the rate of the input is below a lower threshold. In some examples, in response to receiving the input (e.g., 2222), in accordance with a determination that the rate of movement of the input (e.g., 2222) is below the first movement-rate threshold (e.g., a threshold that is between 0.5 and 1 inches per second for a touch-sensitive surface with a width of approximately 3 inches in the direction of movement of the contact along an axis that is parallel to the direction of motion of the contact, or, alternatively a threshold that is between ⅙× the width of the touch-sensitive surface per second and ⅓× the width of the touch-sensitive surface per second along an axis that is parallel to the direction of motion of the contact) (e.g., a threshold greater than zero, such as 0.9 inches/second), the electronic device navigates through the plurality of values (e.g., through a range of the values) without regard to whether the input (e.g., 2222) is moving toward the first input boundary (e.g., 2216) or the second input boundary (e.g., 2218) (e.g., without acceleration).

In accordance with some embodiments, in response to receiving the input (e.g., 2222), in accordance with a determination that the rate of movement of the input (e.g., 2222) is below the first movement-rate threshold (e.g., a threshold that is between 0.5 and 1 inches per second for a touch-sensitive surface with a width of approximately 3 inches in the direction of movement of the contact along an axis that is parallel to the direction of motion of the contact, or, alternatively a threshold that is between ⅙× the width of the touch-sensitive surface per second and ⅓× the width of the touch-sensitive surface per second along an axis that is parallel to the direction of motion of the contact) (e.g., a threshold greater than zero, such as 0.9 inches/second), navigating through the plurality of values (e.g., through a range of the values) without applying an acceleration factor.

In accordance with some embodiments, a rate-based acceleration is also introduced. In some examples, in response to receiving the input (e.g., 2222), in accordance with a determination that the rate of movement of the input (e.g., 2222) meets a second movement-rate criteria, wherein the second movement-rate criteria include a requirement that the rate of movement of the input (e.g., 2222) is above a second movement-rate threshold (e.g., a threshold that is between 4.8 and 6 inches per second for a touch-sensitive surface with a width of approximately 3 inches in the direction of movement of the contact along an axis that is parallel to the direction of motion of the contact, or, alternatively a threshold that is between 1.6× the width of the touch-sensitive surface per second and 2× the width of the touch-sensitive surface per second along an axis that is parallel to the direction of motion of the contact) (e.g., 2242 of FIG. 22I, 5.4 inches/second) that is higher than the first movement-rate threshold in order for the second movement-rate criteria to be met, the electronic device navigates through the plurality of values (e.g., through a range of the values) at a rate based on a rate-based acceleration factor (e.g., 2240). Thus, two inputs with the same magnitude will result in navigation through a different number of values when the rate of movement of one input is above the second movement-rate threshold and the rate of movement the other input is not above the second movement-rate threshold. In some examples, the rate for navigating through the plurality of values is based on the magnitude of the input. In some examples, the rate-base acceleration factor is an acceleration factor that is independent of whether the input is moving toward the first input boundary or the second input boundary and/or is independent of the location along the x-axis of the touch-sensitive surface. In some examples, the value of the rate-based acceleration factor (e.g., 2240) is based on the rate of movement of the input. In some examples, the value of the rate-based acceleration factor reaches a ceiling or maximum when the rate of movement of the input reaches and/or exceeds a threshold (e.g., a threshold that is between 12 and 15 inches per second for a touch-sensitive surface with a width of approximately 3 inches in the direction of movement of the contact along an axis that is parallel to the direction of motion of the contact, or, alternatively a threshold that is between 4× the width of the touch-sensitive surface per second and 5× the width of the touch-sensitive surface per second along an axis that is parallel to the direction of motion of the contact) (e.g., 2244 of FIG. 22I, 13.5 inches/second), and maintains that maximum while the rate of movement of the input is at or above the threshold (e.g., 2244 of FIG. 22I, 13.5 inches/second).

Figure 22J:
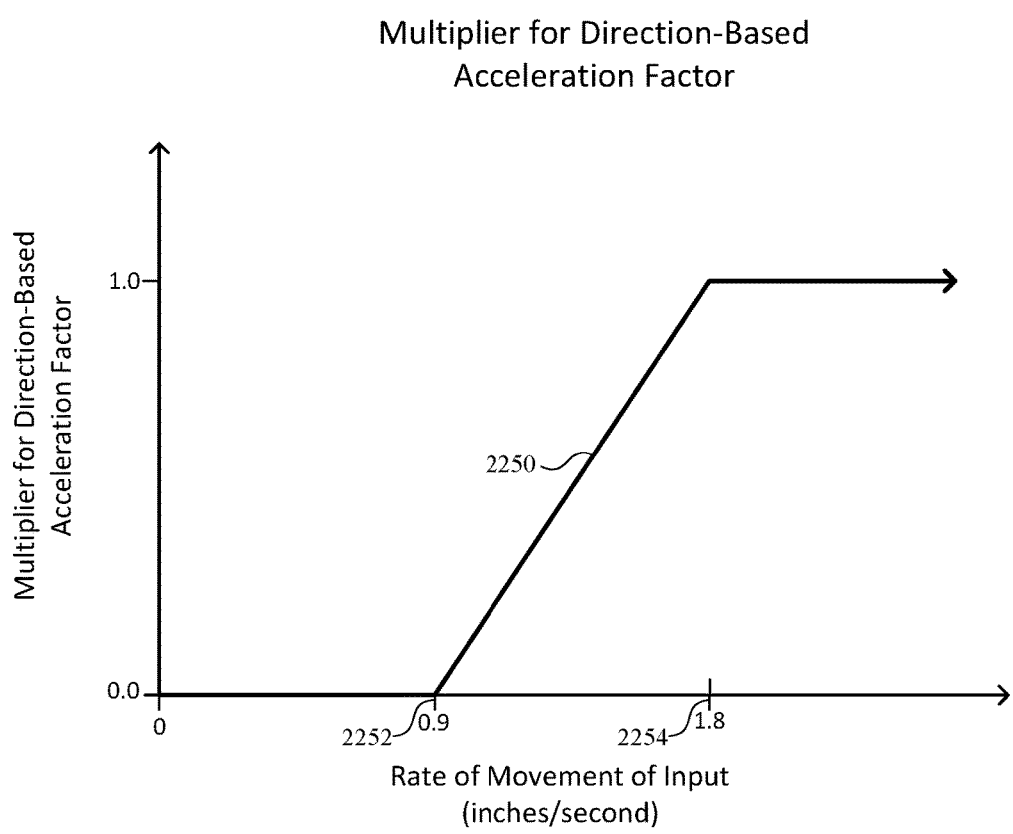

FIG. 22J illustrates an exemplary multiplier that is optionally applied to the direction-based acceleration factor, such as by multiplying the multiplier with the direction-based-acceleration factor. The multiplier is optionally referred to as an acceleration-modification factor. In some examples, the value of the acceleration-modification factor (e.g., 2250) is based on the rate of movement of the input. For example, as illustrated in FIG. 22J, when the rate of the input (which is, optionally, measured as distance/time or pixels/time) is below 0.9 inches/second, the value of the acceleration-modification factor is zero. In some examples, this results in the electronic device navigating through the plurality of values without any direction-based acceleration, such as when the acceleration is determined using the acceleration equation described above.

FIG. 22J illustrates that, optionally prior to navigating through the plurality of values based on the rate-based acceleration factor, the electronic device gradually increases the acceleration-modification factor (e.g., 2250) applied to the navigation through the plurality of values (e.g., through a range of the values) as the rate of movement of the input (e.g., 2222) increases from a first rate that is below the first movement-rate threshold (e.g., a threshold that is between 0.5 and 1 inches per second for a touch-sensitive surface with a width of approximately 3 inches in the direction of movement of the contact along an axis that is parallel to the direction of motion of the contact, or, alternatively a threshold that is between $\frac{1}{6}\times$ the width of the touch-sensitive surface per second and $\frac{1}{3}\times$ the width of the touch-sensitive surface per second along an axis that is parallel to the direction of motion of the contact) (e.g., 2252, 0.9 inches/second) to a rate that is at a third movement-rate threshold (e.g., a threshold that is between 1 and 2.5 inches per second for a touch-sensitive surface with a width of approximately 3 inches in the direction of movement of the contact along an axis that is parallel to the direction of motion of the contact, or, alternatively a threshold that is between $\frac{1}{3}\times$ the width of the touch-sensitive surface per second and $\frac{5}{6}\times$ the width of the touch-sensitive surface per second along an axis that is parallel to the direction of motion of the contact) (e.g., 2254, 1.8 inches/second). Thus ramp-up of the multiplier that is optionally applied to the direction-based acceleration factor provides for smoothing out the acceleration of the navigation, as the rate of the input approaches and exceeds the first movement-rate threshold (e.g., 2252, 0.9 inches/second) and reaches the third movement-rate threshold (e.g., 2254, 1.8 inches/second). In some examples, the increase is a monotonic increase in the acceleration factor that can either be linear or non-linear.

As illustrated in FIG. 22J, in some examples, the acceleration-modification factor is zero when the rate of movement of the input is below the first movement-rate threshold (e.g., a threshold that is between 0.5 and 1 inches per second for a touch-sensitive surface with a width of approximately 3 inches in the direction of movement of the contact along an axis that is parallel to the direction of motion of the contact, or, alternatively a threshold that is between $\frac{1}{6}\times$ the width of the touch-sensitive surface per second and $\frac{1}{3}\times$ the width of the touch-sensitive surface per second along an axis that is parallel to the direction of motion of the contact) (e.g., 2252, 0.9 inches/second). In some examples, the acceleration-modification factor is one when the rate of movement of the input is above the third movement-rate threshold (e.g., a threshold that is between 1 and 2.5 inches per second for a touch-sensitive surface with a width of approximately 3 inches in the direction of movement of the contact along an axis that is parallel to the direction of motion of the contact, or, alternatively a threshold that is between $\frac{1}{3}\times$ the width of the touch-sensitive surface per second and $\frac{5}{6}\times$ the width of the touch-sensitive surface per second along an axis that is parallel to the direction of motion of the contact) (e.g., 2254, 1.8 inches/second).

In accordance with some embodiments, the direction-based acceleration includes upper and lower bounds. In some examples, the first movement-rate criteria include a second requirement that the rate of movement of the input (e.g., 2222) is below the second movement-rate threshold (e.g., a threshold that is between 4.8 and 6 inches per second for a touch-sensitive surface with a width of approximately 3 inches in the direction of movement of the contact along an axis that is parallel to the direction of motion of the contact, or, alternatively a threshold that is between 1.6× the width of the touch-sensitive surface per second and 2× the width of the touch-sensitive surface per second along an axis that is parallel to the direction of motion of the contact) (e.g., 2242 of FIG. 22I, 5.4 inches/second) in order for the first movement-rate criteria to be met. Thus, in the example, the direction-based acceleration is not applied to the navigation when the rate of movement of the input is high enough to result in the rate-based acceleration being applied.

In accordance with some embodiments, a progress-based acceleration factor is applied to the navigation. For example, navigation is optionally accelerated in response to the input (e.g., 2222) when the device determines that the number of values to navigate through (e.g., based on the direction of the movement of the input) exceeds a threshold value. For example, if there are more than five items to scroll through in a direction determined by the input, the electronic device applies the progress-based acceleration factor, and if there are five or fewer items to scroll through in the direction determined by the input, the electronic device does not apply the progress-based acceleration factor (or applies a different (e.g., lower) progress-based acceleration factor). In some examples, in response to receiving the input (e.g., 2222), and in accordance with the determination that the rate of movement of the input (e.g., 2222) meets the first movement-rate criteria and that the current value of the adjustable control (e.g., 2210) is a first value of the plurality of values, navigating through the plurality of values (e.g., through a range of the values) at a rate based on a first progress-based acceleration factor (e.g., an acceleration factor that changes as the current value of the adjustable control moves through the plurality of values) (and, optionally, based on the magnitude of the input). In some examples, in response to receiving the input (e.g., 2222), and in accordance with the determination that the rate of movement of the input (e.g., 2222) meets the first movement-rate criteria and that the current value of the adjustable control (e.g., 2210) is a second value of the plurality of values that is different from the first value of the plurality of values, navigating through the plurality of values (e.g., through a range of the values) at a rate based on a second progress-based acceleration factor that is different from the first progress-based acceleration factor (and, optionally, based on the magnitude of the input). Thus, if the range of magnification factors is between 1× and 10× and the current magnification factor is 2×, the electronic device optionally applies the progress-based acceleration factor when the user requests to increase the magnification factor (e.g., from 2× towards 10×) and the electronic device does not apply (or applies a different progress-based acceleration factor) when the user requests to decrease the magnification factor (e.g., from 2× towards 1×).

This permits the electronic device to more easily enable navigation among larger ranges of values.

In some embodiments, the electronic device (e.g., 2200) includes one or more cameras (e.g., 2202, 2204), and the adjustable control (e.g., 2210) is a camera zoom control and is displayed, on the display (e.g., 2208), as part of a camera capture user interface (e.g., a camera application user interface) that includes (e.g., in a viewfinder 2206) a live preview of a field of view of the one or more cameras. In some embodiments, the adjustable control (e.g., 2210) is a virtual dial that rotates off of the display (e.g., 2208). In some examples, the adjustable control (e.g., 2210) includes one or more characteristics of the zoom control 1824 and 2026 described with reference to FIGS. 18A-18AN and 20A-20L.

As illustrated in FIG. 22H, in some embodiments, the direction-based acceleration speeds up the navigation of the plurality of values when the input toward a boundary or edge is within a predetermined distance of that edge. In some examples, direction-based acceleration does not speed up the navigation of the plurality of values when the input toward the boundary or edge is not within the predetermined distance of that edge. For example, where the left edge of the touch-sensitive surface corresponds to 0% of the location along the width of the touch-sensitive surface and the right edge of the touch-sensitive surface corresponds to 100% of the location along the width of the touch-sensitive surface, the direction-based acceleration is zero when the input is on the right 60% (between 40%-100%) of the touch-sensitive surface (not within the left 40%) and the input is moving toward the left edge. For another example, the direction-based acceleration is greater than zero when the input is on the left 40% of the touch-sensitive surface and the input is moving toward the left edge. In some examples, the first movement-rate criteria include a third requirement that the location of the input (e.g., 2222) is within a predetermined distance to the first input boundary (e.g., 2222) in order for the first movement-rate criteria to be met. In some examples, being within the predetermined distance to the first input boundary is being within 400 pixels of the first input boundary or being within a distance to the first input boundary that is 40% of the distance from the first input boundary to the second input boundary.

FIGS. 23A-23B are a flow diagram illustrating a method for navigating among a plurality of values using an adjustable control using an electronic device in accordance with some embodiments. Method 2300 is performed at a device (e.g., 100, 300, 500, 2200) with a display and one or more input devices. In some examples, the one or more input devices include a touch-sensitive surface. In some examples, the touch-sensitive surface and the display combine to form a touch-sensitive display. In some examples, the electronic device includes one or more cameras. Some operations in method 2300 are, optionally, combined, the order of some operations are, optionally, changed, and some operations are, optionally, omitted.

As described below, method 2300 provides an intuitive way for navigating among a plurality of values using an adjustable control. The method reduces the cognitive burden on a user for navigating among the values, thereby creating a more efficient human-machine interface. For battery-operated computing devices, enabling a user to navigate among values faster and more efficiently conserves power and increases the time between battery charges.

The electronic device (e.g., 2200) displays (2302), on the display, an adjustable control (e.g., a zoom control 2210) for selecting a value of a plurality of values from a minimum value to a maximum value. In some examples, the electronic device (e.g., 2200) also concurrently displays a viewfinder (e.g., 2206) that includes a live preview of a field of view of the one or more cameras (e.g., 2202, 2204). For example, the preview includes a representation of a person (e.g., 2220). In some examples, the electronic device 2200 includes one or more cameras (e.g., 2202, 2204) used for displaying a live (or near-live) preview in a camera application.

While displaying the adjustable control (e.g., 2210), the electronic device receives (2304) an input (e.g., 2222), at the one or more input devices, that includes movement (e.g., 2224) detected via the one or more input devices, wherein the movement (e.g., 2224) is constrained by a first input boundary (e.g., 2216) and a second input boundary (e.g., 2218) and the input (e.g., 2222) is at a location (e.g., on a touch-sensitive display or a touch-sensitive surface) closer to the first input boundary (e.g., 2216) than the second input boundary (e.g., 2218). In accordance with some embodiments, the one or more input devices include (2306) a touch-sensitive surface.

In accordance with some embodiments, the first input boundary (e.g., 2216) is (2308) a first edge of the touch-sensitive surface, and the second input boundary (e.g., 2218) is a second edge of the touch-sensitive surface. In some examples, the first edge and the second edge of the touch sensitive surface are opposite edges of the touch-sensitive surface. In some examples, the first edge and the second edge are edges of a touch-sensitive display (where the one or more input devices and the display make up the touch-sensitive display) on which the control is displayed. In some examples, the first input boundary and the second input boundary are (e.g., opposite) edges of a display-region on the touch-sensitive display on which the control is displayed. In some examples, the input is received at the respective touch-sensitive surface or touch-sensitive display.

In response (2310) to receiving the input (e.g., 2222), in accordance with a determination (2312) that a rate of movement of the input (e.g., 2222) meets a first movement-rate criteria, wherein the first movement-rate criteria include a first requirement that the rate of movement of the input (e.g., 2222) is above a first movement-rate threshold (e.g., a threshold that is between 0.5 and 1 inches per second for a touch-sensitive surface with a width of approximately 3 inches in the direction of movement of the contact along an axis that is parallel to the direction of motion of the contact, or, alternatively a threshold that is between ⅙× the width of the touch-sensitive surface per second and ⅓× the width of the touch-sensitive surface per second along an axis that is parallel to the direction of motion of the contact) (e.g., a threshold greater than zero, such as 0.9 inches/second) in order for the first movement-rate criteria to be met, and in accordance with the movement (e.g., 2224) of the input (e.g., 2222) including movement toward the first input boundary (e.g., 2216), navigating through the plurality of values (e.g., through a range of the values) based on a magnitude of the movement (e.g., distance traversed by the input on the one or more input devices, such as a touch-sensitive surface or touch-screen display) and a first acceleration factor (e.g., a direction-based acceleration factor 2230, an acceleration factor greater than zero). Accelerating the rate at the electronic device navigates through the plurality of values allows for greater user control when performing a navigation, such as for magnification, while still allowing the user to reach, in some examples, the maximum and the minimum magnification levels without requiring the user to reposition his fingers (such as when the user's finger is positioned near the edge of a touch-sensitive surface). As a result, a recorded video that includes magnification changes will be more stable because the user will not need to repeatedly tap on the device to adjust the magnification level.

In accordance with some embodiments, the second acceleration factor is zero, and the first acceleration factor (e.g., a direction-based acceleration factor 2230) is greater than zero. In some examples, when the movement (e.g., 2224) is toward the second input boundary (e.g., 2218), navigating through the plurality of values occurs at a rate that is the same as when the rate of movement of the input is toward the first input boundary (e.g., 2216) and the rate of the input is not above the first movement-rate threshold.

In accordance with some embodiments, the first acceleration factor (e.g., 2230) increases (2314) as the distance of the input (e.g., 2222) to the first input boundary (e.g., 2216) decreases. Accelerating the navigation as the input approaches the boundaries of the input device allows the user, in some examples, to reach the maximum and the minimum magnification levels without requiring the user to reposition his fingers (such as when the user's finger is positioned near the edge of a touch-sensitive surface). As a result, a recorded video that includes magnification changes will be more stable because the user will not need to repeatedly tap on the device (or swipe and lift their finger and then swipe again or otherwise adjust their grip on the device) to adjust the magnification level.

In response (2310) to receiving the input (e.g., 2222), in accordance with a determination (2316) that the rate of movement of the input (e.g., 2222) meets the first set of movement-rate criteria and a determination that the movement of the input includes movement toward the second input boundary (e.g., 2218), the electronic device navigates through the plurality of values (e.g., through a range of the values) based on the magnitude of the movement (e.g., 2224) and a second acceleration factor that is different from the first acceleration factor.

In accordance with some embodiments, the second acceleration factor increases as the distance of the input (e.g., 2222) to the second input boundary decreases. In some examples, the second acceleration factor only increases as the distance of the input to the second input boundary (e.g., 2218) decreases, regardless of whether the input is closer to the second input boundary (e.g., 2218) or to the first input boundary (e.g., 2216). In some examples, the second acceleration factor increases as the distance of the input to the second input boundary (e.g., 2218) decreases in accordance with the input being closer to the second input boundary (e.g., 2218) than to the first input boundary (e.g., 2216).

In accordance with some embodiments, in response to receiving the input (e.g., 2222), in accordance with a determination that the rate of movement of the input (e.g., 2222) is below the first movement-rate threshold (e.g., a threshold that is between 0.5 and 1 inches per second for a touch-sensitive surface with a width of approximately 3 inches in the direction of movement of the contact along an axis that is parallel to the direction of motion of the contact, or, alternatively a threshold that is between $\frac{1}{6}\times$ the width of the touch-sensitive surface per second and $\frac{1}{3}\times$ the width of the touch-sensitive surface per second along an axis that is parallel to the direction of motion of the contact) (e.g., a threshold greater than zero, such as 0.9 inches/second), the electronic device navigates through the plurality of values (e.g., through a range of the values) without regard to whether the input (e.g., 2222) is moving toward the first input boundary (e.g., 2216) or the second input boundary (e.g., 2218) (e.g., without acceleration). Not applying an acceleration factor allows the user to navigate through the plurality of values, such as when using a zoom control, with greater precision. A magnification adjustment using greater precision results in a recorded video with fewer defects (e.g., jerky zooming, unsteady filming, etc.).

In accordance with some embodiments, in response to receiving the input (e.g., 2222), in accordance with a determination that the rate of movement of the input (e.g., 2218) is below the first movement-rate threshold (e.g., a threshold that is between 0.5 and 1 inches per second for a touch-sensitive surface with a width of approximately 3 inches in the direction of movement of the contact along an axis that is parallel to the direction of motion of the contact, or, alternatively a threshold that is between $\frac{1}{6}\times$ the width of the touch-sensitive surface per second and $\frac{1}{3}\times$ the width of the touch-sensitive surface per second along an axis that is parallel to the direction of motion of the contact) (e.g., a threshold greater than zero, such as 0.9 inches/second), navigating through the plurality of values (e.g., through a range of the values) without applying an acceleration factor.

In accordance with some embodiments, in response to receiving the input (e.g., 2222), in accordance with a determination that the rate of movement of the input (e.g., 2222) meets a second movement-rate criteria, wherein the second movement-rate criteria include a requirement that the rate of movement of the input (e.g., 2222) is above a second movement-rate threshold (e.g., a threshold that is between 4.8 and 6 inches per second for a touch-sensitive surface with a width of approximately 3 inches in the direction of movement of the contact along an axis that is parallel to the direction of motion of the contact, or, alternatively a threshold that is between $1.6\times$ the width of the touch-sensitive surface per second and $2\times$ the width of the touch-sensitive surface per second along an axis that is parallel to the direction of motion of the contact) (e.g., 2242 of FIG. 22I, 5.4 inches/second) that is higher than the first movement-rate threshold in order for the second movement-rate criteria to be met, the electronic device (e.g., 2200) navigates through the plurality of values (e.g., through a range of the values) at a rate based on a rate-based acceleration factor (e.g., 2240). In some examples, the rate for navigating through the plurality of values is also based on the magnitude of the input. In some examples, the rate-base acceleration factor is an acceleration factor that is independent of whether the input is moving toward the first input boundary or the second input boundary and/or is independent of the location along the x-axis of the touch-sensitive surface. In some examples, the value of the rate-based acceleration factor (e.g., 2240) is based on the rate of movement of the input. In some examples, the value of the rate-based acceleration factor reaches a ceiling or maximum when the rate of movement of the input reaches and/or exceeds a threshold (e.g., a threshold that is between 12 and 15 inches per second for a touch-sensitive surface with a width of approximately 3 inches in the direction of movement of the contact along an axis that is parallel to the direction of motion of the contact, or, alternatively a threshold that is between $4\times$ the width of the touch-sensitive surface per second and $5\times$ the width of the touch-sensitive surface per second along an axis that is parallel to the direction of motion of the contact) (e.g., 2244 of FIG. 22I, 13.5 inches/second), and maintains that maximum while the rate of movement of the input is at or above the threshold (e.g., 2244 of FIG. 22I, 13.5 inches/second).

In accordance with some embodiments, and, optionally, prior to navigating through the plurality of values based on the rate-based acceleration factor, the electronic device gradually increases an acceleration-modification factor (e.g., 2250) applied to the navigation through the plurality of values (e.g., through a range of the values) as the rate of movement of the input (e.g., 2222) increases from a first rate that is below the first movement-rate threshold (e.g., a threshold that is between 0.5 and 1 inches per second for a touch-sensitive surface with a width of approximately 3 inches in the direction of movement of the contact along an axis that is parallel to the direction of motion of the contact, or, alternatively a threshold that is between ⅙× the width of the touch-sensitive surface per second and ⅓× the width of the touch-sensitive surface per second along an axis that is parallel to the direction of motion of the contact) (e.g., 2252, where the first movement-rate threshold is 0.9 inches/second) to a rate that is at a third movement-rate threshold (e.g., a threshold that is between 1 and 2.5 inches per second for a touch-sensitive surface with a width of approximately 3 inches in the direction of movement of the contact along an axis that is parallel to the direction of motion of the contact, or, alternatively a threshold that is between ⅓× the width of the touch-sensitive surface per second and ⅚× the width of the touch-sensitive surface per second along an axis that is parallel to the direction of motion of the contact) (e.g., 2254, where the third movement-rate threshold is 1.8 inches/second). In some examples, the increase is a monotonic increase in the acceleration factor that is linear. In some examples, the increase is a monotonic increase in the acceleration factor that is non-linear.

In accordance with some embodiments, the first movement-rate criteria include a second requirement that the rate of movement of the input (e.g., 2222) is below the second movement-rate threshold (e.g., a threshold that is between 4.8 and 6 inches per second for a touch-sensitive surface with a width of approximately 3 inches in the direction of movement of the contact along an axis that is parallel to the direction of motion of the contact, or, alternatively a threshold that is between 1.6× the width of the touch-sensitive surface per second and 2× the width of the touch-sensitive surface per second along an axis that is parallel to the direction of motion of the contact) (e.g., 2242 of FIG. 22I, 5.4 inches/second) in order for the first movement-rate criteria to be met.

In accordance with some embodiments, the acceleration-modification factor is zero when the rate of movement of the input is below the first movement-rate threshold (e.g., a threshold that is between 0.5 and 1 inches per second for a touch-sensitive surface with a width of approximately 3 inches in the direction of movement of the contact along an axis that is parallel to the direction of motion of the contact, or, alternatively a threshold that is between ⅙× the width of the touch-sensitive surface per second and ⅓× the width of the touch-sensitive surface per second along an axis that is parallel to the direction of motion of the contact) (e.g., 2252, where the first movement-rate threshold is 0.9 inches/second). In some examples, the acceleration-modification factor is one when the rate of movement of the input is above the third movement-rate threshold (e.g., a threshold that is between 1 and 2.5 inches per second for a touch-sensitive surface with a width of approximately 3 inches in the direction of movement of the contact along an axis that is parallel to the direction of motion of the contact, or, alternatively a threshold that is between ⅓× the width of the touch-sensitive surface per second and ⅚× the width of the touch-sensitive surface per second along an axis that is parallel to the direction of motion of the contact) (e.g., 2254, where the third movement-rate threshold is 1.8 inches/second).

In accordance with some embodiments, in response to receiving the input (e.g., 2222), in accordance with the determination that the rate of movement of the input (e.g., 2222) meets the first movement-rate criteria and that the current value of the adjustable control (e.g., 2210) is a first value of the plurality of values, the electronic device (e.g., 2200) navigates through the plurality of values (e.g., through a range of the values) at a rate based on a first progress-based acceleration factor (e.g., an acceleration factor that changes as the current value of the adjustable control moves through the plurality of values) (and, optionally, based on the magnitude of the input). In response to receiving the input (e.g., 2222), in accordance with the determination that the rate of movement of the input (e.g., 2222) meets the first movement-rate criteria and that the current value of the adjustable control (e.g., 2210) is a second value of the plurality of values that is different from the first value of the plurality of values, the electronic device (e.g., 2200) navigates through the plurality of values (e.g., through a range of the values) at a rate based on a second progress-based acceleration factor that is different from the first progress-based acceleration factor (and, optionally, based on the magnitude of the input).

In accordance with some embodiments, the electronic device (e.g., 2200) includes one or more cameras (e.g., 2202, 2204), and the adjustable control (e.g., 2210) is a camera zoom control and is displayed, on the display (e.g., 2208), as part of a camera capture user interface (e.g., a camera application user interface) that includes (e.g., in a viewfinder 2206) a live preview of a field of view of the one or more cameras. In some examples, the adjustable control (e.g., 2210) includes one or more characteristics of the zoom control 1824 and 2026 described with reference to FIGS. 18A-18AN and 20A-20L.

In accordance with some embodiments, the adjustable control (e.g., 2210) is a virtual dial that rotates off of the display (e.g., 2208). In some examples, the virtual dial rotates while maintaining an axis of rotation, causing values previously displayed as part of the virtual dial to no longer be displayed. In some examples, the virtual dial includes one or more characteristics of the zoom control 1824 and 2026 described with reference to FIGS. 18A-18AN and 20A-20L. The adjustable control rotating off the display allows for relevant information/data to be displayed and for information that is less relevant (e.g., the portions of the dial that are furthest from the currently selected value) to not be displayed when the adjustable control is in use.

In accordance with some embodiments, the first movement-rate criteria include a third requirement that the location of the input (e.g., 2222) is within a predetermined distance to the first input boundary (e.g., 2222) (e.g., within 400 pixels of the first input boundary, within a distance to the first input boundary that is 40% of the distance from the first input boundary to the second input boundary) in order for the first movement-rate criteria to be met.

Note that details of the processes described above with respect to method 2300 (e.g., FIGS. 23A-23B) are also applicable in an analogous manner to the methods described above. For example, methods 700, 900, 1100, 1300, 1900, and 2100 optionally include one or more of the characteristics of the various methods described above with reference to method 2300. For example, elements of the viewfinder magnification techniques, affordances, and controls from among the various methods can be combined. For another example, the viewfinder in method 2300 is analogous to the viewfinder in methods 900, 1100, 1300, 1900, and 2100. For brevity, these details are not repeated below.

Figure 24:
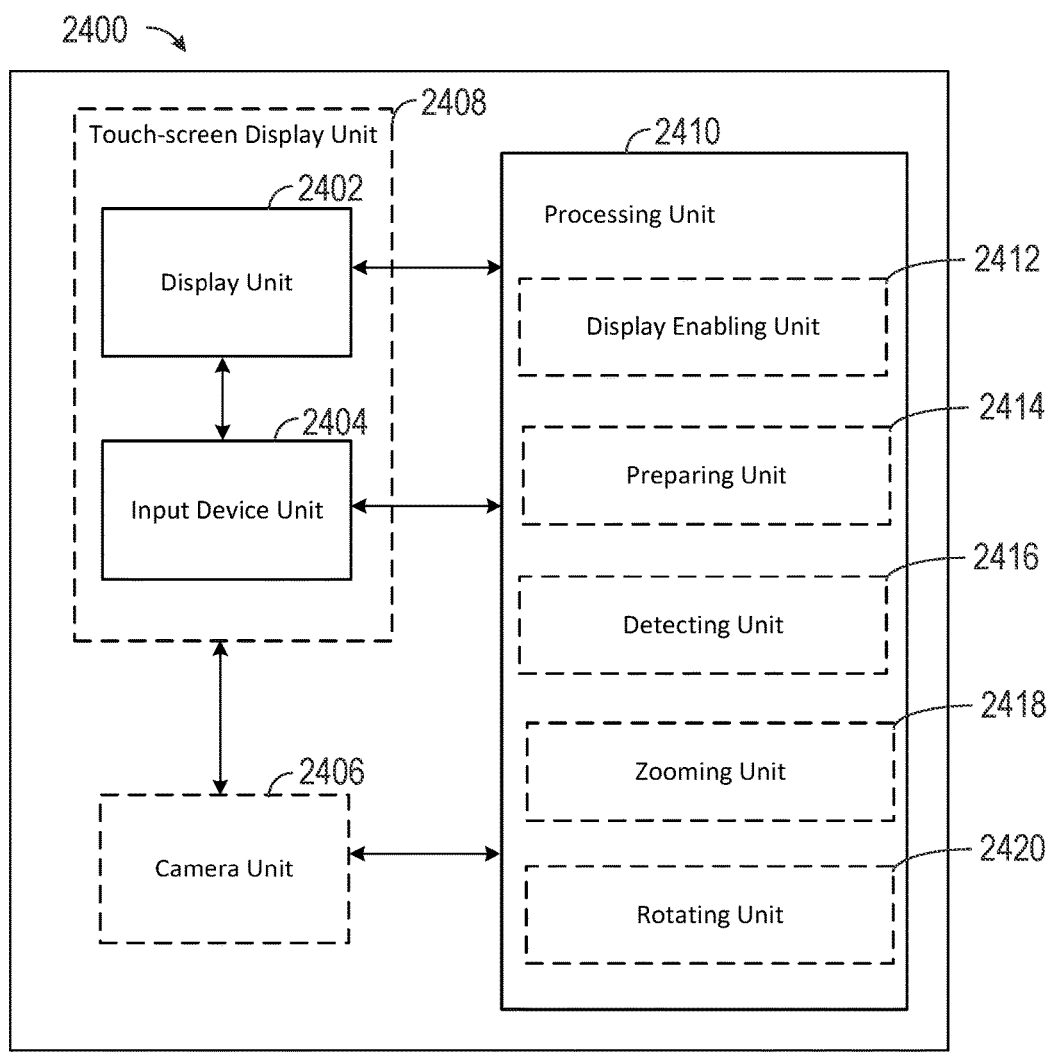
FIGS. 24-26 are functional block diagrams, in accordance with some embodiments.

In accordance with some embodiments, FIG. 24 shows an exemplary functional block diagram of an electronic device 2400 configured in accordance with the principles of the various described embodiments. In accordance with some embodiments, the functional blocks of electronic device 2400 are configured to perform the techniques described above. The functional blocks of the device 2400 are, optionally, implemented by hardware, software, or a combination of hardware and software to carry out the principles of the various described examples. It is understood by persons of skill in the art that the functional blocks described in FIG. 24 are, optionally, combined or separated into sub-blocks to implement the principles of the various described examples. Therefore, the description herein optionally supports any possible combination or separation or further definition of the functional blocks described herein.

As shown in FIG. 24, an electronic device 2400 include one or more camera units 2406; one or more input device units 2404; a display unit 2402; and a processing unit 2410 coupled to the one or more camera units 2406, the display unit 2402, and the one or more input device units 2404.

In accordance with some embodiments, the processing unit 2410 is configured to: concurrently enable display (e.g., with display enabling unit 2412), on the display unit 2402, of: a digital viewfinder for capturing media with the one or more camera units 2406 at a first magnification level; and a magnification adjustment affordance; while concurrently displaying (e.g., with display enabling unit 2412) the digital viewfinder and the magnification adjustment affordance detect (e.g., with detecting unit 2416), via the one or more input device units 2404, a first gesture at a location corresponding to the magnification adjustment affordance; in accordance with determination that the first gesture is of a first type, prepare (e.g., with preparing unit 2414) to capture media with the one or more camera units 2406 at a second magnification level different from the first magnification level; in accordance with a determination that the first gesture is of a second type different from the first type: prepare (e.g., with preparing unit 2414) to capture media with the one or more camera units 2406 at a dynamically-selected magnification level different from the first magnification level, wherein the dynamically-selected magnification level is selected based on a magnitude.

In accordance with some embodiments, in accordance with a determination that the magnitude of the first gesture is a first magnitude, the dynamically-selected magnification level is a first dynamically-selected magnification level different from the first magnification level; and in accordance with a determination that the magnitude of the first gesture is a second magnitude that is different from the first magnitude, the dynamically-selected magnification level is a second dynamically-selected magnification level different from the first magnification level and the first dynamically-selected magnification level.

In accordance with some embodiments, in accordance with the determination that the first gesture is of the second type different from the first type, enable display (e.g., with display enabling unit 2412), on the display unit 2402, of a zoom control; and in accordance with the determination that the first gesture is of the first type, forgo enabling display of the zoom control.

In accordance with some embodiments, in accordance with the determination that the first gesture is of the first type, enable display (e.g., with display enabling unit 2412), on the display unit 2402 at a location that corresponds to the magnification adjustment affordance, of a representation of the second magnification level; and in accordance with the determination that the first gesture is of the second type, enable display (e.g., with display enabling unit 2412), on the display unit 2402 at the location that corresponds to the magnification adjustment affordance, of a representation of the dynamically-selected magnification level.

In accordance with some embodiments, in accordance with a determination that the first gesture is of a third type different from the first type and the second type, enable display (e.g., with display enabling unit 2412), on the display unit 2402, of a zoom control for selecting a dynamically-selected magnification level from a plurality of magnification levels.

In accordance with some embodiments, wherein displaying (e.g., with display enabling unit 2412), on the display unit 2402, the zoom control further includes shifting (e.g., with display enabling unit 2412) a display location, on the display unit 2402, of the magnification adjustment affordance away from an edge of the display toward a center of the display.

In accordance with some embodiments, enabling display, on the display unit 2402, of the zoom control further includes: reducing enable display (e.g., with display enabling unit 2412) a display size of the magnification adjustment affordance.

In accordance with some embodiments, enabling display, on the display unit 2402, of the zoom control further includes: displaying (e.g., with display enabling unit 2412) a portion of a zoom control dial.

In accordance with some embodiments, the first type is a tap gesture and the second type is a swipe gesture.

In accordance with some embodiments, enabling display of the zoom control includes sliding the zoom control onto the display.

In accordance with some embodiments, while displaying (e.g., with display enabling unit 2412) the zoom control and while the electronic device is prepared to capture media with the one or more cameras at a third magnification level: detect (e.g., with detecting unit 2416), via the one or more input device units, a second gesture at a location corresponding to the zoom control; and in accordance with a determination that the second gesture is of the second type: rotate display of the zoom control; and prepare (e.g., with preparing unit 2414) to capture media with the one or more camera units 2406 at a fourth magnification level that is different from the third magnification level.

In accordance with some embodiments, in accordance with a determination that a rate of the second gesture is less than a predetermined threshold, zoom (e.g., with zooming unit 2418) the digital viewfinder at a first rate; and in accordance with a determination that the rate of the second gesture is greater than the predetermined threshold, zoom (e.g., with zooming unit 2418) the digital viewfinder at a second rate, wherein the first rate is less than the second rate.

In accordance with some embodiments, in accordance with a determination that the rate of change of the second gesture is less than a second predetermined threshold, zoom (e.g., with zooming unit 2418) the digital viewfinder at a first rate; and in accordance with a determination that the rate of the second gesture is greater than the second predetermined threshold, zoom (e.g., with zooming unit 2418) the digital viewfinder at a second rate, wherein the first rate is less than the second rate.

In accordance with some embodiments, while displaying (e.g., with display enabling unit 2412), on the display unit 2402, a zoom control for changing the magnification level for capturing media with the one or more cameras, wherein the zoom control has a degree of granularity: detect (e.g., with detecting unit 2416) a third gesture at a location corresponding to the zoom control; and in response to detecting (e.g., with detecting unit 2416) the third gesture, change the degree of granularity of the zoom control.

In accordance with some embodiments, the zoom control includes representations of a plurality of magnification levels, and changing the degree of granularity of the zoom control includes changing the spacing between the representations of the plurality of magnification levels.

In accordance with some embodiments, a displayed zoom control includes representations of a plurality of magnification levels, the processing unit further configure to: detect (e.g., with detecting unit 2416) a request to change between a portrait mode and a landscape mode; and in response to detecting (e.g., with detecting unit 2416) the request to change the electronic device between the portrait mode and the landscape mode: rotate the representations of the plurality of magnification levels.

In accordance with some embodiments, enable display (e.g., with display enabling unit 2412), on the display unit 2402, of a representation of a current magnification level for capturing media with the one or more cameras at a location that corresponds to the magnification adjustment affordance.

In accordance with some embodiments, in accordance with not detecting (e.g., with detecting unit 2416), via the one or more input device units, input at any location corresponding to the zoom control for a predetermined period of time: sliding display of the magnification adjustment affordance toward the edge of the display and away from the center of the display.

In accordance with some embodiments, in accordance with not detecting (e.g., with detecting unit 2416), via the one or more input device units, input at any location corresponding to the zoom control for a predetermined period of time: cease display (e.g., with display enabling unit 2412) of the zoom control.

In accordance with some embodiments, while displaying (e.g., with display enabling unit 2412), on the display unit 2402, the digital viewfinder for capturing media with the one or more camera units 2406 at a fourth magnification level and not displaying (e.g., with display enabling unit 2412), on the display unit 2402, the zoom control: detect (e.g., with detecting unit 2416), via the one or more input devices units, a fourth gesture at a location corresponding to the digital viewfinder; and in accordance with the determination that the fourth gesture is of a fourth type: prepare (e.g., with preparing unit 2414) to capture media with the one or more camera units 2406 at a second dynamically-selected magnification level different from the fourth magnification level, wherein the respective magnification level is selected based on a magnitude of the fourth gesture; and forgo displaying (e.g., with display enabling unit 2412), on the display unit 2402, the zoom control.

The operations described above with reference to FIG. 19A-19B are, optionally, implemented by components depicted in FIGS. 1A-1B or FIG. 24. For example, displaying operation 2104 is, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 25:
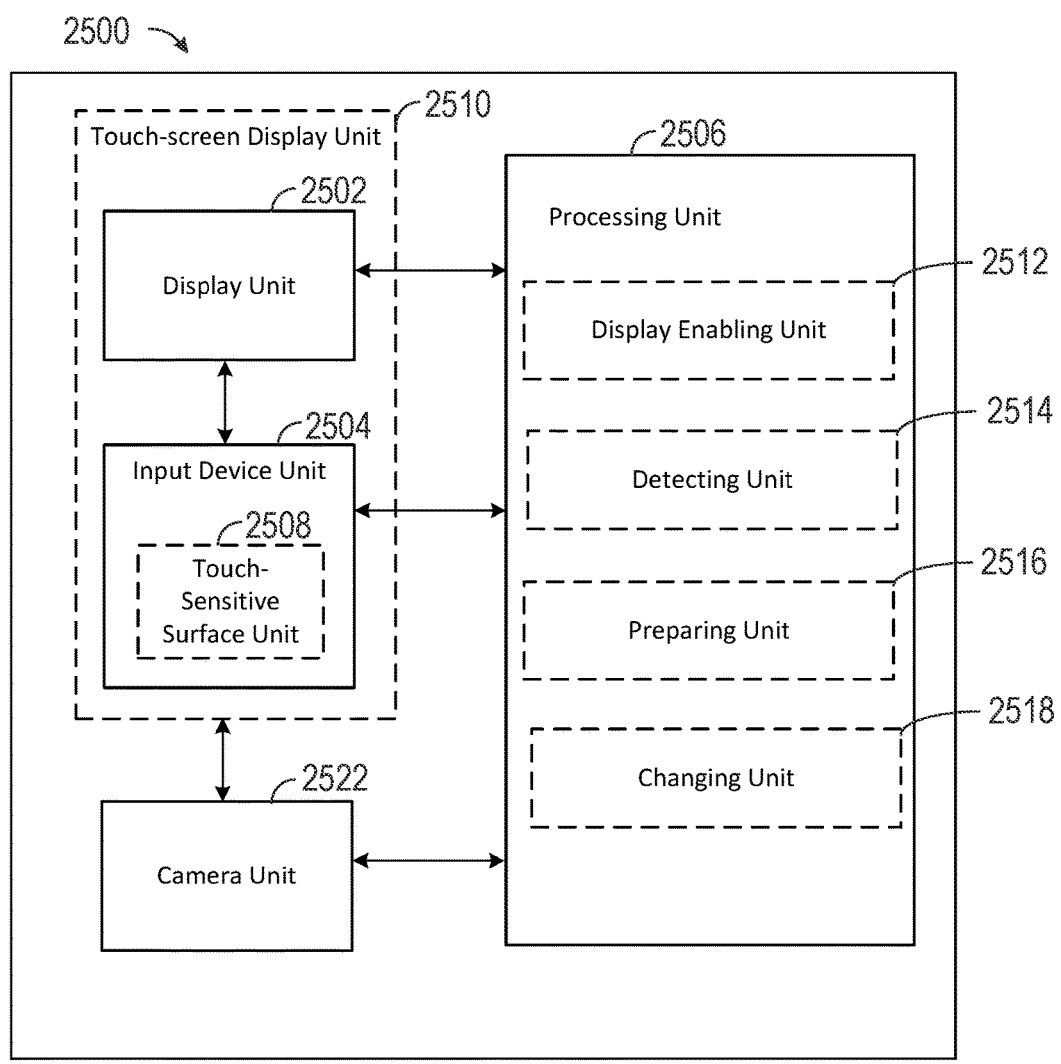

In accordance with some embodiments, FIG. 25 shows an exemplary functional block diagram of an electronic device 2500 configured in accordance with the principles of the various described embodiments. In accordance with some embodiments, the functional blocks of electronic device 2500 are configured to perform the techniques described above. The functional blocks of the device 2500 are, optionally, implemented by hardware, software, or a combination of hardware and software to carry out the principles of the various described examples. It is understood by persons of skill in the art that the functional blocks described in FIG. 25 are, optionally, combined or separated into sub-blocks to implement the principles of the various described examples. Therefore, the description herein optionally supports any possible combination or separation or further definition of the functional blocks described herein.

As shown in FIG. 25, an electronic device 2500 includes a display unit 2502 configured to display a graphic user interface, one or more input device units 2504, one or more camera units 2522, and optionally, a touch-sensitive surface unit 2508 configured to receive contacts, and, a processing unit 2506 coupled to the display unit 2502, the one or more camera units 2522, the one or more input device units 2504 and, optionally, the touch-sensitive surface unit 2508. In some embodiments, the touch-sensitive surface unit 2508 and the display unit 2502 form a touch-sensitive display unit 2510. In some embodiments, the processing unit 2506 includes a display enabling unit 2512, a detecting unit 2514, a preparing unit 2516, and a changing unit 2518.

The processing unit 2506 is configured to: while the device is prepared to capture media with the one or more camera units at a first magnification level, enable display (e.g., with display enabling unit), on the display unit 2502, of: a digital viewfinder based on data received from the one or more camera units, wherein the digital viewfinder includes a representation of one or more objects within a field of view of the one or more camera units 2522; while displaying the digital viewfinder, detect (e.g., using detecting unit 2514), via the one or more input device units 2504, a first gesture; in accordance with a determination that a first set of one or more conditions is met, wherein a first condition of the first set of one or more conditions is met when the first gesture is at a first location, update display (e.g., using display enabling unit 2512) of the digital viewfinder to focus on a representation of a respective object of the one or more objects in the field of view of the one or more camera units 2522 that corresponds to a location of the first gesture on the one or more input device units 2508 without preparing to capture media with the one or more camera units 2522 at a second magnification level different from the first magnification level; and in accordance with a determination that a second set of one or more conditions is met, wherein a first condition of the second set of one or more conditions is met when the first gesture is at a second location different from the first location, prepare (e.g., using preparing unit 2515) to capture media with the one or more camera units 2522 at the second magnification level different from the first magnification level.

In accordance with some embodiments, preparing to capture media with the one or more camera units 2522 at the second magnification level includes updating display of the digital viewfinder to show a preview at the second magnification level.

In accordance with some embodiments, displaying the digital viewfinder while the device is prepared to capture media with the one or more camera units 2522 at the first magnification level includes displaying, on the display unit 2502, representations of the one or more objects at the first magnification level.

In accordance with some embodiments, the processing unit further configured to: in accordance with a determination that a third set of one or more conditions is met, wherein a first condition of the third set of one or more conditions is met when the first gesture is at a third location different from the first location, prepare (e.g., using preparing unit 2516) to capture media with the one or more camera units at a third magnification level that is based on a magnitude of the first gesture.

In accordance with some embodiments, the processing unit further configured to: in accordance with a determination that a fourth set of one or more conditions is met, wherein a first condition of the fourth set of one or more conditions is met when the first gesture is at the first location, change (e.g., using changing unit 2518) a camera capture mode of the electronic device.

In accordance with some embodiments, the processing unit further configured to: in accordance with a determination that a fifth set of one or more conditions is met, wherein a first condition of the fifth set of one or more conditions is met when the first gesture is at a fourth location different from the first location, the second location, and the third location, change (e.g., using changing unit 2518) a camera capture mode of the electronic device to a mode corresponding to a location of the first gesture.

In accordance with some embodiments, the processing unit further configured to: in accordance with a determination that a sixth set of one or more conditions is met, wherein a first condition of the sixth set of one or more conditions is met when the first gesture is at the fourth location, change (e.g., using changing unit 2518) a camera capture mode of the electronic device based on a directional component of the first gesture.

In accordance with some embodiments, the electronic device is configured to change among one or more of: a first camera capture mode, wherein the electronic device is configurable, while in the first camera capture mode, to prepare to capture media within a first range of magnification levels, a second camera capture mode, wherein the electronic device is configurable, while in the second camera capture mode, to prepare to capture media within a second range of magnification levels, wherein the second range of magnification levels is within the first range of magnification levels, a third camera capture mode, wherein the electronic device is configurable, while in the third camera capture mode, to prepare to capture media within a third range of magnification levels, wherein the third range of magnification levels is within the second range of magnification levels, and a fourth camera capture mode, wherein the electronic device is configurable, while in the fourth camera capture mode, to prepare to capture media at a first predetermined magnification level and at a second predetermined magnification level, wherein the first predetermined magnification level and the second predetermined magnification level are within the second range of magnification levels.

In accordance with some embodiments, a second condition of the first set of one or more conditions is met when a zoom control is not displayed.

In accordance with some embodiments, the processing unit further configured to: in accordance with a determination that a seventh set of one or more conditions is met, wherein a first condition of the seventh set of one or more conditions is met when the first gesture is at the second location, enable display (e.g., using display enabling unit 2512), on the display unit 2502, of the zoom control.

In accordance with some embodiments, the processing unit further configured to: in accordance with a determination that an eight set of one or more conditions is met, wherein a first condition of the eight set of one or more conditions is met when the first gesture is at the first location, lock a focus or exposure setting based on a characteristic of a respective object of the one or more objects in the field of view of the one or more camera units 2522 that corresponds to a location of the first gesture on the one or more input device units 2504.

In accordance with some embodiments, the processing unit further configured to: in accordance with a determination that a ninth set of one or more conditions is met, wherein a first condition of the ninth set of one or more conditions is met when the first gesture is at a fifth location, and a second condition of the ninth set of one or more conditions is met when a zoom dial is displayed on the display unit 2502, prepare (e.g., using preparing unit 2516) to capture media with the one or more camera units at a fifth magnification level based on a magnitude of the first gesture.

In accordance with some embodiments, the processing unit further configured to: wherein the electronic device is prepared to capture media, using a first exposure, with the one or more camera units 2522 with a focus or exposure setting locked; and in accordance with a determination that a tenth set of one or more conditions is met, wherein a first condition of the tenth set of one or more conditions is met when the first gesture is at the first location, prepare (e.g., using preparing unit 2516) to capture media, using a second exposure, with the one or more camera units 2522, wherein the second exposure is based on a magnitude of the first input.

In accordance with some embodiments, the first location, the second location, the third location, the fourth location, and the fifth location are independent from one another.

The operations described above with reference to FIG. 21A-21B are, optionally, implemented by components depicted in FIGS. 1A-1B or FIG. 25. For example, updating operation 2116 is, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 26:
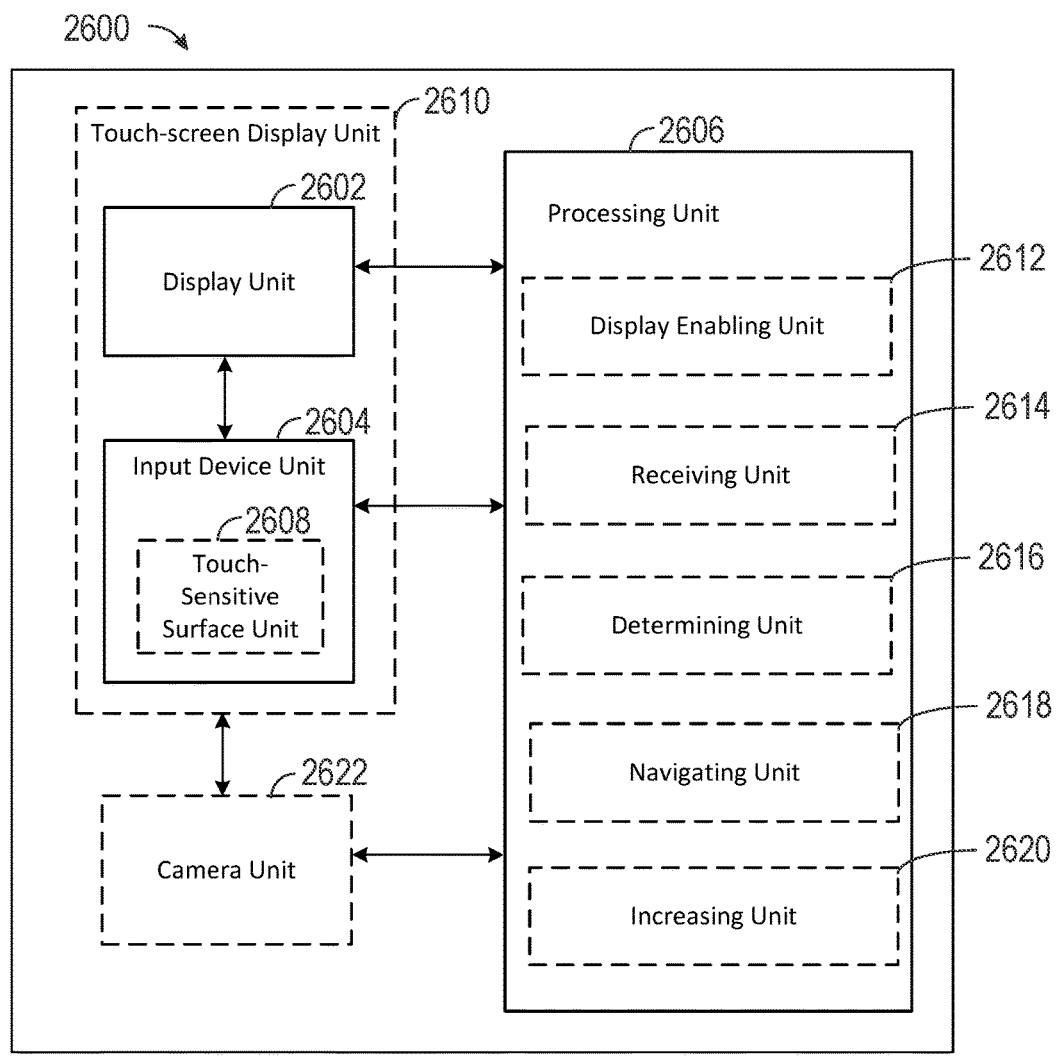

In accordance with some embodiments, FIG. 26 shows an exemplary functional block diagram of an electronic device 2600 configured in accordance with the principles of the various described embodiments. In accordance with some embodiments, the functional blocks of electronic device 2600 are configured to perform the techniques described above. The functional blocks of the device 2600 are, optionally, implemented by hardware, software, or a combination of hardware and software to carry out the principles of the various described examples. It is understood by persons of skill in the art that the functional blocks described in FIG. 26 are, optionally, combined or separated into sub-blocks to implement the principles of the various described examples. Therefore, the description herein optionally supports any possible combination or separation or further definition of the functional blocks described herein.

As shown in FIG. 26, an electronic device 2600 includes a display unit 2602 configured to display a graphic user interface and one or more input device units 2604, optionally, a touch-sensitive surface unit 2608 configured to receive contacts, and one or more camera units 2622, and a processing unit 2606 coupled to the display unit 2602 and the one or more input device units 2604 and, optionally, the touch-sensitive surface unit 2608 and the one or more camera units 2622. In some embodiments, the touch-sensitive surface unit 2608 and the display unit 2602 form a touch-sensitive display unit 2610. In some embodiments, the processing unit 2606 includes a display enabling unit 2612, a receiving unit 2614, a determining unit 2616, a navigating unit 2618, and an increasing unit 2620.

The processing unit 2606 is configured to: enable display (e.g., with display enabling unit 2612), on the display unit 2602, of an adjustable control for selecting a value of a plurality of values from a minimum value to a maximum value; while enabling display (e.g., with display enabling unit 2612) of the adjustable control, receive (e.g., with receiving unit 2614) an input, at the one or more input devices units 2604, that includes movement detected via the one or more input devices units 2604, wherein the movement is constrained by a first input boundary and a second input boundary and the input is at a location closer to the first input boundary than the second input boundary; in response to receiving the input: in accordance with a determination (e.g., using determining unit 2616) that a rate of movement of the input meets a first movement-rate criteria, wherein the first movement-rate criteria include a first requirement that the rate of movement of the input is above a first movement-rate threshold in order for the first movement-rate criteria to be met, and in accordance with the movement of the input including movement toward the first input boundary, navigate (e.g., using navigating unit 2618) through the plurality of values based on a magnitude of the movement and a first acceleration factor; and in accordance with a determination that the rate of movement of the input meets the first set of movement-rate criteria and a determination (e.g., using determining unit 2616) that the movement of the input includes movement toward the second input boundary, navigate (e.g., using navigating unit 2618) through the plurality of values based on the magnitude of the movement and a second acceleration factor that is different from the first acceleration factor.

In accordance with some embodiments, the one or more input devices units 2604 include a touch-sensitive surface unit 2608, the first input boundary is a first edge of the touch-sensitive surface unit 2608, and the second input boundary is a second edge of the touch-sensitive surface unit 2608.

In accordance with some embodiments, the second acceleration factor is zero, and the first acceleration factor is greater than zero.

In accordance with some embodiments, the first acceleration factor increases as the distance of the input to the first input boundary decreases.

In accordance with some embodiments, the second acceleration factor increases as the distance of the input to the second input boundary decreases.

In accordance with some embodiments, the processing unit 2606 is further configured to: in response to receiving the input: in accordance with a determination (e.g., using determining unit 2616) that the rate of movement of the input is below the first movement-rate threshold, navigate (e.g., using navigating unit 2618) through the plurality of values without regard to whether the input is moving toward the first input boundary or the second input boundary.

In accordance with some embodiments, the processing unit 2606 is further configured to: in response to receiving the input: in accordance with a determination (e.g., using determining unit 2616) that the rate of movement of the input is below the first movement-rate threshold, navigate (e.g., using navigating unit 2618) through the plurality of values without applying an acceleration factor.

In accordance with some embodiments, the processing unit 2606 is further configured to: in response to receiving the input: in accordance with a determination (e.g., using determining unit 2616) that the rate of movement of the input meets a second movement-rate criteria, wherein the second movement-rate criteria include a requirement that the rate of movement of the input is above a second movement-rate threshold that is higher than the first movement-rate threshold in order for the second movement-rate criteria to be met, navigate (e.g., using navigating unit 2618) through the plurality of values at a rate based on a rate-based acceleration factor.

In accordance with some embodiments, the processing unit 2606 is further configured to: gradually increase (e.g., using increasing unit 2620) an acceleration-modification factor applied to the navigation through the plurality of values as the rate of movement of the input increases from a first rate that is below the first movement-rate threshold to a rate that is at a third movement-rate threshold.

In accordance with some embodiments, the first movement-rate criteria include a second requirement that the rate of movement of the input is below the second movement-rate threshold in order for the first movement-rate criteria to be met.

In accordance with some embodiments, the acceleration-modification factor is zero when the rate of movement of the input is below the first movement-rate threshold.

In accordance with some embodiments, the processing unit 2606 is further configured to: in response to receiving the input: in accordance with the determination (e.g., using determining unit 2616) that the rate of movement of the input meets the first movement-rate criteria and that the current value of the adjustable control is a first value of the plurality of values, navigate (e.g., using navigating unit 2618) through the plurality of values at a rate based on a first progress-based acceleration factor; and in accordance with the determination (e.g., using determining unit 2616) that the rate of movement of the input meets the first movement-rate criteria and that the current value of the adjustable control is a second value of the plurality of values that is different from the first value of the plurality of values, navigate (e.g., using navigating unit 2618) through the plurality of values at a rate based on a second progress-based acceleration factor that is different from the first progress-based acceleration factor.

In accordance with some embodiments, the electronic device 2600 includes one or more cameras units 2622, and the adjustable control is a camera zoom control and is displayed, on the display unit 2602, as part of a camera capture user interface that includes a live preview of a field of view of the one or more cameras units 2622.

In accordance with some embodiments, the adjustable control is a virtual dial that rotates off of the display unit 2602.

In accordance with some embodiments, the first movement-rate criteria include a third requirement that the location of the input is within a predetermined distance to the first input boundary in order for the first movement-rate criteria to be met.

The operations described above with reference to FIG. 23A-23B are, optionally, implemented by components depicted in FIGS. 1A-1B or FIG. 26. For example, displaying operation 2302 and receiving operation 2304 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, home addresses, or any other identifying information.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

What is claimed is:

1. A non-transitory computer-readable storage medium storing one or more programs configured to be executed by one or more processors of an electronic device with a first camera, a second camera, and a display, the one or more programs including instructions for:
concurrently displaying, on the display:
a user interface for capturing photos based on data received from the first camera that includes displaying a digital viewfinder with a first magnification; and
an affordance for modifying the magnification of photos captured by the device using one or more of the first and second cameras;
detecting activation of the affordance;
in response to detecting activation of the affordance:
ceasing to display, on the display, the user interface for capturing photos based on data received from the first camera; and
displaying, on the display, a user interface for capturing photos based on data received from the second camera that includes displaying a digital viewfinder with a second magnification that is greater than the first magnification.

2. The non-transitory computer-readable storage medium of claim 1, the one or more programs further including instructions for:
detecting a user input in the digital viewfinder;
in response to detecting the user input:
displaying, on the display, a zoom control; and
performing a zoom of the digital viewfinder in accordance with the user input.

3. The non-transitory computer-readable storage medium of claim 2, wherein the user input corresponds to a pinch gesture in the digital viewfinder.

4. The non-transitory computer-readable storage medium of claim 2, wherein the user input corresponds to a drag gesture in the digital viewfinder.

5. The non-transitory computer-readable storage medium of claim 2, wherein the user input corresponds to a swipe gesture in the digital viewfinder.

6. The non-transitory computer-readable storage medium of claim 2, wherein the zoom control includes a zoom indicator affordance.

7. The non-transitory computer-readable storage medium of claim 6, wherein the zoom control includes a plurality of locations corresponding to a plurality of magnification levels, and wherein a first location of the plurality of locations corresponds to a first optical magnification level and a second location of the plurality of locations corresponds to a second optical magnification level that is different from the first optical magnification level.

8. The non-transitory computer-readable storage medium of claim 2, the one or more programs further including instructions for:
detecting a gesture corresponding to the zoom control, the gesture having a direction and a length;
in response to detecting the gesture corresponding to the zoom control and in accordance with the direction being a first direction, performing a zoom-out of the digital viewfinder at a speed based on the magnitude of the gesture; and
in response to detecting the gesture corresponding to the zoom control and in accordance with the direction being a second direction different from the first direction, performing a zoom-in of the digital viewfinder at a speed based on the magnitude of the gesture.

9. The non-transitory computer-readable storage medium of claim 1, wherein the affordance for modifying the magnification is displayed in accordance with a determination that the electronic device includes a plurality of cameras with overlapping fields of view.

10. The non-transitory computer-readable storage medium of claim 1, the one or more programs further including instructions for:
detecting a second activation of the affordance for modifying the magnification;
in response to detecting the second activation of the affordance for modifying the magnification:
ceasing to display, on the display, the user interface for capturing photos based on data received from the second camera; and
displaying, on the display, the user interface for capturing photos based on data received from the first camera that includes displaying the digital viewfinder with the first magnification.

11. The non-transitory computer-readable storage medium of claim 2, wherein the displayed zoom control fades out in response to detecting an input lift-off signal associated with the user input in the digital viewfinder and wherein the displayed affordance for modifying the magnification does not fade out in response detecting the input lift-off signal associated with the user input in the digital viewfinder.

12. The non-transitory computer-readable storage medium of claim 2, wherein displaying, on the display, the zoom control includes replacing display of the affordance for modifying the magnification with display of the zoom control.

13. A method, comprising:
at an electronic device with a first camera, a second camera, and a display:
concurrently displaying, on the display:
a user interface for capturing photos based on data received from the first camera that includes displaying a digital viewfinder with a first magnification; and
an affordance for modifying the magnification of photos captured by the device using one or more of the first and second cameras;
detecting activation of the affordance;
in response to detecting activation of the affordance:
ceasing to display, on the display, the user interface for capturing photos based on data received from the first camera; and
displaying, on the display, a user interface for capturing photos based on data received from the second camera that includes displaying a digital viewfinder with a second magnification that is greater than the first magnification.

14. An electronic device, comprising:
a first camera;
a second camera;
a display;
one or more processors; and
a memory storing one or more programs configured to be executed by the one or more processors, the one or more programs including instructions for:
concurrently displaying, on the display:
a user interface for capturing photos based on data received from the first camera that includes displaying a digital viewfinder with a first magnification; and an affordance for modifying the magnification of photos captured by the device using one or more of the first and second cameras;
detecting activation of the affordance;
in response to detecting activation of the affordance:
ceasing to display, on the display, the user interface for capturing photos based on data received from the first camera; and
displaying, on the display, a user interface for capturing photos based on data received from the second camera that includes displaying a digital viewfinder with a second magnification that is greater than the first magnification.

15. The method of claim 13, further comprising:
detecting a user input in the digital viewfinder;
in response to detecting the user input:
displaying, on the display, a zoom control; and
performing a zoom of the digital viewfinder in accordance with the user input.

16. The method of claim 15, wherein the user input corresponds to a pinch gesture in the digital viewfinder.

17. The method of claim 15, wherein the user input corresponds to a drag gesture in the digital viewfinder.

18. The method of claim 15, wherein the user input corresponds to a swipe gesture in the digital viewfinder.

19. The method of claim 15, wherein the zoom control includes a zoom indicator affordance.

20. The method of claim 19, wherein the zoom control includes a plurality of locations corresponding to a plurality of magnification levels, and wherein a first location of the plurality of locations corresponds to a first optical magnification level and a second location of the plurality of locations corresponds to a second optical magnification level that is different from the first optical magnification level.

21. The method of claim 15, further comprising:
detecting a gesture corresponding to the zoom control, the gesture having a direction and a length;
in response to detecting the gesture corresponding to the zoom control and in accordance with the direction being a first direction, performing a zoom-out of the digital viewfinder at a speed based on the magnitude of the gesture; and
in response to detecting the gesture corresponding to the zoom control and in accordance with the direction being a second direction different from the first direction, performing a zoom-in of the digital viewfinder at a speed based on the magnitude of the gesture.

22. The method of claim 13, wherein the affordance for modifying the magnification is displayed in accordance with a determination that the electronic device includes a plurality of cameras with overlapping fields of view.

23. The method of claim 13, further comprising:
detecting a second activation of the affordance for modifying the magnification;
in response to detecting the second activation of the affordance for modifying the magnification:
ceasing to display, on the display, the user interface for capturing photos based on data received from the second camera; and
displaying, on the display, the user interface for capturing photos based on data received from the first camera that includes displaying the digital viewfinder with the first magnification.

24. The method of claim 15, wherein the displayed zoom control fades out in response to detecting an input lift-off signal associated with the user input in the digital viewfinder and wherein the displayed affordance for modifying the magnification does not fade out in response detecting the input lift-off signal associated with the user input in the digital viewfinder.

25. The method of claim 15, wherein displaying, on the display, the zoom control includes replacing display of the affordance for modifying the magnification with display of the zoom control.

26. The electronic device of claim 14, the one or more programs further including instructions for:
detecting a user input in the digital viewfinder;
in response to detecting the user input:
displaying, on the display, a zoom control; and
performing a zoom of the digital viewfinder in accordance with the user input.

27. The electronic device of claim 26, wherein the user input corresponds to a pinch gesture in the digital viewfinder.

28. The electronic device of claim 26, wherein the user input corresponds to a drag gesture in the digital viewfinder.

29. The electronic device of claim 26, wherein the user input corresponds to a swipe gesture in the digital viewfinder.

30. The electronic device of claim 26, wherein the zoom control includes a zoom indicator affordance.

31. The electronic device of claim 30, wherein the zoom control includes a plurality of locations corresponding to a plurality of magnification levels, and wherein a first location of the plurality of locations corresponds to a first optical magnification level and a second location of the plurality of locations corresponds to a second optical magnification level that is different from the first optical magnification level.

32. The electronic device of claim 26, the one or more programs further including instructions for:
detecting a gesture corresponding to the zoom control, the gesture having a direction and a length;
in response to detecting the gesture corresponding to the zoom control and in accordance with the direction being a first direction, performing a zoom-out of the digital viewfinder at a speed based on the magnitude of the gesture; and
in response to detecting the gesture corresponding to the zoom control and in accordance with the direction being a second direction different from the first direction, performing a zoom-in of the digital viewfinder at a speed based on the magnitude of the gesture.

33. The electronic device of claim 14, wherein the affordance for modifying the magnification is displayed in accordance with a determination that the electronic device includes a plurality of cameras with overlapping fields of view.

34. The electronic device of claim 14, the one or more programs further including instructions for:
detecting a second activation of the affordance for modifying the magnification;
in response to detecting the second activation of the affordance for modifying the magnification:
ceasing to display, on the display, the user interface for capturing photos based on data received from the second camera; and
displaying, on the display, the user interface for capturing photos based on data received from the first camera that includes displaying the digital viewfinder with the first magnification.

35. The electronic device of claim 26, wherein the displayed zoom control fades out in response to detecting an input lift-off signal associated with the user input in the digital viewfinder and wherein the displayed affordance for modifying the magnification does not fade out in response detecting the input lift-off signal associated with the user input in the digital viewfinder.

36. The electronic device of claim 26, wherein displaying, on the display, the zoom control includes replacing display of the affordance for modifying the magnification with display of the zoom control.

* * * * *